United States Patent [19]

Kemppainen et al.

[11] Patent Number: 4,611,277
[45] Date of Patent: Sep. 9, 1986

[54] MICROCOMPUTER COMMUNICATIONS SOFTWARE

[75] Inventors: John C. Kemppainen, Benicia; Thomas E. Trelford, Corte Madera, both of Calif.

[73] Assignee: BankAmerica Corporation, San Francisco, Calif.

[21] Appl. No.: 533,064

[22] Filed: Sep. 15, 1983

[51] Int. Cl.[4] .............................. G06F 15/16
[52] U.S. Cl. ..................... 364/200; 364/300
[58] Field of Search .......... 364/200, 300, 405, 408; 340/825.31, 825.3, 825.33, 825.34, 825.35; 178/22.08

[56] References Cited

U.S. PATENT DOCUMENTS

| | | | |
|---|---|---|---|
| 3,725,868 | 4/1973 | Malmer, Jr. et al. | 364/200 |
| 3,774,156 | 11/1973 | Marsalka et al. | 364/200 |
| 3,937,925 | 2/1976 | Boothroyd | 364/900 X |
| 4,064,490 | 12/1977 | Nagel | 364/200 |
| 4,186,438 | 1/1980 | Benson et al. | 364/200 |
| 4,241,237 | 12/1980 | Paraskevakos et al. | 340/825.26 X |
| 4,293,915 | 10/1981 | Carpenter et al. | 364/493 |
| 4,298,932 | 11/1981 | Sams | 364/200 |
| 4,434,460 | 2/1984 | Drakenborn et al. | 364/200 |
| 4,486,828 | 12/1984 | Kitamura et al. | 364/200 |

*Primary Examiner*—Raulfe B. Zache
*Attorney, Agent, or Firm*—Flehr, Hohbach, Test, Albritton & Herbert

[57] ABSTRACT

Disclosed is a microcomputer communications software implementation for controlling the transfer of data between a microcomputer and a host mainframe computer in various modes of operation, including an unattended mode, a terminal emulation mode, an automatic mode, and a manual mode. The present invention is particularly suitable for use with cash management systems.

9 Claims, 6 Drawing Figures

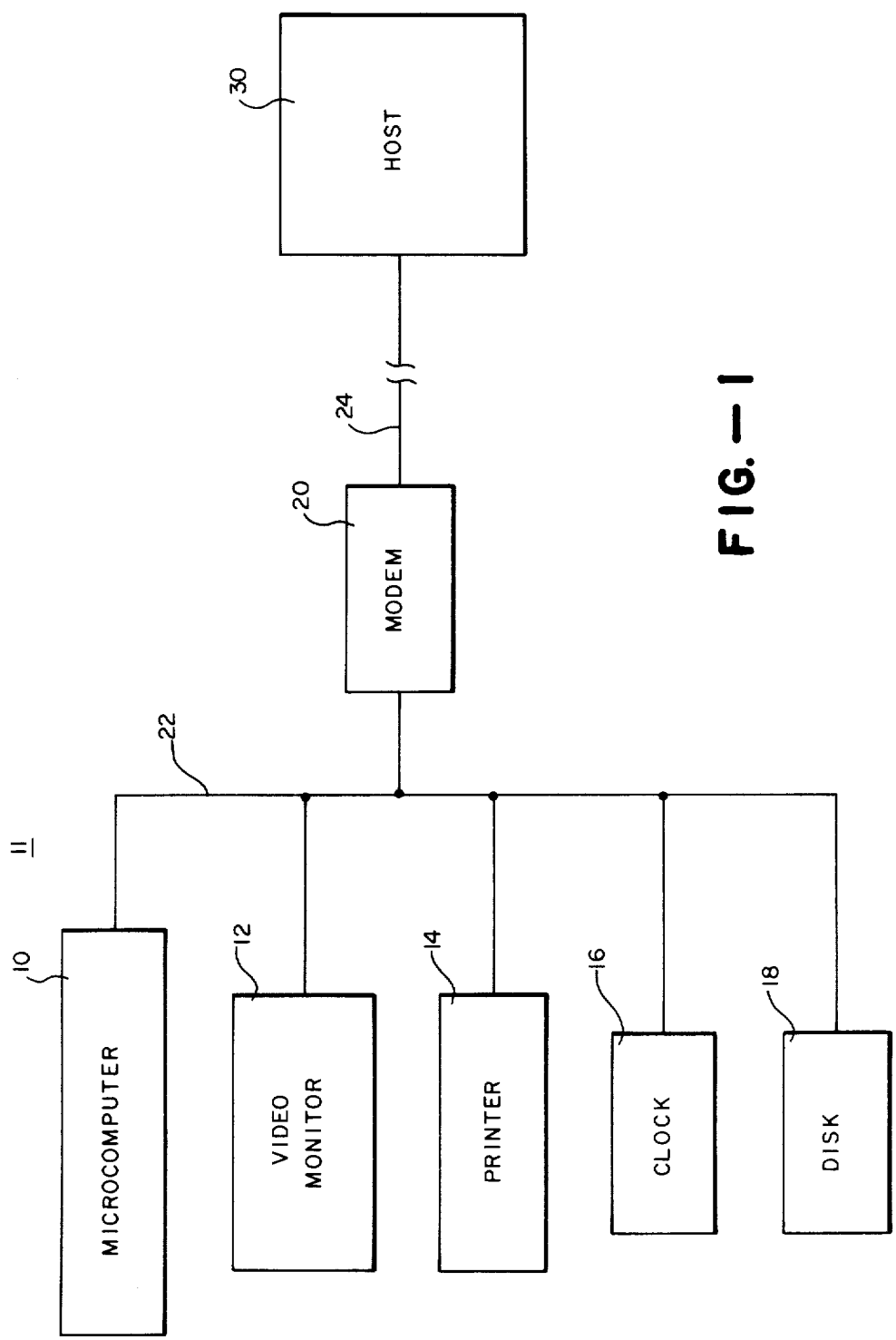

```
MAIN MENU

1   COMMUNICATIONS
2   ACCOUNT DATA ENTRY
3   DAILY PROCESSING
4   INITIATE WIRE TRANSFERS
5   INITIATE DTCs/ACHs
6   END OF DAY PROCESSING
7   START OF MONTH PROCESSING
9   CHANGE TEMPLATES
10  GENERIC PRODUCTS
11  SYSTEM UTILITIES
12  BANK RELATIONSHIP
13  DEBT MANAGEMENT
14  INVESTMENT MANAGEMENT
18  RETURN TO SYSTEM LOGON
19  RETURN TO MS-DOS

PLEASE ENTER NUMBER
```

FIG.—2

```
COMMUNICATIONS MENU

20  COMMUNICATIONS MENU
21  PLACE A CALL
22  UPDATES = DIAL LIST
23            LOG FILE
24  REPORTS = DIAL LIST
25            CALL AUDIT
26            TROUBLE LOG
27            CALL HISTORY
28            COMMUNICATIONS DATA/REPORTS
30  COMMUNICATIONS HELP

PLEASE ENTER NUMBER
```

FIG.—3

```
AVAILABLE FUNCTIONS SCREEN

AVAILABLE FUNCTIONS ARE:
        [T]ERMINAL EMULATION
        [M]ANUAL CALL SELECTION
        [A]UTOMATIC CALL SELECTION
        [U]NATTENDED AUTOMATIC CALLING
        [Q]UIT

WHAT FUNCTION DO YOU WANT TO PERFORM?
```

FIG.—4

```
                UNATTENDED AUTOMATIC CALLING SCREEN

UNATTENDED AUTOMATIC CALLING

CALL                                    CALL
NBR   DESCRIPTION                       TIME   STATUS

4   BAMTRAC DATAFILE SF               0750 HRS CALL RESCHEDULED
  2   BAMTRAC DETAIL REPORT             0800 HRS CALL PENDING

===================================NEXT CALL=====================================
CALL NUMBER 4 TO BAMTRAC DATAFILE SF   at 0750 HOURS ON 08/10/83
================================================================================

TO STOP THE AUTOMATIC CALLING PRESS RETURN

IT IS NOW 07:47:11 ON 08/10/83
```

FIG.—5

```
                END OF DAY PROCESSING MENU

60  END OF DAY PROCESSING
61  FILE BACKUP
63  INITIALIZE ALL WORKSHEETS FOR TOMORROW
64  INITIALIZE DATA ENTRY FOR TOMORROW
65  RESET COMMUNICATIONS FILES
66  RESET HISTORY FILES
67      INITIALIZE TARGET BALANCE FOR TODAY
68      INITIALIZE DAILY CASH PROJECTION WORKSHEET FOR TODAY
69      INITIALIZE DAILY TRANSACTION JOURNAL FOR TODAY
70      INITIALIZE BALANCE REPORT FOR TODAY
71      INITIALIZE INTRACO FUNDS DETAIL FOR TODAY
72      INITIALIZE INTRACO FUNDS SUMMARY FOR TODAY
73      INITIALIZE DATA ENTRY FOR TODAY
```

FIG.—6

MICROCOMPUTER COMMUNICATIONS SOFTWARE

BACKGROUND OF THE INVENTION

The present invention relates to a communications software control implementation for controlling the transfer of data between a microcomputer and a mainframe computer.

The present invention is more particularly directed for implementation with a cash management system which permits an interfacing between the microcomputer and a mainframe computer under software control.

Prior art systems have been known which provide for hardware control of communications between microcomputers and mainframe computers in a cash management system. In addition, there are some software control approaches to such cash management systems but which, however, are limited in that such approaches do not allow accessing of a host computer together with the ability of receiving data from the host.

In view of the foregoing background, it is an objective of the present invention to provide an improved software communications technique for controlling the transfer of data between a microcomputer and a mainframe computer.

SUMMARY OF THE INVENTION

The present invention relates to a microcomputer software control system for controlling the transfer of data between a microcomputer and a mainframe computer.

In a preferred embodiment, the system includes a microcomputer a mainframe computer connected via telephone network to said microcomputer, and communications software control means for controlling the transfer of data between the microcomputer and the mainframe computer wherein the software control means include means for controlling the transfer of said data in an unattended mode.

In a typical environment, the present invention is intended to be utilized with a cash management system wherein a corporate customer is provided with advanced tools to simplify the determination and management of daily and longer term cash positions. The system includes a communications module with auto-dial and clock capabilities which allows a customer to predefine calls to be placed to a specified bank reporting service. Each morning, at the time specified by the customer, the system dials the reporting service in an unattended mode, completes the log-on procedures, answers all prompts of the host system, receives the data, and then log-offs. The transfer of information is under general control of software control means which thereby provides an improved communication technique.

In accordance with the foregoing summary, the present invention achieves the objective of providing an improved software communications technique for controlling the transfer of data between a mainframe computer and a microcomputer in a cash management environment.

Other objects and features of the present invention will become apparent from the following detailed description when taken in conjunction with the accompanying drawings.

BRIEF DESCRIPTION OF THE DRAWINGS

FIG. 1 depicts a block diagram of a user terminal connected to a host system according to the present invention.

FIG. 2 depicts a main menu display which appears on the screen of a monitor which forms a portion of FIG. 1.

FIG. 3 depicts a communications menu display which appears on the screen of the monitor of FIG. 1.

FIG. 4 depicts an available functions screen display which appears on the monitor of FIG. 1.

FIG. 5 depicts an unattended automatic calling screen display which appears on the monitor of FIG. 1.

FIG. 6 depicts an end of day processing menu display which appears on the screen of the monitor of FIG. 1.

DESCRIPTION OF THE PREFERRED EMBODIMENT

As described above, the present invention relates to a communications software control means in conjunction with controlling the transfer of data between a microcomputer and a host mainframe computer.

The present invention provides a software communications aspect which enables users to transfer information between a microcomputer and another connected host computer, typically a mainframe computer.

In FIG. 1, a block diagram of one preferred embodiment of the present invention is illustrated. In FIG. 1, the user's terminal 11 comprises a microcomputer configuration including a microcomputer 10 (typically a Victor 9000 microcomputer), a video monitor 12 (typically a Victor model) a clock 16 (typically D.C. Hayes chronograph clock), a disk storage facility 18, and high speed printer 14, all of which are interconnected between modem 20 (typically a D.C. Hayes Smartmodem at 1200 baud) by bus 22.

The user terminal 11 can be directly connected to a host mainframe computer 30 via bus 24, which could be a telephone connection in a preferred embodiment.

According to one aspect of the present invention, a communications function of the software enables a user with a terminal 11 such as illustrated in FIG. 1 to transfer information between the microcomputer 10 and any other connected host computer such as host 30. The information transferred falls into one of three categories:

The transfer of responses to prompts from the user terminal 11 to a connecter computer.

The transfer of (balance) data files from the host computer 30 to the micro 10 for posting and manipulation.

The transfer of report files from a connected computer to the micro 10 for storage, printing and/or display.

The communications function may be utilized in any or all of four modes: terminal emulation, manual, automatic or automatic unattended.

TERMINAL EMULATION MODE

This function allows the user to place calls to another computer as if using a non-intelligent/dumb terminal. The terminal prompts the user for the telephone number to be called, whether the other computer is in full or half duplex, and if the terminal session is to be displayed on the screen, printer or both. Once the connection with the other host computer has been established, the ensuing terminal session proceeds just as if the user were on any "dumb" terminal.

MANUAL MODE

This function allows the user to place calls that are partially or fully defined. Predefined call information may include as little as the phone number to be called or as much as the entire terminal session whereby the micro dials up the outer computer, passes the predefined logon information and responses to prompts and logs off. If responses to prompts after the logon have not been predefined, the micro will return the user to terminal emulation mode. Predefined manual calls do not have a time of execution associated with them but are manually initiated at the user's request.

AUTOMATIC MODE

This function allows the user to ("manually") initiate calls, at any time, that are predefined and set to execute at a specific date and time. If the user initiates a call in automatic mode the system will, after completion, ask if this satisfies today's call requirement and reschedules the call appropriately.

UNATTENDED MODE

This function allows the user to place the micro in a wait mode, check the clock, and place predefined calls at the appropriate time. Because these calls are executed without an operator present, any reports or files resulting from the call are automatically stored on disk to avoid printer malfunctions or can be routed to the printer and/or CRT screen as well. When unattended calls have been successfully completed, the terminal automatically reschedules them for the next day excluding weekends and holidays. Unattended automatic calls that are not successfully completed are automatically rescheduled for twenty minutes later.

CALL DEFINITION

For the present invention to initiate calls in any mode other than terminal emulation, the user creates the call definition. The call definition is comprised of two items, a dial list and a log file, which are created for each call. The dial list contains "macro" information about the call to be placed such as characteristics of the other computer, time for the call to be placed, and options for returned data; i.e., screen, printer, disk. The log file contains the actual instructions to complete the call; i.e., telephone number, logon responses, and/or responses to prompts of the other computer, and log off.

REPORTS

Reports stored on a hard disk as a result of the communication function may be displayed and/or printed at the user's request. These saved report files may be printed singly, by group of files, or all saved report files.

In addition to reports generated via the communications function, communications itself provides several reports for monitoring and information purposes.

DIAL LIST REPORT

This report provides the user with a list of each call defined in the dial list by number and description, the time it is to be executed if there is one, and if the call results in a disk file. Report viewing on the monitor or on the printer is available.

CALL AUDIT REPORT

This report provides the user with a list of each defined call and the last successful completion date and time, the number of lines of data received from the other computer and the amount of time the micro was connected to the other computer.

TROUBLE LOG

This report provides the user with a list of calls that were attempted but unsuccessfully completed, the time and date of each call and the number of lines received, if any. Also included is a description of the error to the best that it can be determined by the system.

CALL HISTORY REPORT

The call history file contains a listing of completed calls, the date and time, number of lines received and the connect time. This file may be reported in total or screened based on the call number, call time, call date, number of lines received or the connect time.

COMMUNICATIONS HELP

The communications help prints/displays online information about using the communications module. Included in this information is a suggested procedure for setting up call definitions, a brief description of each item in the dial list, special characters that may be required, and conversion tables that may be needed to define special characters in the log file.

In addition to the points listed above, the communications module in one preferred embodiment operates under the CP/M operating system. The communications software source code can also operate under the MS-DOS operating system. A computer print-out illustrating a preferred software source code for controlling the operation of the user terminal 11 of FIG. 1 is attached herewith as Appendix A.

According to one aspect of the present invention, a microcomputer based cash management system has been briefly described which can provide a customer with advanced tools to simplify the determination and management of daily and longer term cash positions.

The communications module of FIG. 1 with auto-dial and clock capabilities allows a customer to predefine those calls to be placed to specified bank reporting services. Each morning, at the time specified by the customer, the present invention can dial the reporting service, complete the log-on procedures, answer all prompts of the host system, receive the data and then log-off. This procedure is then repeated for as many banks as specified by the customer.

Information from such financial reporting services is received in a data file format. Information from other reporting services is received in a report format. The information that is received in a file format is subsequently posted from the data file into work sheets which are used for the creation of the daily reports. For information not transferred in data file format, a data entry routine allows a user to enter other types of account information, store that information in a data base, and also post to the work sheets.

In order to further described the features of the present invention a sequence of activities occurring when placing a call in an unattended mode will be described.

The description of this unattended mode of operation will be described in conjunction with FIGS. 1-5. The general sequence of events will be described first in general terms followed by a description of the unattended mode of operation. It is assumed that an operator is arriving at his office and will utilize the user terminal 11 depicted in FIG. 1.

Upon arrival—Many calls, perhaps all, have been set up in Unattended Mode and may occur before an operator arrives in the morning. He checks to be sure Unattended calls were completed successfully. He checks the status column on the Unattended calling screen. If there is a problem, he checks the Daily Trouble Log for details. If necessary, he places the call in Automatic Mode or reschedules the call for tomorrow.

Retrieving Information—The operator uses menu item 28 (Communications Data/Reports) to display or print information obtained via system calls.

Additional Calls—The operator places any additional calls by using Manual or Terminal Emulation Mode.

Account Data Entry—The operator uses the Account Data Entry module to enter information not received in file format and obtained via system calls.

Systems Worksheets—The operator indicates that the account balance information should be posted to the system worksheets.

Reports—The operator prints or displays the Call Audit and Call History Reports in order to determine exactly which calls have recently been made to whom, and when.

End of Day Processing—As depicted in FIG. 6, the operator uses menu items 65 (Reset communications files) and 66 (Reset history files) to delete old files at the end of the day. The operator uses menu item 61 (File backup) to back up the system.

Before Leaving—The operator puts the system into Unattended Mode so that calls will be placed automatically on the next morning.

The Communications System provides the capability to automatically dial the phone number of another computer system; log-on to that system; respond to prompts issued by the host system; request and receive information; display on screen, print or save in a disk file the received information; and log-off the host system. A call made automatically is controlled by that call's dial list and log file.

Dial List—The dial list controls: time and date of Unattended call placement (if any); disposition of the received information (display on screen, print or save in a disk file); technical parameters of the telecommunications link between the present system and the host computer system (duplex, modem setting and host's log-off).

Log File—The log file controls the exact sequence of responses sent to the most computer system in the course of logging on, receiving information, and logging off. The log file also contains the phone number of the host system.

CALLING MODES

An operator may use the system as if it were a simple teletype terminal or he may utilize the automatic calling capability it offers. Automatic calls can be initiated at any time by the operator or they can be initiated by the system at a predetermined time and date.

Terminal Emulation Mode—If an operator elects to place a call in Terminal Emulation Mode, he is prompted for the phone number he wishes to dial, the rate of data transmission (300 or 1200 baud), and the duplex mode (full or half). He is then asked whether he wishes the received information to be displayed on the screen or printed. The phone number is then dialed. From that point forward, interaction with the host computer system occurs exactly as if he were using a simple teletype terminal. He must enter a response to each prompt issued by the host system. No dial list or log file is required for calls made in Terminal Emulation Mode.

Manual Mode or Automatic Mode—A call made in Manual Mode or Automatic Mode requires a dial list and a log file. If the operator elects to place a call in Manual or Automatic Mode, the call can be place entirely automatically; the phone number is dialed, the log-on and subsequent prompts are answered, the information is received, and the log-off is completed.

The only difference between calls made in Manual versus Automatic Mode is that calls with scheduled call times (for Unattended Mode calls) are classified as Automatic Mode calls, whereas calls without scheduled call times (for Unattended Mode calls) are classified as Manual Mode calls.

Unattended Mode—If the operator selects Unattended Mode, the system will automatically place the calls scheduled at the specified times. The operator initially schedules a call to take place in Unattended Mode by entering a time and date in the CALL TIME section of the dial list for that call. Thereafter, the call will be automatically made on each business day.

At the specified time, the call will be automatically placed if the system is in Unattended Mode at that moment. If the system is not in Unattended Mode at the scheduled call time, the call will be made when the system is next put into Unattended Mode.

FUNCTION KEYS

Screen Display—A row of ten illuminated boxes appears at the bottom of the video monitor of FIG. 1 as a call is being made in any of the four modes. These ten boxes correspond to special effects during call placement.

F1-CRT

If F1 is ON, all information received by the system during the call is displayed on the video monitor as it is received. If F1 is OFF, received information is not displayed.

F2-PTR

If F2 is ON, all information received by the system during the call is printed as it is received. If F2 is OFF, received information is not printed.

F3-K/P

If F3 is ON, all characters entered on the keyboard are printed. In addition, turning on F3 turns on F2. Thus, by pressing function key 3, on operator can generate a complete printed record of any call made in Terminal Emulation Mode. This feature is quite useful in the call definition process. If F3 is OFF, keyboard input is not printed.

F4-DSK

If F4 is ON, all information received by the system during the call is saved in a disk file. If F4 is OFF, received information is not saved in a disk file. If an operator wants to save the received call information in a disk file but the dial list for this call does not specify that the information is to be so saved, the operator simply presses F4. After the call has been completed, a prompt will ask the operator what file what file name he wishes to give the new file. He enters any file name he wishes to give the new file, then enters any file name of up to eight characters, enters a dot, then enters a three-character suffix. An example of a valid file name would be: MORGAN.BAL. When he wishes to retrieve the filed call information, he first goes into MS-DOS, the operating system of the microcomputer, by entering 19 on the main menu. At the A>prompt, he enters type MORGAN.BAL to get a screen display of the file. If he wishes to print the file, he enters copy MORGAN.BAL PRN.

F5-MDM

If F5 is ON, all information sent from the modem to the host computer system is displayed on the screen. This may be useful when testing a new call. If FS is OFF, the output from the modem is not displayed on the screen.

F6-CTL

If F6 is ON and the operator presses the backspace key, a backspace is sent to the host computer system. Thus, if he is using Terminal Emulation Mode and he enters a character accidentally, he simply presses F6 and the backspace to delete the mis-entered character. If F6 is OFF when he presses the backspace key, no backspace is sent.

F7-LOG

When he presses the F7 key, the log-off word (specified in the dial list) is sent to the host immediately and the phone line is disconnected. If the system is in Terminal Emulation Mode, pressing F7 sends LOG before disconnecting the line. Thus, F7 terminates the call by logging off and hanging up. If the system is receiving information at the time F7 is pressed, the log-off will occur after the information is completely received.

F8-HELP

When the operator presses F8, a list of the function keys along with a brief description of their effects is displayed on the screen.

F9-BRK

When the operator presses F9, a break signal is sent to the host system. The break signal acts to interrupt processing for some host systems.

F10-CAN

When the operator presses F10, the system immediately stops referencing the log file for the particular call in progress. The system remains connected to the host system, however, and reverts to Terminal Emulation Mode to await the operator's keyboard-entered responses.

ON and OFF

To turn ON the effect associated with a given function key, the operator presses that function key. The illuminated box paired with that key is darkened. To turn OFF the effect associated with a given function key, the operator presses that function key and the box paired with that key is lit. Each press of a function key will switch the effect from OFF to ON or from ON to OFF.

Dial List Settings

The dial list for the call being made may turn ON one or more of the function key effects. If so, the illuminated boxes associated with those functions will be dark. The operator may still alter those call characteristics controlled by the function keys at the time the call is actually placed by simply pressing the appropriate function key to go from ON to OFF or from OFF to ON.

Delayed Effect

At some points in the call placement process, the system does not immiediately acknowledge that the operator has pressed a function key. Thus, if he presses a function key while the phone number is actually being dialed, for example, the appropriate change in the screen display will not occur until the dialing process is completed. If he presses a function key while the system is otherwise engaged, he simply waits a few seconds and the request will soon be acknowledged.

When an operator places calls using the Unattended Mode, the terminal depicted in FIG. 1 automatically performs all tasks associated with those calls. The system waits until the time the operator has specified for each call placement, then establishes a telephone link with the host computer system, executes the log-on sequence, receives the desired information and logs off the host system.

DIAL LIST AND LOG FILE

The operator creates a dial list and llog file for each call he wishes to place in Unattended Mode, and uses the dial list to specify the date and time at which he wishes a call to be placed.

CALL SCHEDULING

If the system is in Unattended Mode at the time a given call placement is scheduled, the call is placed immediately. If the system is not in Unattended Mode at the time a given call placement is scheduled, the call will be placed as soon as the system is put into Unattended Mode.

ERRORS DURING UNATTENDED CALLS

If an error terminates a call made in Unattended Mode, the error message is placed in the Daily Trouble Log, and the call is re-scheduled to take place 20 minutes later. If the problem is unlikely to be resolved by retrying the call, however, the call will not be rescheduled.

Thus, if a call is placed in Unattended Mode at 6:00 a.m., for example, and that call is unsuccessful, it is rescheduled for 6:20 a.m. If the 6:20 call is also unsuccessful, the call is rescheduled for 6:40. This rescheduling process goes on until the call is successfully completed.

TERMINATING CALL RESCHEDULING

If an operator wishes to terminate the rescheduling process, he may use either of two methods:
Place the call in Automatic Mode. After the call has been completed (successfully or not), a prompt appears on the monitor. Does this call satisfy today's call requirement (Y,N)? Enter Y to cause the call to be scheduled for tomorrow.
Modify the call's dial list. Set NEXT CALL DATE to tomorrow's date.

FIG. 2 depicts a main menu utilized for operating in an Unattended attended Mode. FIG. 3 depicts a communications menu utilized for operating in an Unattended Mode. The initial steps are as follows:

On Main Menu

Step 1—Enter 1 (Communications) to indicate that the operator wishes to use the Communications module.

Please enter number 1 and hit the RETURN key (RET).

The Communications menu appears as depicted in FIG. 3.

On Communications Menu

Step 2—Enter 21 (Place a call) to indicate that the operator wishes to place a call. Please enter number 21 (RET).

The Available Functions screen appears as depicted in FIG. 4.

On Available Functions Screen

Step 3—Indicate which function the operator wishes to perform. If the operator wishes to put the system in Unattended Mode, enter U. If the operator wishes to return to the Communications menu, enter Q.

What function do you want to perform? U (RET) (Unattended or Q (RET) (Quit).

U—(Unattended Automatic Calling)—If the operator enters U, the Unattended Automatic Calling screen appears as depicted in FIG. 5. For instructions, go on to Step 4. Q (Quit)—If the operator enters Q, the Communications menu appears.

Step 4—The Unattended Automatic Calling screen displays the calls to be placed in the order in which those calls will be placed. A maximum of five calls are displayed. If the operator wishes the system to place the calls according to the schedule displayed, he simply leaves the machine alone. For instructions, go on to Step 5. If the operator wishes to interrupt the automatic calling process, he presses the return key.

To stop the automatic calling, press the RETURN key (RET).

The Available Functions screen appears. For instructions, go back to Step 3.

Step 5—When the next scheduled call time arrives, the Unattended Automatic Calling screen disappears. A message is displayed briefly:

Setting up instructions for selected call.

Transferring to communications processor.

After a few seconds, the system dials the host system's telephone number. A message displays the call description and phone number.

If the call description is BAMTRAC DATAFILE SF, for example, and the phone number is 9-123-4567, then the message displayed is:

When the call ends and the telephone link is broken, a message appears:

Call has been completed. Updating proper file.

If an error terminated the call (if, for example, the host hung up unexpectedly), a message appears:

TO INTERRUPT UNATTENDED CALLING PRESS "RETURN" BETWEEN NOW AND THE TIME DISPLAY ON THE "UNATTENDED AUTOMATIC CALLING" SCREEN.

Have an error. Updating the trouble log.

Have an error. Rescheduling the call.

After a few seconds, the Unattended Automatic Calling screen appears. For instructions, go back to Step 4.

If the normal log-off terminated the call, a message appears:

TO INTERRUPT UNATTENDED CALLING PRESS "RETURN" BETWEEN NOW AND THE TIME DISPLAY ON THE "UNATTENDED AUTOMATIC CALLING" SCREEN.

Normal completion. Updating the daily history file.

After a few seconds, the Unattended Automatic Calling screen appears. For instructions, go back to Step 4.

Calling BAMTRAC DATAFILE SF

Dialing 91234567.

If the host system answers the call, a message appears:

Host Sytem has answered. For instructions, go on to Step 6.

If the host system does not answer the call, the system re-dials twice before giving up. After the third unsuccessful attempt, a message appears:

Call has been completed. Updating the proper files.

TO INTERRUPT UNATTENDED CALLING, PRESS RETURN BETWEEN NOW AND THE TIME DISPLAYED ON THE UNATTENDED AUTOMATIC CALLING SCREEN.

Have an error. Updating the trouble log.

Have an error. Rescheduling the call.

The Unattended Automatic Calling screen appears. For instructions, go back to Step 4.

Step 6—The dialogue between the terminal and the host computer system is carried out according to the instructions contained in the dial list and log file.

| REM | VERSION | DATE | CHANGE |
|---|---|---|---|
| REM | 1.0 | 08/26/82 | INITIAL VERSION |
| REM | 1.1 | 09/07/82 | Corrected wording in 4 areas |
| REM | 1.2 | 10/05/82 | Corrected ENTRY TYPE 'CD' date prefix |
| REM | 1.3 | 10/20/82 | Date prompt for BAMTRAC files |
| REM | | | Reschedule time from 10 to 20 |
| REM | 1.4 | 10/23/82 | Added (E) and (F) to date format |
| REM | 1.5 | 02/04/83 | Return to COMUMENU added |
| REM | | | Eliminate use of CLOCK |
| REM | | | Changed wording |
| REM | | | Added use of TECH control value |
| REM | 2.0 | 02/16/83 | Translated to Microsoft Business BASIC version 0.95 |
| REM | | | by Steve Hemphill |
| REM | 2.1 | 03/04/83 | Remove chain-back to COMUMENU; by Steve Hemphill |
| REM | 2.2 | 03/10/83 | Prompts changed to show space before response; by |
| REM | | | Steve Hemphill |
| REM | 2.3 | 03/15/83 | Changed MODEM SETTING wording; added helpful hint to |

```
REM                     FULL DUPLEX; added function key definition; by Terry
REM                     Lord
REM     2.4  03/17/83   Updated key entry section to match log file; added
REM                     log file definition; by Terry Lord
REM     2.5  03/18/83   Added notes 5,6; updated character numeric values
REM                     for VICTOR; by Terry Lord
REM     2.6  04/25/83   Display of Version number added; by Steve Hemphill
REM     2.7  05/22/83   Update Communications Forms to match system;
REM                     by Judy Ku
REM     2.8  08/22/83   Update Communications Forms to match system &
REM                     various format changes; S.WONG
REM-----------------------------------------------------------(PROGRAM START)
START:
      CONSOLE
      LET VERSION$="Communications Help Facility - Version 2.8"
      LET CTLFILE1$="CONTROL.DAT"
      LET CTLLENGTH%=128
      LET CTLMAX%=122
      LET CURRDAY$="000000"
      LET ENTRYLMT%=50
      LET STITLE1$="COMMUNICATIONS HELP INFORMATION"
      LET STITLE2$="COMMUNICATIONS DATA ENTRY"
      LET SCRNMAX%=14
      LET TECH$="NO"
      GOTO CONTROLFILE.OPEN
REM--------------------------------------------------------------(SUBROUTINES)
SCREEN.HEADING:
      IF HEADING$="BLANK" THEN GOTO SCREEN.BLANK
           PRINT SHOME$; SCLEAR$
           GOTO SCREEN.TITLE
SCREEN.BLANK:
      PRINT BLANK$
SCREEN.TITLE:
      PRINT TAB((60-LEN(TITLE$))\2);TITLE$
      PRINT TAB((60-LEN(CTITLE$))\2);CTITLE$
      PRINT TAB((60-LEN(VERSION$))\2);VERSION$
      RETURN
REM-------------------------------------------------------------------------
READ.CONTROLFILE.RECORD:
      ON END (1) GOTO READ.CONTROLFILE.ERROR
      READ #1,WORK%;NAME$,VALUEONE$,VALUETWO$
      LET STAT$="OK"
      RETURN
READ.CONTROLFILE.ERROR:
      LET STAT$="END"
      RETURN
REM---------------------------------------------------------------(CONTROLFILE)
CONTROLFILE.OPEN:
      PRINT
      PRINT "Obtaining system control values."
      ON END (1) GOTO CONTROLFILE.NO.FILE
      OPEN "R",1,CTLFILE1$,CTLLENGTH%
      LET WORK%=1
      GOTO CONTROLFILE.SET.RECORD
CONTROLFILE.NO.FILE:
      FOR LLINE%=1 TO 25
           PRINT
```

```
            NEXT LLINE%
            PRINT "NO CONTROL FILE. RETURNING TO MENU"
            GOTO RETURN.TO.MENU
    CONTROLFILE.GET.RECORD:
            GOSUB READ.CONTROLFILE.RECORD
            IF STAT$="END"      THEN GOTO CONTROLFILE.CLOSE
            IF NAME$="ENDALL"   THEN GOTO CONTROLFILE.CLOSE
            LET IWORK%=FIX(INT(VAL(LEFT$(VALUEONE$,4))+.5))
            IF NAME$="BLANK"    THEN BLANK$=CHR$(IWORK%)
            IF NAME$="CTITLE"   THEN CTITLE$=VALUEONE$
            IF NAME$="CURRDAY"  THEN CURRDAY$=VALUEONE$
            IF NAME$="HEADING"  THEN HEADING$=VALUEONE$
            IF NAME$="PMAXLINE" THEN PMAXLINE%=IWORK%
            IF NAME$="PNEWPAGE" THEN PNEWPAGE$=CHR$(IWORK%)
            IF NAME$="PRINTER"  THEN PRINTER$=VALUEONE$
            IF NAME$="SHOME"    THEN SHOME$=CHR$(IWORK%)
            IF NAME$="SCLEAR"   THEN SCLEAR$=CHR$(IWORK%)
            IF NAME$="TECH"     THEN TECH$=VALUEONE$
            IF NAME$="TITLE"    THEN TITLE$=VALUEONE$
    REM----------------------------------------------------------(CSI VT52 PATCH)
            IF IWORK%()27 THEN GOTO CONTROLFILE.SETUP.NEXT
            IF NAME$="SCLEAR" _                REM ADD PARSING FOR ADD'TL
                THEN SCLEAR$=CHR$(IWORK%)+VALUETWO$   REM VT52 DISPLAY DRIVER
            IF NAME$="SHOME" _                 REM MNEMONICS AT END OF THIS
                THEN SHOME$=CHR$(IWORK%)+VALUETWO$    REM PATCH AREA
    REM----------------------------------------------------------(CSI VT52 PATCH)
    CONTROLFILE.SETUP.NEXT:
            LET WORK%=WORK%+1
            IF WORK%)CTLMAX% THEN GOTO CONTROLFILE.CLOSE
            GOTO CONTROLFILE.GET.RECORD
    CONTROLFILE.CLOSE:
            CLOSE 1
    REM-----------------------------------------------------------(HELP SELECTION)
    DISPLAY.FUNCTIONS:
            GOSUB SCREEN.HEADING
            PRINT "Available functions are:"
            PRINT
            PRINT TAB(15);"(D)isplay Communications Help"
            PRINT TAB(15);"(P)rint Communications Help"
            PRINT TAB(15);"(C)all Definition Worksheets"
            PRINT TAB(15);"(Q)uit"
    DISPLAY.RESPONSE:
            PRINT
            INPUT "What function do you want to perform? ",WORK$
            ANSWER2$=LEFT$(WORK$,1)
            ANSWER$=UCASE$(ANSWER2$)
            IF ANSWER$="D" THEN MEDIA$="D": GOTO DISPLAY.HELP.LIST
            IF ANSWER$="P" THEN MEDIA$="P": GOTO DISPLAY.HELP.LIST
            IF ANSWER$="C" THEN MEDIA$="F": GOTO DISPLAY.HELP.LIST
            IF ANSWER$="Q" THEN GOTO RETURN.TO.MENU
            PRINT "RESPONSE MUST BE D, P, C, OR Q.  RE-ENTER."
            GOTO DISPLAY.RESPONSE
    REM--------------------------------------------------------------------
    DISPLAY.HELP.LIST:
            LET SKIPPAGE$="NO"
            LET QUIT$="NO"
            LET REC%=1
```

```
        LET PGNO%=0
        IF MEDIA$="D" THEN GOTO DISPLAY.HELP.DATA
        GOSUB SCREEN.HEADING
        IF PRINTER$="YES" THEN GOTO DISPLAY.GET.PRINT.INPUT
        PRINT "YOU DON'T HAVE A PRINTER AVAILABLE."
        PRINT "Press RETURN to return to selection menu. ";
        WORK%=CONCHAR
        GOTO DISPLAY.FUNCTIONS
DISPLAY.GET.PRINT.INPUT:
        PRINT "Do you have the printer ready (press RETURN) ";
        WORK%=CONCHAR
        GOSUB SCREEN.HEADING
        LET MSG$="Printing communications help."
        LET RTITLE$=STITLE1$
        IF MEDIA$="F" THEN MSG$="Printing Call Definition worksheets"
        IF MEDIA$="F" THEN RTITLE$=STITLE2$
        PRINT MSG$
        LPRINTER
        PRNTDATE$=MID$(CURRDAY$,3,2)+"/"+RIGHT$(CURRDAY$,2)+"/"+LEFT$(CURRDAY$,2)
        GOTO DISPLAY.HELP.DATA
DISPLAY.NEW.PAGE:
        IF SKIPPAGE$="YES" THEN SKIPPAGE$="NO": RETURN
        PRINT PNEWPAGE$
        LET PGNO%=PGNO%+1
        PRINT TAB((80-LEN(TITLE$))\2);TITLE$
        PRINT TAB((80-LEN(CTITLE$))\2);CTITLE$
        PRINT "DATE: ";PRNTDATE$;
        PRINT TAB((80-LEN(RTITLE$))\2);RTITLE$;
        PRINT TAB(70);"Page ";
        PRINT USING "###";PGNO%
        RETURN
DISPLAY.BOTTOM.SCREEN:
        LET QUIT$="NO"
        INPUT "When ready to continue enter (N)ext or (Q)uit. ",WORK$
        ANSWER2$=LEFT$(WORK$,1)
        ANSWER$=UCASE$(ANSWER2$)
        IF ANSWER$="N" THEN RETURN
        IF ANSWER$="Q" THEN QUIT$="YES": RETURN
        PRINT "MUST BE (N) OR (Q). RE-ENTER."
        GOTO DISPLAY.BOTTOM.SCREEN
DISPLAY.HELP.DATA:
        IF MEDIA$="F" THEN GOTO FORMS.PRNT
        LET SKIPPAGE$="NO"
        IF MEDIA$="D" THEN GOSUB SCREEN.HEADING ELSE GOSUB DISPLAY.NEW.PAGE
        GOSUB HELP.MAINT.DEF
        IF MEDIA$="D" THEN GOSUB DISPLAY.BOTTOM.SCREEN
        IF QUIT$="YES" THEN GOTO DISPLAY.HELP.QUIT
        IF MEDIA$="D" THEN GOSUB SCREEN.HEADING ELSE GOSUB DISPLAY.NEW.PAGE
        GOSUB HELP.NOTES.ONE
        IF MEDIA$="D" THEN GOSUB DISPLAY.BOTTOM.SCREEN
        IF QUIT$="YES" THEN GOTO DISPLAY.HELP.QUIT
        LET SKIPPAGE$="YES"
        IF MEDIA$="D" THEN GOSUB SCREEN.HEADING ELSE GOSUB DISPLAY.NEW.PAGE
        GOSUB HELP.NOTES.TWO
        IF MEDIA$="D" THEN GOSUB DISPLAY.BOTTOM.SCREEN
        IF QUIT$="YES" THEN GOTO DISPLAY.HELP.QUIT
```

```
IF MEDIA$="D" THEN GOSUB SCREEN.HEADING ELSE GOSUB DISPLAY.NEW.PAGE
GOSUB HELP.DEF.SEQ.ONE
IF MEDIA$="D" THEN GOSUB DISPLAY.BOTTOM.SCREEN
IF QUIT$="YES" THEN GOTO DISPLAY.HELP.QUIT
LET SKIPPAGE$="YES"
IF MEDIA$="D" THEN GOSUB SCREEN.HEADING ELSE GOSUB DISPLAY.NEW.PAGE
GOSUB HELP.DEF.SEQ.TWO
IF MEDIA$="D" THEN GOSUB DISPLAY.BOTTOM.SCREEN
IF QUIT$="YES" THEN GOTO DISPLAY.HELP.QUIT
IF MEDIA$="D" THEN GOSUB SCREEN.HEADING ELSE GOSUB DISPLAY.NEW.PAGE
GOSUB HELP.DIAL.ONE
IF MEDIA$="D" THEN GOSUB DISPLAY.BOTTOM.SCREEN
IF QUIT$="YES" THEN GOTO DISPLAY.HELP.QUIT
SKIPPAGE$="YES"
IF MEDIA$="D" THEN GOSUB SCREEN.HEADING ELSE GOSUB DISPLAY.NEW.PAGE
GOSUB HELP.DIAL.TWO
IF MEDIA$="D" THEN GOSUB DISPLAY.BOTTOM.SCREEN
IF QUIT$="YES" THEN GOTO DISPLAY.HELP.QUIT
SKIPPAGE$="YES"
IF MEDIA$="D" THEN GOSUB SCREEN.HEADING ELSE GOSUB DISPLAY.NEW.PAGE
GOSUB HELP.DIAL.THREE
IF MEDIA$="D" THEN GOSUB DISPLAY.BOTTOM.SCREEN
IF QUIT$="YES" THEN GOTO DISPLAY.HELP.QUIT
IF MEDIA$="D" THEN GOSUB SCREEN.HEADING ELSE GOSUB DISPLAY.NEW.PAGE
GOSUB HELP.DIAL.FOUR
IF MEDIA$="D" THEN GOSUB DISPLAY.BOTTOM.SCREEN
IF QUIT$="YES" THEN GOTO DISPLAY.HELP.QUIT
LET SKIPPAGE$="YES"
IF MEDIA$="D" THEN GOSUB SCREEN.HEADING ELSE GOSUB DISPLAY.NEW.PAGE
IF TECH$()"YES" THEN GOTO DISPLAY.HELP.TECH.ONE
GOSUB HELP.DIAL.FIVE
IF MEDIA$="D" THEN GOSUB DISPLAY.BOTTOM.SCREEN
IF QUIT$="YES" THEN GOTO DISPLAY.HELP.QUIT
IF MEDIA$="D" THEN GOSUB SCREEN.HEADING ELSE GOSUB DISPLAY.NEW.PAGE
DISPLAY.HELP.TECH.ONE:
     GOSUB HELP.DIAL.SIX
     IF MEDIA$="D" THEN GOSUB DISPLAY.BOTTOM.SCREEN
     IF QUIT$="YES" THEN GOTO DISPLAY.HELP.QUIT
     LET SKIPPAGE$="YES"
     IF MEDIA$="D" THEN GOSUB SCREEN.HEADING ELSE GOSUB DISPLAY.NEW.PAGE
GOSUB HELP.DIAL.SEVEN
IF MEDIA$="D" THEN GOSUB DISPLAY.BOTTOM.SCREEN
IF QUIT$="YES" THEN GOTO DISPLAY.HELP.QUIT
IF TECH$()"YES" THEN GOTO DISPLAY.HELP.LOG
SKIPPAGE$="YES"
IF MEDIA$="D" THEN GOSUB SCREEN.HEADING ELSE GOSUB DISPLAY.NEW.PAGE
GOSUB HELP.DIAL.EIGHT
IF MEDIA$="D" THEN GOSUB DISPLAY.BOTTOM.SCREEN
IF QUIT$="YES" THEN GOTO DISPLAY.HELP.QUIT
LET SKIPPAGE$="YES"
IF MEDIA$="D" THEN GOSUB SCREEN.HEADING ELSE GOSUB DISPLAY.NEW.PAGE
GOSUB HELP.DIAL.NINE
IF MEDIA$="D" THEN GOSUB DISPLAY.BOTTOM.SCREEN
IF QUIT$="YES" THEN GOTO DISPLAY.HELP.QUIT
IF MEDIA$="D" THEN GOSUB SCREEN.HEADING ELSE GOSUB DISPLAY.NEW.PAGE
GOSUB HELP.DIAL.TEN
```

```
        IF MEDIA$="D" THEN GOSUB DISPLAY.BOTTOM.SCREEN
        IF QUIT$="YES" THEN GOTO DISPLAY.HELP.QUIT
        LET SKIPPAGE$="YES"
        IF MEDIA$="D" THEN GOSUB SCREEN.HEADING ELSE GOSUB DISPLAY.NEW.PAGE
        GOSUB HELP.DIAL.ELEVEN
        IF MEDIA$="D" THEN GOSUB DISPLAY.BOTTOM.SCREEN
        IF QUIT$="YES" THEN GOTO DISPLAY.HELP.QUIT
DISPLAY.HELP.LOG:
        IF MEDIA$="D" THEN GOSUB SCREEN.HEADING ELSE GOSUB DISPLAY.NEW.PAGE
        GOSUB HELP.LOG.ONE
        IF MEDIA$="D" THEN GOSUB DISPLAY.BOTTOM.SCREEN
        IF QUIT$="YES" THEN GOTO DISPLAY.HELP.QUIT
        IF MEDIA$="D" THEN GOSUB SCREEN.HEADING ELSE GOSUB DISPLAY.NEW.PAGE
        GOSUB HELP.NBRS.ONE
        IF MEDIA$="D" THEN GOSUB DISPLAY.BOTTOM.SCREEN
        IF QUIT$="YES" THEN GOTO DISPLAY.HELP.QUIT
        LET SKIPPAGE$="YES"
        IF MEDIA$="D" THEN GOSUB SCREEN.HEADING ELSE GOSUB DISPLAY.NEW.PAGE
        GOSUB HELP.NBRS.TWO
        IF MEDIA$="D" THEN GOSUB DISPLAY.BOTTOM.SCREEN
        IF QUIT$="YES" THEN GOTO DISPLAY.HELP.QUIT
        LET SKIPPAGE$="YES"
        IF MEDIA$="D" THEN GOSUB SCREEN.HEADING ELSE GOSUB DISPLAY.NEW.PAGE
        GOSUB HELP.NBRS.THREE
        IF MEDIA$="D" THEN GOSUB DISPLAY.BOTTOM.SCREEN
        IF QUIT$="YES" THEN GOTO DISPLAY.HELP.QUIT
        IF MEDIA$="D" THEN GOSUB SCREEN.HEADING
        GOSUB HELP.NBRS.FOUR
        IF MEDIA$="D" THEN GOSUB DISPLAY.BOTTOM.SCREEN
        IF QUIT$="YES" THEN GOTO DISPLAY.HELP.QUIT
DISPLAY.HELP.QUIT:
        IF MEDIA$()"D" THEN CONSOLE
        GOTO DISPLAY.FUNCTIONS
REM----------------------------------------------------------------(MAINT SCREEN)
HELP.MAINT.DEF:
        LET WTITLE$="COMMUNICATIONS HELP DEFINITION"
        PRINT TAB((80-LEN(WTITLE$))\2);WTITLE$
        PRINT
        PRINT "The communications maintenance process provides the capability"
        PRINT "of defining to the system which calls to make, when to make"
        PRINT "them, how to respond to other system questions, and what to do"
        PRINT "with the information received."
        PRINT
        PRINT "This description is intended to supplement the written documentation,"
        PRINT "not replace it."
        PRINT
        PRINT "This description contains the following:"
        PRINT
        PRINT "    .    Call Definition Sequence"
        PRINT "    .    Notes on Communications Operation"
        PRINT "    .    Dial List Definition"
        PRINT "    .    Log File Definition"
        PRINT "    .    Character Numeric Codes"
        PRINT
        PRINT
        RETURN
```

```
HELP.NOTES.ONE:
    LET WTITLE$="NOTES ON COMMUNICATIONS OPERATION"
    PRINT TAB((80-LEN(WTITLE$))\2);WTITLE$
    PRINT
    PRINT "1.   The definition of calls takes practice.  What works on"
    PRINT "     one call may not work on another call.  Adopt a careful,"
    PRINT "     analytical approach and, with a little experience, you"
    PRINT "     will be defining calls with ease."
    PRINT
    PRINT "2.   If you are in the automated portion of a call and you"
    PRINT "     want to revert to terminal emulation mode, press 'C' to"
    PRINT "     cancel the referencing of the dial list and log file."
    PRINT
    PRINT "3.   If there is a 'BREAK' key as part of the communications"
    PRINT "     conversation DO NOT use the log file for responses,"
    PRINT "     only for the logon portion of the call."
    PRINT
    IF MEDIA$()"D" THEN RETURN
    PRINT:PRINT:PRINT:PRINT:PRINT:RETURN
HELP.NOTES.TWO:
    IF MEDIA$()"D" THEN GOTO HELP.NOTES.TWO.CONT:
    LET WTITLE$="NOTES ON COMMUNICATIONS OPERATION (continued)"
    PRINT TAB((80-LEN(WTITLE$))\2);WTITLE$
    PRINT
HELP.NOTES.TWO.CONT:
    PRINT "4.   The communications processing program has several "
    PRINT "     function keys, they are:"
    PRINT
    PRINT "     F1 - Turn CRT on/off           F6 - Send backspace"
    PRINT "     F2 - Turn PRINTER on and off   F7 - Logoff"
    PRINT "     F3 - Print keyboard input      F8 - Help"
    PRINT "     F4 - Save report on disk       F9 - Send break signal"
    PRINT "     F5 - Print modem output        F10- Cancel call"
    PRINT "          (for debugging)"
    PRINT
    PRINT "5.   AUTOMATIC menu shows calls with established call times."
    PRINT "     MANUAL menu shows calls without establihed call times."
    PRINT
    PRINT
    PRINT
    RETURN
HELP.NBRS.ONE:
    LET WTITLE$="CHARACTER NUMERIC VALUES"
    PRINT TAB((80-LEN(WTITLE$))\2);WTITLE$
    PRINT
    PRINT "The following values are the numeric representation of the"
    PRINT "keyed entries that may be necessary for communications response."
    PRINT "The values are used with the 'CR' response entry type only."
    PRINT
    PRINT "   TOP LABEL     UNSHIFT      SHIFT      ALT"
    PRINT "      A            097         065        001"
    PRINT "      B            098         066        002"
    PRINT "      C            099         067        003"
    PRINT "      D            100         068        004"
    PRINT "      E            101         069        005"
    PRINT "      F            102         070        006"
```

```
             PRINT "    G        103       071       007"
             PRINT "    H        104       072       008"
             PRINT "    I        105       073       009"
             PRINT "    J        106       074       010"
             PRINT "    K        107       075       011"
             PRINT
             RETURN
HELP.NBRS.TWO:
        IF MEDIA$()"D" THEN GOTO HELP.NBRS.TWO.CONT
        LET WTITLE$="CHARACTER NUMERIC VALUES (continued)"
        PRINT TAB((82-LEN(WTITLE$))\2);WTITLE$
        PRINT
        PRINT " TOP LABEL    UNSHIFT    SHIFT     ALT"
HELP.NBRS.TWO.CONT:
             PRINT "    L        108       076       012"
             PRINT "    M        109       077       013"
             PRINT "    N        110       078       014"
             PRINT "    O        111       079       015"
             PRINT "    P        112       080       016"
             PRINT "    Q        113       081       017"
             PRINT "    R        114       082       018"
             PRINT "    S        115       083       019"
             PRINT "    T        116       084       020"
             PRINT "    U        117       085       021"
             PRINT "    V        118       086       022"
             PRINT "    W        119       087       023"
             PRINT "    X        120       088       024"
             PRINT "    Y        121       089       025"
             PRINT "    Z        122       090       026"
             PRINT
             RETURN
HELP.NBRS.THREE:
        IF MEDIA$()"D" THEN GOTO HELP.NBRS.THREE.CONT
        LET WTITLE$="CHARACTER NUMERIC VALUES (continued)"
        PRINT TAB((82-LEN(WTITLE$))\2);WTITLE$
        PRINT
        PRINT " TOP LABEL    UNSHIFT    SHIFT     ALT"
HELP.NBRS.THREE.CONT:
             PRINT "   1 !       049       033       124"
             PRINT "   2 @       050       064       060"
             PRINT "   3 #       051       035       062"
             PRINT "   4 $       052       036       249"
             PRINT "   5 %       053       037       024"
             PRINT "   6         054       155       094"
             PRINT "   7 &       055       038       094"
             PRINT "   8 *       056       042       096"
             PRINT "   9 (       057       040       123"
             PRINT "   0 )       048       041       125"
             PRINT "   - _       045       095       126"
             PRINT "   = +       061       043       092"
             PRINT " BACKSPACE   008       008       008"
             PRINT "   ] [       093       091       027"
             PRINT "   ; :       059       058       059"
             PRINT
             RETURN
HELP.NBRS.FOUR:
        IF MEDIA$()"D" THEN GOTO HELP.NBRS.FOUR.CONT
```

```
        LET WTITLE$="CHARACTER NUMERIC VALUES (continued)"
        PRINT TAB((80-LEN(WTITLE$))\2);WTITLE$
        PRINT
        PRINT " TOP LABEL    UNSHIFT      SHIFT        ALT"
HELP.NBRS.FOUR.CONT:
        PRINT "      ' "       039          034          039"
        PRINT "      , ,       044          044          044"
        PRINT "      . .       046          046          046"
        PRINT "      / ?       047          063          047"
        PRINT " SPACE BAR      032          032          032"
        PRINT " DEL            127          127          127"
        PRINT
        PRINT
        PRINT
        PRINT
        PRINT
        PRINT
        PRINT
        PRINT
        PRINT
        RETURN
HELP.DEF.SEQ.ONE:
        LET WTITLE$="CALL DEFINITION SEQUENCE"
        PRINT TAB((80-LEN(WTITLE$))\2);WTITLE$
        PRINT
        PRINT " 1. Gather the information necessary to make the call at a terminal."
        PRINT
        PRINT " 2. Using the gathered information, place the call using Terminal"
        PRINT "    Evaluation mode. Press function keys 2 and 3 to print all"
        PRINT "    questions, prompts and valid responses. Keep the printout"
        PRINT "    for reference during the following steps."
        PRINT
        PRINT " 3. Using your printout from the terminal session, complete the Dial"
        PRINT "    List Worksheet and Log File Worksheets. Remember that each of your"
        PRINT "    terminal responses will require an entry in your log file."
        PRINT
        PRINT " 4. Review the Dial List Report and pick an unassigned call number."
        PRINT
        PRINT " 5. Use your Dial List Worksheet to create a dial list for your new"
        PRINT "    call with the UPDATES=Dial List function (menu item 22). Print"
        PRINT "    the Master Dial List Report for your new call."
        RETURN
HELP.DEF.SEQ.TWO:
        IF YEDIA$()"D" THEN GOTO HELP.DEF.SEQ.TWO.CONT
        LET WTITLE$="CALL DEFINITION SEQUENCE (continued)"
        PRINT TAB((80-LEN(WTITLE$))\2);WTITLE$
HELP.DEF.SEQ.TWO.CONT:
        PRINT
        PRINT " 6. Use your Log File Worksheet to create a log file for your new"
        PRINT "    call with the UPDATES=Log File function (menu item 23). Print"
        PRINT "    the Log File Report for your new call."
        PRINT
        PRINT " 7. During a non-critical time period, test your call using Manual"
        PRINT "    or Automatic mode. Again, press function keys 2 and 3 to get a"
        PRINT "    printout of the session. Note all problems."
```

```
        PRINT
        PRINT " 8.  Use the Master Dial List Report, and the printout of your test"
        PRINT "     call to identify and resolve any problems."
        PRINT
        PRINT " 9.  Retest your call until it is placed correctly."
        PRINT
        PRINT " 10. The call is now ready to run in Manual, Automatic or Unattended"
        PRINT "     modes of operation."
        PRINT
        PRINT
        RETURN
HELP.DIAL.ONE:
        LET WTITLE$="COMMUNICATIONS DIAL LIST"
        PRINT TAB((80-LEN(WTITLE$))\2);WTITLE$
        PRINT
        PRINT "The dial list provides the control for defined calls."
        PRINT "It is maintained by the communications maintenance programs."
        PRINT "The following fields comprise each entry in the dial list."
        PRINT
        PRINT "CALL NUMBER"
        PRINT "    This is the numeric value assigned to the call.  It is"
        PRINT "    used for quick reference by the user.  The value may be"
        PRINT "    between 1 and 52."
        PRINT
        PRINT "CALL DESCRIPTION"
        PRINT "    This is a description (maximum of 35 characters) which"
        PRINT "    describes the call to the user."
        PRINT
        PRINT
        PRINT
        RETURN
HELP.DIAL.TWO:
        IF MEDIA$()="D" THEN GOTO HELP.DIAL.TWO.CONT
        LET WTITLE$="COMMUNICATIONS DIAL LIST (continued)"
        PRINT TAB((80-LEN(WTITLE$))\2);WTITLE$
HELP.DIAL.TWO.CONT:
        PRINT
        PRINT "-----------------------(CALL TIME)-----------------------"
        PRINT
        PRINT "NEXT CALL DATE"
        PRINT "    This is the date upon which the next unattended"
        PRINT "    call is to be placed.  This allows for pre-scheduling and"
        PRINT "    allows the system to bypass calls on weekends and holidays."
        PRINT
        PRINT "CALL TIME"
        PRINT "    This is the time (HHMMSS) that the call is placed when in"
        PRINT "    unattended mode."
        PRINT
        PRINT "RESCHEDULE TIME"
        PRINT "    This is the rescheduled time for unattended calls."
        PRINT "    The reschedule time is maintained by the system and is 20"
        PRINT "    minutes from the last attempt at calling.  It is only updated"
        PRINT "    if the call was not completed normally."
        PRINT
        RETURN
```

```
HELP.DIAL.THREE:
        IF MEDIA$()"D" THEN GOTO HELP.DIAL.THREE.CONT
        LET WTITLE$="COMMUNICATIONS DIAL LIST (continued)"
        PRINT TAB((80-LEN(WTITLE$))\2);WTITLE$
        PRINT
HELP.DIAL.THREE.CONT:
        PRINT "-------------------------(DISK FILE)--------------------------"
        PRINT
        PRINT "BOFA FILE TXFR"
        PRINT "    This is an indication that the call results in a disk file,"
        PRINT "    using the Bank of America protocol between the microcomputer"
        PRINT "    and the host system.  This protocol is used to insure that"
        PRINT "    the host does not get ahead of the microcomputer as it"
        PRINT "    receives data. This is for BANTRAC services only."
        PRINT
        IF TECH$()"YES" THEN PRINT: PRINT: PRINT: PRINT: PRINT: GOTO HELP.DIAL.THREE.CONT.TWO
        PRINT "NEXT FILE NUMBER"
        PRINT "    This is an indication that the call results in a file"
        PRINT "    being stored on the microcomputer.  The number starts at"
        PRINT "    1 and increases automatically to 99 before starting over."
        PRINT "    It may be a disk file or a file for reports on disk."
HELP.DIAL.THREE.CONT.TWO:
        PRINT
        PRINT
        PRINT
        RETURN
HELP.DIAL.FOUR:
        LET WTITLE$="COMMUNICATIONS DIAL LIST (continued)"
        PRINT TAB((80-LEN(WTITLE$))\2);WTITLE$
        PRINT
        PRINT "-------------------------(DISPOSITION)--------------------------"
        PRINT
        PRINT "DISPLAY ON SCREEN"
        PRINT "    This is an indication (yes or no) if the received data"
        PRINT "    is to be displayed on the screen."
        PRINT
        PRINT "PRINT ON PRINTER"
        PRINT "    This is an indication (yes or no) if the received data"
        PRINT "    is to be printed on hard-copy."
        PRINT
        PRINT "SAVE RPT ON DISK"
        PRINT "    This is an indication (yes or no) if the report information"
        PRINT "    received is to be saved as a disk file.  This is the normal"
        PRINT "    mode of operation for unattended automatic calling. This cannot"
        PRINT "    be used in conjunction with the disk file option, must be"
        PRINT "    one or the other, not both."
        IF MEDIA$()"D" THEN RETURN
        PRINT
        RETURN
HELP.DIAL.FIVE:
        IF TECH$()"YES" THEN RETURN
        IF MEDIA$()"D" THEN GOTO HELP.DIAL.FIVE.CONT
        LET WTITLE$="COMMUNICATIONS DIAL LIST (continued)"
        PRINT TAB((80-LEN(WTITLE$))\2);WTITLE$
        PRINT
        PRINT "-------------------------(DISPOSITION)--------------------------"
```

```
        PRINT "                          continued"
        PRINT
HELP.DIAL.FIVE.CONT:
        PRINT "SAVE DIAGNOSTICS"
        PRINT "    This is an indication (yes or no) if all communications"
        PRINT "    activity for the call is to be retained in a diagnostics"
        PRINT "    file.  This is for analyzing problems and the file takes"
        PRINT "    the place of the normal disk file or reports or disk."
        PRINT
        PRINT "ECHO MODEM OUTPUT"
        PRINT "    This is an indication (yes or no) if the instructions sent"
        PRINT "    to the communications modem are to be displayed on the screen."
        PRINT "    This is normally done during testing and can be an aid in"
        PRINT "    determining problems with the call definition."
        PRINT
        PRINT
        PRINT
        RETURN
HELP.DIAL.SIX:
        IF TECH$()"YES" THEN GOTO HELP.DIAL.SIX.CONT
        LET WTITLE$="COMMUNICATIONS DIAL LIST (continued)"
        PRINT TAB((80-LEN(WTITLE$))\2);WTITLE$
  HELP.DIAL.SIX.CONT:
        PRINT
        PRINT "--------------------------(TECHNICAL)--------------------------"
        PRINT
        PRINT "FULL DUPLEX"
        PRINT "    This is an indication (yes or no) if the communications is"
        PRINT "    performed in full duplex mode.  If the response is no, then"
        PRINT "    the system assumes the communications is half-duplex."
        PRINT
        PRINT "    If you are uncertain about the duplex of the system you "
        PRINT "    are calling, select half-duplex.  Test the call and press"
        PRINT "    function key 5 during the test.  If each character you "
        PRINT "    send appears twice on your screen change to full-duplex."
        PRINT
        PRINT "MODEM SETTING"
        PRINT "    This is the format and speed of the data that is expected"
        PRINT "    by the host computer."
        PRINT
        IF MEDIA$()"D" THEN RETURN
        PRINT
        PRINT
        RETURN
HELP.DIAL.SEVEN:
        IF MEDIA$()"D" THEN GOTO HELP.DIAL.SEVEN.CONT
        LET WTITLE$="COMMUNICATIONS DIAL LIST (continued)"
        PRINT TAB((80-LEN(WTITLE$))\2);WTITLE$
        PRINT
        PRINT "--------------------------(TECHNICAL)--------------------------"
        PRINT "                          continued"
HELP.DIAL.SEVEN.CONT:
        PRINT "     300 BPS    1200 BPS    DATA BITS    PARITY    STOP BITS"
        PRINT "      01          11           7          even        2"
        PRINT "      02          12           7          odd         2"
        PRINT "      03          13           7          even        1"
```

```
        PRINT "    04      14      7      odd    1"
        PRINT "    05      15      8      none   2"
        PRINT "    06      16      8      none   1"
        PRINT "    07              8      even   1"
        PRINT "    08              8      odd    1"
        PRINT "  Notes:"
        PRINT "  1. 300 bps and 1200 bps do require separate phone numbers "
        PRINT "     and may require different prompts."
        PRINT "  2. 0 modem setting defaults to 2."
        PRINT "  3. 10 modem setting defaults to 12."
        RETURN
HELP.DIAL.EIGHT:
        IF TECH$()"YES" THEN RETURN
        IF MEDIA$()"D" THEN GOTO HELP.DIAL.EIGHT.CONT
        LET WTITLE$="COMMUNICATIONS DIAL LIST (continued)"
        PRINT TAB((82-LEN(WTITLE$))\2);WTITLE$
        PRINT
        PRINT "----------------------(TECHNICAL)----------------------"
        PRINT "                       continued"
HELP.DIAL.EIGHT.CONT:
        PRINT
        PRINT "LOGOFF/QUIT VALUE"
        PRINT "   This is the indication that the host computer recognizes"
        PRINT "   as a logoff or indication to quit. It is used to terminate"
        PRINT "   the session if there is any problem detected with the call"
        PRINT "   instructions in the log file."
        PRINT
        PRINT "NORMAL PROMPT"
        PRINT "   This is a single character value that the host computer"
        PRINT "   sends when it expects an keyed reponse from the terminal."
        PRINT "   If unknown check a normal terminal session and find the"
        PRINT "   prompt most used, it may be a ')' or a '?' or something else."
        PRINT
        IF MEDIA$()"D" THEN RETURN
        PRINT
        PRINT
        PRINT
        RETURN
HELP.DIAL.NINE:
        IF TECH$()"YES" THEN RETURN
        IF MEDIA$()"D" THEN GOTO HELP.DIAL.NINE.CONT
        LET WTITLE$="COMMUNICATIONS DIAL LIST (continued)"
        PRINT TAB((82-LEN(WTITLE$))\2);WTITLE$
        PRINT
        PRINT "----------------------(TECHNICAL)----------------------"
        PRINT "                       continued"
HELP.DIAL.NINE.CONT:
        PRINT "HOST BACKSPACE"
        PRINT "   This is a single character that the host system recognizes"
        PRINT "   as a backspace (thus ignoring the prior entry). If it is"
        PRINT "   unknown an 'at' sign (@) is a good default entry."
        PRINT
        PRINT "EDITOR EOF"
        PRINT "   This is the indication that the host computer recognizes"
        PRINT "   as an end-of-file when doing datafile transfers. If it is"
        PRINT "   unknown a value of 'EOF' is a good default entry."
```

```
            PRINT
            PRINT
            PRINT
            PRINT
            PRINT
            PRINT
            RETURN
HELP.DIAL.TEN:
            IF TECH$()"YES" THEN RETURN
            LET WTITLE$="COMMUNICATIONS DIAL LIST (continued)"
            PRINT TAB((80-LEN(WTITLE$))\2);WTITLE$
            PRINT
            PRINT "--------------------------(PROCESSING)----------------------------"
            PRINT
            PRINT "CALL STATUS"
            PRINT "    This is the communications return code that indicates the"
            PRINT "    completion status of the call.  The values and their meanings"
            PRINT "    are defined in the COMERROR.DAT file."
            PRINT
            PRINT "REC/LINE COUNT"
            PRINT "    This is the number of records written to disk or the number"
            PRINT "    of lines printed as a result of the last call."
            PRINT
            PRINT "LAST START TIME"
            PRINT "    This is the time (HHMMSS) that the last completed call started."
            PRINT
            PRINT "LAST END TIME"
            PRINT "    This is the time (HHMMSS) that the last completed call ended."
            PRINT
            RETURN
HELP.DIAL.ELEVEN:
            IF TECH$()"YES" THEN RETURN
            IF MEDIA$()"D" THEN GOTO HELP.DIAL.ELEVEN.CONT
            LET WTITLE$="COMMUNICATIONS DIAL LIST (continued)"
            PRINT TAB((80-LEN(WTITLE$))\2);WTITLE$
            PRINT
            PRINT "--------------------------(PROCESSING)----------------------------"
            PRINT "                         continued"
HELP.DIAL.ELEVEN.CONT:
            PRINT "LAST END DATE"
            PRINT "    This is the date (MMDDYY) that the last completed call completed."
            PRINT
            PRINT "LAST PROGRAM"
            PRINT "    This is the last program that called the communications core"
            PRINT "    module (COMIO) and placed the call."
            PRINT
            PRINT "DISK FILE FORMAT"
            PRINT "    This indicates what format the received file is in so that"
            PRINT "    the system programs can translate the information into a"
            PRINT "    standard format.  Values are 'BAYTRAC', 'SAI', and 'NONE'."
            PRINT
            PRINT
            PRINT
            PRINT
            RETURN
```

```
HELP.LOG.ONE:
    LET WTITLE$="COMMUNICATIONS LOG FILE"
    PRINT TAB((80-LEN(WTITLE$))\2);WTITLE$
    PRINT
    PRINT "The log file defines the prompts and responses for"
    PRINT "communicating with the host computer system.  The table"
    PRINT "below briefly describes the available log entries."
    PRINT
    PRINT "(LS) Copy Log Information from another call."
    PRINT "(PH) Specify Phone Number."
    PRINT "(CR) Character Response with non-keyable value."
    PRINT "(RD) Read for a specific value before processing next."
    PRINT "(SL) Read and Send Message with carriage return/line feed."
    PRINT "(SN) Read and Send Message with out carriage return/line feed."
    PRINT "(**) End of Logon, Indicate presence of responses."
    PRINT "(CD) Check for character/text, send response with date."
    PRINT "(CN) Check for single character, send response."
    PRINT "(CX) Check for text message, send response. Prompt on same line."
    PRINT "(CW) Check for text message, send response. Prompt on next line."
    PRINT "(RP) Copy Response Information from another call."
    PRINT
    RETURN FORMS.NEW.PAGE:
    PRINT PNEWPAGE$
    LET PGNO%=PGNO%+1
    PRINT TAB((80-LEN(TITLE$))\2);TITLE$
    PRINT TAB((80-LEN(CTITLE$))\2);CTITLE$;
    IF CLOCK$="YES" THEN PRINT "DATE: ";PRNTDATE$;
    PRINT TAB(70);"Page ";
    PRINT USING "###";PGNO%
    IF CLOCK$="YES" THEN PRINT "TIME: ";PRNTTIME$;
    RETURN FORMS.PRNT:
    GOSUB FORMS.NEW.PAGE
    LET WTITLE$="DIAL LIST WORKSHEET"
    PRINT TAB((80-LEN(WTITLE$))\2);WTITLE$
    PRINT
    PRINT "Call Number: !__!__."
    PRINT
    PRINT "1.   What is the call description ((RESET) to initialize, (NO) for no change)?"
    PRINT
    PRINT "     !__!__!__!__!__!__!__!__!__!__!__!__!__!__!__!__!__!__!__!__!"
    PRINT
    PRINT "     !__!__!__!__!__!__!__!__!__!__!__!__!__!__!__!__!__!"
    PRINT
    PRINT "2.   Do you want to establish a call time (Y,N)?    -or-"
    PRINT "     Do you want to change/cancel the call time (Y,N,C)?"
    PRINT
    PRINT "     !__!"
    PRINT
    PRINT "3.   (If 2='Y') What day is the call to be started (mmddyy)?"
    PRINT
    PRINT "     !__!__!__!__!__!__!"
    PRINT
    PRINT "4.   (If 2='Y') What time is the call placed (hhmm, 24 hour clock)?"
    PRINT
```

```
PRINT "      |__|__|__|__|"
PRINT
PRINT "5.  Do you want to update the disk file definition?"
PRINT
PRINT "      |__|"
PRINT
PRINT "6.  (If 5='Y') Do you want to continue keeping a disk data file? -or-"
PRINT "                Do you want a data file to result from this call?"
PRINT
PRINT "      |__|"
PRINT
PRINT "7.  Do you want to change the data disposition?"
PRINT
PRINT "      |__|"
PRINT
PRINT "8.  (If 7='Y') Do you want to view the received data on the screen?"
PRINT
PRINT "      |__|"
PRINT
PRINT "9.  (If 7='Y') Do you want to print the received data on the printer?"
PRINT
PRINT "      |__|"
PRINT
PRINT "10. (If 7='Y') Do you want to save the printed reports on disk?"
PRINT
PRINT "      |__|"
PRINT
PRINT "11. (If 7='Y') Do you want to update the diagnostics file?"
PRINT
PRINT "      |__|    (TECHNICAL UPDATE ONLY)"
PRINT
PRINT "12. (If 7='Y') Do you want to display modem output on the screen?"
PRINT
PRINT "      |__|    (TECHNICAL UPDATE ONLY)"
GOSUB FORMS.NEW.PAGE
LET WTITLE$="DIAL LIST WORKSHEET"
PRINT TAB((80-LEN(WTITLE$))\2);WTITLE$
PRINT
PRINT "Call Number: |__|__|"
PRINT
PRINT "13. Do you want to update the technical data?"
PRINT
PRINT "      |__|"
PRINT
PRINT "15. (If 13='Y') What is the modem setting for the host system?"
PRINT
PRINT "      |__|__|"
PRINT
PRINT "16. (If 13='Y') What is the host system logoff (quit) message?"
PRINT
PRINT "      |__|__|__|__|__|__|__|__|__|__|"
PRINT
PRINT "17. (If 13='Y') What is the host system backspace character?"
PRINT
PRINT "      |__|    (TECHNICAL UPDATE ONLY)"
PRINT
PRINT "18. (If 13='Y') How does the host system editor indicate end-of-file?"
PRINT
```

```
        PRINT "    |__|__|__|__|__|__|__|__|__|__|   (TECHNICAL UPDATE ONLY)"
        PRINT
        PRINT "19. (If 13='Y') What is the normal prompt for the host system?"
        PRINT
        PRINT "    |__|   (TECHNICAL UPDATE ONLY)"
        PRINT
        GOTO FORMS.CALL.LIST
FORMS.CALL.HEADING:
        GOSUB FORMS.NEW.PAGE
        LET WTITLE$="LOG FILE WORKSHEET"
        PRINT TAB((80-LEN(WTITLE$))\2);WTITLE$
        PRINT
        PRINT "Call Number: |__|__.         Entry Number: |__|__."
        PRINT
        RETURN
FORMS.CALL.LIST:
        GOSUB FORMS.CALL.HEADING
        PRINT "------------------------ENTRY TYPE 'LB'------------------------"
        PRINT
        GOSUB FORMS.CALL.TEN
        GOSUB FORMS.CALL.TWO
        GOSUB FORMS.CALL.HEADING
        PRINT "------------------------ENTRY TYPE 'PH'------------------------"
        PRINT
        PRINT "What is the telephone number to be called?"
        PRINT
        PRINT "    |__|__|__|__|__|__|__|__|__|__|__|__|__|__|__|__|__|__|__|"
        PRINT
        PRINT "    |__|__|__|__|__|__|__|__|__|__|"
        PRINT
        GOSUB FORMS.CALL.NINE
        GOSUB FORMS.CALL.HEADING
        PRINT "------------------------ENTRY TYPE 'CR'------------------------"
        PRINT
        GOSUB FORMS.CALL.ONE
REM     GOSUB FORMS.CALL.THREE
        PRINT "What character value do you want to send ((END) to end)?"
        PRINT
        PRINT "    |__|__|__|    |__|__|__|    |__|__|__|    |__|__|__|"
        PRINT
        PRINT "    |__|__|__|    |__|__|__|    |__|__|__|"
        PRINT
        GOSUB FORMS.CALL.NINE
        GOSUB FORMS.CALL.HEADING
        PRINT "------------------------ENTRY TYPE 'RD'------------------------"
        PRINT
REM     GOSUB FORMS.CALL.ONE
REM     GOSUB FORMS.CALL.THREE
        GOSUB FORMS.CALL.EIGHT
        GOSUB FORMS.CALL.HEADING
        PRINT "------------------------ENTRY TYPE 'SL'------------------------"
        PRINT
        GOSUB FORMS.CALL.ONE
REM     GOSUB FORMS.CALL.THREE
        GOSUB FORMS.CALL.FOUR
        GOSUB FORMS.CALL.NINE
        GOSUB FORMS.CALL.HEADING
        PRINT "------------------------ENTRY TYPE 'SN'------------------------"
```

```
         PRINT
         GOSUB FORMS.CALL.ONE
         GOSUB FORMS.CALL.FOUR
REM      GOSUB FORMS.CALL.THREE
         GOSUB FORMS.CALL.NINE
         GOSUB FORMS.CALL.HEADING
         PRINT "-------------------------ENTRY TYPE '##'------------------------"
         PRINT
         PRINT "Are there response definitions to be processed?"
         PRINT
         PRINT "     |_|"
         GOSUB FORMS.CALL.HEADING
         PRINT "-------------------------ENTRY TYPE 'CD'------------------------"
         PRINT
         PRINT "Is the date used to retrieve a (D)isk file or (R)eport?"
         PRINT
         PRINT "     |_|"
         PRINT
         PRINT "(If 'R') Enter length of prefix to send with the date (between 2 and 15)?"
         PRINT
         PRINT "     |_|_|"
         PRINT
         PRINT "(If not 0) What is the date prefix (__ characters)?"
         PRINT
         PRINT "     |_|_|_|_|_|_|_|_|_|_|_|_|_|_|_|"
         PRINT
         PRINT "(If 'R') (A)=MMDDYY, (B)=MM/DD/YY, (C)=YYMMDD, (D)=YY/MM/DD"
         PRINT "         (E)=MMDD,   (F)=MM/DD"
         PRINT "         What date format is used in the response?"
         PRINT
         PRINT "     |_|"
         PRINT
         PRINT "Which date is used ((P)rior work day, (C)urrent, (N)ext)?"
         PRINT
         PRINT "     |_|"
         PRINT
         PRINT "Does the response require a carriage return and linefeed?"
         PRINT
         PRINT "     |_|"
         PRINT
         PRINT "Is the end character (prompt) on the same line as the text?"
         PRINT
         PRINT "     |_|"
         PRINT
         GOSUB FORMS.CALL.FIVE
         GOSUB FORMS.CALL.SIX
         GOSUB FORMS.CALL.SEVEN
         GOSUB FORMS.CALL.HEADING
         PRINT "-------------------------ENTRY TYPE 'CN'------------------------"
         PRINT
         GOSUB FORMS.CALL.FOUR
         GOSUB FORMS.CALL.FIVE
         GOSUB FORMS.CALL.SIX
         GOSUB FORMS.CALL.HEADING
         PRINT "-------------------------ENTRY TYPE 'CX'------------------------"
         PRINT
```

```
        GOSUB FORMS.CALL.FOUR
        GOSUB FORMS.CALL.FIVE
        GOSUB FORMS.CALL.SIX
        GOSUB FORMS.CALL.SEVEN
        GOSUB FORMS.CALL.HEADING
        PRINT "------------------------ENTRY TYPE 'CW'------------------------"
        PRINT
        GOSUB FORMS.CALL.FOUR
        GOSUB FORMS.CALL.FIVE
        GOSUB FORMS.CALL.SIX
        GOSUB FORMS.CALL.SEVEN
        GOSUB FORMS.CALL.HEADING
        PRINT "------------------------ENTRY TYPE 'RP'------------------------"
        PRINT
        GOSUB FORMS.CALL.TEN
        PRINT "Which call's response information do you want to copy?"
        PRINT
        PRINT "     |__|__|"
        PRINT
        CONSOLE
        GOTO DISPLAY.FUNCTIONS
FORMS.CALL.ONE:
        PRINT "How many times do you want to retry responding before stopping?"
        PRINT
        PRINT "     |__|__|__|"
        PRINT
        RETURN
FORMS.CALL.TWO:
        PRINT "Which call's logon information do you want to copy?"
        PRINT
        PRINT "     |__|__|"
        PRINT
        RETURN
FORMS.CALL.THREE:
        PRINT "How many seconds do you want to wait before retrying?"
        PRINT
        PRINT "     |__|__|"
        PRINT
        RETURN
FORMS.CALL.FOUR:
        PRINT "What response message do you want to send to the other computer?"
        PRINT
        PRINT "     |__|__|__|__|__|__|__|__|__|__|__|__|__|__|__|__|__|__|__|__|"
        PRINT
        PRINT "     |__|__|__|__|__|__|__|__|__|__|"
        PRINT
        RETURN
FORMS.CALL.FIVE:
        PRINT "     (E) End of response group, report from host follows"
        PRINT "     (N) Normal command, another response command follows"
        PRINT "     (L) End of all responses. Must have this at end"
        PRINT
        PRINT "What is the mode value (E,L,N)?"
        PRINT
        PRINT "     |__|"
        PRINT
```

```
                RETURN
FORMS.CALL.SIX:
        PRINT "What single character (prompt) must be matched before sending response?"
        PRINT
        PRINT "     |__|"
        PRINT
        RETURN
FORMS.CALL.SEVEN:
        PRINT "What message must be matched before sending response?"
        PRINT
        PRINT "     |__|__|__|__|__|__|__|__|__|__|__|__|__|__|__|__|__|__|__|__|"
        PRINT
        PRINT "     |__|__|__|__|__|__|__|__|__|__|__|__|__|__|__|__|__|__|__|__|"
        PRINT
        PRINT "     |__|__|__|__|__|__|__|__|__|__|"
        PRINT
        RETURN
FORMS.CALL.EIGHT:
        PRINT "What is the last unique character to be received before responding?"
        PRINT
        PRINT "     |__|"
        PRINT
        RETURN
FORMS.CALL.NINE:
        PRINT "What is the last unique character received after the response is sent?"
        PRINT
        PRINT "     |__|"
        PRINT
        RETURN
FORMS.CALL.TEN:
        PRINT "Do you want to perform this information transfer (Y,N)?"
        PRINT
        PRINT "     |__|"
        PRINT
        RETURN
REM------------------------------------------------------------------(RETURN)
RETURN.TO.MENU:
        GOSUB SCREEN.HEADING
        PRINT "Returning to Communications Menu."
        END D)type D:COMID.BAS _    This module takes the comdialw.$$$ Dataset and creates the
_    Pascal Formated data set COMCALL.$$$

_    NOTE: This module serves as interface between Business Basic Programs
_          and PASCAL.  This is a temporary interface module until support
_          programs are rewritten in PASCAL SCRCLEAR$=CHR$(27)+"E"+CHR$(27)+"K"
    ON END (5) GOTO NODATASET
    OPEN "I",5,"COMDIALW.$$$"
    ON END (4) GOTO NOROOM
    OPEN "O",4,"COMCALL.$$$",64
    ON END (5) GOTO DONE
```

```
READ  #5;CALLNBRX,DESCRIP$,CDATE$,CTIME$,RTIME$,DSK%,DSKYETH$,_
    EDRT$,EPTR$,DIAG$,SAVEPTR$,FDX$,EYDY$,-BKSP$,ECF$,LOGYS3$,ENDDHR$,_
    PARITY%,STATS%,REDNT%,STIME$,ETIME$,LDATE$,RPGY$,MODE%$
DDESCRIP$=SPACE$(30)
LSET DDESCRIP$=DESCRIP$
CLOG$=SPACE$(8)
LSET CLOG$=LOGMSG$
IF DSKYETH$ = "Y" THEN DSKYETHX=1
IF EDRT$="Y" THEN EDRTX=1
IF EPTR$="Y" THEN EPTRX=1
IF DIAG$="Y" THEN DIAG%=1
IF SAVEPTR$="Y" THEN SAVEPTRX=1
IF FDX$="Y" THEN FDXX=1
IF EYDY$="Y" THEN EYDYX=1
IF DSK%()2 AND DSKYETHX()2 THEN BAYTRACKX=1 ELSE BAYTRACKX=0
IF LEN(DESCRIP$) > 32 THEN DYLENX=32 ELSE DYLENX=LEN(DESCRIP$)
DREC$="3"+CHR$(DYLENX)+DDESCRIP$+CHR$(DSKYETH%)+CHR$(EDRTX)
DREC$=DREC$+CHR$(EPTRX)+CHR$(DIAG%)+CHR$(BAYTRACKX)+CHR$(SAVEPTRX)+CHR$(FDXX)
DREC$=DREC$+CHR$(EYDYX)+-BKSP$+CHR$(LEN(LOGYS3$))+CLOG$+ENDCHR$+CHR$(PARITY%)
DREC$=DREC$+CHR$(STATS%)+CHR$(0)+CHR$(0)
DBUFF$=SPACE$(64)
LSET DBUFF$=DREC$
PRINT #4,DBUFF$;
PROCESSX=1
WHILE  NOT EOF(5)
  DMSG$=SPACE$(29)
  DTEXT$=SPACE$(29)
  DMODE$=" "
  DECHAR$=" "
  DBUFF$=SPACE$(64)
  READ #5;DN0X,ACTION$,ANOX,ACNT,MSG$,MODE$,ECHAR$,TEXT$
  LSET DMSG$=MSG$
  LSET DTEXT$=TEXT$
  LSET DMODE$=MODE$
  LSET DECHAR$=ECHAR$
  ACTS$=CHR$(0)
  IF ACTION$ = "PH" THEN ACT$=CHR$(1)
  IF ACTION$ = "SL" THEN ACT$=CHR$(3)
  IF ACTION$ = "SN" THEN ACT$=CHR$(4)
  IF ACTION$ = "**" THEN ACT$=CHR$(5)
  IF ACTION$ = "CX" THEN ACT$=CHR$(6)
  IF ACTION$ = "CW" THEN ACT$=CHR$(7)
  IF ACTION$ = "CN" THEN ACT$=CHR$(8)
  IF LEN(MSG$) > 29 THEN DMLENX=29 ELSE DMLENX=LEN(MSG$)
  IF LEN(TEXT$) > 29 THEN DTLENX=29 ELSE DTLENX=LEN(TEXT$)
  DREC$=ACT$+CHR$(DMLENX)+DMSG$+DMODE$+DECHAR$+CHR$(DTLENX)+DTEXT$
  LSET DBUFF$=DREC$
  IF ACT$ () CHR$(0) THEN
    PRINT #4,DBUFF$;
WEND
DONE:
  DMSG$=SPACE$(29)
  DTEXT$=SPACE$(30)
  DMODE$=" "
  DECHAR$=" "
  DBUFF$=SPACE$(64)
```

```
    ACT$=CHR$(9)
    LSET OMSG$="$"
    LSET OTEXT$="$"
    LSET CMODE$="$"
    LSET OECHAR$="$"
    OREC$=ACT$+CHR$(1)+OMSG$+CMODE$+OECHAR$+CHR$(1)+OTEXT$
    LSET OBUFF$=OREC$
    PRINT #4,OBUFF$;
  CLOSE 5
  CLOSE 4

'   The following code builds the batch file to allow recursive
'   calling of itself;  Created in this module and updated by
'   the COMIDRET.
  OPEN "O",2,"COMIOBAT.BAT"
  PRINT #2,USING "$";" REM "+SCRCLEAR$ + "Loading - Please wait"
  PRINT #2,USING "&";"COMIOTRY"," REM "+SCRCLEAR$ + "Loading - Please wait"
  PRINT #2,USING "&";"COMIDRET"," REM "+SCRCLEAR$ + "Loading - Please wait"
  PRINT #2,USING "&";"COMIOBAT"," REM "+SCRCLEAR$ + "Loading - Please wait"
  CLOSE 2
  END

XDATABST:
  PERROR%=55
  GOTO ABENDIT

XRDOY:
  PERROR%=58

ABENDIT:
  PRINT CHR$(27)+"E"+CHR$(27)+"K";
  FOR IX=1 TO 5
    PRINT
  NEXT IX
  PRINT "       ************ERROR ";PERROR%;"************"
  PRINT " INVALID ENTRY OR UNRECOVERABLE DISK ERROR"
  PRINT "             RE-BOOT SYSTEM"
  PCNT%=0
  WHILE PCNT% < 12
    PCNT%=0
  WEND
END

C)type D:COMIDRET.BAS
'   This module takes the return file created by basic and creates the
'   file required by the supporting basic programs
'

DEF FN.KEYIN$
  KIN$=""
  WHILE KIN$ = ""
    KIN$=INKEY$
  WEND
  FN.KEYIN$=KIN$
END DEF
```

```
DEF FN.KEY$ (KLEN%)
  KEYCHAR$="":KCNT=1:KEYBUFF$=""
  WHILE (KCNT (=KLEN%) AND (KEYCHAR$ () CHR$(13))
    KEYCHAR$=FN.KEYIN$
    IF LEN(KEYCHAR$) ( 1 THEN GOTO KEY9
    IF KEYCHAR$ )= " " THEN GOTO KEY1
    IF KEYCHAR$ = CHR$(13) THEN PRINT:GOTO KEY9
    IF KEYCHAR$ () CHR$(8) THEN GOTO KEY9
    IF LEN(KEYBUFF$) ( 1 THEN PRINT CHR$(7);:GOTO KEY9
    KEYBUFF$=LEFT$(KEYBUFF$,LEN(KEYBUFF$)-1)
    PRINT CHR$(8)+" "+CHR$(8);
    GOTO KEY9
KEY1:
    KEYBUFF$=KEYBUFF$+KEYCHAR$: KCNT%=KCNT%+1
    PRINT KEYCHAR$;
KEY9:
    WEND
  FN.KEY$=KEYBUFF$
END DEF

----------------------------------------

YES/NO KEY BOARD INPUT

DEF FN.YESNO% (YNMSG$)
  PRINT YNMSG$;" (Y/N) ";              REM PRINT PROMPT MESSAGE
  KCHAR$=""                            REM INITIALIZE BUFFER

WAIT FOR Y OR N

WHILE (KCHAR$ () "Y") AND (KCHAR$ () "N")
    KCHAR$=FN.KEYIN$                   REM READ CHAR
    KCHAR$=UCASE$(KCHAR$)              REM YES CONVERT TO UPPER CASE
  WEND
  PRINT KCHAR$                         REM PRINT KEYED ENTRY
  IF KCHAR$="Y" THEN                   REM IF Y THEN
    FN.YESNO%=1                        REM SET TRUE RETURN
  ELSE FN.YESNO%=2                     REM SET FALSE RETURN
END DEF

----------------------------------------

DEF FN.RENAME%
  IF FN.YESNO% ("Do you wish to save the file created during this session? ") = 2 THEN
    EXIT DEF
RENAME20:
  PRINT ("The file will be saved under what name? ");
  DSN$=FN.KEY$(14)
  FILESIZE = SIZE(DSN$)
  IF FILESIZE = 0 THEN GOTO RENAME50
  DSNMSG$=DSN$+" ALREADY EXISTS -- Overwrite? "
  IF FN.YESNO% (DSNMSG$) = 2 THEN GOTO RENAME20
  OPEN "I",6,DSN$
  DELETE 6
RENAME50:
  IF RENAME (DSN$,"COMDSKW.$$$") () 0 THEN EXIT DEF
  PRINT ("RENAME UNSUCCESSFULL")
```

```
    FOR I=2 TO 82002
      NEXT I
END DEF

ON END (5) GOTO NODATASET
  OPEN "I",5,"COMDIALW.$$$"
  ON END (5) GOTO BADDATASET
  READ #5;CALLNBR%,DESCRIP$,CDATE$,CTIME$,RTIME$,DSK%,DSKPETH$,_
    ECRT$,EPTR$,DIAG$,SAVEPTR$,FDX$,EMDY$,HBKSP$,EOF$,LOGYS$$,ENDCHR$,_
    PARITY%,STATS%,RECNT%,STIME$,ETIME$,LDATE$,RPGM$,MODEM$
  DELETE (5)
  ON END (4) GOTO NOCALL
  OPEN "I",4,"COMRET.$$$"
  READ #4;CSTATS%,CRECNT%,DISKOUT$
  IF DISKOUT$ = "Y" THEN T%=FN.RENAME%
  DELETE (4)
  ON END (5) GOTO NOROOM
  OPEN "O",5,"COMDIALW.$$$"
  WRITE #5;CALLNBR%,DESCRIP$,CDATE$,CTIME$,RTIME$,DSK%,DSKPETH$,_
    ECRT$,EPTR$,DIAG$,SAVEPTR$,FDX$,EMDY$,HBKSP$,EOF$,LOGYS$$,ENDCHR$,_
    PARITY%,CSTATS%,CRECNT%,STIME$,ETIME$,LDATE$,RPGM$,MODEM$
  CLOSE 5
  CLOSE 4
DONE:
  SCRCLEAR$=CHR$(27)+"E"+CHR$(27)+"K"

UPDATES BATCH FILE

OPEN "O",2,"COMIDBAT.BAT"
  PRINT #2,USING "&";"  REM "+SCRCLEAR$ + "Loading - Please wait"
  PRINT #2,USING "&";"%ECONT1  ";"REM "+SCRCLEAR$ + "Loading - Please wait"
  PRINT #2,USING "&";"%ECONT1  ";"REM "+SCRCLEAR$ + "Loading - Please wait"
  PRINT #2,USING "&";"%ECONT1  ";"REM "+SCRCLEAR$ + "Loading - Please wait"
  CLOSE 2
  RUN RPGM$
  END
BADDATASET:
  AERROR%=96
  GOTO ABENDIT

NOCALL:
  AERROR%=97
  GOTO ABENDIT

NODATASET:
  AERROR%=95
  GOTO ABENDIT

NOROOM:
  AERROR%=98

ABENDIT:
  PRINT CHR$(27)+"E"+CHR$(27)+"K";
  FOR IX=1 TO 5
    PRINT
  NEXT IX
```

```
PRINT "      ************ERROR ";AERROR%;"************"
PRINT " INVALID ENTRY OR UNRECOVERABLE DISK ERROR"
PRINT "             RE-BOOT SYSTEM"
ACNT%=0
WHILE ACNT% < 10
  ACNT%=2
WEND
END

C)type D:COMRESET.BAS
REM ***** COMRESET.BAS (Business BASIC (.59))
REM       05/19/83
REM       1:52
REM
REM THIS PROGRAM RESETS THE COMMUNICATIONS FILES FOR THE
REM NEXT DAY'S PROCESSING.
REM
REM ORIGINALLY PROGRAMMED BY TOM TELFORD 08/23/82
REM TRANSLATED FROM CB80 BY TERESA JANE LORD
REM----------------------------------------------------(CHANGE LOG)
REM VERSION   DATE      CHANGE
REM   1.0    08/23/82   INITIAL VERSION
REM   1.1    02/02/83   Added PCOMRST flag to bypass printed report
REM                     Eliminated use of CLOCK
REM   1.2    02/03/83   Added OnERROR processing
REM   2.0    02/18/83   Translated from CB80
REM   2.1    05/19/83   Program title & version added by Steve Hemphill
REM----------------------------------------------------(PROGRAM START)
START:
      CONSOLE
      LET CFDIAGDAYS%=10
      LET CFDIAGDROP%=0
      LET CFDIAGIN%=0
      LET CFDIAGOUT%=0
      LET CFDSKDAYS%=5
      LET CFDSKDROP%=0
      LET CFDSKIN%=0
      LET CFDSKOUT%=0
      LET CFERORDAYS%=10
      LET CFERORDROP%=0
      LET CFERORIN%=0
      LET CFERORDUT%=0
      LET CFILE1$="COMTRL.DAT"
      LET CFILE2$="COMHIST.DAT"
      LET CFILE3$="COMHISTD.DAT"
      LET CFILE4$="COMFILES.DAT"
      LET CFILE5$="COMWORK.$$$"
      LET CFILE6$="COMHIST.BAK"
      LET CFILE7$="COMFILES.BAK"
      LET CFRPTDAYS%=5
      LET CFRPTDROP%=0
      LET CFRPTIN%=0
      LET CFRPTOUT%=0
      LET CHISTDAYS%=10
      LET CCMFILEIN%=0
```

```
LET COMPILEDLTX=0
LET CT_FILE$="CONTROL.DAT"
LET CTLLENGTHX=102
LET CTLMAXX=100
LET CURRDAY$="000000"
LET CURRHISTINX=0
LET CURRHISTOUTX=0
LET CURRHISTDROPX=0
LET NEWHISTOUTX=0
LET OLDHISTINX=0
LET OLDHISTOUTX=0
LET OLDHISTDROPX=0
LET PCOMRSET$="NO"
LET PRINTER$="NO"
LET VERSION$="Communications File Reset - Version 2.1"
GOTO CONTROLFILE.OPEN
REM----------------------------------------------------------------(STANDARD SCREEN HEADING)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))/2);VERSION$
        PRINT
        RETURN
REM----------------------------------------------------------------(READ CONTROL FILE)
READ.CONTROLFILE.RECORD:
        ON END (1) GOTO READ.CONTROLFILE.ERROR
        READ #1,WORKX;NAME$,VALUEONE$,VALUETWO$
        LET STAT$="OK"
        RETURN
READ.CONTROLFILE.ERROR:
        LET STAT$="END"
        RETURN
REM----------------------------------------------------------------(JULIAN TO YYMMDD)
GET.YYMMDD.DATE:
        YYX=FIX(JWORKX\365.25)+1
        DDX=JWORKX+FIX(395.25-365.25*YYX)
        IF FIX(YYX\4)*4=YYX THEN D1X=1 ELSE D1X=2
        IF DDX)(91-D1X) THEN DDX=DDX+D1X
        MMX=FIX(DDX\30.57)
        DDX=DDX-FIX(30.57*MMX)
        IF MMX)12 THEN MMX=1: YYX=YYX+1
        TEMPD1$=TRIM$(STR$(YYX))
        TEMPD1$="00"+TEMPD1$
        TEMPD3$=RIGHT$(TEMPD1$,2)
        TEMPD1$=TRIM$(STR$(MMX))
        TEMPD1$="00"+TEMPD1$
        TEMPD2$=RIGHT$(TEMPD1$,2)
        TEMPD3$=TEMPD3$+TEMPD2$
        TEMPD1$=TRIM$(STR$(DDX))
        TEMPD1$="00"+TEMPD1$
```

```
            TEMPD2$=RIGHT$(TEMPD1$,2)
            DATEOUT$=TEMPD3$+TEMPD2$
            RETURN
REM----------------------------------------------------------(CALENDAR TO JULIAN)
GET.JULIAN.MDY.IN:
            WORKMO$=LEFT$(DATEIN$,2)
            MM%=FIX(VAL(WORKMO$))
            WORKDA$=MID$(DATEIN$,3,2)
            DD%=FIX(VAL(WORKDA$))
            WORKYR$=RIGHT$(DATEIN$,2)
            YY%=FIX(VAL(WORKYR$))
            GOTO GET.JULIAN.CALC
GET.JULIAN.YMD.IN:
            WORKYR$=LEFT$(DATEIN$,2)
            YY%=FIX(VAL(WORKYR$))
            WORKMO$=MID$(DATEIN$,3,2)
            MM%=FIX(VAL(WORKMO$))
            WORKDA$=RIGHT$(DATEIN$,2)
            DD%=FIX(VAL(WORKDA$))
GET.JULIAN.CALC:
            JWORK%=FIX(30.57*MM%)+FIX(365.25*YY%-395.25)+DD%
            IF MM%>2 THEN JWORK%=JWORK%-1: IF FIX(YY%\4)*4<>YY% THEN JWORK%=JWORK%-1
            RETURN
REM----------------------------------------------------------(CONVERT DATE FORMAT)
CONVERT.MDY.YMD:
            LET INMO$=LEFT$(DATEIN$,2)
            LET INDA$=MID$(DATEIN$,3,2)
            LET INYR$=RIGHT$(DATEIN$,2)
            LET DATEOUT$=INYR$+INMO$+INDA$
            RETURN
CONVERT.YMD.MDY:
            LET INYR$=LEFT$(DATEIN$,2)
            LET INMO$=MID$(DATEIN$,3,2)
            LET INDA$=RIGHT$(DATEIN$,2)
            LET DATEOUT$=INMO$+INDA$+INYR$
            RETURN
FORMAT.YMD.MDY:
            LET INYR$=LEFT$(DATEIN$,2)
            LET INMO$=MID$(DATEIN$,3,2)
            LET INDA$=RIGHT$(DATEIN$,2)
            LET DATEOUT$=INMO$+"/"+INDA$+"/"+INYR$
            RETURN
REM----------------------------------------------------------(VALIDATE DATE)
VALIDATE.DATE:
            LET DSTAT$="OK"
            LET MSG$=" "
            IF LEN(WORK$)=6 THEN GOTO VALIDATE.DATE.MONTH
                    LET MSG$="MUST HAVE 6 DIGITS. RE-ENTER."
                    GOTO VALIDATE.DATE.ERROR
VALIDATE.DATE.MONTH:
            LET ANSWER$=LEFT$(WORK$,2)
            LET ANSWER2$=MID$(WORK$,3,2)
            LET ANSWER3$=RIGHT$(WORK$,2)
            IF ANSWER$>"00" AND ANSWER$<"13" THEN GOTO VALIDATE.DATE.DAY
                    LET MSG$="MONTH MUST BE 01 THRU 12"
                    GOTO VALIDATE.DATE.ERROR
```

```
VALIDATE.DATE.DAY:
    IF ANSWER2$)"00" AND ANSWER2$("29" THEN GOTO VALIDATE.DATE.YEAR
    IF ANSWER2$="29" AND ANSWER$()"02" THEN GOTO VALIDATE.DATE.YEAR
    IF ANSWER2$("32" AND ANSWER$="01" THEN GOTO VALIDATE.DATE.YEAR
    IF ANSWER2$("32" AND ANSWER$="03" THEN GOTO VALIDATE.DATE.YEAR
    IF ANSWER2$("31" AND ANSWER$="04" THEN GOTO VALIDATE.DATE.YEAR
    IF ANSWER2$("32" AND ANSWER$="05" THEN GOTO VALIDATE.DATE.YEAR
    IF ANSWER2$("31" AND ANSWER$="06" THEN GOTO VALIDATE.DATE.YEAR
    IF ANSWER2$("32" AND ANSWER$="07" THEN GOTO VALIDATE.DATE.YEAR
    IF ANSWER2$("32" AND ANSWER$="08" THEN GOTO VALIDATE.DATE.YEAR
    IF ANSWER2$("31" AND ANSWER$="09" THEN GOTO VALIDATE.DATE.YEAR
    IF ANSWER2$("32" AND ANSWER$="10" THEN GOTO VALIDATE.DATE.YEAR
    IF ANSWER2$("31" AND ANSWER$="11" THEN GOTO VALIDATE.DATE.YEAR
    IF ANSWER2$("32" AND ANSWER$="12" THEN GOTO VALIDATE.DATE.YEAR
        LET MSG$="DAY VALUE MUST BE VALID FOR MONTH. RE-ENTER."
        GOTO VALIDATE.DATE.ERROR
VALIDATE.DATE.YEAR:
    IF ANSWER3$)"81" AND ANSWER3$(="99" THEN RETURN
        LET MSG$="INVALID YEAR, MUST BE 82 THRU 99. RE-ENTER."
VALIDATE.DATE.ERROR:
    LET DSTAT$="BAD"
    RETURN
REM--------------------------------------------------------(DISPLAY DATES)
DISPLAY.OLDEST.DATES:
    PRINT
    PRINT "========================================================="
    PRINT " Deleting the current Call Trouble Log."
    PRINT " Deleting Diagnostic Files with a date of ";
    LET DATEIN$=DIAGYMD$
    GOSUB FORMAT.YMD.MDY
    PRINT DATEOUT$;
    PRINT " and earlier."
    PRINT " Deleting Disk Files with a date of ";
    LET DATEIN$=DSKYMD$
    GOSUB FORMAT.YMD.MDY
    PRINT DATEOUT$;
    PRINT " and earlier."
    PRINT " Deleting Error Files with a date of ";
    LET DATEIN$=ERORYMD$
    GOSUB FORMAT.YMD.MDY
    PRINT DATEOUT$;
    PRINT " and earlier."
    PRINT " Deleting Report Files with a date of ";
    LET DATEIN$=RPTYMD$
    GOSUB FORMAT.YMD.MDY
    PRINT DATEOUT$;
    PRINT " and earlier."
    PRINT " Deleting Call History Records with a date of ";
    LET DATEIN$=HISTYMD$
    GOSUB FORMAT.YMD.MDY
    PRINT DATEOUT$;
    PRINT " and earlier."
    PRINT "========================================================="
    PRINT
    RETURN
REM--------------------------------------------------------(DISPLAY STATISTICS)
```

```
DISPLAY.STATISTICS:
        PRINT
        PRINT "======================================================"
        PRINT TAB(35);"DELETE/"
        PRINT TAB(25);"     IN";TAB(35);"   DROP";TAB(43);"    OUT"
        PRINT
        PRINT TAB(2);"Old Call History";
        PRINT TAB(24);" ";
        PRINT USING "###,###";OLDHISTIN%;
        PRINT TAB(34);" ";
        PRINT USING "###,###";OLDHISTDROP%;
        PRINT TAB(44);" ";
        PRINT USING "###,###";OLDHISTOUT%
        PRINT TAB(2);"Current Call History";
        PRINT TAB(24);" ";
        PRINT USING "###,###";CURRHISTIN%;
        PRINT TAB(34);" ";
        PRINT USING "###,###";CURRHISTDROP%;
        PRINT TAB(44);" ";
        PRINT USING "###,###";CURRHISTOUT%
        PRINT TAB(2);"New Call History";
        PRINT TAB(44);" ";
        PRINT USING "###,###";NEWHISTOUT%
        PRINT
        PRINT TAB(2);"COMFILES Entries";
        PRINT TAB(24);" ";
        PRINT USING "###,###";COMFILEIN%
        PRINT TAB(2);"Diagnostic Files";
        PRINT TAB(24);" ";
        PRINT USING "###,###";CFDIAGIN%;
        PRINT TAB(34);" ";
        PRINT USING "###,###";CFDIAGDROP%;
        PRINT TAB(44);" ";
        PRINT USING "###,###";CFDIAGOUT%
        PRINT TAB(2);"Disk Files";
        PRINT TAB(24);" ";
        PRINT USING "###,###";CFDSKIN%;
        PRINT TAB(34);" ";
        PRINT USING "###,###";CFDSKDROP%;
        PRINT TAB(44);" ";
        PRINT USING "###,###";CFDSKOUT%
        PRINT TAB(2);"Error Files";
        PRINT TAB(24);" ";
        PRINT USING "###,###";CFERORIN%;
        PRINT TAB(34);" ";
        PRINT USING "###,###";CFERORDROP%;
        PRINT TAB(44);" ";
        PRINT USING "###,###";CFERCROUT%
        PRINT TAB(2);"Report Files";
        PRINT TAB(24);" ";
        PRINT USING "###,###";CFRPTIN%;
        PRINT TAB(34);" ";
        PRINT USING "###,###";CFRPTDROP%;
        PRINT TAB(44);" ";
        PRINT USING "###,###";CFRPTOUT%
        PRINT TAB(2);"COMFILES Entries";
```

```
        PRINT TAB(44);" ";
        PRINT USING "###,###";COMFILEOUT%
        PRINT "============================================================"
        PRINT
        RETURN
REM--------------------------------------------------------(CONTROLFILE)
CONTROLFILE.OPEN:
        FILESIZE=SIZE(CTLFILE$)
        IF FILESIZE=0 THEN GOTO CONTROLFILE.NO.FILE
        OPEN "R",1,CTLFILE$,CTLLENGTH%
        LET WORK%=1
        GOTO CONTROLFILE.GET.RECORD
CONTROLFILE.NO.FILE:
        FOR WORK%=1 TO 25
              PRINT
        NEXT WORK%
        PRINT "NO CONTROL FILE. RETURNING TO MENU"
        GOTO RETURN.TO.SYSTEM
CONTROLFILE.GET.RECORD:
        GOSUB READ.CONTROLFILE.RECORD
        IF STAT$="END"       THEN GOTO CONTROLFILE.CLOSE
        IF NAME$="ENDALL"    THEN GOTO CONTROLFILE.CLOSE
        LET IWORK%=FIX(VAL(LEFT$(VALUEONE$,4)))
        IF NAME$="BLANK"     THEN BLANK$=CHR$(IWORK%)
        IF NAME$="CFDIAGDAYS" THEN CFDIAGDAYS%=IWORK%
        IF NAME$="CFDSKDAYS" THEN CFDSKDAYS%=IWORK%
        IF NAME$="CFRPTDAYS" THEN CFRPTDAYS%=IWORK%
        IF NAME$="CFERORDAYS" THEN CFERORDAYS%=IWORK%
        IF NAME$="CHISTDAYS" THEN CHISTDAYS%=IWORK%
        IF NAME$="CTITLE"    THEN CTITLE$=VALUEONE$
        IF NAME$="CURRDAY"   THEN CURRDAY$=VALUEONE$
        IF NAME$="HEADING"   THEN HEADING$=VALUEONE$
        IF NAME$="PCOMRSET"  THEN PCOMRSET$=VALUEONE$
        IF NAME$="PNEWPAGE"  THEN PNEWPAGE$=CHR$(IWORK%)
        IF NAME$="PRINTER"   THEN PRINTER$=VALUEONE$
        IF NAME$="SHOME"     THEN SHOME$=CHR$(IWORK%)
        IF NAME$="SCLEAR"    THEN SCLEAR$=CHR$(IWORK%)
        IF NAME$="TITLE"     THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.CLOSE:
        CLOSE 1
REM--------------------------------------------------------(MAINLINE)
        GOSUB SCREEN.HEADING
        PRINT "This process resets the communications files."
        IF CURRDAY$()"000000" THEN CURRYMD$=CURRDAY$: GOTO HAVE.CURR.DATE
DATE.INPUT.RESPONSE:
        PRINT
        INPUT "What is today's date (mmddyy)? ",WORK$
        LET CURRDATE$=WORK$
        GOSUB VALIDATE.DATE
        IF DSTAT$()"BAD" THEN GOTO DATE.INPUT.CONVERT
        PRINT MSG$
        GOTO DATE.INPUT.RESPONSE
```

```
DATE.INPUT.CONVERT:
        LET DATEIN$=CURRDATE$
        GOSUB CONVERT.MDY.YMD
        LET CURRYMD$=DATEOUT$
HAVE.CURR.DATE:
        LET DATEIN$=CURRYMD$
        GOSUB GET.JULIAN.YMD.IN
        LET JCURR%=JWORK%
        LET JWORK%=JCURR%-CFDIASDAYS%
        GOSUB GET.YYMMDD.DATE
        LET DIASYMD$=DATEOUT$
        LET JWORK%=JCURR%-CFDSKDAYS%
        GOSUB GET.YYMMDD.DATE
        LET DSKYMD$=DATEOUT$
        LET JWORK%=JCURR%-CFERORDAYS%
        GOSUB GET.YYMMDD.DATE
        LET ERORYMD$=DATEOUT$
        LET JWORK%=JCURR%-CFRPTDAYS%
        GOSUB GET.YYMMDD.DATE
        LET RPTYMD$=DATEOUT$
        LET JWORK%=JCURR%-CHISTDAYS%
        GOSUB GET.YYMMDD.DATE
        LET HISTYMD$=DATEOUT$
        GOSUB DISPLAY.OLDEST.DATES
        PRINT "Deleting the Call Trouble Log File."
        ON END (1) GOTO NO.TROUBLE.FILE
        OPEN "I",1,CFILE1$
        DELETE 1
NO.TROUBLE.FILE:
        LET HAVEOLDHIST$="NO"
        LET HAVENEWHIST$="NO"
        LET HAVEWRKHIST$="NO"
        PRINT "Updating the Call History File."
        ON END (2) GOTO CREATE.WORK.FILE
        OPEN "I",2,CFILE5$
        DELETE 2
CREATE.WORK.FILE:
        LET MSG$=")))))  BIG PROBLEM - CANNOT CREATE HISTORY WORK FILE ((((("
        OPEN "O",2,CFILE5$
        LET HAVEWRKHIST$="YES"
        ON END (1) GOTO OPEN.CURR.HISTORY
        OPEN "I",1,CFILE2$
        LET HAVEOLDHIST$="YES"
READ.OLD.HISTORY.LOOP:
        ON END (1) GOTO OPEN.CURR.HISTORY
        READ #1;CALLNBR%,DESCRIP$,CDATE$,CTIME$,RTIME$,DSK%,DSKMETH%,EDRT$,_
            EPTR$,DIAG$,SAVEPTR$,FDX$,EMDM$,HBKSP$,EOF$,LOGMSG$,ENDCHR$,_
            PARITY%,STATUS%,RECNT%,STIME$,ETIME$,LDATE$,RPGRM$,SPGRM$
        LET OLDHISTIN%=OLDHISTIN%+1
        LET DATEIN$=LDATE$
        GOSUB CONVERT.MDY.YMD
        IF DATEOUT$<HISTYMD$ THEN OLDHISTDROP%=OLDHISTDROP%+1: GOTO READ.OLD.HISTORY.LOOP
        LET MSG$=")))))  BIG PROBLEM - CANNOT ADD OLD TO HISTORY WORK FILE ((((("
        ON END (2) GOTO HAVE.FILE.ERROR
        WRITE  #2;CALLNBR%,DESCRIP$,CDATE$,CTIME$,RTIME$,DSK%,DSKMETH%,EDRT$,_
            EPTR$,DIAG$,SAVEPTR$,FDX$,EMDM$,HBKSP$,EOF$,LOGMSG$,ENDCHR$,_
```

```
                PARITY%,STATUS%,RECNT%,STIME$,ETIME$,LDATE$,RPGRM$,SPGRM$
        LET OLDHISTOUT%=OLDHISTOUT%+1
        LET NEWHISTOUT%=NEWHISTOUT%+1
        GOTO READ.OLD.HISTORY.LOOP
OPEN.CURR.HISTORY:
        IF HAVEOLDHIST$="YES" THEN CLOSE 1: LET HAVEOLDHIST$="CLS"
        ON END (1) GOTO HISTORY.FILE.RESET
        OPEN "I",1,CFILE3$
        LET HAVENEWHIST$="YES"
READ.NEW.HISTORY.LOOP:
        ON END (1) GOTO HISTORY.FILE.RESET
        READ #1;CALLNBR%,DESCRIP$,CDATE$,CTIME$,RTIME$,DSK%,DSKMETH%,ECRT$,_
                EPTR$,DIAG$,SAVEPTR$,FDX$,EMDM$,HBKSP$,EOF$,LOGMSG$,ENDCHR$,_
                PARITY%,STATUS%,RECNT%,STIME$,ETIME$,LDATE$,RPGRM$,SPGRM$
        LET CURRHISTIN%=CURRHISTIN%+1
        LET DATEIN$=LDATE$
        GOSUB CONVERT.MDY.YMD
        IF DATEOUT$<HISTYMD$ THEN CURRHISTDROP%=CURRHISTDROP%+1: GOTO READ.NEW.HISTORY.LOOP
        LET MSG$=")))))  BIG PROBLEM - CANNOT ADD NEW TO HISTORY WORK FILE (((((("
        ON END (2) GOTO HAVE.FILE.ERROR
        WRITE  #2;CALLNBR%,DESCRIP$,CDATE$,CTIME$,RTIME$,DSK%,DSKMETH%,ECRT$,_
                EPTR$,DIAG$,SAVEPTR$,FDX$,EMDM$,HBKSP$,EOF$,LOGMSG$,ENDCHR$,_
                PARITY%,STATUS%,RECNT%,STIME$,ETIME$,LDATE$,RPGRM$,SPGRM$
        LET CURRHISTOUT%=CURRHISTOUT%+1
        LET NEWHISTOUT%=NEWHISTOUT%+1
        GOTO READ.NEW.HISTORY.LOOP
HISTORY.FILE.RESET:
        IF HAVENEWHIST$="YES" THEN DELETE 1: LET HAVENEWHIST$="NO"
        IF HAVEWRKHIST$="YES" THEN CLOSE 2: LET HAVEWRKHIST$="CLS"
        ON END (1) GOTO HISTORY.RENAME.BAK
        OPEN "I",1,CFILE6$
        DELETE 1
HISTORY.RENAME.BAK:
        IF HAVEOLDHIST$()"CLS" THEN GOTO HISTORY.RENAME.DAT
        REC%=RENAME(CFILE6$,CFILE8$)
        IF REC%=-1 THEN GOTO HISTORY.RENAME.DAT
                PRINT
                PRINT "CANNOT RENAME CURRENT HISTORY TO BACKUP VERSION."
                PRINT "When ready to continue press RETURN.";
                WORK%=CONCHAR
HISTORY.RENAME.DAT:
        REC%=RENAME(CFILE2$,CFILE5$)
        IF REC%=-1 THEN GOTO COMFILE.START
                PRINT
                PRINT "CANNOT RENAME MERGED HISTORY TO STANDARD VERSION."
                PRINT "When ready to continue press RETURN.";
                WORK%=CONCHAR
COMFILE.START:
        LET HAVEOLDFILE$="NO"
        LET HAVEWRKFILE$="NO"
        PRINT "Updating the Communications Files File."
        ON END (2) GOTO CREATE.COMFILE.WORK
        OPEN "I",2,CFILE5$
        DELETE 2
CREATE.COMFILE.WORK:
        LET MSG$=")))))) BIG PROBLEM - CANNOT CREATE COMFILES WORK FILE (((((("
```

```
        ON END (2) GOTO HAVE.FILE.ERROR
        OPEN "O",2,CFILE5$
        LET HAVEWRKFILE$="YES"
        ON END (1) GOTO NO.COMFILE.FILE
        OPEN "I",1,CFILE4$
        LET HAVEOLDFILE$="YES"
        GOTO READ.OLD.COMFILE.LOOP
NO.COMFILE.FILE:
        DELETE 2
        GOTO CLOSING.PROCEDURES
READ.OLD.COMFILE.LOOP:
        ON END (1) GOTO COMFILE.RENAME
        READ #1;CFYMD$,CFHMS$,CFNAME$
        LET COMFILEIN%=COMFILEIN%+1
        LET WORK$=MID$(CFNAME$,4,4)
        IF WORK$="DIAG" THEN GOTO COMFILE.CHECK.DIAG
        IF WORK$="ERCR" THEN GOTO COMFILE.CHECK.EROR
        LET WORK$=MID$(CFNAME$,6,3)
        IF WORK$="DSK" THEN GOTO COMFILE.CHECK.DSK
        IF WORK$="RPT" THEN GOTO COMFILE.CHECK.RPT
        GOTO WRITE.WORK.COMFILE
COMFILE.DELETE.FILE:
        ON END (3) GOTO READ.OLD.COMFILE.LOOP
        OPEN "I",3,CFNAME$
        DELETE 3
        GOTO READ.OLD.COMFILE.LOOP
WRITE.WORK.COMFILE:
        LET MSG$=")))))  BIG PROBLEM - CANNOT WRITE COMFILE WORK RECORD ((((("
        ON END (2) GOTO HAVE.FILE.ERROR
        WRITE #2;CFYMD$,CFHMS$,CFNAME$
        LET COMFILEOUT%=COMFILEOUT%+1
        GOTO READ.OLD.COMFILE.LOOP
COMFILE.CHECK.DIAG:
        LET CFDIAGIN%=CFDIAGIN%+1
        IF CFYMD$(DIAGYMD$ THEN CFDIAGDROP%=CFDIAGDROP%+1: GOTO COMFILE.DELETE.FILE
        LET CFDIAGOUT%=CFDIAGOUT%+1
        GOTO WRITE.WORK.COMFILE
COMFILE.CHECK.DSK:
        LET CFDSKIN%=CFDSKIN%+1
        IF CFYMD$(DSKYMD$ THEN CFDSKDROP%=CFDSKDROP%+1: GOTO COMFILE.DELETE.FILE
        LET CFDSKOUT%=CFDSKOUT%+1
        GOTO WRITE.WORK.COMFILE
COMFILE.CHECK.EROR:
        LET CFERORIN%=CFERORIN%+1
        IF CFYMD$(ERORYMD$ THEN CFERORDROP%=CFERORDROP%+1: GOTO COMFILE.DELETE.FILE
        LET CFERDROUT%=CFERDROUT%+1
        GOTO WRITE.WORK.COMFILE
COMFILE.CHECK.RPT:
        LET CFRPTIN%=CFRPTIN%+1
        IF CFYMD$(RPTYMD$ THEN CFRPTDROP%=CFRPTDROP%+1: GOTO COMFILE.DELETE.FILE
        LET CFRPTOUT%=CFRPTOUT%+1
        GOTO WRITE.WORK.COMFILE
COMFILE.RENAME:
        IF HAVEOLDFILE$="YES" THEN CLOSE 1: LET HAVEOLDFILE$="CLS"
        IF HAVEWRKFILE$="YES" THEN CLOSE 2: LET HAVEWRKFILE$="CLS"
        ON END (3) GOTO COMFILE.RENAME.BAK
        OPEN "I",3,CFILE7$
        DELETE 3
COMFILE.RENAME.BAK:
```

```
        IF HAVEOLDFILE$()"OLS" THEN GOTO COMFILE.RENAME.DAT
        REC%=RENAME(CFILE7$,CFILE4$)
        IF REC%=-1 THEN GOTO COMFILE.RENAME.DAT
                PRINT
                PRINT "CANNOT RENAME CURRENT COMFILE TO BACKUP VERSION."
                PRINT "When ready to continue press RETURN.";
                WORK%=CONCHAR
COMFILE.RENAME.DAT:
        REC%=RENAME(CFILE4$,CFILE5$)
        IF REC%=-1 THEN GOTO CLOSING.PROCEDURES
                PRINT
                PRINT "CANNOT RENAME UPDATED COMFILE TO STANDARD VERSION."
                PRINT "When ready to continue press RETURN.";
                WORK%=CONCHAR
CLOSING.PROCEDURES:
        GOSUB SCREEN.HEADING
        GOSUB DISPLAY.STATISTICS
        PRINT "When ready to continue press RETURN.";
        WORK%=CONCHAR
        IF PRINTER$()"YES" THEN GOTO RETURN.TO.SYSTEM
        IF PCOMRSET$()"YES" THEN GOTO RETURN.TO.SYSTEM
        GOSUB SCREEN.HEADING
        PRINT "Do you have the printer ready (press RETURN)";
        WORK%=CONCHAR
        GOSUB SCREEN.HEADING
        PRINT "Printing Communication File Reset Report on printer."
        LPRINTER
        LET DATEIN$=CURRDAY$
        GOSUB FORMAT.YMD.MDY
        LET PRNTDATE$=DATEOUT$
        PRINT PNEWPAGE$
        LET PGNO%=0
        LET PGNO%=PGNO%+1
        PRINT TAB((80-LEN(TITLE$))\2);TITLE$
        PRINT TAB((80-LEN(CTITLE$))\2);CTITLE$
        PRINT "DATE: ";PRNTDATE$;
        LET WTITLE$="COMMUNICATIONS FILE RESET REPORT"
        PRINT TAB((80-LEN(WTITLE$))\2);WTITLE$;
        PRINT TAB(70);"PAGE: ";
        PRINT USING "###";PGNO%
        PRINT
        GOSUB DISPLAY.OLDEST.DATES
        PRINT
        GOSUB DISPLAY.STATISTICS
        CONSOLE
        GOTO RETURN.TO.SYSTEM
HAVE.FILE.ERROR:
        IF HAVEOLDHIST$="YES" THEN CLOSE 1
        IF HAVENEWHIST$="YES" THEN CLOSE 1
        IF HAVEWRKHIST$="YES" THEN CLOSE 2
        IF HAVEOLDFILE$="YES" THEN CLOSE 1
        IF HAVEWRKFILE$="YES" THEN CLOSE 2
        GOSUB SCREEN.HEADING
        PRINT MSG$
        PRINT "When you have read this message press RETURN.";
        WORK%=CONCHAR
        GOTO RETURN.TO.SYSTEM
REM-------------------------------------------------------------(RETURN)
```

```
RETURN.TO.SYSTEM:
    CONSOLE
    GOSUB SCREEN.HEADING
    PRINT "Returning to menu."
    END C)type D:COMTBAMR.BAS
REM ***** COMTBAMR.BAS (C383)
REM      04/05/83
REM      1005
REM
REM THIS PROGRAM PROVIDES THE FACILITY TO TRANSLATE DATA FILES
REM FROM THE RECEIVED FORMAT INTO THE COMMON "COMTPOST" FORMAT.
REM
REM IT IS INITIATED BY PLACING THE FOLLOWING VALUES IN THE "DATERTRN"
REM ENTRY IN THE CONTROL FILE:
REM
REM          VALUEONE$ = RETURN PROGRAM NAME
REM          VALUETWO$ = 1 CHARACTER RETURN FUNCTION
REM                      FILE NAME TO TRANSLATE
REM
REM THIS MODULE (AND ALL TRANSLATE MODULES) REPLACE THE RETURN
REM PROGRAM NAME IN VALUEONE$ WITH "TRAN". THE VALUETWO$ VALUE
REM REMAINS THE SAME (THE INITIATING PROGRAM NEEDS THE FUNCTION
REM VALUE TO KNOW WHERE TO RETURN TO).
REM
REM ORIGINALLY PROGRAMMED WITHIN COMUCALL BY TOM TRELFORD 08/28/82
REM---------------------------------------------------------(CHANGE LOG)
REM VERSION  DATE     CHANGE
REM   1.0    02/11/83 INITIAL VERSION
REM   1.1    03/04/83 Added TEMPFILE.$$$ to concatenate new COMTPOST to
REM                   existing COMTPOST; by Steve Hemphill
REM   1.2    03/07/83 Writes to TEMPFILE.$$$ changed to remove embedded
REM                   quotes; by Steve Hemphill
REM   1.3    03/08/83 Changed to bypass TEMPFILE.$$$ if COMTPOST.DAT does
REM                   not exist; by Steve Hemphill
REM   1.4    03/10/83 ACCOUNTFLAG field dropped from the format of the
REM                   COMTPOST files; by Steve Hemphill
REM   1.5    04/05/83 XOUTAMT made single-precision; by Steve Hemphill
REM---------------------------------------------------------(START OF PROGRAM)
START:
    CONSOLE
    DEFDBL X
    LET VERSION$="BAMTRAC Data Translation - Version 1.5"
    LET CFILE8$="COMTPOST.DAT"
    LET CFILE9$="COMTPOST.$$$"
    LET TMPFILE10$="TEMPFILE.$$$"
    LET CFILELEN%=200
    LET CTLFILE1$="CONTROL.DAT"
    LET CTLLENGTH%=100
    LET CTLMAX%=100
    LET ENTRYLMT%=50
    LET ENTRYMAX=35
    LET RETURNPGM$="COMUMENU"
```

```
        LET SCRN01$="BANTRAC DATA TRANSLATION"
        LET TEST$="NO"
        GOTO CONTROLFILE.OPEN
REM----------------------------------------------(SUBROUTINE = SCREEN HEADING)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))/2);VERSION$
        PRINT
        RETURN
REM----------------------------------------------(SUBROUTINE = READ CONTROL FILE)
READ.CONTROLFILE.RECORD:
        ON END (4) GOTO READ.CONTROLFILE.ERROR
        READ #4,WORK%;NAME$,VALUEONE$,VALUETWO$
        LET STAT$="OK"
        RETURN
READ.CONTROLFILE.ERROR:
        LET STAT$="END"
        RETURN
REM----------------------------------------------(SUBROUTINE = WRITE CONTROL FILE)
WRITE.CONTROLFILE.RECORD:
        ON END (4) GOTO WRITE.CONTROLFILE.ERROR
        WRITE  #4,WORK%;NAME$,VALUEONE$,VALUETWO$
        LET STAT$="OK"
        RETURN
WRITE.CONTROLFILE.ERROR:
        LET STAT$="END"
        RETURN
REM----------------------------------------------(PROCESS CONTROL FILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",4,CTLFILE1$,CTLLENGTH%
        LET WORK%=1
        GOTO CONTROLFILE.GET.RECORD
CONTROLFILE.NO.FILE:
        FOR LLINE%=1 TO 25
                PRINT
        NEXT LLINE%
        PRINT "NO CONTROL FILE. RETURNING TO INITIATING MODULE"
        GOTO SETUP.RETURN
CONTROLFILE.GET.RECORD:
        GOSUB READ.CONTROLFILE.RECORD
        IF STAT$="END"    THEN GOTO CONTROLFILE.CLOSE
        IF NAME$="ENDALL" THEN GOTO CONTROLFILE.CLOSE
        LET IWORK%=FIX(VAL(LEFT$(VALUEONE$,4)))
        IF NAME$="BLANK"  THEN BLANK$=CHR$(IWORK%)
        IF NAME$="CTITLE" THEN CTITLE$=VALUEONE$
```

```
        IF NAME$="DATERTRN" THEN GOTO CONTROLFILE.DATERTRN
        IF NAME$="HEADING"  THEN HEADING$=VALUEONE$
        IF NAME$="SHOME"    THEN SHOME$=CHR$(IWORK%)
        IF NAME$="SCLEAR"   THEN SCLEAR$=CHR$(IWORK%)
        IF NAME$="TEST"     THEN TEST$=VALUEONE$
        IF NAME$="TITLE"    THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.DATERTRN:
        LET RETURNPGM$=VALUEONE$
        LET DISKNAME$=RIGHT$(VALUETWO$,LEN(VALUETWO$)-1)
        LET VALUEONE$="TRAN"
        GOSUB WRITE.CONTROLFILE.RECORD
        IF STAT$="END" THEN GOTO CONTROLFILE.CLOSE
        GOTO CONTROLFILE.SETUP.NEXT
CONTROLFILE.CLOSE:
        CLOSE 4
        IF TEST$<>"YES" THEN GOTO TRANSLATE.START
        PRINT "This processing is being run in TEST mode. Turn on printer."
        PRINT "When the printer is ready press RETURN.";
        WORK%=CONCHAR
        PRINT
        LPRINTER
        PRINT "COMMUNICATIONS BAMTRAC TRANSLATION REPORT"
        PRINT
        CONSOLE
REM-----------------------------------------------------------(DATA TRANSLATION)
TRANSLATE.START:
        GOSUB SCREEN.HEADING
        PRINT "Translating the (";DISKNAME$;") file into our standard format."
        PRINT
        ON END (9) GOTO TRANSLATE.NO.WORK.FILE
        OPEN "I",9,CFILE9$
        DELETE 9
TRANSLATE.NO.WORK.FILE:
        ON END (9) GOTO TRANSLATE.WORK.FILE.PROBLEM
        OPEN "O",9,CFILE9$
        GOTO TRANSLATE.OPEN.SOURCE
TRANSLATE.WORK.FILE.PROBLEM:
        PRINT "***** BIG PROBLEM - CANNOT OPEN TRANSLATE WORK FILE *****"
        WORK%=CONCHAR
        GOTO SETUP.RETURN
TRANSLATE.OPEN.SOURCE:
        ON END (11) GOTO TRANSLATE.SOURCE.FILE.PROBLEM
        OPEN "I",11,DISKNAME$
        GOTO TRANSLATE.MOVE.RECORDS
TRANSLATE.SOURCE.FILE.PROBLEM:
        PRINT "***** BIG PROBLEM - CANNOT OPEN TRANSLATE SOURCE FILE *****"
        CLOSE 9
        WORK%=CONCHAR
        GOTO SETUP.RETURN
TRANSLATE.MOVE.RECORDS:
        RECCNT%=1
        LET MSG$="NO HEADER RECORD ON INPUT FILE"
```

```
        ON END (11) GOTO TRANSLATE.ERROR.01
        LINE READ #11; INLINE$
        IF TEST$="YES" THEN LPRINTER: PRINT "HEADER=";INLINE$: CONSOLE
        RECTYPE$=MID$(INLINE$,1,2)
        USERID$=MID$(INLINE$,3,8)
        DATADATE$=MID$(INLINE$,11,6)
        REVDATE$=DATADATE$
        DATATYPE$=MID$(INLINE$,17,2)
        DATESENT$=MID$(INLINE$,19,6)
        TIMESENT$=MID$(INLINE$,25,4)
        NUMITEMS%=VAL(MID$(INLINE$,29,3))
        IF DATATYPE$="2 " THEN GOTO TRANSLATE.SETUP.BALANCE
        DELETE 9
        CLOSE 11
        GOTO SETUP.RETURN
TRANSLATE.SETUP.BALANCE:
        DIM VALUE$(NUMITEMS%),TYPCODE$(NUMITEMS%)
        INDEX1%=1
        INDEX2%=NUMITEMS%
        IF INDEX2%>10 THEN INDEX2%=10
TRANSLATE.READ.01:
        LET MSG$="NO FORMAT CONTROL RECORD"
        READ #11;RECID%
        IF TEST$="YES" THEN LPRINTER: PRINT "RECID%=";RECID%: CONSOLE
        RECCNT%=RECCNT%+1
        IF RECID%<>1 THEN GOTO TRANSLATE.ERROR.03
        FOR ITEM%=INDEX1% TO INDEX2%
                READ #11;TYPCODE$(ITEM%)
        NEXT ITEM%
        IF INDEX2%=NUMITEMS% THEN GOTO TRANSLATE.FIND.FIELDS
        INDEX1%=INDEX2%+1
        INDEX2%=INDEX1%+9
        IF INDEX2%>NUMITEMS% THEN INDEX2%=NUMITEMS%
        GOTO TRANSLATE.READ.01
TRANSLATE.FIND.FIELDS:
        ABANUM%=1
        CURRFIELD$="ABA "
        IF TYPCODE$(1)=CURRFIELD$ THEN GOTO TRANSLATE.SETUP.ACCOUNT
        LEAVELOOP%=0
        FOR ABANUM%=1 TO NUMITEMS% AND LEAVELOOP%=0
                IF TYPCODE$(ABANUM%)=CURRFIELD$ THEN LEAVELOOP%=1
        NEXT ABANUM%
        IF LEAVELOOP%=1 THEN GOTO TRANSLATE.SETUP.ACCOUNT
        GOTO TRANSLATE.ERROR.02
TRANSLATE.SETUP.ACCOUNT:
        IF TEST$="YES" THEN LPRINTER: PRINT "ABANUM%=";ABANUM%: CONSOLE
        ACCTNUM%=2
        CURRFIELD$="ACCT"
        IF TYPCODE$(2)=CURRFIELD$ THEN GOTO TRANSLATE.READ.DATA
        LEAVELOOP%=0
        FOR ACCTNUM%=1 TO NUMITEMS% AND LEAVELOOP%=0
                IF TYPCODE$(ACCTNUM%)=CURRFIELD$ THEN LEAVELOOP%=1
        NEXT ACCTNUM%
        IF LEAVELOOP%=1 THEN GOTO TRANSLATE.READ.DATA
        GOTO TRANSLATE.ERROR.02
```

```
TRANSLATE.READ.DATA:
        IF TEST$="YES" THEN LPRINTER: PRINT "ACCTNUM%=";ACCTNUM%: CONSOLE
TRANSLATE.READ.MORE:
        INDEX1%=1
        INDEX2%=NUMITEMS%
        IF INDEX2%)10 THEN INDEX2%=10
TRANSLATE.READ.02:
        ON END (11) GOTO TRANSLATE.CLOSE.FILES
        READ #11;RECID%
        IF TEST$="YES" THEN LPRINTER: PRINT "DETAIL RECID%=";RECID%: CONSOLE
        RECCNT%=RECCNT%+1
        IF RECID%()2 THEN GOTO TRANSLATE.CLOSE.FILES
        FOR ITEM%=INDEX1% TO INDEX2%
                READ #11;VALUE$(ITEM%)
                IF TEST$="YES" THEN LPRINTER: PRINT "VALUE(";ITEM%;")=";VALUE$(ITEM%): CONSOLE
        NEXT ITEM%
        IF INDEX2%=NUMITEMS% THEN GOTO TRANSLATE.WRITE.FIELDS
        INDEX1%=INDEX2%+1
        INDEX2%=INDEX1%+9
        IF INDEX2%)NUMITEMS% THEN INDEX2%=NUMITEMS%
        GOTO TRANSLATE.READ.02
TRANSLATE.WRITE.FIELDS:
        FOR ITEM%=1 TO NUMITEMS%
                IF ITEM%=ABANUM% THEN GOTO TRANSLATE.STEP.IT
                IF ITEM%=ACCTNUM% THEN GOTO TRANSLATE.STEP.IT
                THISLEN=LEN(VALUE$(ITEM%))
                IF THISLEN=2 THEN GOTO TRANSLATE.STEP.IT
                IF TYPCODE$(ITEM%)="   " THEN GOTO TRANSLATE.STEP.IT
                LET OUTABA$=VALUE$(ABANUM%)
                LET OUTACCT$=VALUE$(ACCTNUM%)
                LET OUTTYPE%=VAL(LEFT$(TYPCODE$(ITEM%),4))
                LET XOUTAMT=VAL(VALUE$(ITEM%))
REM             LET OUTACCTFLAG=0
REM             WRITE #9;OUTABA$,OUTACCT$,REVDATE$,OUTTYPE%,XOUTAMT,OUTACCTFLAG
                PRINT #9,OUTABA$;",";OUTACCT$;",";REVDATE$;",";OUTTYPE%;",";XOUTAMT
                IF TEST$()"YES" THEN GOTO TRANSLATE.STEP.IT
                        LPRINTER
                        PRINT "---------------------------ONTO FILE"
                        PRINT "    OUTABA=";OUTABA$
                        PRINT "    OUTACCT=";OUTACCT$
                        PRINT "    REVDATE$=";REVDATE$
                        PRINT "    OUTTYPE%=";OUTTYPE%
                        PRINT "    XOUTAMT=";XOUTAMT
REM                     PRINT "OUTACCTFLAG=";OUTACCTFLAG
                        PRINT "---------------------------"
                        CONSOLE
TRANSLATE.STEP.IT:
        NEXT ITEM%
        GOTO TRANSLATE.READ.MORE
TRANSLATE.ERROR.01:
        PRINT "ERROR PROCESSING TRANSLATE FILES"
        PRINT
        GOTO TRANSLATE.HAVE.ERROR
TRANSLATE.ERROR.02:
        PRINT "ERROR PROCESSING RECORD "
        FOR ITEM%=1 TO NUMITEMS%
```

```
                PRINT TYPCODE$(ITEM%);
        NEXT ITEM%
        PRINT "NAME ";CURRFIELD$;" MISSING FIELD ON HEADER RECORD"
        GOTO TRANSLATE.HAVE.ERROR
TRANSLATE.ERROR.03:
        PRINT "ILLEGAL RECORD ID ";RECID%;" ON RECORD ";RECCNT%
TRANSLATE.HAVE.ERROR:
        IF FUNCTION$="U" THEN GOTO TRANSLATE.CLOSE.FILES
        PRINT "Press RETURN when you have reviewed this error.";
        WORK%=CONCHAR
TRANSLATE.CLOSE.FILES:
        CLOSE 9
        CLOSE 11
REM----------------------------------------------------------------
REM The actual translation is now finished. At this point, the program will
REM attempt to append the newly translated records (COMTPOST.$$$) to the
REM existing translated records (COMTPOST.DAT). If there is not COMTPOST.DAT,
REM a simple renaming of COMTPOST.$$$ to .DAT will be attempted.
REM----------------------------------------------------------------
REM Check if COMTPOST.DAT exists. If not, goto rename; if so, try to open it
REM for reading.
REM----------------------------------------------------------------
TRANSLATE.COPY.CHECK:
        FILESIZE=SIZE(CFILE8$)
        IF FILESIZE=0 THEN GOTO TRANSLATE.RENAME.WORKFILE
        ON END (8) GOTO TRANSLATE.MSTR.FILE.PROBLEM
        OPEN "I",8,CFILE8$
        GOTO TRANSLATE.OPEN.TRANSLATED
TRANSLATE.MSTR.FILE.PROBLEM:
        PRINT "***** BIG PROBLEM - CANNOT OPEN TRANSLATE MASTER FILE *****"
        WORK%=CONCHAR
        GOTO SETUP.RETURN
REM----------------------------------------------------------------
REM Try to open COMTPOST.$$$ for reading.
REM----------------------------------------------------------------
TRANSLATE.OPEN.TRANSLATED:
        ON END (9) GOTO TRANSLATE.TRANSLATED.FILE.PROBLEM
        OPEN "I",9,CFILE9$
        GOTO TRANSLATE.TEMPFILE.OPEN
TRANSLATE.TRANSLATED.FILE.PROBLEM:
        PRINT "***** BIG PROBLEM - CANNOT OPEN TRANSLATED SOURCE FILE *****"
        CLOSE 8
        WORK%=CONCHAR
        GOTO SETUP.RETURN
REM----------------------------------------------------------------
REM Since Business Basic cannot append to an existing sequential file, a
REM temporary file must be used
REM----------------------------------------------------------------
TRANSLATE.TEMPFILE.OPEN:
        OPEN "O",10,TMPFILE10$
REM----------------------------------------------------------------
REM A record of the existing COMTPOST is read, and written to the temporary
REM file
REM----------------------------------------------------------------
TRANSLATE.READ.MASTER:
        ON END (8) GOTO TRANSLATE.MOVE.TRANSLATED
```

```
        READ #8;ABANUM$,ACCTNUM$,REVDATE$,TYPECODE,AMOUNT
        PRINT #10,ABANUM$;",";ACCTNUM$;",";REVDATE$;",";TYPECODE;",";AMOUNT
        IF TEST$="YES" THEN LPRINTER: PRINT " OLD MASTER: ABANUM$=";ABANUM$;"  ACCTNUM$=";ACCTNUM$: CONSOLE
        GOTO TRANSLATE.READ.MASTER
REM------------------------------------------------------------------
REM  When the end of the existing COMTPOST is read and written, the first
REM  record of the new COMTPOST is read, and written to the temporary file
REM------------------------------------------------------------------
TRANSLATE.MOVE.TRANSLATED:
        ON END (9) GOTO TRANSLATE.ALL.FINISHED
        READ #9;ABANUM$,ACCTNUM$,REVDATE$,TYPECODE,AMOUNT
        IF TEST$="YES" THEN LPRINTER: PRINT "CURR UPDATE: ABANUM$=";ABANUM$;"  ACCTNUM$=";ACCTNUM$: CONSOLE
        PRINT #10,ABANUM$;",";ACCTNUM$;",";REVDATE$;",";TYPECODE;",";AMOUNT
        IF TEST$="YES" THEN LPRINTER: PRINT " NEW MASTER: ABANUM$=";ABANUM$;"  ACCTNUM$=";ACCTNUM$: CONSOLE
        GOTO TRANSLATE.MOVE.TRANSLATED
REM------------------------------------------------------------------
REM  Since both files have been written to the temporary file, delete them
REM------------------------------------------------------------------
TRANSLATE.ALL.FINISHED:
        CLOSE 10
        DELETE 8
        DELETE 9
REM------------------------------------------------------------------
REM  Rename the temporary file, with both sets of data, to COMTPOST.DAT
REM------------------------------------------------------------------
TRANSLATE.RENAME.TEMPFILE:
        RENFLAG%=RENAME(CFILE8$,TMPFILE10$)
        IF RENFLAG%()-1 THEN GOTO TRANSLATE.RENAME.ERROR
        GOTO SETUP.RETURN
REM------------------------------------------------------------------
REM  No COMTPOST.DAT existed, so simply try to rename COMTPOST.$$$ to .DAT
REM------------------------------------------------------------------
TRANSLATE.RENAME.WORKFILE:
        RENFLAG%=RENAME(CFILE8$,CFILE9$)
        IF RENFLAG%()-1 THEN GOTO TRANSLATE.RENAME.ERROR
        GOTO SETUP.RETURN
TRANSLATE.RENAME.ERROR:
        PRINT "*** BIG PROBLEM - CANNOT RENAME TEMPORARY FILE TO TRANSLATE ***"
        PRINT
        PRINT "Press RETURN to continue"
        WAITER%=CONCHAR
REM---------------------------------------------------(COMMO RETURN CHECK)
SETUP.RETURN:
        GOSUB SCREEN.HEADING
        PRINT "Returning to initiating module."
        LET RETURNPGM$=RETURNPGM$+".EXE"
        CHAIN RETURNPGM$
        END C)type D:COMPDIAG.BAS
REM ***** COMPDIAG.BAS (Business BASIC 0.99)
REM      04/25/83
REM      1521
REM
REM  THIS PROGRAM DISPLAYS/PRINTS THE USER SELECTED DIAGNOSTICS OR
```

```
REM  COMMUNICATIONS ERROR FILE(S) FROM THE LIST OF FILES IN THE
REM  "COMFILES.DAT" FILE.
REM
REM  MODIFIED FROM COMPFILE.BAS BY TOM TRELFORD 02/02/83
REM----------------------------------------------------------(CHANGE LOG)
REM  VERSION   DATE      CHANGE
REM    1.0    02/02/83   INITIAL VERSION
REM    2.0    02/17/83   Translated to MicroSoft Business BASIC 0.99;
REM                      by Steve Hemphill
REM    2.1    03/04/83   Remove chain-back to COMUMENU; by Steve Hemphill
REM    2.2    04/25/83   Display of Version number added; by Steve Hemphill
REM---------------------------------------------------------(PROGRAM START)
START:
        CONSOLE
        LET VERSION$="Communications Files Listing - Version 2.2"
        LET CFILE2$="COMFILES.DAT"
        LET CFILE3$="COMFILEW.$$$"
        LET CFILE3.LEN%=103
        LET COMTYPEMAX%=100
        LET CURRDAY$="000000"
        LET CTLFILE1$="CONTROL.DAT"
        LET CTLLENGTH%=100
        LET CTLMAX%=100
        LET ENTRYLMT%=50
        LET HEADRPAGE$="NORMAL"
        LET LINE$=" -------------------------------------------------"
        LET SCRNMAX%=21
        LET TITLE2$="COMMUNICATIONS FILES LISTING"
        LET WORKFILE%=0
        DIM RECORD$(COMTYPEMAX%)
        GOTO CONTROLFILE.OPEN
REM====================================================(SCREEN.HEADING)
SCREEN.HEADING:
        IF HEADING$ = "BLANK" THEN  PRINT BLANK$ _
            ELSE _
              PRINT SHOME$; SCLEAR$
        PRINT TAB((80-LEN(TITLE$))\2); TITLE$
        PRINT TAB((80-LEN(CTITLE$))\2); CTITLE$
        PRINT TAB((80-LEN(VERSION$))\2); VERSION$
        LLINE%=4
        RETURN
REM====================================================(READ.CONTROLFILE.RECORD)
READ.CONTROLFILE.RECORD:
        ON END (1) GOTO READ.CONTROLFILE.ERROR
        READ #1,WORK%;NAME$,VALUEONE$,VALUETWO$
        LET STAT$="OK"
        RETURN
READ.CONTROLFILE.ERROR:
        LET STAT$="END"
        RETURN
REM====================================================(OPEN SELECTED FILE)
SELECT.FILE.OPEN:
        ON END (3) GOTO SELECT.FILE.OPEN.ERROR
        OPEN "I",3,FILENAME$
        FSTAT$="OPN"
        RETURN
```

```
SELECT.FILE.OPEN.ERROR:
        FSTAT$="CLS"
        RETURN
REM=========================================================(INITIALIZE MATRIX)
INITIALIZE.MATRIX:
        FOR WORK%=1 TO COMTYPEMAX%
                LET RECORD$(WORK%)="END"
        NEXT WORK%
        RETURN
REM--------------------------------------------------------------(CONTROLFILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",1,CTLFILE1$,CTLLENGTH%
        LET WORK%=1
        GOTO CONTROLFILE.GET.RECORD
CONTROLFILE.NO.FILE:
        FOR LLINE%=1 TO 25
                PRINT
        NEXT LLINE%
        PRINT "NO CONTROL FILE. RETURNING TO MENU"
        PRINT "Press RETURN when you have reviewed this message. ";
        WORK%=CONCHAR
        GOTO RETURN.TO.MENU
CONTROLFILE.GET.RECORD:
        GOSUB READ.CONTROLFILE.RECORD
        IF STAT$="END"      THEN GOTO CONTROLFILE.CLOSE
        IF NAME$="ENDALL"   THEN GOTO CONTROLFILE.CLOSE
        LET IWORK%=CINT(VAL(LEFT$(VALUEONE$,4)))
        IF NAME$="BLANK"     THEN BLANK$=CHR$(IWORK%)
        IF NAME$="CURRDAY"   THEN CURRDAY$=VALUEONE$
        IF NAME$="HEADRPAGE" THEN HEADRPAGE$=VALUEONE$
        IF NAME$="CTITLE"    THEN CTITLE$=VALUEONE$
        IF NAME$="HEADING"   THEN HEADINE$=VALUEONE$
        IF NAME$="PMAXLINE"  THEN PMAXLINE%=IWORK%
        IF NAME$="PNEWPAGE"  THEN PNEWPAGE$=CHR$(IWORK%)
        IF NAME$="PRINTER"   THEN PRINTER$=VALUEONE$
        IF NAME$="SHOME"     THEN SHOME$=CHR$(IWORK%)
        IF NAME$="SCLEAR"    THEN SCLEAR$=CHR$(IWORK%)
        IF NAME$="TITLE"     THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.CLOSE:
        CLOSE 1
        GOSUB INITIALIZE.MATRIX
REM-----------------------------------------------------------(OPEN COMFILES)
COMFILESFILE.CHECK.SIZE:
        FILESIZE=SIZE(CFILE2$)
        IF FILESIZE=0 THEN GOTO COMFILESFILE.ERROR
        GOTO CHOOSE.FUNCTION
COMFILESFILE.ERROR:
        GOSUB SCREEN.HEADING
        PRINT
```

```
            PRINT "NO COMMUNICATIONS FILES AVAILABLE FOR DISPLAY."
            PRINT "Press RETURN when you have reviewed this message. ";
            WORK%=CONCHAR
            GOTO RETURN.TO.MENU
REM----------------------------------------------------------(CHOOSE.FUNCTION)
CHOOSE.FUNCTION:
        GOSUB SCREEN.HEADING
        PRINT
        PRINT "Available functions are:"
        PRINT
        PRINT TAB(15);"(D)isplay file values"
        PRINT TAB(15);"(P)rint file values"
        PRINT TAB(15);"(Q)uit"
DISPLAY.RESPONSE:
        PRINT
        INPUT "What function do you want to perform? ",WORK$
        ANSWER2$=LEFT$(WORK$,1)
        MEDIA$=UCASE$(ANSWER2$)
        IF MEDIA$="Q" THEN GOTO RETURN.TO.MENU
        IF MEDIA$="D" THEN GOTO CHOOSE.FILETYPE
        IF MEDIA$="P" THEN GOTO CHOOSE.FILETYPE
        PRINT "RESPONSE MUST BE (D)ISPLAY, (P)RINT, OR (Q)UIT. RE-ENTER."
        GOTO DISPLAY.RESPONSE
REM----------------------------------------------------------(CHOOSE FILETYPE)
CHOOSE.FILETYPE:
        GOSUB SCREEN.HEADING
        PRINT
        PRINT "Available file types are:"
        PRINT
        PRINT TAB(15);"(D) Communications DIAGNOSTIC files"
        PRINT TAB(15);"(E) Communications ERROR files"
        PRINT TAB(15);"(Q)uit"
DISPLAY.FTYPE.RESPONSE:
        PRINT
        INPUT "What file type do you want to select? ",WORK$
        ANSWER2$=LEFT$(WORK$,1)
        ANSWER$=UCASE$(ANSWER2$)
        IF ANSWER$="Q" THEN GOTO CHOOSE.FUNCTION
        IF ANSWER$="D" THEN FTYPE$="DIAG": GOTO CHOOSE.CALLFILE
        IF ANSWER$="E" THEN FTYPE$="EROR": GOTO CHOOSE.CALLFILE
        PRINT "RESPONSE MUST BE (D)IAGNOSTIC, (E)RROR, OR (Q)UIT. RE-ENTER."
        GOTO DISPLAY.FTYPE.RESPONSE
REM----------------------------------------------------(BUILD WORK FILE OF SELECTED)
CHOOSE.CALLFILE:
        ON END (2) GOTO COMFILESFILE.ERROR
        OPEN "I",2,CFILE2$
        GOSUB INITIALIZE.MATRIX
        LET MAXCALLNBR%=0
        LET REC%=0
        IF FTYPE$="DIAG" THEN DESC$="Diagnostic"
        IF FTYPE$="EROR" THEN DESC$="Error"
CALLFILE.LOOP.START:
        ON END (2) GOTO CALLFILE.END.LOOP
        READ #2;FDATE$,FTIME$,FILENAME$
        LET MATCH1$=MID$(FILENAME$,4,4)
        IF FTYPE$=MATCH1$ THEN GOTO CALLFILE.UPDATE.MATRIX
        GOTO CALLFILE.LOOP.START
```

```
CALLFILE.UPDATE.MATRIX:
        MDATE$=MID$(FDATE$,3,4)+LEFT$(FDATE$,2)
        MTIME$=LEFT$(FTIME$,4)
        CALLNO$=MID$(FILENAME$,2,2)
        RECX=RECX+1
        REC$=TRIM$(STR$(RECX))
        FDATE$=MID$(FDATE$,3,2)+"/"+MID$(FDATE$,5,2)+"/"+MID$(FDATE$,1,2)
        FTIME$=MID$(FTIME$,1,2)+":"+MID$(FTIME$,3,2)+":"+MID$(FTIME$,5,2)
        LET FILENAME$=FILENAME$+" "
        LET WORK$=FILENAME$+MDATE$+MTIME$+" ("+REC$+") "+DESC$+" file for call "
        LET WORK$=WORK$+CALLNO$+" on "+FDATE$+" at "+FTIME$
        LET RECORD$(RECX)=WORK$
        LET MAXRECNBRX=RECX
        IF RECX<COMTYPEMAXX THEN GOTO CALLFILE.LOOP.START
CALLFILE.END.LOOP:
        CLOSE 2
        IF RECORD$(1)="END" THEN _
            PRINT: _
            PRINT "UNABLE TO FIND ANY FILES OF SELECTED TYPE." :_
            GOTO RETURN.TO.CHOOSE.FILETYPE
        MAXLINEX=SCRNMAXX
REM------------------------------------------------(DISPLAY FILE SELECTION)
GET.RESPONSE:
        LET RECX=1
        LET MENU.PROMPT$="Select file"
        IF MEDIA$="P" THEN MENU.PROMPT$=MENU.PROMPT$+" or (G)roup or (A)ll"
        LET PMSG$=MENU.PROMPT$+" or (N)ext or (Q)uit"
        LET EOF$="NO"
        GOSUB SCREEN.HEADING
        PRINT
        PRINT "Available files are:"
        PRINT LINE$
        LLINEX=5
GET.RESPONSE.LOOP:
        IF RECORD$(RECX)="END" THEN GOTO GET.RESPONSE.MENU.END
        MENU.REC$=MID$(RECORD$(RECX),23,80)
        GOTO GET.RESPONSE.GOOD.READ
GET.RESPONSE.MENU.END:
        LET PMSG$=MENU.PROMPT$+" or (Q)uit"
        LET EOF$="YES"
GET.RESPONSE.GOOD.READ:
        IF EOF$="YES" THEN GOTO GET.RESPONSE.MESSAGE
        PRINT MENU.REC$
        LLINEX=LLINEX+1
        RECX=RECX+1
        IF LLINEX<MAXLINEX THEN GOTO GET.RESPONSE.LOOP
        WORKX=CONCHAR
GET.RESPONSE.MESSAGE:
        PRINT LINE$
GET.RESPONSE.MSG.RESPONSE:
        LET PRNTALL$="NO"
        LET PRNTTIME1$="0000"
        LET PRNTTIME2$="2400"
        LET PRNTCNTX=0
        PRINT PMSG$;
        INPUT RESP$
        ANSWER$=UCASE$(LEFT$(RESP$,1))
```

```
            IF ANSWER$="A" THEN _
                SELECT$="ALL" _
            ELSE _
                SELECT$=" "
            IF ANSWER$="C" THEN GOTO GET.RESPONSE.SETUP.SELECTED
            IF ANSWER$="A" AND MEDIA$="P" THEN GOTO GET.RESPONSE.SETUP.ALL
            IF ANSWER$="B" AND MEDIA$="P" THEN GOTO GET.RESPONSE.SETUP.ALL
            IF ANSWER$()"N" THEN GOTO GET.RESPONSE.CHECK.NUMERICS
                    GOSUB SCREEN.HEADING
                    PRINT
                    PRINT MENU.HEADING$
                    PRINT LINE$
                    LLINE%=5
                    GOTO GET.RESPONSE.LOOP
GET.RESPONSE.CHECK.NUMERICS:
        LEAVELOOP%=0
        FOR I%=1 TO LEN(RESP$) AND LEAVELOOP%=0
                IF MATCH("#",RESP$,I%) () I% THEN _
                        PRINT "NON-NUMERIC RESPONSE. RE-ENTER.": _
                        LEAVELOOP%=1
            NEXT I%
            IF LEAVELOOP%=1 THEN GOTO GET.RESPONSE.MSG.RESPONSE
            GOTO GET.RESPONSE.SETUP.SELECTED
GET.RESPONSE.SETUP.ALL:
        LET PRNTALL$="YES"
        LET RESP$="1"
        PRINT
        INPUT "What day's reports do you want (mmddyy,999999=all dates)? ",PRNTDATE$
        IF PRNTDATE$="999999" THEN GOTO GET.RESPONSE.SETUP.SELECTED
        IF SELECT$="ALL" THEN GOTO GET.RESPONSE.SETUP.SELECTED
GET.RESPONSE.SETUP.TIME:
        PRINT
        INPUT "Do you want to select by time (Y/N)? ",RESP$
        ANSWER$=UCASE$(LEFT$(RESP$,1))
        IF ANSWER$="N" THEN GOTO GET.RESPONSE.SETUP.SELECTED
        IF ANSWER$="Y" THEN GOTO GET.RESPONSE.TIME.RANGE
        PRINT "RESPONSE MUST BE Y OR N. RE-ENTER."
        GOTO GET.RESPONSE.SETUP.TIME
GET.RESPONSE.TIME.RANGE:
        INPUT "What is the earliest time (HHMM)? ",PRNTTIME1$
        INPUT "What is the latest time (HHMM)? ",PRNTTIME2$
GET.RESPONSE.SETUP.SELECTED:
        IF ANSWER$="Q" THEN GOTO RETURN.TO.CHOOSE.FILETYPE
        REC%=CINT(VAL(LEFT$(RESP$,4)))
GET.RESPONSE.READ.FOR.NEXT:
        LET BUFF$=RECORD$(REC%)
        IF BUFF$="END" THEN GOTO GET.RESPONSE.NO.SELECT.FILE
        IF PRNTALL$="YES" AND PRNTDATE$()"999999" THEN GOTO GET.RESPONSE.CHECK.DATE
        GOTO START.REPORT
GET.RESPONSE.CHECK.DATE:
        MDATE$=MID$(BUFF$,13,6)
        MTIME$=MID$(BUFF$,19,4)
        IF MDATE$=PRNTDATE$ THEN _
            IF MTIME$ )= PRNTTIME1$ THEN _
                IF MTIME$ (= PRNTTIME2$ THEN GOTO START.REPORT
        LET REC%=REC%+1
```

```
             IF RECX(=MAXRECNBRX THEN GOTO GET.RESPONSE.READ.FOR.NEXT
GET.RESPONSE.NO.SELECT.FILE:
        IF PRNTCNTX=0 THEN _
             PRINT :_
             PRINT "NO FILES MEET SELECTION CRITERIA" :_
             PRINT "Press RETURN when you have reviewed this message. "; :_
             WORKX=CONCHAR :_
             GOTO CHOOSE.CALLFILE
        IF ANSWER$()"Q" THEN _
                 PRINT "Press RETURN to return to last menu. " :_
                 WX=CONCHAR :_
                 GOTO CHOOSE.CALLFILE
RETURN.TO.CHOOSE.FILETYPE:
        IF ANSWER$()"Q" THEN _
                 PRINT "Press RETURN to return to last menu. ": _
                 WX=CONCHAR
        GOTO CHOOSE.FILETYPE
REM---------------------------------------------------(PRINT/DISPLAY SELECTED FILE)
START.REPORT:
        FILENAME$=MID$(BUFF$,1,12)
        PGNOX=0
        IF MEDIA$="D" THEN GOTO PROCESS.SCREEN
        IF PRINTER$="NO" THEN GOTO REPORT.NO.PRINTER
        MAXLINEX=PMAXLINEX
        IF PRNTALL$="YES" AND PRNTCNTX()0 THEN GOTO REPORT.CONTINUATION
        GOSUB SCREEN.HEADING
        PRINT
        PRINT "When you have the printer ready press RETURN ";
        WX=CONCHAR
        IF HEADRPAGE$()"SUMMARY" THEN GOTO REPORT.CONTINUATION
        GOSUB SCREEN.HEADING
        PRINT
        PRINT "Printing ";TITLE2$;" on printer."
        LPRINTER
        PGNOX=PGNOX+1
        RUNDATE$=" "
        RUNTIME$=" "
        RUNDATE$=MID$(CURRDAY$,3,2)+"/"+RIGHT$(CURRDAY$,2)+"/"+LEFT$(CURRDAY$,2)
REPORT.SUMMARY.PAGE:
        PRINT PNEWPAGE$
        PRINT TAB((80-LEN(TITLE$))\2); TITLE$
        PRINT TAB((80-LEN(CTITLE$))\2); CTITLE$
        PRINT TAB(2); "Date: "; RUNDATE$;
        PRINT TAB((80-LEN(TITLE2$))\2); TITLE2$;
        PRINT TAB(72); "Page: "; : PRINT USING "###"; PGNOX
        PRINT
        PRINT TAB(2); "SELECTION CRITERIA:"
        PRINT TAB(2); "Date: ";PRNTDATE$;"  Earliest time: ";PRNTTIME1$;"  Latest time: ";PRNTTIME2$
        PRINT
        SUMRECX=1
SUMMARY.HEADER.LOOP:
        LET BUFF$=RECORD$(SUMRECX)
        IF BUFF$="END" THEN GOTO END.SUMMARY.LOOP
        IF PRNTALL$="YES" THEN _
                 IF PRNTDATE$="999999" THEN GOTO PRINT.HEADER.RECORD _
                 ELSE _
                         MDATE$=MID$(BUFF$,13,6) :_
```

```
                    MTIME$=MID$(BUFF$,19,4) :_
                    IF MDATE$=PRNTDATE$ THEN _
                         IF MTIME$)=PRNTTIME1$ THEN _
                              IF MTIME$(=PRNTTIME2$ THEN GOTO PRINT.HEADER.RECORD _
                              ELSE _
                         ELSE _
                    ELSE _
          ELSE IF SUMRECX=RECX THEN GOTO PRINT.HEADER.RECORD
          GOTO NXT.SUMMARY.HEADER
PRINT.HEADER.RECORD:
          PRINT MID$(BUFF$,23,80)
NXT.SUMMARY.HEADER:
          SUMRECX=SUMRECX+1
          IF SUMRECX(=MAXRECNBRX THEN GOTO SUMMARY.HEADER.LOOP
END.SUMMARY.LOOP:
          PRINT
          PRINT TAB(2); "COMMUNICATIONS FILE PRINT STARTS ON NEXT PAGE."
          PRINT TAB(2); "IT IS UNCHANGED AND IS PRINTED 'AS IS'."
          PRINT PNEWPAGE$
          GOTO ACCESS.CURRENT.FILE
REPORT.CONTINUATION:
          LPRINTER
          PGNOX=PGNOX+1
          RUNDATE$=" "
          RUNTIME$=" "
          RUNDATE$=MID$(CURRDAY$,3,2)+"/"+RIGHT$(CURRDAY$,2)+"/"+LEFT$(CURRDAY$,2)
REPORT.TITLE.PAGE:
          PRINT PNEWPAGE$
          IF HEADRPAGE$()"NORMAL" THEN GOTO ACCESS.CURRENT.FILE
          PRINT TAB((80-LEN(TITLE$))\2); TITLE$
          PRINT TAB((80-LEN(CTITLE$))\2); CTITLE$
          PRINT TAB(2); "Date: "; RUNDATE$;
          PRINT TAB((80-LEN(TITLE2$))\2); TITLE2$;
          PRINT TAB(70); "Page: "; : PRINT USING "###"; PGNOX
          PRINT
          PRINT MID$(BUFF$,23,80)
          PRINT
          PRINT TAB(2); "SELECTION CRITERIA:"
          PRINT TAB(2); "Date: ";PRNTDATE$;"  Earliest time: ";PRNTTIME1$;"  Latest time: ";PRNTTIME2$
          PRINT
          PRINT TAB(2); "COMMUNICATIONS FILE PRINT STARTS ON NEXT PAGE."
          PRINT TAB(2); "IT IS UNCHANGED AND IS PRINTED 'AS IS'."
          PRINT PNEWPAGE$
          GOTO ACCESS.CURRENT.FILE
REPORT.NO.PRINTER:
          PRINT
          PRINT "YOU DON'T HAVE A PRINTER AVAILABLE"
          PRINT "Press RETURN to return to Function List ";
          WX=CONCHAR
          GOTO CHOOSE.FUNCTION
PROCESS.SCREEN:
          MAXLINEX=SCRNMAXX
          PGNOX=PGNOX+1
          GOSUB SCREEN.HEADING
          PRINT LINE$
ACCESS.CURRENT.FILE:
          GOSUB SELECT.FILE.OPEN
```

```
        IF FSTAT$()"CLS" THEN GOTO PRNT.FILE.LOOP
        CONSOLE
        PRINT
        PRINT "UNABLE TO OPEN SELECTED FILE."
        PRINT "Press RETURN to return to last menu. ";
        W%=CONCHAR
        LET ANSWER$="Q"
        GOTO RETURN.TO.CHOOSE.FILETYPE
PRNT.FILE.LOOP:
        FSTAT$=" "
        ON END (3) GOTO PRNT.FILE.END
        LINE READ #3; CALLFILE.REC$
        FSTAT$="OK"
        GOTO PRNT.FILE.GOOD.READ
PRNT.FILE.END:
        FSTAT$="END"
PRNT.FILE.GOOD.READ:
        IF MEDIA$="D" AND FSTAT$="END" THEN GOTO PRNT.LAST.SHOWN
        IF MEDIA$()"D" AND FSTAT$="END" THEN GOTO PRNT.CLOSE.FILE
        IF LLINE%(MAXLINE% THEN GOTO PRNT.SAME.PAGE
        IF MEDIA$()"D" THEN GOTO PRNT.SAME.PAGE
        PRINT LINE$
PRNT.RESPONSE:
        INPUT "(N)ext screen or (Q)uit? ";RESP$
        ANSWER$=UCASE$(LEFT$(RESP$,1))
        IF ANSWER$="Q" THEN GOTO PRNT.CLOSE.FILE
        IF ANSWER$="N" THEN GOTO PRNT.SETUP.NEXT.SCREEN
        PRINT "INVALID RESPONSE. RE-ENTER."
        PRINT
        GOTO PRNT.RESPONSE
PRNT.SETUP.NEXT.SCREEN:
        PGNO%=PGNO%+1
        GOSUB SCREEN.HEADING
        PRINT LINE$
        GOTO PRNT.FILE.LOOP
PRNT.SAME.PAGE:
        IF FSTAT$="END" THEN GOTO PRNT.CLOSE.FILE
        PRINT CALLFILE.REC$
        LLINE%=LLINE%+1
        GOTO PRNT.FILE.LOOP
PRNT.LAST.SHOWN:
        PRINT LINE$
        PRINT "Last record processed for this file. To continue press RETURN. ";
        WORK%=CONCHAR
PRNT.CLOSE.FILE:
        CLOSE 3
        IF MEDIA$="D" THEN GOTO CHOOSE.CALLFILE
        CONSOLE
        IF PRNTALL$()"YES" THEN GOTO CHOOSE.CALLFILE
        LET REC%=REC%+1
        LET PRNTCNT%=PRNTCNT%+1
        IF REC%)MAXRECNBR% THEN GOTO CHOOSE.CALLFILE
        LET RESP$=TRIM$(STR$(REC%))
        LET ANSWER$="R"
        GOTO GET.RESPONSE.SETUP.SELECTED
REM----------------------------------------------------------------(RETURN TO MENU)
```

```
RETURN.TO.MENU:
    CONSOLE
    GOSUB SCREEN.HEADING
    PRINT "Returning to Communications Menu."
    END D)type D:COMIOTRX.PAS
PROGRAM COMIOTRM (Output);
(*_____

COMMUNICTIONS SUPPORT
    This program handles the communications between the micro and
    a large scale host system.  The basic support provided as follows:
        a) Dials host system
        b) Completes logon as specified by the user
        c) If requested completes responses required by the host
        d) Based on options chosen the data will be
            1) Displayed on CRT
            2) Printed on printer
            3) Written to Disk
       'e) Specialized protocal to recieve a data file from BAMTRAC.
_____
    VERSION     DATE        CHANGES
    0.98        04/21/83    Initial BETA Test Version
    1.20        05/10/83    Slowed acknowledgement for BAMTRAC 300 Baud
                            File transfer down.  It was too fast and was
                            causing read errors.
_____
*)
CONST
    MAXCHARS=255;                       !Maximum no chars in msg form host
    VERSION='1.00 Pascal Communications';
    BS=CHR(8);
    CR=CHR(13);
    ESC=CHR(27);
    BELL=CHR(7);
    BKSP8=8;
    CR13=13;
    F1=177;
    F2=178;
    F3=179;
    F4=180;
    F5=181;
    F6=182;
    F7=183;
    F8=184;
    F9=185;
    F10=186;

TYPE
    !           Logon & Prompt File Description
    LOG=RECORD
        CASE INTEGER OF
        1:  (HDR10:BYTE;                    !Record Type = 0
             SYSTEM11:STRING(30);           !System Name
             DSKMET-132:BOOLEAN;            !Disk output (true) V/R  this ver
```

```
            ECRT[33]:BOOLEAN;              !Display Data Recieves on CRT (true)
            EPTR[34]:BOOLEAN;              !Write Data Recieved on Printer (true)
            DIAG[35]:BOOLEAN;              !Write all Data Recived and Trans.
                                           !to disk (true)
            BAMTRAC[36]:BOOLEAN;           !Bamtrac Protocal (true)
            SAVEPTR[37]:BOOLEAN;           !Write Data Recieved on Disk (true)
            FDX[38]:BOOLEAN;               !Full Duplex (true)
            EMDM[39]:BOOLEAN;              !Display Data Trans. on CRT (true)
            HBKSP[40]:BYTE;                !Host System Delete Char
            LOG[41]:LSTRING(8);            !Host System Standard Logoff Msg.
            ENDCHAR[50]:BYTE;              !Host System Standard Prompt Char
            PARITY[51]:BYTE);              !Modem Parity Setting
    2:      (ACTION[2]:BYTE;               !Record Type
                                           !  1 = Phone Number
                                           !  2 = Not used
                                           !  3 = Send Message with Carrage Ret.
                                           !  4 = Send Message no Carrage Ret.
                                           !  5 = End of Logon
                                           !  6 = Compare Text to current mcm
                                           !      input buffer
                                           !  7 = Compare text to previous mcm
                                           !      input buffer
                                           !  8 = Don't Compare text just wait for
                                           !      prompt char
                                           !  9 = (end of set) Not used
            MSG[1]:LSTRING(29);            !Message to be transmitted to host
            MODE[31]:BYTE;                 !Processing Indicator (Responses)
                                           !  E = Start Retriveing Data or Report
                                           !      after Transmitting Response
                                           !  * = End of Session After recieving
                                           !      report
                                           !  N = More Prompts
            ECHAR[32]:BYTE;                !Prompt char to be waited for
            TEXT[33]:LSTRING(29));         !Message to be recieved and compared
    3:      (STRNG[0]:PACKED ARRAY [0..63] of byte); !Sets Fixed Record Length
END;
MSTRING=LSTRING(250);

VAR
    COMLOG:FILE OF LOG;                    !Logon and Prompt File
    COMDSKW:FILE OF byte;                  !Output Data Disk
    COMRET:TEXT;                           !Status Return File for Basic Interface
    DBUFF:LOG;                             !Dial Record Buffer
    BUFF:LOG;                              !Logon & Prompts Buffer
    LOGMSG:LSTRING(12);                    !Logoff Message
    BERROR,PERROR:BOOLEAN;                 !Error Flags fr Buffer overrun and Printer off
    EKEY:BOOLEAN;                          !Display Keyboard data on Printer
    CAN:BOOLEAN;                           !Canned Respone Flag
    KCTL:BOOLEAN;                          !Transmit Keybard Control Char
    NOTIMES:WORD;                          !Count used toWait for Char from Modem
    MPOS:WORD;                             !Current offset into modem input buff
    PPOS:WORD;                             !Current offset into modem input buff.
                                           !pool for printer output
    DPOS:WORD;                             !Current offset into modem input buff
                                           !pool for disk output
    EPOS:INTEGER;                          !Offset into response msg for prompt
    CPOS:WORD;                             !Offset into modem input buff for
```

```
                              !Message being Recived
LPOS:WORD;                    !Offset into modem input buff for
                              !last Message Received ended by Line Feed
KLEN:WORD;                    !Number of chars entered used for back
                              !space control
MNO:BYTE;                     !No of Current Modem Input Buffer Pool
                              !number
PNO:BYTE;                     !No of Current Modem Buffer being
                              !printed
DNO:BYTE;                     !No of Modem Buffer being used for
                              !Disk output
LNO:BYTE;                     !Modem Buffer no for Beginning of last
                              !last complete msg
CNO:BYTE;                     !Modem Buffer no for beginning of
                              !message being recieved
MWR5:BYTE;                    !Setting of Modem Status Write Reg 5
                              !Used for Break Key processing
RECNT:WORD;                   !Line Count
STATS:WORD;                   !Session Completion Code
NOCHARS:INTEGER;              !Count of chars in current msg
DISKOUT:CHAR;                 !Disk output
CRLF:LSTRING(2);              !Carrage Retrun Line Feed VALUE
  CRLF:='  ';
  CRLF[1]:=CR;
  CRLF[2]:=CHR(10);
  PERROR:=FALSE;              !Initialize
  DISKOUT:='N';

(*_____
         ASSEMBLER SUPPORT ROUTINES
*)
        !------ Put character into modem buffer pool
PROCEDURE PUTBUFF (PCHAR,PNO:byte; var PPOS:word); extern;
        !------ Get character from modem Buffer Pool
FUNCTION  GETBUFF (PNO:byte; var PPOS:word):byte; extern;
        !------ Read Keyboard char
FUNCTION  KEY:BYTE; extern;
        !------ Printer Status test
FUNCTION  PTRREADY:boolean; extern;
        !------ Printer output routine
FUNCTION- PRINTER (PNO:byte; var PPOS:word):boolean; extern;
        !------ Convert Type Char to byte
FUNCTION  SWAPEM (SCHAR:CHAR):byte; extern;
        !------ Transmits Break Signal
PROCEDURE MDMBREAK (MWR5:byte); extern;
        !------ Transmits a Single Char
PROCEDURE MDMPUT (MCHAR:BYTE); extern;
        !------ Forces modem offline
PROCEDURE MDMOFF; extern;
        !------ Initializes Chip for Modem
FUNCTION  MDMINIT (MCLK,MCLK1,MWR3,MWR4,MWR5:byte):byte; extern;
        !------ Returns Status Register (currently not used)
FUNCTION  MDMSTAT:integer; extern;
        !------ Returns Carrier Status
```

```
FUNCTION CARRIER:boolean; extern;
       !------ Reads Character From Modem
FUNCTION MDMGET:byte; extern;
       !------ System halt routine
PROCEDURE ENDXQQ; extern;
       !------ Forward Reference for Exiting from program
PROCEDURE EXIT (ESTAT:BYTE); forward;
       !------ Forward Reference for keyboard control keys
PROCEDURE KEYCTL (KCHAR:BYTE); forward;
       !------ Forward Reference for Displaying 25 line
PROCEDURE TURN25ON; forward;
!
!------------------------------------------------------------
!
!                    Procedure to clear CRT
!
PROCEDURE CLEARCRT;
BEGIN
  WRITE (ESC,'E',ESC,'X');
END;
!
!------------------------------------------------------------
!
!                        ABEND Program
!
PROCEDURE ABENDIT (AERROR:BYTE);
VAR
  ACNT:BYTE;
BEGIN
  CLEARCRT;
  FOR VAR I:=1 TO 5 DO
    WRITELN;
  WRITELN ('     ************ERROR ',AERROR:3,'************');
  WRITELN (' INVALID ENTRY OR UNRECOVERABLE DISK ERROR');
  WRITELN ('       Contact BCFA Support Group');
  WRITELN ('         Before REBOOTING System');
  REPEAT
   ACNT:=0;
  UNTIL ACNT ) 10;
END;
!
!------------------------------------------------------------
!
!                        Wait Routine
!       Each count will cause approximately a 1 second wait
!
PROCEDURE WAIT (WCNT:INTEGER);
VAR
  WWORD:INTEGER;
  WWORD1:WORD;
BEGIN
  WWORD:=0;
  REPEAT
    WWORD:=WWORD+1;
    FOR WWORD1:=0 TO 60000 DO;
  UNTIL WWORD )= WCNT;
END;
!
!------------------------------------------------------------
!
```

```
!              Test if user entered a C to cancel function
!
FUNCTION CANCELLED:BOOLEAN;
VAR
  KCHAR:BYTE;
BEGIN
  CANCELLED:=FALSE;
  KCHAR:=KEY;
  IF KCHAR < 127 THEN RETURN;
  IF KCHAR = F10 THEN
    BEGIN
      CANCELLED:=TRUE;
      RETURN;
    END;
  IF NOT DBUFF.BANTRAC THEN
    KEYCTL (KCHAR);
END;
!_____
!
!              Prints Error Message and Sets Printer Error Flag
!
PROCEDURE PRINTEROFF;
BEGIN
  IF PERROR THEN RETURN;
  WRITELN;
  WRITELN ('**********ERROR**********');
  WRITELN ('****PRINTER LOST DATA****');
  PERROR:=TRUE;
END;
!_____
!
!              Puts char into Buffer Pool
!                 BCHAR = character to be buffered
!
PROCEDURE BUFFER (BCHAR:BYTE);
BEGIN
  PUTBUFF (BCHAR,MNO,MPOS);
  IF MPOS = MAXWORD THEN              !Test if Buffer Full
    BEGIN                             !yes
      MNO:=MNO+1;                     !Go to next buffer
      IF MNO > 2 THEN                 !End of pool?
        MNO:=0;                       !Yes - go to 1st buffer
      MPOS:=0;                        !set offset to beginning
    END;
  IF (DBUFF.EPTR)                     !If printer output and next input char
  AND ((MNO=DND) AND (MPOS=PPOS)) THEN !will overlay data to be printed then
    PRINTEROFF;                       !printer off error
  IF (DBUFF.SAVEPTR OR DBUFF.DIAG)    !If disk output and next input char
  AND ((MNO = DNO)                    !will overlay data to be written to
  AND (MPOS = DPOS)) THEN             !disk then set buffer overlap error
    BEGIN                             !and notify user
      WRITELN ('BUFFER OVERLAP ERROR****');
      BERROR:=TRUE;
    END;
END;
!_____
!
```

```
!                 Printer ouput routine
!
PROCEDURE PRINT;
BEGIN
  IF (PNO = MNO)                    !If all chars in buffer have been
  AND (PPOS = MPOS) THEN            !printed then return to caller
    RETURN;
  IF NOT PRINTER (PNO,PPOS) THEN    !If printer not ready for char then
    RETURN;                         !return to caller
  IF PPOS < MAXWORD THEN RETURN;    !If not last pos in buffer return
  IF PNO < 2 THEN                   !If not last buffer then set to next
    PNO:=PNO+1                      !buffer in buffer pool
  ELSE
    PNO:=0;                         !If last buffer go back to start
END;
!-------------------------------------------------------------------
!
!            Prints all chars in buffer
!       Loop until all chars in buffer have been printed or
!       max count has been reached which indicates that the
!       printer is offline
       PROCEDURE PRINTBUFF;
       VAR
          PCNT:WORD;
       BEGIN
          REPEAT
            IF (PNO = MNO)              !If all chars in buffer have been
            AND (PPOS = MPOS) THEN      !printed then ereturn
              RETURN;
            IF NOT PTRREADY THEN        !if printer not ready increment count
              PCNT:=PCNT+1
            ELSE
              BEGIN
                PCNT:=0;                !Reset Count
                PRINT;                  !Print char
              END;
          UNTIL PCNT > 24000;           !If Max Count Reached
          PRINTEROFF;                   !Setup Error
       END;
!-------------------------------------------------------------------
!
!            Writes All Characters in buffer to Disk
!
PROCEDURE DISKWRITE;
BEGIN
  IF (DNO= MNO)                     !If all chars have been written return
  AND (DPOS = MPOS) THEN
    RETURN;
  WRITE ('D',SS);                   !Display a D on CRT to indicate disk
                                    !write is being completed
  REPEAT                            !Write Loop
    IF DBUFF.EPTR THEN PRINT;       !If printer output then print
    WRITE (COMDSKW,GETBUFF(DNO,DPOS)); !Write char to disk
    IF COMDSKW.ERRS () 0 THEN       !If Disk I/O Error
      EXIT (COMDSKW.ERRS + 65);     !Exit with error
    IF DPOS >= MAXWORD THEN         !If end of buffer pool
```

```
      BEGIN
        DND:=DND+1;                       !Increment to next buffer
        IF DND > 2 THEN                   !If last buffer then go to beginning
          DND:=2;
        DPOS:=0;                          !Reset to buffer base
      END;
  UNTIL (DND = MND) AND (DPOS = MPOS);    !If all chars have been written to disk
  WRITE (' ',ES);                         !Clean up crt and return
END;
!-------------------------------------------------------------
!
!                 Modem Initialization Routine
!                   Parity = Modem parity
!
PROCEDURE MDMSETUP (PARITY:BYTE);
VAR
  CLK,CLK1,MWR3,MWR4,MSTAT:BYTE;
BEGIN
  IF PARITY >= 10 THEN            !If parity > 10 then setup for 1200
    BEGIN                         !baud
      PARITY:=PARITY-10;          !Set so case statement is valid
      CLK:=65; CLK1:=0;           !1200 Baud Clock Settings
    END
  ELSE                            !Setup for 300 Baud
    BEGIN
      CLK:=4; CLK1:=1;            !300 Baud Clock Settings
    END;
  CASE PARITY OF                  !Status Reg 4
    1:   MWR4:=79;
    3,7: MWR4:=71;
    4,8: MWR4:=69;
    5:   MWR4:=76;
    6:   MWR4:=68;
    OTHERWISE MWR4:=77;
  END;
  IF PARITY < 5 THEN              !Test if 7-bits per char
    BEGIN
      MWR3:=97;                   !Status Reg 3
      MWR5:=170;                  !Status Reg 5
    END
  ELSE
    BEGIN
      MWR3:=193;                  !Status Reg 3
      MWR5:=234;                  !Status Reg 5
    END;
  MSTAT:=MDMINIT (CLK,CLK1,MWR3,MWR4,MWR5); !Initialize Modem
  IF MSTAT < 116 THEN             !If Modem offline exit pgm
    EXIT (32);
END;
!-------------------------------------------------------------
!
!                 Read character from Modem
!           Routine returns Valid ASCII Char or 0
!
FUNCTION MDMREAD:BYTE;
VAR
```

```
YCHAR:BYTE;
BEGIN
  MDMREAD:=0;                              !Set No character
  YCHAR:=MDMGET;                           !Get Character
  IF YCHAR = 0 THEN                        !If No character
    BEGIN
      IF DBUFF.EPTR THEN PRINT;            !If printer output then go print char
                                           !from buffer
      NOTIMES:=NOTIMES+1;                  !Increment No char Count & return
      RETURN;
    END;
  NOTIMES:=0;                              !Clear out No char count
  IF YCHAR >= 127 THEN RETURN;             !Test if valid Char if not return
  MDMREAD:=YCHAR;                          !Set Function Return with Char
  IF (YCHAR () BKSP8) THEN                 !If not back space char put character
    BUFFER (YCHAR);                        !in buffer
  IF DBUFF.ECRT THEN                       !If CRT Display requested display
    WRITE (CHR(YCHAR))                     !character on CRT
  ELSE                                     !If not then display
    WRITE ('R',BS);                        !'R' on CRT to show a mdmread occuring
  IF (YCHAR = 10) THEN                     !If line feed swap buffer pointers
    BEGIN                                  !and increment message count
      RECNT:=RECNT+1;
      LNO:=CNO;                            !Setup last message buffer number
      LPOS:=CPOS;                          !Setup last message offset pointer
      CNO:=MNO;                            !Setup current message buffer number
      CPOS:=MPOS;                          !Setup current message offset pointer
      NOCHARS:=0;                          !Reset msgchar count
    END
  ELSE
    BEGIN
      NOCHARS:=NOCHARS+1;                  !INCREMENT character count
      IF NOCHARS > MAXCHARS THEN           !If more then 255 chars recieved
        EXIT (30);                         !without a line feed then exit with
                                           !error
                                           !NOTE: The purpose of this is to limit
                                           !the chance of hanging up the entire
                                           !system due to modem garabage chars.
    END;
END;
!
!---------------------------------------------------------------
!
!                 Transmit Character
!                         MCHAR = character to be sent
PROCEDURE MDMSND (MCHAR:BYTE);
VAR
  MRETRY:INTEGER;
  ECHAR:BYTE;
BEGIN
  IF EKEY
  OR DBUFF.DIAG THEN                       !If Diagnostics output requested
    BEGIN
      BUFFER (MCHAR);                      !put char in buffer
      IF MCHAR = CR13 THEN
        BUFFER (10);
    END;
  IF (MCHAR = CR13)                        !If sending carrage return & disk
```

```
       AND ((DBUFF.SAVEPTR)              !output then
        OR (DBUFF.DIAG)) THEN DISKWRITE; !write data in buffer to disk
      MDMPUT (MCHAR);                    !Write Character To Modem
      IF NOT DBUFF.ECRT THEN             !IF CRT Display not requested than
        WRITE ('S',BS);                  !Write 'S' to CRT
      IF DBUFF.EMDM THEN                 !If Display of modem output Requested
        WRITE (CHR(MCHAR));              !Display Char on CRT !NOTE: The HAYES Modem has been setup to echo all chars so a full
          !      Duplex processing is avialable for all trans modes MRETRY:=0;
      REPEAT                             !Loop to read echoed char
        ECHAR:=MDMGET;
        MRETRY:=MRETRY+1;
      UNTIL (ECHAR () 0) OR (MRETRY ) 1000);
    END;

!-------------------------------------------------------------------
!
!             Transmit a message
!                 SMSG = character to be transmitted
!
PROCEDURE MDMSEND (VAR SMSG:LSTRING);
VAR
  SPOS,SLEN:BYTE;
BEGIN
  SLEN:=SMSG.LEN;                        !setup length
  FOR SPOS:=1 TO SLEN DO                 !Loop until all chars have been trans
    BEGIN
      MDMSND (SWAPEM(SMSG[SPOS]));
    END;
  MDMSND (CR13);                         !Send Carrage Return
END;

!-------------------------------------------------------------------
!
!             Wait for a specific prompt char
!                   RCHAR = Prompt char
!                   RCNT  = no of time to read modem for a character
!                           In effect this is a timming loop
!                   FUNCTION = Returns a 0 if prompt char recieved
!
FUNCTION RTEST (RCHAR:BYTE; RCNT:WORD):BYTE;
VAR
  ICHAR:BYTE;
BEGIN
  NOTIMES:=0;                            !Reset mdm read count
  RTEST:=0;                              !Set no error return
  NOCHARS:=0;                            !Reset Character Count
  REPEAT                                 !Loop Reading Modem until prompt char
    ICHAR:=MDMREAD;                      !Read or count exceeded
    IF NOT CARRIER THEN                  !If carrier lost exit
      EXIT (43);
    IF CANCELLED THEN
      BEGIN
        RTEST:=44;
        RETURN;
      END;
```

```
      UNTIL (ICHAR=RCHAR)
      OR   (NOTIMES )= RCNT);
      IF ICHAR () RCHAR THEN             !If prompt char no recieved set error
        BEGIN                             !return to caller
          RTEST:=41;
          RETURN;
        END;
      NOTIMES:=0;                        !Reset mdaread count
      REPEAT                             !Loop reading chars from modem until
        ICHAR:=MDMREAD;                  !count reached. In effect read
      UNTIL NOTIMES = 3000;              !residule chars
    END;
    !---------------------------------------------------------------
    !
    !          Read Logon and Response Portion of Logon File
    !
    PROCEDURE READDIALN;
    VAR
      RCHAR:CHAR;
      RNO:BYTE;
    BEGIN
      EPOS:=0;
      IF EOF(COMLOG) THEN                !If end of file exit with error
        EXIT (38);
      READ (COMLOG,BUFF);                !Read Record
      IF COMLOG.ERRS () 0 THEN           !If error exit
        EXIT (COMLOG.ERRS + 50);
      RNO:=BUFF.TEXT.LEN;                !Get length of message to be compared
      IF (RNO ) 0)                       !If there is a message to be compared
      AND (BUFF.ACTION = 6) THEN         !and prompt is on the the same line
        BEGIN                            !as the actual message
          RCHAR:=CHR(BUFF.ICHAR);        !Get count as to what pos in message
                                         !line to start checking for prompt char
          EPOS:=SCANEQ (RNO,RCHAR,BUFF.TEXT,1);
        END;
    END;
    !---------------------------------------------------------------
    !
    !                     Logon Routine
    !
    PROCEDURE AUTOLOG;
    VAR
      ANO:WORD;
      AFIRST:BOOLEAN;
      ARET:BYTE;
      ABUFF:LSTRING(31);
      !
      !                     Dial Routine
      !
      PROCEDURE DIAL;
      VAR
        DMSG:LSTRING(40);
        D:WORD;
        DTRIES:INTEGER;
        DCHAR:BYTE;
```

```
BEGIN
  DTRIES:=0;                               !Reset Dial Retry Count
  REPEAT                                   !Dial Loop
    MDMSETUP (DBUFF.PARITY);                !Inialize modem
    IF DBUFF.FDX THEN                      !If full Duplex session then
      DMSG:='AT F1 D'                      !Setup modem command for full duplex
        ELSE
          DMSG:='AT F0 D';                 !Setup half duplex
        CONCAT (DMSG,BUFF.MSG);            !Concat command with Phone No.
        CLEARCRT;
        WRITELN (VERSION);
        WRITELN ('Calling ',DBUFF.SYSTEM); !Display system description
        WRITELN ('Dialing ',BUFF.MSG);     !Display phone number
        MDMSEND (DMSG);                    !Send Command to modem
        NOTIMES:=0;                        !Initialize Mdmread count
        REPEAT                             !Loop waiting for carrier or cr
          DCHAR:=MDMREAD;
          IF CANCELLED THEN                !If User entered a 'C' then exit
            EXIT (42);
        UNTIL (CARRIER)
        OR (DCHAR = CR13)
        OR (NOTIMES > 35000);
        IF CARRIER THEN                    !If phone answered
          BEGIN
            WRITELN ('Host System has answered');
            IF BUFF.ECHAR <= 32 THEN       !If host does not immediatly start
              BEGIN                        !sending data then wait for modems
                WAIT (3);                  !to become in sync. the return
                RETURN;                    !logon routine
              END;
            DCHAR:=RTEST (BUFF.ECHAR,32000);
            IF DCHAR = 2 THEN              !host starts transmitting data
              RETURN;                      !so wait for prompt character
            IF DCHAR = 44 THEN
              EXIT (42);
          END;
        DTRIES:=DTRIES+1;                  !Phone not answered increment count
      UNTIL DTRIES > 2;                    !If max count then exit with error
      EXIT (31);
END;
!
!        Specialized Transmit Message Routine
!
PROCEDURE AUTOSEND;
VAR
  ATRIES,APOS,ALEN:BYTE;
  ACNT:INTEGER;
BEGIN
  ATRIES:=0;                               !Reset retry count
  REPEAT
    ALEN:=ABUFF.LEN;                       !get length of message
    FOR APOS:=1 TO ALEN DO                 !Loop to send message
      BEGIN
        FOR ACNT:=1 TO 10000 DO;           !Timming wait between chars.
                                           !It appears that this is required for
                                           !initial messages used for multi baud
                                           !rate modems. Without this loop intial
```

```
                                    !messages get garbaged very frequently
        IF NOT CARRIER THEN          !If carrier lost exit program with err.
          EXIT (43);
        MOMSND (SWAPEM(ABUFF(APCSI)));  !Send Character
      END;
    ARET:=RTEST (BUFF.ECHAR,AND);    !Wait for Response From host
    IF ARET = 44 THEN
      BEGIN
        WRITELN ('*******AUTOLOG CANCELLED********');
        WRITELN ('SYSTEM RETURNED TO TERMINAL MODE');
        BUFF.ACTION:=5;
        RETURN;
      END;
    ATRIES:=ATRIES+1;                !Increment Retry Count
  UNTIL (ARET = 0) OR (ATRIES > 3);
  IF ARET () 0 THEN                  !If unsucessfull exit with error
    EXIT (ARET);
END;
!
!               Autolog Mainline
!
  BEGIN
    REPEAT                           !Clear out keyboard buffer
      ARET:=KEY;
    UNTIL ARET = 0;
    ASSIGN (COMDSKW,'COMDSKW.$$$');  !Setup Output Disk Data Set
    COMDSKW.TRAP:=TRUE;              !Set I/O error trapping
    REWRITE (COMDSKW);               !Create Disk File
    IF COMDSKW.ERRS () 0 THEN        !If unsucessful exit with error
      EXIT (COMDSKW.ERRS + 65);
    ASSIGN (COMLOG,'COMCALL.$$$');   !Setup Input Dial list Name
    COMLOG.TRAP:=TRUE;               !Set I/O error trapping
    RESET (COMLOG);                  !Open File
    IF COMLOG.ERRS () 0 THEN         !If I/O error exit with error
      ABENDIT (COMLOG.ERRS + 50);
    READ (COMLOG,DBUFF);             !Read Dial List Header
    IF COMLOG.ERRS () 0 THEN         !If I/O error exit with error
      EXIT (COMLOG.ERRS + 50);
    RECNT:=0;                        !Initialize line count
    COPYLST (DBUFF.LOG,LOGMSG);      !Setup log off message for Exit
                                     !procedure
    TURN25ON;                        !Setup Line 25
    READDIALW;                       !Read record from Dial list
    IF BUFF.ACTION () 1 THEN         !If not phone number exit with error
      EXIT (35)                      !Note phone no must immediately follow
    ELSE                             !dial header
      DIAL;                          !Dial phone number
    AFIRST:=TRUE;                    !Set first time through switch
    WHILE (BUFF.ACTION () 5) DO      !Loop processing logon portion of dial
      BEGIN                          !list
        READDIALW;                   !Read Record from dial list
        IF (AFIRST) THEN             !If first time through set wait count
          BEGIN                      !fairly low
            AFIRST:=FALSE;           !Turn off Switch
            IF (BUFF.MSG.LEN ( 2) THEN  !If length of response set shorter wait
              AND:=4000              !count
            ELSE
```

```
            AND:=8000;
        END;
    CASE BUFF.ACTION OF
        3:  BEGIN                           !Send response with carriage return
                ABUFF:=BUFF.MSG;
                CONCAT (ABUFF,CR);
                AUTOSEND;
            END;
        4:  BEGIN                           !Send response without carriage return
                ABUFF:=BUFF.MSG;
                AUTOSEND;
            END;
        5:  BEGIN                           !End of Logon Set record
                IF BUFF.MSG = 'Y' THEN      !If requested set responses switch true
                    CAN:=TRUE;
            END;
        OTHERWISE;                          !Ignore Invalid Records
        END;
        AND:=32000;                         !Reset /dmread count
    END;
END;
!_____
!
!               Get Character out of buffer
!           LEFTBUFF = Buffer to be filled
!           LEFTCNT  = Maximum No of chars to be retrieved
!           LEFTNO   = Buffer Pool Number
!           LEFTPOS  = Starting point in buffer
PROCEDURE LEFT (VAR LEFTBUFF:MSTRING;LEFTCNT:word;LEFTNO:BYTE; LEFTPOS:WORD);
VAR
  LCNT:word;
  LNO:BYTE;
  LPOS:WORD;
  LCHAR:CHAR;
  LBYTE:BYTE;
BEGIN
  LEFTBUFF:=NULL;                           !Initialize buffer
  IF LEFTCNT < 1 THEN                       !If zero chars requested return
    RETURN;                                 !to caller
  LCNT:=LEFTCNT;                            !Setup internal counts
  LNO:=LEFTNO;
  LPOS:=LEFTPOS;
  REPEAT
    LBYTE:=GETBUFF(LNO,LPOS);               !Get character from buffer
    IF LBYTE = 10 THEN RETURN;              !If linefeed the return to caller
    LCHAR:=CHR(LBYTE);                      !Convert to char for string functions
    IF LBYTE > 31 THEN                      !If not control char then
      BEGIN
        LCNT:=LCNT-1;                       !Decrement count
        CONCAT (LEFTBUFF,LCHAR);            !put char in buffer
        IF LPOS >= MAXWORD THEN             !If end of Buffer pool Buffer go to
          BEGIN                             !next buffer
            LNO:=LNO+1;
            IF LNO > 2 THEN
              LNO:=0;
            LPOS:=0;
          END;
```

```
      END;
  UNTIL (LCNT ( 1);                    !return if all chars pulled from buffer
END;
!
!---------------------------------------------------------------
!
!                    Response Processing
!
PROCEDURE REPLY;
VAR
  OUTMSG:MSTRING;
  RRET:BYTE;
!
!                    Compare Routine
!
  PROCEDURE REPLYS;
  VAR
    MBUFF:MSTRING;
  BEGIN
    IF BUFF.MODE = ORD('*') THEN        !If last Response for session
      BEGIN                              !setup log msg and exit pgm
        COPYLST (BUFF.MSG,LOGMSG);
        EXIT (100);
      END;
    IF BUFF.ACTION = 8 THEN             !If no compare requested return to
      RETURN;                            !calling routine
    IF BUFF.ACTION = 7 THEN             !If compare to previous buffer pull
      LEFT (MBUFF,BUFF.TEXT.LEN,LNO,LPOS) !msg from last msg buffer
    ELSE
      LEFT (MBUFF,BUFF.TEXT.LEN,CNO,CPOS); !pull msg from current buffer
    IF MBUFF () BUFF.TEXT THEN          !If msg does not match response
      EXIT (34);                         !exit with error
  END;
BEGIN
  RRET:=0;
  REPEAT                                !Loop to process responses
    IF (RRET = 44)
    OR (CANCELLED) THEN                 !If user cancelled exit routine
      BEGIN
        WRITELN; WRITELN;
        WRITELN ('SYSTEM RETURNED TO TERMINAL MODE');
        RETURN;
      END;
    REPLYS;                             !Compare response to msg
    COPYLST (BUFF.MSG,OUTMSG);          !Setup Reply msg
    IF DBUFF.ECRT THEN                  !If CRT output requested display
      WRITE (BUFF.MSG);                  !reply on CRT
    IF BUFF.MODE = ORD('E') THEN        !If Report Retrieval to start
      BEGIN
        IF DBUFF.EPTR                   !If printer output or
        OR DBUFF.SAVEPTR THEN           !if report is being saved on disk then
          BEGIN                          !insert a carrage return,linefeed, and
            PUTBUFF (CR13,MNO,MPOS);     !printer page command
            PUTBUFF (10,MNO,MPOS);
            PUTBUFF (12,MNO,MPOS);
          END;
        READDIALW;                      !Read next entry for compare during
                                         !report retrieval
```

```
        MDMSEND (OUTMSG);              !Transmit Reply
        RETURN;                         !return to calling routine
     END;
   READDIALW;                          !Read next entry in dial
   MDMSEND (OUTMSG);                   !Transmit response
     RRET:=RTEST (BUFF.ECHAR,60000);   !Read modem waiting for prompt char
 UNTIL RRET =41;                       !If prompt char not recieved then
 EXIT (RRET);                          !exit with error
END;

!-----------------------------------------------------------------
!
!           This routine processes User Report Requests
!
PROCEDURE CANNED;
VAR
  CRET:BYTE;
  GNO:BYTE;
  GPOS:WORD;
  CBUFF:MSTRING;
  !
  !             Retrieves Report
  !
  FUNCTION GETREPORT:BYTE;
  VAR
    GRET,CCHAR:BYTE;
    TIMES:WORD;

BEGIN
    TIMES:=60000;                       !Initialize Max no of times to read
                                        !modem waiting for a valid ASCII char
    NOCHARS:=0;                         !Initialize message length
    REPEAT                              !Loop reading modem
      CCHAR:=MDMREAD;                   !Read modem port
      IF CANCELLED THEN                 !If user cancelled go into terminal
        BEGIN                           !mode
          GETREPORT:=120;
          WRITELN; WRITELN;
          WRITELN ('SYSTEM RETURNED TO TERMINAL MODE');
          RETURN;
        END;
      IF (CCHAR = BUFF.ECHAR)           !If input char = prompt char
      AND (NOCHARS )= EPOS) THEN        !and prompt char appears in
        BEGIN                           !approximate location within the
          TIMES:=10000;                 !message begin recieved reset no chars
                                        !to wait for valid char lower.
          IF BUFF.ACTION = 7 THEN       !If message to be compared is in the
            BEGIN                       !previous buffer then set it up
              GPOS:=LPOS;               !NOTE:  Saving pointers so that
              GNO:=LNO;                 !Messages can be compared later. The
            END                         !system is not fast enough to compare
                                        !in a interactive mode
          ELSE                          !Else
            BEGIN
              GPOS:=CPOS;               !Setup for current buffer
              GNO:=CNO;
            END;
        END;
```

```
        UNTIL (NOTIMES ) TIMES)          !If max count reached or lost carrier
        OR (NOT CARRIER);                !return to calling routine
        GETREPORT:=0;                    !set successful return
    END;
!
!                    Canned Mainline
BEGIN
    IF NOT DBUFF.ECRT THEN               !If no CRT Display then Display
        WRITELN ('RESPONDING TO PROMPTS');
    READDIALW;                           !Read Dail List Record
    REPEAT                               !Base loop to answer prompts and
                                         !retrieve data
        REPLY;                           !Process Promts
        NOTIMES:=0;                      !Reset mdmread count
        IF NOT DBUFF.ECRT THEN           !If no CRT Display then Display
            WRITELN ('STARTING TO RETRIEVE REPORT');
        CRET:=GETREPORT;                 !Retrieve Report
        IF CRET () 0 THEN                !If user requesed Cancel then return
            RETURN;                      !calling procedure
        LEFT (CBUFF,BUFF.TEXT.LEN,BNO,BPOS); !Build Message buffer using pointers
                                         !set by GETREPORT
        IF CBUFF () BUFF.TEXT THEN       !If message does not match recieved
            EXIT (34);                   !message then exit error
        IF BUFF.MODE = ORD('*') THEN     !If end of session then setup logmsg
            BEGIN                        !from prompt processing record
                COPYLST (BUFF.MSG,LOGMSG); !and exit pgm
                EXIT (100);              !NOTE: Normal exit
            END;
        BUFF.ACTION:=8;                  !Set Action code so that the replys
                                         !routine will not attempt to compare
                                         !msgs
    UNTIL (CRET () 0);
END;
!
!------------------------------------------------------------------
!
!           This Routine Handles BOFA Bamtrac Protocal
!
PROCEDURE BAMTRAC;
VAR
    BNO:INTEGER;
    BRECNT,BSTATS:WORD;
    ITYPE:CHAR;
    BTRIES,INACK,IACK,ETX,AFLAG,BRET:BYTE;
    EOTFLAG:BOOLEAN;
    BBUFF:ARRAY [0..1] OF MSTRING;
    BAMACK:LSTRING(6);
    !
    !        Read Bamtrac Message
    !
    FUNCTION BAMREAD:BYTE;
    VAR
        BCHAR:CHAR;
        BBYTE:BYTE;
    BEGIN
        BBUFF[BNO]:=NULL;                !Initialize buffer
        NOTIMES:=0;                      !Reset mdmread count
        REPEAT                           !Loop Reading Message Waiting for
```

```
     IF CANCELLED THEN
        EXIT (44);
     BBYTE:=MDMREAD;                    !etx
     IF BBYTE > 0 THEN                  !If char then
        BEGIN
           IF (BBYTE > 31)              !If not valid ascci char and not ')'
           AND (BBYTE () ORD(')')) THEN
              BEGIN
                 BCHAR:=CHR(BBYTE);     !convert To char and put into buffer
                 CONCAT (BBUFF[BNO],BCHAR);
              END;
        END;
     IF NOT CARRIER THEN                !If carrier Lost exit with error
        EXIT (39);
  UNTIL (BBYTE = ETX)                   !If ETX or Max count reached
  OR (NOTIMES > 50000);                 !end loop
  BAMREAD:=BBYTE;                       !Set function return with last char rec
  NOTIMES:=0;                           !Reset mdmread count
  REPEAT                                !Loop reading mdm for ')' prompt
     BBYTE:=MDMREAD;
  UNTIL (NOTIMES > 5000)
  OR    (BBYTE = ORD(')'));
END;
!
!          This Routine Processes Admin Messages
!
PROCEDURE BAMADMIN;
VAR
  PB:LSTRING(5);
BEGIN
  PB:='000';
  FOR VAR I:=1 TO 3 DO                  !Get Message No from Input msg
     IF BBUFF[0,I] () ' ' THEN
        PB[I]:=BBUFF[0,I];
  IF DECODE(PB,BSTATS) THEN;            !Convert To INTEGER
  IF BSTATS = 100 THEN                  !If normal completion msg
     BEGIN
        PB:='00000';
        FOR VAR I:=4 TO 8 DO            !Get Record Count from Input Msg
           IF BBUFF[0,I] () ' ' THEN
              PB[I-3]:=BBUFF[0,I];
        IF DECODE(PB,BRECNT) THEN;      !Convert to INTEGER
     END;
  INSERT ('ADMIN',BBUFF[0],1);          !Flag record as Admin MSG
END;
!
!          This Routine Compares Messages and ACK nos.
!
FUNCTION BAMVALID:BOOLEAN
VAR
  BLEN:INTEGER;
BEGIN
  BAMVALID:=FALSE;                      !Set Invalid Message Return
  IF BBUFF[BNO].LEN < 3 THEN
     RETURN;
  IACK:=SWAPEM(BBUFF[BNO,2]);
  ITYPE:=BBUFF[BNO,1];
```

```
     IF IACK () INACK THEN
        RETURN;
     DELETE (BBUFF[BNO],1,2);
     IF BNO=0 THEN                        !If First Buffer then set
       BEGIN
          BNO:=1;                         !first buffer full switch
          BAMVALID:=TRUE;                 !Set Valid Message Return
          RETURN;                         !return to caller
       END;
     IF BBUFF[0] () BBUFF[1] THEN         !If Buffers do not match then
        RETURN;                           !Return to caller
     BAMVALID:=TRUE;                      !Set Valid Message Return
     BNO:=0;                              !Set switch First Buffer
     IF BBUFF[1] = 'EOT' THEN             !If Eot message recieved then set
       BEGIN
          EOTFLAG:=TRUE;                  !eot switch to true
          ETX:=ORD(')');                  !Reset etx to system prompt
       END;
     IF ITYPE = 'A' THEN                  !If Admin message then
        BAMADMIN;                         !go and process
     CONCAT (BBUFF[0],CRLF);
     FOR BLEN:=1 TO BBUFF[0].LEN DO       !Write Data To Disk File
        WRITE (COMDSKW,SWAPEM(BBUFF[0,BLEN]));
     AFLAG:=AFLAG+1;                      !Increment ACK count
     IF AFLAG ) 57 THEN AFLAG:=48;        !If Ack ) 9 then set next ack out
                                          !to zero IF AFLAG ) 56 THEN                   !If Ack ) 8 then set ack to zero
        INACK:=ORD('0')
     ELSE
        INACK:=AFLAG+1;                   !increment in ack no
     BTRIES:=0;
  END;
!
!              Bamtrac Routine Mainline
!
BEGIN
   INACK:=ORD('0');                       !Initialize
   AFLAG:=ORD('9');
   ETX:=3;
   BTRIES:=0;
   EOTFLAG:=FALSE;
   BBUFF[0]:=NULL;
   BBUFF[1]:=NULL;
   BAMACK:='ACK ';
   IF NOT DBUFF.ECRT THEN                 !If No CRT Echoing then display
      WRITELN ('PROCESSING DATA REQUEST PROMPTS');
   READDIALW;                             !Read dial record
   REPLY;                                 !Process Prompts
   IF NOT DBUFF.ECRT THEN                 !If No CRT Echoing then display
      WRITELN ('RETRIEVING DATA');
   DBUFF.EPTR:=FALSE;                     !Turn off Disk & Printer ouput
   DBUFF.SAVEPTR:=FALSE;
   WRITE (ESC,'J');
   WRITE (ESC,CHR(120),'1');
   WRITE (ESC,'Y',CHR(32+24),CHR(32+0));
   FOR BNO:=1 TO 9 DO
      WRITE (ESC,'p','       ',ESC,'q',' ');
```

```
WRITE (ESC,'p','F10 CAN',ESC,'q');
WRITE (ESC,CHR(121),'1');
WRITE (ESC,'K');
BND:=0;
REPEAT
   IF BAMREAD = ETX THEN          !If ETX recieved then test if
      BEGIN                       !valid
         IF EOTFLAG THEN
            BEGIN
               RECNT:=BRECNT;
               EXIT (BSTATS);
            END;
         IF NOT BAMVALID THEN     !If not increment retry count
            BTRIES:=BTRIES+1;
      END
   ELSE                           !If not ETX then increment retry count
      BTRIES:=BTRIES+1;
   BAMACK[4]:=CHR(AFLAG);
   IF DBUFF.PARITY(10 THEN WAIT(1);
   MDMSEND (BAMACK);              !Send Ack
UNTIL BTRIES ) 8;                 !If max retries reached then
EXIT (36);                        !Exit with error
END;
!_____
!          Setup and display the 25th line
!
PROCEDURE TURN25ON;

PROCEDURE HIGHVIDIO (TMSG:MSTRING);
   BEGIN
      WRITE (ESC,'p',TMSG,ESC,'q',' ');
   END;

PROCEDURE LOWVIDIO (TMSG:MSTRING);
   BEGIN
      WRITE (ESC,'0',TMSG,ESC,'1',' ');
   END;

BEGIN
   WRITE (ESC,'j',ESC,CHR(120),'1',ESC,'Y',CHR(32+24),CHR(32+0));
   IF DBUFF.ECRT THEN
      LOWVIDIO ('F1-CRT')
   ELSE
      HIGHVIDIO ('F1-CRT');
   IF DBUFF.EPTR THEN
      LOWVIDIO ('F2-PTR')
   ELSE
      HIGHVIDIO ('F2-PTR');
   IF EKEY THEN
      LOWVIDIO ('F3-K/P')
   ELSE
      HIGHVIDIO ('F3-K/P');
   IF DBUFF.SAVEPTR THEN
      LOWVIDIO ('F4-DSK')
   ELSE
      HIGHVIDIO ('F4-DSK');
```

```
IF DBUFF.EYDN THEN
   LOWVIDIO ('F5-XDM')
ELSE
   HIGHVIDIO ('F5-XDM');
IF KCTL THEN
   LOWVIDIO ('F6-CTL')
ELSE
   HIGHVIDIO ('F6-CTL');
HIGHVIDIO ('F7-LOG');
HIGHVIDIO ('F8-HELP');
WRITE (ESC,'p','F9-BRK',ESC,'q',' ');
HIGHVIDIO ('F10-CAN');
WRITE (ESC,CHR(121),'1',ESC,'k');
END;
!
!-----------------------------------------------------------
!
!           Clear the 25th line
!
PROCEDURE TURN25OFF;
BEGIN
  WRITE (ESC,'j',ESC,CHR(120),'1',ESC,'Y',CHR(32+24),CHR(32+0));
  WRITE (ESC,'1',ESC,CHR(121),'1',ESC,'k');
END;
!
!-----------------------------------------------------------
!
!           Function Key validation
!
PROCEDURE KEYCTL;

PROCEDURE KEYCTLS;
    BEGIN
    CASE KCHAR OF
      F1: BEGIN                       ! F1 - Turn CRT On/Off
            IF DBUFF.ECRT THEN          !If on then turn off
              DBUFF.ECRT:=FALSE
            ELSE                        !else turn on
              DBUFF.ECRT:=TRUE;
          END;
      F2: BEGIN                       ! F2 - Turn Printer On/off
            IF EKEY THEN
              BEGIN
                WRITE (BELL);
                RETURN;
              END;
            IF DBUFF.EPTR THEN          !If printer already on turn off
              DBUFF.EPTR:=FALSE
            ELSE
              BEGIN
                DBUFF.EPTR:=TRUE;       !Turn printer on
                PNO:=MNO;               !Setup where printing is to be
                PPOS:=MPOS;             !started
              END;
            RETURN;
          END;
      F3: BEGIN                       ! F3 - ECHOING OF KEYBOARD DATA ON PRINTER
            IF EKEY THEN                !If printer already on turn off
              BEGIN
```

```
          EKEY:=FALSE;
          DBUFF.EPTR:=FALSE;
        END
      ELSE
        BEGIN
          DBUFF.EPTR:=TRUE;      !Turn printer on
          EKEY:=TRUE;
          PNO:=%NO;              !Setup where printing is to be
          PPOS:=%POS;            !started
        END;
      RETURN;
    END;
F4: BEGIN                        ! F4 - Turn OUTPUT TO DISK ON/OFF
      IF DBUFF.SAVEPTR THEN      !If DISK OUTPUT already on turn off
        DBUFF.SAVEPTR:=FALSE
      ELSE
        BEGIN
          DISKOUT:='Y';
          DBUFF.SAVEPTR:=TRUE;   !Turn DISK on
          DNO:=%NO;              !Setup where DISK WRITE is to be
          DPOS:=%POS;            !started
        END;
      RETURN;
    END;
F5: BEGIN                        ! F5 - Turn echoing mdm output On/Off
      IF DBUFF.EMDM THEN
        DBUFF.EMDM:=FALSE
      ELSE
        DBUFF.EMDM:=TRUE;
      RETURN;
    END;
F6: BEGIN                        ! F6 - Allow CRT Control Chars to be Trans
      IF KCTL THEN
        KCTL:=FALSE
      ELSE
        KCTL:=TRUE;
      RETURN;
    END;
F7: BEGIN          ! F7 - FORCE MODEM OFFLINE
      EXIT (120);
      RETURN
    END;
F8: BEGIN          ! F8 - HELP MENU
      WRITELN; WRITELN;
      WRITELN ('          HELP MENU');
      WRITELN;
      WRITELN ('    F1    Turn CRT Display On/Off');
      WRITELN ('    F2    Turn Printer On/Off');
      WRITELN ('    F3    Turn Echoing of Keyed Data on Printer On/Off');
      WRITELN ('    F4    Turn Writing of Data to Disk On/Off');
      WRITELN ('    F5    Turn Echoing of Mdm Output Data On/Off');
      WRITELN ('    F6    Turn CRT Back Space Char On/Off');
      WRITELN ('    F7    Send Logoff Msg & Force Modem Off Line');
      WRITELN ('    F8    HELP Menu');
      WRITELN ('    F9    Break Key');
      WRITELN ('    F10   Cancel Current Process or Session');
      RETURN;
```

```
            END;
   F9:  BEGIN                           ! F9 - Break key
           MDMBREAK (MWRS);
        END;
     OTHERWISE WRITE (BELL);            !Invalid Function key ring bell
     RETURN;
     END;
  END;

BEGIN
   KEYCTLS;
   TURN25ON;
END;
!
!------------------------------------------------------------
!
!                   Keyboard Routine
!
PROCEDURE KEYBOARD;
VAR
   KCHAR:BYTE;
BEGIN
   KCHAR:=KEY;                          !Read keyboard
   IF KCHAR = 0 THEN RETURN;            !If no char entered return to caller
   IF KCHAR > 126 THEN                  !If Function Key then go process
     BEGIN                              !& return to caller
        KEYCTL (KCHAR);
        RETURN;
     END;
   IF KCHAR = CR13 THEN                 !If carriage return
     BEGIN
        KLEN:=0;                        !Intialize no of chars Entered
        MDMSND (KCHAR);                 !Send char
        IF DBUFF.ECRT THEN              !If Crt ouput requested then
           WRITE (CR);
        RETURN;                         !Return to caller
     END;
   IF (KCHAR = BKSP8)                   !If Backspace and request to send
   AND (NOT KCTL) THEN                  !control chars off then
     BEGIN
        IF KLEN < 1 THEN                !If no chars entered then
           WRITE (BELL)                 !ring bell
        ELSE                            !else
           BEGIN
              KLEN:=KLEN-1;             !decrement no chars entered
              IF DBUFF.ECRT THEN        !If CRT output requested then
                 WRITE (BS,' ',BS);     !delete char from screen
              MDMSND (DBUFF.HBKSP);     !send host system delete char
           END;
        RETURN;                         !Return to caller
     END;
   KLEN:=KLEN+1;                        !Valid ASCII Chars inrement no chars
   IF DBUFF.ECRT THEN                   !If Crt ouput requested then
     BEGIN
        IF KCHAR > 31 THEN              !If valid char display it
           WRITE (CHR(KCHAR))
        ELSE
```

```
      BEGIN                              !Control char display ASCII Char
        WRITE (ESC,'2',CHR(KCHAR+64));   !underlined
        WRITE (ESC,'1');
      END;
    END;
  MDMSND (KCHAR);                        !Transmit keyed char
END;
!----------------------------------------------------------------
!
!              Program Exit Routine
!
PROCEDURE EXIT;
VAR
  ECHAR:BYTE;
  ERSB:LSTRING(10);
  OSTATS,ORECNT:LSTRING(10);
  NDS:INTEGER;
BEGIN
  STATS:=ESTAT;                          !Setup Status Return
  IF CARRIER THEN                        !If carrier then Send Log msg
    BEGIN                                !reset mdm read count and wait until
      MDMSEND (LOGMSG);                  !carrier dropped
      NOTIMES:=0;
      WHILE (NOTIMES ( 10000)
      AND (CARRIER) DO
        ECHAR:=MDMREAD;
    END;
  MDMOFF;                                !Force Modem offline
  TURN25OFF;                             !Turn line 25 off
  IF DBUFF.DIAG
  OR DBUFF.SAVEPTR THEN                  !If disk output write whats left in
    BEGIN                                !buffer to disk
      FOR NDS:=1 TO 128 DO               !Basic requires 128 char blocks so
        PUTBUFF (26,MNO,MPOS);           !force write so last data is in a
                                         !valid data block
      DISKWRITE;                         !buffer to disk
    END;
  IF DBUFF.EPTR THEN                     !If printer output requested then
    PRINTBUFF;                           !print whats left in buffer
  IF (ESTAT = 100)                       !If normal completion and printer
  AND (PERROR) THEN                      !offline error occured
    STATS:=110;                          !reset status to show it
  CLOSE (COMDSKW);                       !Close Output Dataset
  IF COMDSKW.ERRS () 0 THEN              !If I/O error then set error to reflect
    STATS:=COMDSKW.ERRS + 65;            !it
  DISCARD (COMLOG);                      !Delete data set
  IF COMLOG.ERRS () 0 THEN               !If I/O error then set error to reflect
    STATS:=COMLOG.ERRS + 50;             !it
  IF BERROR THEN STATS:=45;              !If buffer error then reset error
  IF NOT ENCODE (OSTATS,STATS) THEN;     !Convert return status to char
  IF NOT ENCODE (ORECNT,RECNT) THEN;     !Convert record count to char
  NDS:=SCANNE (OSTATS.LEN,' ',OSTATS,1); !Delete leading blanks
  IF NDS ) 0 THEN
    DELETE (OSTATS,1,NDS);
  NDS:=SCANNE (ORECNT.LEN,' ',ORECNT,1); !Delete leading blanks
  IF NDS ) 0 THEN
```

```
    DELETE (DRECNT,1,NOS);
    ASSIGN (COMRET,'COMRET.$$$');        !Set dataset name
    COMRET.TRAP:=TRUE;                   !Set error trapping on
    REWRITE (COMRET);                    !Create dataset
    IF COMRET.ERRS = 0 THEN              !If no I/O error then write data
      BEGIN                              !to disk
        WRITELN (COMRET,DSTATS,',',DRECNT,',"',DISKOUT,'"');
        IF COMRET.ERRS = 0 THEN          !If no I/O error then write
          BEGIN                          !pad out record so at least one 128
            FOR NOS:=1 TO 128 DO         !char block is written to disk
              WRITE (COMRET,CHR(26));    !basic requirement
            CLOSE (COMRET);              !Close disk
          END;
      END;
    IF COMRET.ERRS () 0 THEN
      ABENDIT (COMRET.ERRS+80);
    ENDX20;                              !halt
END;
!
!------------------------------------------------------------
!
!                     Dumb Terminal Routine
!
PROCEDURE TERMINAL;
VAR
  MRDCHAR:BYTE;
BEGIN
  REPEAT                                 !Process routine until carrier lost
    KEYBOARD;
    NOTIMES:=0;
    MRDCHAR:=MDMREAD;
  UNTIL NOT CARRIER;
  EXIT (128);
END;
!
!------------------------------------------------------------
!
!                     PROGRAM XMAINLINE
!
BEGIN
  CLEARCRT;
  AUTOLOG;                               !Logon
  IF DBUFF.BAMTRAC THEN                  !If Bamtrac File retrieveal then
    BAMTRAC;                             !process
  IF CAN THEN                            !Responses then process
    CANNED;
  TERMINAL;                              !TERMINAL
END.

C)type D:COMIOMDM.ASM
MBUFF0 SEGMENT
       DB       0FFFFH DUP(?)
MBUFF0 ENDS

XBUFF1 SEGMENT
       DB       0FFFFH DUP(?)
MBUFF1 ENDS
```

```
MBUFF2  SEGMENT
        DB      0FFFFH DUP(?)
MBUFF2  ENDS

MDM     SEGMENT PUBLIC 'CODE'
        ASSUME  CS:MDM
        PUBLIC  PUTBUFF
        PUBLIC  GETBUFF
        PUBLIC  SWAPEM
        PUBLIC  MDMINIT
        PUBLIC  CARRIER
        PUBLIC  PTRREADY
        PUBLIC  PRINTER
        PUBLIC  MDMSTAT
        PUBLIC  KEY
        PUBLIC  MDXBREAK
        PUBLIC  MDXGET
        PUBLIC  MDXPUT
        PUBLIC  MDXOFF
MCLK    EQU     DS:20H
MDATA   EQU     DS:40H
MSTAT   EQU     DS:42H
MCTL    EQU     DS:23H
PSTAT   EQU     DS:8020H
;
;       THIS ROUTINE TAKES IN CHAR FORMAT AND RETURNS BYTE
;       function SWAPEM (SCHAR:char):byte;
;
SWAPEM  PROC    FAR
        PUSH    BP
        MOV     BP,SP           ;GET CURRENT STACK POSN IN BP
        MOV     AX,0
        MOV     AL,6[BP]
        POP     BP
        RET     2
SWAPEM  ENDP
;
;       SETUP ROUTINE FOR BUFFER ROUTINES
;
BUFFSET PROC    FAR
        MOV     DX,MBUFF2       ;GET BUFFER 2
        CMP     AH,2            ;TEST IF FILLING BUFFER 2
        JE      BUFFSET1        ;SETUP DS
        MOV     DX,MBUFF1       ;GET BUFFER 1
        CMP     AH,1            ;TEST IF FILLING BUFFER 1
        JE      BUFFSET1        ;SETUP DS
        MOV     DX,MBUFF0       ;GET BUFFER 0
BUFFSET1:
        RET
BUFFSET ENDP
;
;       THIS ROUTINE TAKES CHARACTER AND PUTS IT INTO BUFFER
;       PROCEDURE PUTBUFF (PCHAR,PNO:BYTE; VAR PPOS:WORD);
;
PUTBUFF PROC    FAR
        PUSH    BP
```

```
        MOV     BP,SP               ;GET CURRENT STACK POSN IN BP
        MOV     BX,6[BP]            ;GET PPOS POINTER
        MOV     DI,[BX]             ;GET COUNTER
        MOV     AH,8[BP]            ;GET BUFFER INDEX
        MOV     AL,10[BP]           ;GET CHARACTER
        CALL    BUFFSET             ;SETUP DS WITH PROPER BUFFER AREA
        PUSH    DS
        MOV     DS,DX               ;SETUP DS
        STOSB
        POP     DS
        MOV     [BX],DI             ;RETURN UPDATED POINTER
        POP     BP
        RET     6                   ;RETURN AND CLEAN UP STACK
PUTBUFF ENDP
;
;
;       THIS ROUTINE RETURNS CHARACTER FROM THE BUFFER
;       FUNCTION GETBUFF (PNO:BYTE; VAR PPOS:WORD);
;
GETBUFF PROC    FAR
        PUSH    BP
        MOV     BP,SP               ;GET CURRENT STACK POSN IN BP
        MOV     BX,6[BP]            ;GET PPOS POINTER
        MOV     SI,[BX]             ;GET COUNTER
        MOV     AH,8[BP]            ;GET BUFFER INDEX
        CALL    BUFFSET             ;SETUP DS WITH PROPER BUFFER AREA
        PUSH    DS
        LODSB
        POP     DS
        MOV     AH,0                ;CHAR RETURNED IN AL
        MOV     [BX],SI             ;RETURN UPDATED POINTER
        POP     BP
        RET     4                   ;RETURN AND CLEAN UP STACK
GETBUFF ENDP
;
;
;       THIS ROUTINE RETURNS TRUE IF PRINTER READY FOR OUTPUT
;
PTRREADY PROC   FAR
        PUSH    DS
        MOV     DX,0E000H           ;SET DS
        MOV     DS,DX
        MOV     DL,PSTAT
        POP     DS
        AND     DL,0A0H             ;SEE IF PRINTER READY
        MOV     AX,0
        CMP     DL,80H
        JNE     PEND9
        MOV     AL,1
PEND9:
        RET
PTRREADY ENDP
;
;       THIS ROUTINE HANDLES THE COMIO PRINTER OUTPUT
;       FUNCTION PRINTER (PNO:BYTE,VAR PPOS:WORD):BOOLEAN
;
```

```
PRINTER PROC     FAR
        PUSH     BP
        MOV      BP,SP              ;SET CURRENT STACK POSN IN BP
        PUSH     DS
        MOV      DX,0E000H          ;SET DS
        MOV      DS,DX
        MOV      DL,PSTAT
        POP      DS
        AND      DL,2A0H            ;SEE IF PRINTER READY
        MOV      AX,0
        CMP      DL,80H
        JNE      PEND8
        MOV      BX,6[BP]           ;GET PPOS POINTER
        MOV      SI,[BX]            ;GET COUNTER
        MOV      AH,8[BP]           ;GET BUFFER INDEX
        CALL     BUFFSET            ;SETUP DS WITH PROPER BUFFER AREA
        PUSH     DS
        LODSB
        POP      DS
        MOV      AH,0               ;CHAR RETURNED IN AL
        MOV      [BX],SI            ;RETURN UPDATED POINTER
        MOV      DL,AL
        CMP      DL,13              ;SEE IF CARRAGE RETURN
        JE       PEND7              ;IF IT IS DON'T PRINT IT MESSES UP TIMMINGS
        MOV      AH,5               ;SET UP AS PRINTER OUTPUT
        INT      21H                ;ISSUE INTERRUPT FOR OUTPUT
PEND7:
        MOV      AX,1
PEND8:
        POP      BP
        RET      4                  ;RETURN AND CLEAN UP STACK
PRINTER ENDP
;
;       THIS ROUTINE HANDLES THE KEYBOARD INPUT
;       function KEY:char;
;
KEY     PROC     FAR
        MOV      DL,255
        MOV      AH,6               ;SET UP AS PRINTER OUTPUT
        INT      21H                ;ISSUE INTERUPT FOR OUTPUT
        MOV      AH,0
        RET                         ;RETURN AND CLEAN UP STACK
KEY     ENDP
;
;       THIS ROUTINE RETURNS MODEM STATUS
;           CALL MDMGETS
;
MDMGETS PROC     FAR
        PUSH     DS
        MOV      AX,0E000H          ;SET DS
        MOV      DS,AX
        MOV      DL,MSTAT
        POP      DS
        RET                         ;RETURN AND CLEAN UP STACK
MDMGETS ENDP
;
```

```
;                    WRITES MDM STATUS REGISTER
;                    DL = OUTPUT CHAR
;          CALL      MDMPUTS
;
;
MDMPUTS  PROC        FAR
         PUSH        DS
         MOV         AX,0E000H         ;SET DS
         MOV         DS,AX
         MOV         BYTE PTR MSTAT,DL ;RESET CHANNEL
         POP         DS
         RET
MDMPUTS  ENDP
;
;
;        THIS ROUTINE HANDLES MDM INITIALIZATION
;        function MDMINIT (MCLK,MCLK1,MWR3,MWR4,MWR5:char):integer;
;
MDMINIT  PROC        FAR
         PUSH        BP
         MOV         BP,SP             ;GET CURRENT STACK POSN IN BP
         MOV         DL,18H
         CALL        MDMPUTS
         MOV         AX,07FFFH
MDMINIT1:
         DEC         AX
         JNZ         MDMINIT1
;
         MOV         DL,14[BP]         ;GET CLOCK SETTINGS
         MOV         DH,12[BP]         ;GET CLOCK SETTING
         PUSH        DS
         MOV         AX,0E000H         ;SET DS
         MOV         DS,AX
         MOV         BYTE PTR MCTL,036H ;SET CLOCK CONTROL REQUEST
         MOV         BYTE PTR MCLK,DL
         MOV         BYTE PTR MCLK,DH
         POP         DS
;
         MOV         DL,2              ;SELECT WR2
         CALL        MDMPUTS
         MOV         DL,14H            ;SET WR2
         CALL        MDMPUTS
;
         MOV         DL,04H            ;SELECT WR4
         CALL        MDMPUTS
         MOV         DL,8[BP]          ;GET WR4
         CALL        MDMPUTS
;
         MOV         DL,3              ;SELECT WR3
         CALL        MDMPUTS
         MOV         DL,10[BP]         ;GET WR3
         CALL        MDMPUTS
;
         MOV         DL,5              ;SELECT WR5
         CALL        MDMPUTS
         MOV         DL,06[BP]         ;GET WR5
         CALL        MDMPUTS
;
```

```
        MOV     DL,1H           ;SELECT WR1
        CALL    MDMPUTS
        MOV     DL,0            ;PUT IT IN DL
        CALL    MDMPUTS
;
        MOV     AX,07FFFH
MDMINIT2:
        DEC     AX
        JNZ     MDMINIT2
        CALL    MDMGETS
        MOV     AL,DL
        MOV     AH,0
        POP     BP
        RET     10              ;RETURN AND CLEAN UP STACK
MDMINIT ENDP
;
;       THIS ROUTINE RETURNS MODEM STATUS
;       FUNCTION MDMSTAT:byte;
;
MDMSTAT PROC    FAR
        MOV     DL,10H          ;GET FOR MODEM STATUS RESET
        CALL    MDMPUTS
        CALL    MDMGETS         ;GET MODEM STATUS
        MOV     AL,DL           ;RETURN STATUS
        MOV     AH,0
        RET                     ;RETURN AND CLEAN UP STACK
MDMSTAT ENDP
;
;       THIS ROUTINE RETURNS CARRIER STATUS
;       function CARRIER:boolean;
;
CARRIER PROC    FAR
        MOV     DL,10H          ;GET FOR MODEM STATUS RESET
        CALL    MDMPUTS
        CALL    MDMGETS         ;GET MODEM STATUS
        MOV     AL,DL
        AND     AL,8H           ;TEST FOR CARRIER
        JZ      CEND            ;NO RETURN ZERO
        MOV     AL,1            ;YES RETURN 1 FOR TRUE
CEND:
        MOV     AH,0
        RET                     ;RETURN AND CLEAN UP STACK
CARRIER ENDP
;
;       THIS ROUTINE READS MODEM
;       function MDMGET:CHAR;
;
MDMGET  PROC    FAR
        CALL    MDMGETS
        AND     DL,01H          ;SEE IF CHARACTER READY
        MOV     AX,0
        JZ      MGET9
        PUSH    DS
        MOV     AX,0E000H
        MOV     DS,AX
        MOV     AL,MDATA
        POP     DS
```

```
        AND     AL,07FH
        CMP     AL,127              ;TEST IF SYNC CHAR
        JE      MGETS               ;YES EXIT
        CMP     AL,13               ;TEST IF CARRIAGE RETURN
        JE      MGETS               ;YES
        CMP     AL,10               ;TEST IF LINE FEED
        JE      MGETS               ;YES
        CMP     AL,8                ;TEST IF back space
        JE      MGETS               ;YES
        CMP     AL,3                ;TEST IF ETX CHAR
        JE      MGETS
        CMP     AL,31               ;TEST IF ASCII CHAR
        JG      MGETS               ;YES VALID EXIT
MGET3:
        MOV     AL,07FH
MGET5:
        MOV     AH,0
MGET9:
        RET                         ;RETURN AND CLEAN UP STACK
MDMGET  ENDP
;
;       THIS ROUTINE WRITES DATA TO MODEM
;          procedure MDMPUT (mchar:CHAR);
;
MDMPUT  PROC    FAR
        PUSH    BP
        MOV     BP,SP               ;GET CURRENT STACK POSN IN BP
        MOV     SI,10000
MDMPUT2:
        CALL    MDMGETS             ;GET STATUS
        AND     DL,04H              ;SEE IF MDM READY TO OUTPUT CHARACTER
        JNZ     MDMPUT4             ;YES
        DEC     SI                  ;NO LOOP WAIT FOR READY
        JNZ     MDMPUT2
MDMPUT4:
        PUSH    DS
        MOV     AX,0E000H           ;SET DS
        MOV     DS,AX
        MOV     AL,6[BP]
        MOV     BYTE PTR MDATA,AL   ;GET CHAR TO BE OUTPUTED
        POP     DS
        POP     BP
        RET     2                   ;RETURN AND CLEAN UP STACK
MDMPUT  ENDP
;
;       THIS ROUTINE WRITES BREAK CHARACTER TO MODEM
;          Procedure MDMBREAK (MWR5:byte)
;
MDMBREAK PROC   FAR
        PUSH    BP
        MOV     BP,SP               ;GET CURRENT STACK POSN IN BP
        MOV     DL,5                ;SELECT WR5
        CALL    MDMPUTS             ;OUTPUT REQUEST
        MOV     SI,2500H
        MOV     DL,6[BP]            ;GET WR5 ADDRESS
        OR      DL,010H
        CALL    MDMPUTS             ;OUTPUT RESET CHAR
```

```
MDMBRK1:
        DEC     SI
        JNZ     MDMBRK1
        MOV     DL,5            ;SELECT WR5
        CALL    MDMPUTS         ;OUTPUT REQUEST
        MOV     DL,6[BP]        ;SET WR5 ADDRESS
        CALL    MDMPUTS         ;OUTPUT RESET CHAR
        POP     BP
        RET     2               ;RETURN AND CLEAN UP STACK
MDMBREAK ENDP
;
;       PROCEDURE MDMOFF;
;       FORCES MODEM OFF LINE
MDMOFF  PROC    FAR
        MOV     DL,5
        CALL    MDMPUTS
        MOV     DL,0
        CALL    MDMPUTS
        RET
MDMOFF  ENDP
MDM     ENDS
        END
```

```
D)type D:COMUCALL.BAS
REM ***** COMUCALL.BAS (Business BASIC (1.00))
REM     05/20/83
REM     1220
REM
REM THIS PROGRAM PROVIDES THE FACILITY TO PLACE CALLS AND
REM AS A RESULT UPDATES THE DIAL LIST. IT THEN EITHER CONTINUES
REM CALLING OR ALLOWS ADDITIONAL USER SELECTION.
REM
REM ORIGINALLY PROGRAMMED BY TOM TRELFORD 08/28/82
REM TRANSLATED FROM DEC0 BY TERESA JANE LORD
REM--------------------------------------------------------(CHANGE LOG)
REM VERSION DATE    CHANGE
REM     1.0     08/28/82 INITIAL VERSION
REM     1.1     09/01/82 No Error Found to "R" from "T"
REM                      Added Wait before checking clock
REM                      Added Message for Unattended Interruption
REM                      Changed Terminal Emulation Call Description
REM                      Changed unattended call to wait for clock
REM     1.2     09/07/82 Changed error message wording
REM                      Turn-off SAVEPTR$ if DIAG$ = 'Y'
REM     1.3     09/10/82 Set reschedule date to current date
REM                      EFLAG$="T" = Bypass reschedule and re-call
REM     1.4     09/17/82 Added delete or prior DIAG entries in COMFILES
REM                      Non "2" in translate terminates normally
REM                      Translate check for 'B ' (balance) only
REM     1.5     09/25/82 Added TEST output to printer
REM     1.6     09/27/82 Added update of ODS%% in COMMO.SETUP.DIAL.TWO
REM     1.7     10/04/82 Added GET.PRIOR.NEXT in SETUP.NO.CLOCK
REM     1.8     10/05/82 Revised SETUP.CD.NORMAL.FORMAT for date prefix.
REM                      Reschedule call from 10 to 20 minutes.
REM     1.9     10/19/82 Current date on BAMTRAC files
REM     1.10    10/26/82 Added (E) and (F) to date format
```

```
REM    1.11  11/10/82  Added mod to pick up (A) and (C) date format
REM                    YY caused by 1.10 code change
REM    1.12  11/12/82  Revised TERMINAL.RESPONSE to be an input line
REM                    to handle commas in telephone number
REM    1.13  02/10/83  Return to COMUMENU added
REM                    Added chain to UTLUDATE to update dates
REM                    Limited CLOCK access to unattended & start/stop
REM                    Added CnnERDR file update when error occurs
REM                    Added use of DATERTRN for translation return
REM    2.0   02/18/83  Translated from CB80
REM    2.1   02/22/83  Added CONTRBL.$$$ for updating trouble log.
REM    2.2.  03/02/83  Substituted hardware clock for chronograph.
REM                    COMMD.FILE.FINISH mods.
REM                    Added COMHISTD.$$$ for updating history log.
REM    2.3   03/03/83  Restructured to drop thru at end rather than chain
REM                    to COMUMENU; by Steve Hemphill
REM    2.4   03/09/83  Prompts changed to leave space before response; by
REM                    Steve Hemphill
REM    2.5   03/15/83  TERMINAL.SETUP.LOGMSG ENDCHAR$ default to blank; by
REM                    Teresa Jane Lord.
REM    2.6   03/17/83  KEYIN% & CONSTAT changed to KEYIN$ & INKEY$ when
REM                    checking to break out of unattended mode; by Steve
REM                    Hemphill
REM    2.7   04/26/83  Display of Version number added; changed rescheduling
REM                    algorithm to not reschedule 999999 calls; by Steve
REM                    Hemphill
REM          05/20/83  1) Added code to purge all pretyped characters from
REM                       console stack at start of program in case anything
REM                       left in stack from last placed call.
REM                    2) Placed VICTOR 9000 dependent screen commands at
REM                       top of this file for easy reference.
REM                    3) Miscellaneous cleanup of wording, consistency in
REM                       wording, capitalization.
REM                    All changes by Andrew Schwartz
REM    2.8   07/11/83  Clean up display message in unattended calling;
REM                    by Judy Ku
REM-----------------------------------------------------------(START OF PROGRAM)
START:
    REM-----------------------------------------------------------
    REM  VICTOR 9000 SCREEN COMMAND STRINGS
    REM-----------------------------------------------------------
    ESC$                  = CHR$(27)       REM ESCAPE STRING
    REM-----------------------------------------------------------
    REM  SCREEN COMMANDS TO TURN CURSOR ON AND OFF SO IT IS EITHER SEEN OR
    REM  NOT.
    REM-----------------------------------------------------------
    CURSOR.OFF.COMMAND$   = ESC$+"x5"
    CURSOR.ON.COMMAND$    = ESC$+"y5"
    REM-----------------------------------------------------------
    REM  SCREEN COMMAND WHICH ERASE ENTIRE LINE AT THE CURSOR
    ERASE.LINE.COMMAND$   = ESC$+"l"
    REM-----------------------------------------------------------
    REM ESCx1 ==> enable use of line 25 on screen, ESCy1 ==> disable use
    REM Must enable line 25 before one can cursor address within it
    REM Must cursor address out of line 25 before one can disable it.
    REM-----------------------------------------------------------
```

```
ENABLE.LINE.25$       = ESC$+"x1"
DISABLE.LINE.25$      = ESC$+"y1"
REM----------------------------------------------------------------
REM ESC-Y ==)cursor address to line,column specified.  Line 1 = x'20'
REM----------------------------------------------------------------
CURSOR.ADDRESS.PREFIX$ = ESC$+"Y"
REM----------------------------------------------------------------
REM ESCj ==) save cursor position; ESCk ==) restore cursor position
REM----------------------------------------------------------------
SAVE.CURSOR.COMMAND$    = ESC$ + "j"
RESTORE.CURSOR.COMMAND$ = ESC$ + "k"

CONSOLE:
    LET VERSION$="Call Processor - Version 2.8"
    LET CFILE1$="COMDIAL.DAT"
    LET CFILE2$="COMDIALW.$$$"
    LET CFILE3$="COMDSKW.$$$"
    LET CFILE4$="COMTRBL.DAT"
    LET CFILE5$="COMHISTD.DAT"
    LET CFILE6$="COMLOG.DAT"
    LET CFILE7$="COMERROR.DAT"
    LET CFILE10$="UTLDATES.DAT"
    LET CFILE11$="COMFILES.DAT"
    LET CFILE12$="COMFILES.$$$"
    LET CFILE13$="COMTRBL.$$$"
    LET CFILE14$="COMHISTD.$$$"
    LET CFILELEN%=200
    LET CLOCK$="NO"
    LET CTLFILE1$="CONTROL.DAT"
    LET CTLLENGTH%=100
    LET CTLMAX%=100
    LET CURRYMD$="000000"
    LET DATERTRN$="NO"
    LET ENTRYLMT%=50
    LET ENTRYMAX=35
    LET NEXTYMD$="000000"
    LET POSTDATE$="000000"
    LET RETURNPGM$="COMLCALL.EXE"
    LET RTRNFUNC$=" "
    LET SCRN01$="DIAL LIST"
    LET TEST$="NO"
SETUP.MATRIX:
    REDIM DISPLAY$(ENTRYLMT%)
    REDIM UDAY$(ENTRYLMT%)
    REDIM UHOUR$(ENTRYLMT%)
    REDIM UCALL%(ENTRYLMT%)
    REDIM USTATUS$(ENTRYLMT%)
    GOTO CONTROLFILE.OPEN
REM---------------------------------------------(SUBROUTINE = GET TIME OF DAY)
GO.GET.TIME:
REM USE HARDWARE CLOCK
REM TIME$ FUNCTION RETURNS HH:MM:SS.SS
    CURRTIME$=TIME$
REM CONVERT TO HHMMSS
    CURRTIME$=LEFT$(CURRTIME$,2)+MID$(CURRTIME$,4,2)+MID$(CURRTIME$,7,2)
    RETURN
```

```
REM--------------------------------------------------------(SUBROUTINE = GET CURRENT DATE)
GO.GET.DATE:
REM USE HARDWARE CLOCK
REM DATE$ FUNCTION RETURNS MM-DD-YYYY
        WORKDATE$=DATE$
REM CONVERT TO YYMMDD
        WORKDATE$=RIGHT$(WORKDATE$,2)+LEFT$(WORKDATE$,2)+MID$(WORKDATE$,4,2)
        RETURN
REM--------------------------------------------------------(SUBROUTINE = SCREEN HEADING)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        RETURN
REM--------------------------------------------------------(SUBROUTINE = READ CONTROL FILE)
READ.CONTROLFILE.RECORD:
        ON END (4) GOTO READ.CONTROLFILE.ERROR
        READ #4,WORK%;NAME$,VALUEONE$,VALUETWO$
        LET STAT$="OK"
        RETURN
READ.CONTROLFILE.ERROR:
        LET STAT$="END"
        RETURN
REM--------------------------------------------------------(SUBROUTINE = WRITE CONTROL FILE)
WRITE.CONTROLFILE.RECORD:
        ON END (4) GOTO WRITE.CONTROLFILE.ERROR
        WRITE #4,WORK%;NAME$,VALUEONE$,VALUETWO$
        LET STAT$="OK"
        RETURN
WRITE.CONTROLFILE.ERROR:
        LET STAT$="END"
        RETURN
REM--------------------------------------------------------(SUBROUTINE = READ DIAL LIST)
READ.CALLFILE.RECORD:
        ON END (1) GOTO READ.CALLFILE.ERROR
        GET #1,REC%
        INPUT #1,CALLNBR%,DESCRIP$,CDATE$,CTIME$,RTIME$,DSK%,DSKMETH$
        INPUT #1,ECRT$,EPTR$,DIAG$,SAVEPTR$,FDX$,EXOM$,HBKSP$,EOF$,LOGMSG$
        INPUT #1,ENDCHR$,PARITY%,STATUS%,RECNT%,STIME$,ETIME$,LDATE$,RPGRM$
        INPUT #1,SPGRM$
        LET STAT$="OK"
        RETURN
READ.CALLFILE.ERROR:
        LET STAT$="END"
        RETURN
REM--------------------------------------------------------(SUBROUTINE = WRITE DIAL LIST)
WRITE.CALLFILE.RECORD:
        ON END (1) GOTO WRITE.CALLFILE.ERROR
        WRITE #1,REC%;CALLNBR%,DESCRIP$,CDATE$,CTIME$,RTIME$,DSK%,DSKMETH$,_
```

```
                    ECRT$,EPTR$,DIAG$,SAVEPTR$,FDX$,EMD%$,HSKSP$,EOF$,LOGMSG$,_
                    ENDCHR$,PARITY%,STATUS%,RECNT%,STIME$,ETIME$,LDATE$,RPGRM$,_
                    SPGRM$
            LET STAT$="OK"
            RETURN
WRITE.CPLLFILE.ERROR:
            LET STAT$="END"
            RETURN
REM----------------------------------------------------------(SUBROUTINE = VALIDATE DATE)
VALIDATE.DATE:
            LET STAT$="OK"
            LET MSG$=" "
            IF LEN(WORK$)=6 THEN GOTO VALIDATE.DATE.MONTH
                    LET MSG$="MUST HAVE 6 DIGITS. RE-ENTER."
                    GOTO VALIDATE.DATE.ERROR
VALIDATE.DATE.MONTH:
            LET ANSWER$=LEFT$(WORK$,2)
            LET ANSWER2$=MID$(WORK$,3,2)
            LET ANSWER3$=RIGHT$(WORK$,2)
            IF ANSWER$>"00" AND ANSWER$<"13" THEN GOTO VALIDATE.DATE.DAY
                    LET MSG$="MONTH MUST BE 01 THRU 12"
                    GOTO VALIDATE.DATE.ERROR
VALIDATE.DATE.DAY:
            IF ANSWER2$>"00" AND ANSWER2$<"29" THEN GOTO VALIDATE.DATE.YEAR
            IF ANSWER2$="29" AND ANSWER$<>"02" THEN GOTO VALIDATE.DATE.YEAR
            IF ANSWER2$<"32" AND ANSWER$="01" THEN GOTO VALIDATE.DATE.YEAR
            IF ANSWER2$<"32" AND ANSWER$="03" THEN GOTO VALIDATE.DATE.YEAR
            IF ANSWER2$<"31" AND ANSWER$="04" THEN GOTO VALIDATE.DATE.YEAR
            IF ANSWER2$<"32" AND ANSWER$="05" THEN GOTO VALIDATE.DATE.YEAR
            IF ANSWER2$<"31" AND ANSWER$="06" THEN GOTO VALIDATE.DATE.YEAR
            IF ANSWER2$<"32" AND ANSWER$="07" THEN GOTO VALIDATE.DATE.YEAR
            IF ANSWER2$<"32" AND ANSWER$="08" THEN GOTO VALIDATE.DATE.YEAR
            IF ANSWER2$<"31" AND ANSWER$="09" THEN GOTO VALIDATE.DATE.YEAR
            IF ANSWER2$<"32" AND ANSWER$="10" THEN GOTO VALIDATE.DATE.YEAR
            IF ANSWER2$<"31" AND ANSWER$="11" THEN GOTO VALIDATE.DATE.YEAR
            IF ANSWER2$<"32" AND ANSWER$="12" THEN GOTO VALIDATE.DATE.YEAR
                    LET MSG$="DAY VALUE MUST BE VALID FOR MONTH. RE-ENTER."
                    GOTO VALIDATE.DATE.ERROR
VALIDATE.DATE.YEAR:
            IF ANSWER3$>"81" AND ANSWER3$(="99" THEN RETURN
                    LET MSG$="INVALID YEAR, MUST BE 82 THRU 99. RE-ENTER."
VALIDATE.DATE.ERROR:
            LET STAT$="BAD"
            RETURN
REM----------------------------------------------------------(SUBROUTINE = VALIDATE TIME)
VALIDATE.TIME:
            LET STAT$="OK"
            LET MSG$=" "
            IF LEN(WORK$)=4 THEN WORK$=WORK$+"00"
            IF LEN(WORK$)=6 THEN GOTO VALIDATE.TIME.HOUR
                    LET MSG$="MUST HAVE 6 DIGITS. RE-ENTER."
                    GOTO VALIDATE.TIME.ERROR
VALIDATE.TIME.HOUR:
            IF WORK$="002000" THEN RETURN
            LET ANSWER$=LEFT$(WORK$,2)
            LET ANSWER2$=MID$(WORK$,3,2)
            LET ANSWER3$=RIGHT$(WORK$,2)
```

```
        IF ANSWER$="00" AND ANSWER2$()"00" THEN GOTO VALIDATE.TIME.MIN
        IF ANSWER$="24" AND ANSWER2$="00" AND ANSWER3$="00" THEN RETURN
        IF ANSWER$)"00" AND ANSWER$("24" THEN GOTO VALIDATE.TIME.MIN
              LET MSG$="HOUR MUST BE 00 THRU 24. RE-ENTER."
              GOTO VALIDATE.TIME.ERROR
VALIDATE.TIME.MIN:
        IF ANSWER2$="00" THEN GOTO VALIDATE.TIME.SEC
        IF ANSWER2$)"00" AND ANSWER2$("60" THEN GOTO VALIDATE.TIME.SEC
              LET MSG$="MINUTES MUST BE 00 THRU 59. RE-ENTER."
              GOTO VALIDATE.TIME.ERROR
VALIDATE.TIME.SEC:
        IF ANSWER3$="00" THEN RETURN
        IF ANSWER3$)"00" AND ANSWER3$("60" THEN RETURN
              LET MSG$="SECONDS MUST BE 00 THRU 59. RE-ENTER."
VALIDATE.TIME.ERROR:
        LET STAT$="BAD"
        RETURN
REM--------------------------------------------------------(SUBROUTINE = DATE CONVERSION)
CONVERT.MDY.YMD:
        LET INMO$=LEFT$(DATEIN$,2)
        LET INDA$=MID$(DATEIN$,3,2)
        LET INYR$=RIGHT$(DATEIN$,2)
        LET DATEOUT$=INYR$+INMO$+INDA$
        RETURN
CONVERT.YMD.MDY:
        LET INYR$=LEFT$(DATEIN$,2)
        LET INMO$=MID$(DATEIN$,3,2)
        LET INDA$=RIGHT$(DATEIN$,2)
        LET DATEOUT$=INMO$+INDA$+INYR$
        RETURN
REM--------------------------------------------------------(PROCESS CONTROL FILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",4,CTLFILE1$,CTLLENGTH%
        LET WORK%=1
        GOTO CONTROLFILE.GET.RECORD
CONTROLFILE.NO.FILE:
        FOR LLINE%=1 TO 25
              PRINT
        NEXT LLINE%
        PRINT "NO CONTROL FILE. RETURNING TO MENU"
        PRINT
        PRINT "Press RETURN when you have reviewed this message. ";
        WORK%=CONCHAR
        GOTO RETURN.TO.MENU
CONTROLFILE.GET.RECORD:
        GOSUB READ.CONTROLFILE.RECORD
        IF STAT$="END"      THEN GOTO CONTROLFILE.CLOSE
        IF NAME$="ENDALL"   THEN GOTO CONTROLFILE.CLOSE
        LET IWORK%=FIX(VAL(LEFT$(VALUEONE$,4)))
        IF NAME$="BLANK"   THEN BLANK$=CHR$(IWORK%)
        IF NAME$="CLOCK"   THEN CLOCK$=VALUEONE$
        IF NAME$="CTITLE"  THEN CTITLE$=VALUEONE$
        IF NAME$="CURRDAY" THEN CURRYMD$=VALUEONE$
```

```
        IF NAME$="DATEPOST" THEN POSTDATE$=VALUEONE$
        IF NAME$="DATERTRN" THEN GOTO CONTROLFILE.DATERTRN
        IF NAME$="HEADING"  THEN HEADING$=VALUEONE$
        IF NAME$="NEXTDAY"  THEN NEXTYMD$=VALUEONE$
        IF NAME$="PNEWPAGE" THEN PNEWPAGE$=CHR$(IWORK%)
        IF NAME$="PREVDAY"  THEN LASTYMD$=VALUEONE$
        IF NAME$="PRINTER"  THEN PRINTER$=VALUEONE$
        IF NAME$="SHOME"    THEN SHOME$=CHR$(IWORK%)
        IF NAME$="SCLEAR"   THEN SCLEAR$=CHR$(IWORK%)
        IF NAME$="TEST"     THEN TEST$=VALUEONE$
        IF NAME$="TITLE"    THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.DATERTRN:
        LET DATERTRN$=VALUEONE$
        LET RTRNFUNC$=LEFT$(VALUETWO$,1)
        IF DATERTRN$="NO" THEN GOTO CONTROLFILE.SETUP.NEXT
                LET VALUEONE$="NO"
                LET VALUETWO$=""
                GOSUB WRITE.CONTROLFILE.RECORD
                IF STAT$="END" THEN GOTO CONTROLFILE.CLOSE
        GOTO CONTROLFILE.SETUP.NEXT
CONTROLFILE.CLOSE:
        CLOSE 4
REM------------------------------------------------------(OBTAIN DATES)
SETUP.DATES:
        LET DATEIN$=CURRYMD$
        GOSUB CONVERT.YMD.MDY
        LET CURRDATE$=DATEOUT$
        LET DATEIN$=NEXTYMD$
        GOSUB CONVERT.YMD.MDY
        LET NEXTDATE$=DATEOUT$
        LET DATEIN$=LASTYMD$
        GOSUB CONVERT.YMD.MDY
        LET LASTDATE$=DATEOUT$
REM------------------------------------------------(OPEN DIAL LIST AND WORK FILES)
CALLFILE.OPEN:
        GOSUB SCREEN.HEADING
        IF TEST$()"YES" THEN GOTO CALLFILE.MESSAGE
        PRINT "This processing is being run in TEST mode. Turn on printer."
        PRINT "When the printer is ready press RETURN.";
        WORK%=CONCHAR
        PRINT
        LPRINTER
        PRINT "COMMUNICATIONS CALLING TEST REPORT"-
        PRINT
        CONSOLE
CALLFILE.MESSAGE:
        PRINT "Opening the Dial List and communications processing files."
        FILESIZE=SIZE(CFILE1$)
        IF FILESIZE=0 THEN GOTO CALLFILE.NO.DIAL.LIST
        OPEN "R",1,CFILE1$,CFILELEN%
        GOTO CALLFILE.OPEN.WORK.FILE
```

```
CALLFILE.NO.DIAL.LIST:
        PRINT "NO DIAL LIST HAS BEEN ESTABLISHED."
        PRINT "THIS FUNCTION IS NOT AVAILABLE."
        PRINT
        PRINT "Press RETURN when you have read this message. ";
        WORK%=CONCHAR
        GOTO RETURN.TO.MENU
CALLFILE.OPEN.WORK.FILE:
        ON END (2) GOTO CALLFILE.CREATE.WORK
        OPEN "I",2,CFILE2$
        LET RETURNCODE$="COMMO"
        LET DATERTRN$="NO"
        GOTO COMMO.RETURN
CALLFILE.CREATE.WORK:
        OPEN "O",2,CFILE2$
        LET RETURNCODE$="NORMAL"
        IF DATERTRN$="NO"  THEN GOTO DISPLAY.FUNCTIONS
        IF DATERTRN$="TRAN" THEN GOTO CALLFILE.TRANSLATE.RTRN
        IF DATERTRN$()"YES" THEN GOTO DISPLAY.FUNCTIONS
            LET FUNCTION$="U"
            GOTO AUTO.INITIALIZE.MATRIX
CALLFILE.TRANSLATE.RTRN:
        LET FUNCTION$=RTRNFUNC$
        IF FUNCTION$="U" THEN GOTO AUTO.INITIALIZE.MATRIX
        IF FUNCTION$="M" THEN GOTO SELECTION.START
        IF FUNCTION$="A" THEN GOTO SELECTION.START
        GOTO DISPLAY.FUNCTIONS
REM------------------------------------------------(PURGE CONSOLE OF CHARACTERS)
PURGE.CONSOLE.OF.CHARACTERS:
        A$ = INKEY$
        WHILE A$ () ""
            A$ = INKEY$
        WEND
        RETURN
REM----------------------------------------------------(DISPLAY PROGRAM FUNCTIONS)
DISPLAY.FUNCTIONS:
        GOSUB SCREEN.HEADING
        PRINT "Available functions are:"
        PRINT
        PRINT TAB(15);"(T)erminal Emulation"
        PRINT TAB(15);"(M)anual Call Selection"
        PRINT TAB(15);"(A)utomatic Call Selection"
        PRINT TAB(15);"(U)nattended Automatic Calling"
        PRINT TAB(15);"(Q)uit"
        GOSUB PURGE.CONSOLE.OF.CHARACTERS
DISPLAY.RESPONSE:
        PRINT
        INPUT "What function do you want to perform? ",WORK$
        ANSWER2$=LEFT$(WORK$,1)
        FUNCTION$=UCASE$(ANSWER2$)
        IF FUNCTION$="T" THEN HAVEDIAL$="NO": GOTO TERMINAL.START
        IF FUNCTION$="M" THEN GOTO SELECTION.START
        IF FUNCTION$="A" THEN GOTO SELECTION.START
        IF FUNCTION$="U" THEN GOTO AUTO.INITIALIZE.MATRIX
        IF FUNCTION$="Q" THEN GOTO CLOSE.FILES
        PRINT "RESPONSE MUST BE T, M, A, U, OR Q.  RE-ENTER."
        GOTO DISPLAY.RESPONSE
```

```
REM-----------------------------------------------------------(TERMINAL EMULATION)
TERMINAL.START:
        GOSUB SCREEN.HEADING
TERMINAL.RESPONSE:
        LINE INPUT "What telephone number do you want to dial ('C' to cancel call)? ",WORK$
        IF WORK$="C" OR WORK$="c" THEN GOTO COMMO.CHECK.RETURN
        LET TELEPHONE$=WORK$
        IF LEN(WORK$)<20 THEN GOTO TERMINAL.TELEPHONE.NBR
        PRINT "TELEPHONE NUMBER IS TOO LONG. MUST BE 1 TO 19 DIGITS."
        PRINT "SHORTENED TO: ";
        LET WORK$=LEFT$(WORK$,19)
        PRINT WORK$
        PRINT
        GOTO TERMINAL.RESPONSE
TERMINAL.TELEPHONE.NBR:
        IF LEN(WORK$)>4 THEN GOTO TERMINAL.TELEPHONE.NBR.TWO
        PRINT "NUMBER MUST BE MORE THAN FOUR DIGITS. RE-ENTER."
        PRINT
        GOTO TERMINAL.RESPONSE
TERMINAL.TELEPHONE.NBR.TWO:
        LET PHONENBR$=RIGHT$(WORK$,4)
        IF PHONENBR$>="0000" AND PHONENBR$<="9999" THEN GOTO TERMINAL.ASK.FOR.DISPLAY
        PRINT "I CAN'T CHECK IT ALL, BUT THE LAST FOUR MUST BE NUMERIC. RE-ENTER."
        PRINT
        GOTO TERMINAL.RESPONSE
TERMINAL.ASK.FOR.DISPLAY:
        IF HAVEDIAL$="YES" THEN GOTO TERMINAL.SETUP.LOGMSG
        PRINT
        INPUT "Do you want the received information to show on the screen? ",WORK$
        LET ANSWER2$=LEFT$(WORK$,1)
        LET ASCRN$=UCASE$(ANSWER2$)
        IF ASCRN$="Y" THEN GOTO TERMINAL.ASK.FOR.PRINTER
        IF ASCRN$="N" THEN GOTO TERMINAL.ASK.FOR.PRINTER
        PRINT "RESPONSE MUST BE (Y)ES OR (N)O. RE-ENTER."
        GOTO TERMINAL.ASK.FOR.DISPLAY
TERMINAL.ASK.FOR.PRINTER:
        PRINT
        INPUT "Do you want the received information to show on the printer? ",WORK$
        LET ANSWER2$=LEFT$(WORK$,1)
        LET APTR$=UCASE$(ANSWER2$)
        IF APTR$="Y" THEN GOTO TERMINAL.ASK.DUPLEX
        IF APTR$="N" THEN GOTO TERMINAL.ASK.DUPLEX
        PRINT "RESPONSE MUST BE (Y)ES OR (N)O. RE-ENTER."
        GOTO TERMINAL.ASK.FOR.PRINTER
TERMINAL.ASK.DUPLEX:
        PRINT
        INPUT "Is this call to be placed in full duplex mode? ",WORK$
        LET ANSWER2$=LEFT$(WORK$,1)
        LET AFDX$=UCASE$(ANSWER2$)
        IF AFDX$="Y" THEN GOTO TERMINAL.GET.START
        IF AFDX$="N" THEN GOTO TERMINAL.GET.START
        PRINT "RESPONSE MUST BE (Y)ES OR (N)O. RE-ENTER."
        GOTO TERMINAL.ASK.DUPLEX
TERMINAL.GET.START:
        LET DATEIN$=CURRYMD$
        GOSUB CONVERT.YMD.MDY
```

```
        LET CURRDATE$=DATEOUT$
        GOSUB GO.GET.TIME
TERMINAL.FILE.SETUP:
        LET CALLNBR%=0
        LET DESCRIP$="DIRECT CALL TO: "
        LET CDATE$="000000"
        LET CTIME$="000000"
        LET RTIME$="000000"
        LET DSK%=0
        LET DSKMETH$="N"
        LET ECRT$=ASCRN$
        LET EPTR$=APTR$
        LET DIAG$="N"
        LET SAVEPTR$="N"
        LET FDX$=AFDX$
        LET EXDM$="N"
        LET HBKSP$="0"
        LET EOF$="EOF"
        LET LOGMSG$="*QUIT"
        LET ENDCHR$=")"
        LET PARITY%=0
        LET STATUS%=0
        LET RECNT%=0
        LET STIME$=CURRTIME$
        LET ETIME$="000000"
        LET LDATE$=CURRDATE$
        LET RPGRM$=RETURN2GX$
        LET SPGRM$=FUNCTIONS+TELEPHONES
        ON END (2) GOTO TERMINAL.DIAL.ADD.ERROR
        WRITE #2;CALLNBR%,DESCRIP$,CDATE$,CTIME$,RTIME$,DSK%,DSKMETH$,_
              ECRT$,EPTR$,DIAG$,SAVEPTR$,FDX$,EXDM$,HBKSP$,EOF$,LOGMSG$,_
              ENDCHR$,PARITY%,STATUS%,RECNT%,STIME$,ETIME$,LDATE$,RPGRM$,_
              SPGRM$
        GOTO TERMINAL.SETUP.LOGMSG
TERMINAL.DIAL.ADD.ERROR:
        PRINT
        PRINT "***** BIG PROBLEM - CANNOT ADD FIRST RECORD TO COMDIAL.W *****"
        LET WORK%=CONCHAR
        GOTO CLOSE.FILES
TERMINAL.SETUP.LOGMSG:
        LET ETYPE$="PH"
        LET ANO%=0
        LET ACNT=0
        LET MSG$=TELEPHONES
        LET MODE$=" "
REM Change default of ENDCHAR$ from ")" to " "
REM     LET ENDCHAR$=")"
        LET ENDCHAR$=" "
        LET TEXT$=" "
        ON END (2) GOTO TERMINAL.LOGMSG.ERROR
        WRITE #2;CALLNBR%,ETYPE$,ANO%,ACNT,MSG$,MODE$,ENDCHAR$,TEXT$
        LET ETYPE$="**"
        LET MSG$="N"
        WRITE #2;CALLNBR%,ETYPE$,ANO%,ACNT,MSG$,MODE$,ENDCHAR$,TEXT$
        GOTO CHAIN.TO.COMMUNICATIONS
TERMINAL.LOGMSG.ERROR:
```

```
        PRINT
        PRINT "***** BIG PROBLEM - CANNOT ADD LOG RECORD TO COMDIAL% *****"
        LET WORK%=CONCHAR
        GOTO CLOSE.FILES
REM----------------------------------------------------------(CHAIN TO COMMUNICATIONS)
CHAIN.TO.COMMUNICATIONS:
        CLOSE 1
        CLOSE 2
        GOSUB SCREEN.HEADING
        FILESIZE=SIZE("COMIO.EXE")
        IF FILESIZE=0 THEN PRINT "Unable to transfer to communications processor."
        IF FILESIZE()0 THEN _
            PRINT "Transferring to communications processor." :_
            RUN "COMIO.EXE"
        END
REM----------------------------------------------------------(CLOSE FILES)
CLOSE.FILES:
        CLOSE 1
        DELETE 2
        GOTO RETURN.TO.MENU
REM----------------------------------------------------------(SELECTION START)
SELECTION.START:
        FOR INDEX%=1 TO ENTRY_%T%
            LET DISPLAY$(INDEX%)="N"
        NEXT INDEX%
        ON END (6) GOTO SELECTION.NO.LOGFILE
        OPEN "I",6,CFILE6$
        GOTO SELECTION.CLOSE.LOGFILE
SELECTION.NO.LOGFILE:
        PRINT "NO LOG FILE HAS BEEN ESTABLISHED."
        PRINT "THIS FUNCTION IS NOT AVAILABLE."
        PRINT
        PRINT "Press RETURN when you have read this message. ";
        WORK%=CONCHAR
        GOTO RETURN.TO.MENU
SELECTION.CLOSE.LOGFILE:
        CLOSE 6
        LET REC%=0
        LET MSG$=" "
        LET HAVECALLS$="NO"
SELECTION.NEW.SCREEN:
        GOSUB SCREEN.HEADING
        LET TITLE2$="CALL SELECTION"
        IF FUNCTION$="M" THEN TITLE2$="SELECT MANUAL CALL"
        IF FUNCTION$="A" THEN TITLE2$="SELECT AUTOMATIC CALL"
        IF FUNCTION$="U" THEN TITLE2$="UNATTENDED AUTOMATIC CALLING"
        PRINT TAB((80-LEN(TITLE2$))\2);TITLE2$
        PRINT
        PRINT TAB(2);"CALL";
        IF FUNCTION$()"U" THEN PRINT
        IF FUNCTION$="U" THEN PRINT TAB(54);"CALL"
        PRINT TAB(2);"NBR";TAB(8);"DESCRIPTION";
        IF FUNCTION$="M" THEN PRINT " "
        IF FUNCTION$="A" THEN PRINT TAB(62);"STATUS"
        IF FUNCTION$="U" THEN PRINT TAB(54);"TIME"; TAB(59);"STATUS"
        PRINT
        IF FUNCTION$="U" THEN PRINT "Determining the calls to be placed.";
```

```
            LET SSAVE%=REC%
            LET LLINE%=8
SELECTION.READ.RECORD:
            LET REC%=REC%+1
            IF REC%>ENTRYLMT% THEN GOTO SELECTION.RESPONSE
            GOSUB READ.CALLFILE.RECORD
            IF STAT$="END" THEN GOTO SELECTION.READ.RECORD
            IF DESCRIP$="*" THEN GOTO SELECTION.READ.RECORD
            IF FUNCTION$="X" AND CTIME$()"000000" THEN GOTO SELECTION.READ.RECORD
            IF FUNCTION$="X" THEN CALLSTATUS$=" ": GOTO SELECTION.SHOW.THE.ENTRY
            IF FUNCTION$="A" AND CTIME$="000000" THEN GOTO SELECTION.READ.RECORD
            IF FUNCTION$="U" AND CTIME$="000000" THEN GOTO SELECTION.READ.RECORD
            LET WORKDAY$=RIGHT$(CDATE$,2)+LEFT$(CDATE$,4)
            LET WORKCURR$=RIGHT$(CURRDATE$,2)+LEFT$(CURRDATE$,4)
            IF RTIME$="999999" THEN CALLSTATUS$="Problem, Not Resch'd": GOTO SELECTION.LINE.STATUS
            IF RTIME$()"000000" THEN CALLSTATUS$="Call Rescheduled": GOTO SELECTION.LINE.STATUS
            IF WORKDAY$)WORKCURR$ THEN CALLSTATUS$="Call Completed": GOTO SELECTION.LINE.STATUS
            LET CALLSTATUS$="Call Pending"
SELECTION.LINE.STATUS:
            IF TEST$()"YES" THEN GOTO SELECTION.LINE.STATUS.CONTINUE
                LPRINTER
                PRINT "------SELECTION.READ.RECORD------"
                PRINT "    REC%=";REC%
                PRINT " DESCRIP$=";DESCRIP$
                PRINT "FUNCTION$=";FUNCTION$
                PRINT "   CTIME$=";CTIME$
                PRINT "   RTIME$=";RTIME$
                PRINT "WORKCURR$=";WORKCURR$
                PRINT " WORKDAY$=";WORKDAY$
                PRINT "--------------------------------"
                CONSOLE
SELECTION.LINE.STATUS.CONTINUE:
            IF FUNCTION$()"U" THEN GOTO SELECTION.SHOW.THE.ENTRY
            IF RTIME$="999999" THEN GOTO SELECTION.READ.RECORD
            LET WORKTIME$=CTIME$
            IF RTIME$()"000000" THEN WORKTIME$=RTIME$
            FOR COUNT%=1 TO ENTRYLMT%
                IF UDAY$(COUNT%)="000000" THEN GOTO SELECTION.MATRIX.MOVE
                IF WORKDAY$(UDAY$(COUNT%) THEN GOTO SELECTION.MATRIX.INSERT
                IF WORKDAY$)UDAY$(COUNT%) THEN GOTO SELECTION.MATRIX.LOOP
                IF WORKTIME$)UHOUR$(COUNT%) THEN GOTO SELECTION.MATRIX.LOOP
                GOTO SELECTION.MATRIX.INSERT
SELECTION.MATRIX.LOOP:
            NEXT COUNT%
            GOTO SELECTION.READ.RECORD
SELECTION.MATRIX.MOVE:
            LET UDAY$(COUNT%)=WORKDAY$
            LET UHOUR$(COUNT%)=WORKTIME$
            LET UCALL%(COUNT%)=CALLNBR%
            LET USTATUS$(COUNT%)=CALLSTATUS$
            LET HAVECALLS$="YES"
            GOTO SELECTION.READ.RECORD
SELECTION.MATRIX.INSERT:
            FOR ICOUNT%=ENTRYLMT% TO COUNT%+1 STEP -1
                LET UDAY$(ICOUNT%)=UDAY$(ICOUNT%-1)
                LET UHOUR$(ICOUNT%)=UHOUR$(ICOUNT%-1)
```

```
              LET UCALL%(ICOUNT%)=UCALL%(ICOUNT%-1)
              LET USTATUS$(ICOUNT%)=_STATUS$(ICOUNT%-1)
      NEXT ICOUNT%
      GOTO SELECTION.MATRIX.MOVE
SELECTION.SHOW.THE.ENTRY:
      PRINT TAB(3);" ";
      PRINT USING "##";CALLNBR%;
      PRINT TAB(8);DESCRIP$;
      IF FUNCTION$="U" THEN PRINT TAB(50);LEFT$(WORKTIME$,4)+" HRS";
      PRINT TAB(59);CALLSTATUS$
      LET DISPLAY$(CALLNBR%)="Y"
      LET HAVECALLS$="YES"
      LET LLINE%=LLINE%+1
      LET HAVENEXT$="NO"
      IF LLINE%<18 THEN GOTO SELECTION.READ.RECORD
      PRINT "(N)";TAB(8);"NEXT SCREEN"
      LET HAVENEXT$="YES"
SELECTION.RESPONSE:
      IF HAVECALLS$="NO" AND FUNCTION$="U" THEN PRINT: PRINT
      IF HAVECALLS$="NO" THEN PRINT "NO CALLS SELECTED": PRINT
      IF HAVECALLS$="YES" AND FUNCTION$="U" THEN GOTO SELECTION.UNATTENDED
REM   PRINT "(Q)";TAB(8);"QUIT"
      PRINT
      PRINT MSG$
SELECTION.RESPONSE.QUESTION:
      PRINT "What do you want to do now ((Q)uit";
      IF HAVENEXT$="YES" THEN PRINT ", (N)ext,";
      INPUT " or number)? ",WORK$
      LET ANSWER2$=LEFT$(WORK$,1)
      LET ANSWER$=UCASE$(ANSWER2$)
      IF ANSWER$="N" THEN GOTO SELECTION.NEW.SCREEN
      IF ANSWER$="Q" THEN GOTO DISPLAY.FUNCTIONS
      LET REC%=FIX(VAL(LEFT$(WORK$,4)))
      IF REC%>0 AND REC%<=ENTRYLMT% THEN GOTO SELECTION.CHECK.DISPLAY
      LET ENTRYLMT$=TRIM$(STR$(ENTRYLMT%))
      LET MSG$="ENTRY NUMBER MUST BE 1 THRU "+ENTRYLMT$+". RE-ENTER."
      LET REC%=SSAVE%
      GOTO SELECTION.NEW.SCREEN
SELECTION.CHECK.DISPLAY:
      IF DISPLAY$(REC%)="Y" THEN GOTO SELECTION.READ.CURRENT
      LET MSG$= "THIS CALL WAS NOT INCLUDED IN THE SELECTION LIST. RE-ENTER."
      GOTO SELECTION.NEW.SCREEN
SELECTION.UNATTENDED:
      PRINT CHR$(13);
      PRINT "                                                          ";
      PRINT CHR$(13);
      FOR COUNT%=1 TO 5
              IF UDAY$(COUNT%)="000000" THEN GOTO SELECTION.UNATTENDED.LOOP
              LET REC%=UCALL%(COUNT%)
              GOSUB READ.CALLFILE.RECORD
              IF STAT$="END" THEN GOTO SELECTION.UNATTENDED.LOOP
              PRINT TAB(3);" ";
              PRINT USING "##";CALLNBR%;
              PRINT TAB(8);DESCRIP$;
              PRINT TAB(50);LEFT$((UHOUR$(COUNT%)),4)+" HRS";
              PRINT TAB(59);USTATUS$(COUNT%)
```

```
SELECTION.UNATTENDED.LOOP:
        NEXT COUNT%
        LET RECX=UCALL%(1)
SELECTION.READ.CURRENT:
        GOSUB READ.CALLFILE.RECORD
        IF STATS$="END" THEN GOTO SELECTION.SELECTED.ERROR
        IF FUNCTION$()"U" THEN GOTO SETUP.CHAIN.VALUES
        GOTO SELECTION.DISPLAY.AND.WAIT
SELECTION.SELECTED.ERROR:
        PRINT
        PRINT "***** BIG PROBLEM - CANNOT READ SELECTED CALL *****"
        PRINT
        PRINT "Press RETURN when you have read this message. ";
        LET WORKX=CONCHAR
        GOTO CLOSE.FILES
SELECTION.DISPLAY.AND.WAIT:
        PRINT
        PRINT "============================ NEXT CALL ============================"
        PRINT " Call number";CALLNBR%;
        PRINT " to ";DESCRIP$;
        PRINT " at ";LEFT$((UHOURS$(1)),4)+" hours";
        PRINT " on ";LEFT$(CDATE$,2)+"/"+MID$(CDATE$,3,2)+"/"+RIGHT$(CDATE$,2);"."
        PRINT "================================================================="
        PRINT
        PRINT "To stop the automatic calling press RETURN."
        PRINT "Please wait - response may take a few seconds.";
SELECTION.TIMING.LOOP:
        FOR CCOUNT = 1 TO 7500
        NEXT CCOUNT
        LET NEXTCALLDATE$=UDAY$(1)
        LET NEXTCALLTIME$=UHOUR$(1)
        LET SAVETIME$="000000"
        PRINT ERASE.LINE.COMMAND$;
REM-------------------------------------------------------------------
REM Turn cursor off during time display
REM-------------------------------------------------------------------
        PRINT CURSOR.OFF.COMMAND$;
SELECTION.CHECK.FOR.KEY.ENTRY:
        KEYIN$=INKEY$
        IF KEYIN$="" THEN GOTO SELECTION.CHECK.CLOCK
REM-------------------------------------------------------------------
REM Turn cursor back on after time display
REM-------------------------------------------------------------------
        PRINT CURSOR.ON.COMMAND$;
        GOTO DISPLAY.FUNCTIONS
SELECTION.CHECK.CLOCK:
        GOSUB GO.GET.DATE
        PRNTDATE$=MID$(WORKDATE$,3,2)+"/"+RIGHT$(WORKDATE$,2)+"/"+LEFT$(WORKDATE$,2)
        GOSUB GO.GET.TIME
        LET WORKTIME$=CURRTIME$
        PRNTTIME$=LEFT$(CURRTIME$,2)+":"+MID$(CURRTIME$,3,2)+":"+RIGHT$(CURRTIME$,2)
        IF PRNTTIME$=SAVETIME$ THEN GOTO SELECTION.CHECK.FOR.KEY.ENTRY
        LET SAVETIME$=PRNTTIME$
        PRINT CHR$(13);
        PRINT "IT NOW IS ";PRNTTIME$;" ON ";PRNTDATE$;".";"           ";
```

```
SELECTION.CHECK.CALL.NOW:
        IF WORKDATE$()POSTDATE$    THEN GOTO SETUP.UTLUDATE.CHAIN
        IF WORKDATE$(NEXTCALLDATE$ THEN GOTO SELECTION.TIMING.LOOP
        IF WORKDATE$)NEXTCALLDATE$ THEN GOTO SELECTION.SETUP.UNATTENDED.CALL
        IF WORKTIME$(NEXTCALLTIME$ THEN GOTO SELECTION.TIMING.LOOP
SELECTION.SETUP.UNATTENDED.CALL:
        PRINT ESC$+".*+"2"
        IF EPTR$="N" THEN GOTO SETUP.CHAIN.VALUES
        LET EPTR$="N"
        IF DIAG$="Y" THEN GOTO SETUP.CHAIN.VALUES
        IF SAVEPTR$="Y" THEN GOTO SETUP.CHAIN.VALUES
        IF DSK%=0 THEN LET DSK%=1
        LET SAVEPTR$="Y"
        GOTO SETUP.CHAIN.VALUES
REM----------------------------------------------------------------(SETUP CHAIN TO UTLUDATE)
SETUP.UTLUDATE.CHAIN:
        GOSUB SCREEN.HEADING
        PRINT "Setting up transfer to date calculation process"
        CLOSE 1
        DELETE 2
        FILESIZE=SIZE(CTLFILE$)
        IF FILESIZE=0 THEN GOTO CONTROLFILE.NO.FILE
        OPEN "R",4,CTLFILE$,CTLLENGTH%
        LET WORK%=1
SETUP.UTLUDATE.DATEPOST.READ:
        GOSUB READ.CONTROLFILE.RECORD
        IF STAT$="END"    THEN GOTO SETUP.UTLUDATE.ERROR
        IF NAME$="ENDALL"  THEN GOTO SETUP.UTLUDATE.ERROR
        IF NAME$="DATEPOST" THEN GOTO SETUP.UTLUDATE.UPDATE
        LET WORK%=WORK%+1
        IF WORK%)CTLMAX%   THEN GOTO SETUP.UTLUDATE.ERROR
        GOTO SETUP.UTLUDATE.DATEPOST.READ
SETUP.UTLUDATE.UPDATE:
        LET VALUETWO$="COMUCALL"
        GOSUB WRITE.CONTROLFILE.RECORD
        IF STAT$="END" THEN GOTO SETUP.UTLUDATE.ERROR
        CLOSE 4
        CHAIN "UTLUDATE.EXE"
SETUP.UTLUDATE.ERROR:
        CLOSE 4
        PRINT "NO DATEPOST ENTRY IN THE CONTROL FILE."
        PRINT
        PRINT "Press RETURN when you have read this message. ";
        WORK%=CONCHAR
REM----------------------------------------------------------------(SETUP CHAIN VALUES)
SETUP.CHAIN.VALUES:
        GOSUB SCREEN.HEADING
        PRINT "Setting up instructions for selected call."
        GOSUB GO.GET.TIME
SETUP.NO.CLOCK:
        LET STATUS%=0
        LET RECNT%=0
        IF DIAG$="Y" THEN SAVEPTR$="N"
        LET STIME$=CURRTIME$
        LET ETIME$="002000"
        LET LDATE$=CURRDATE$
        LET RPGRM$=RETURNPGM$
```

```
        LET SPGRM$=FUNCTION$+SPGRM$
        ON END (2) GOTO SETUP.DIAL.ADD.ERROR
        WRITE #2;CALLNBR%,DESCRIP$,CDATE$,CTIME$,RTIME$,DSK%,DSKMETH$,_
              ECRT$,EPTR$,DIAG$,SAVEPTR$,FDX$,EMDM$,HBKSP$,EDF$,LOGMSG$,_
              ENDCHR$,PARITY%,STATUS%,RECNT%,STIME$,ETIME$,LDATE$,RPERM$,_
              SPGRM$
        GOTO SETUP.OPEN.LOG.FILE
SETUP.DIAL.ADD.ERROR:
        PRINT
        PRINT "***** BIG PROBLEM - CANNOT ADD FIRST SETUP RECORD TO COMDIALW *****"
        PRINT
        PRINT "Press RETURN when you have read this message. ";
        LET WORK%=CONCHAR
        GOTO CLOSE.FILES
SETUP.OPEN.LOG.FILE:
        ON END (6) GOTO SETUP.LOGFILE.OPEN.ERROR
        OPEN "I",6,CFILE6$
        LET HAVELOG$="NO"
        GOTO SETUP.LOGFILE.READ.LOOP
SETUP.LOGFILE.OPEN.ERROR:
        PRINT
        PRINT "NO LOGFILE HAS BEEN ESTABLISHED. CHANGING TO TERMINAL EMULATION."
        PRINT
        PRINT "Press RETURN when you have read this message.";
        LET WORK%=CONCHAR
        GOTO CLOSE.FILES
SETUP.LOGFILE.READ.LOOP:
        ON END (6) GOTO SETUP.CLOSE.FILES
        READ #6;CALLNBR%,ETYPE$,ANO%,AC%T,MSG$,MODE$,ENDCHAR$,TEXT$
        IF CALLNBR%(REC% THEN GOTO SETUP.LOGFILE.READ.LOOP
        IF CALLNBR%)REC% THEN GOTO SETUP.CLOSE.FILES
        LET HAVELOG$="YES"
        IF ETYPE$()"CD" THEN GOTO SETUP.OUTPUT.LOG.VALUES
        LET DTYPE$=LEFT$(MSG$,1)
        LET RTYPE$=MID$(MSG$,2,1)
        IF RTYPE$="Y" THEN ETYPE$="CY"
        IF RTYPE$="N" THEN ETYPE$="CN"
        IF RTYPE$="S" THEN ETYPE$="CW"
        LET DATETYPE$=MID$(MSG$,7,1)
        LET WORKDATE$=CURRDATE$
        IF DATETYPE$="P" THEN WORKDATE$=LASTDATE$
        IF DATETYPE$="N" THEN WORKDATE$=NEXTDATE$
        IF DATETYPE$=" " THEN WORKDATE$=LASTDATE$
        IF DTYPE$="N" THEN GOTO SETUP.CD.NORMAL.RESPONSE
               LET LDMM$=LEFT$(WORKDATE$,2)
               LET LDDD$=MID$(WORKDATE$,3,2)
               LET LDYY$=RIGHT$(WORKDATE$,2)
               LET LTHH$=LEFT$(CURRTIME$,2)
               LET LTMM$=MID$(CURRTIME$,3,2)
               LET MSG$=DTYPE$+" "+LDYY$+LDMM$+LDDD$+" "+LTHH$+LTMM$
               GOTO SETUP.OUTPUT.LOG.VALUES
SETUP.CD.NORMAL.RESPONSE:
        LET DATEFMT$=MID$(MSG$,6,1)
        IF DATEFMT$="A" OR DATEFMT$="B" THEN GOTO SETUP.CD.NORMAL.FORMAT
        IF DATEFMT$="E" OR DATEFMT$="F" THEN GOTO SETUP.CD.NORMAL.FORMAT
        LET DATEIN$=WORKDATE$
        GOSUB CONVERT.MDY.YMD
```

```
            LET WORKDATE$=DATEOUT$
SETUP.CD.NORMAL.FORMAT:
            LET WMSG$=""
            LET DPREFIXLEN$=MID$(MSG$,8,2)
            IF DPREFIXLEN$="" THEN _
                LET DPREFIX$=MID$(MSG$,3,3) :_
                IF DPREFIX$()"   " THEN _
                    LET WMSG$=DPREFIX$ _
                ELSE _
            ELSE _
                LET DPREFIXLEN%=VAL(DPREFIXLEN$) :_
                IF DPREFIXLEN%()0 THEN _
                    LET WMSG$=MID$(MSG$,10,DPREFIXLEN%)
            LET WMSG$=WMSG$+LEFT$(WORKDATE$,2)
            IF DATEFMT$="B" OR DATEFMT$="D" OR DATEFMT$="F" THEN WMSG$=WMSG$+"/"
            LET WMSG$=WMSG$+MID$(WORKDATE$,3,2)
            IF DATEFMT$="B" OR DATEFMT$="D" THEN _
                WMSG$=WMSG$+"/"
            IF DATEFMT$="A" OR DATEFMT$="B" OR DATEFMT$="C" OR DATEFMT$="D" THEN _
                LET WMSG$=WMSG$+RIGHT$(WORKDATE$,2)
            LET MSG$=WMSG$
SETUP.OUTPUT.LOG.VALUES:
            ON END (2) GOTO SETUP.OUTPUT.ADD.ERROR
            WRITE #2;CALLNBR%,ETYPE$,AND%,ACNT,MSG$,MODE$,ENDCHAR$,TEXT$
            GOTO SETUP.LOGFILE.READ.LOOP
SETUP.OUTPUT.ADD.ERROR:
            PRINT
            PRINT "***** BIG PROBLEM - NO ROOM FOR NEW COMDIAL% RECORDS *****"
            PRINT
            PRINT "Press RETURN when you have read this message. ";
            LET WORK%=CONCHAR
            CLOSE 6
            GOTO CLOSE.FILES
SETUP.CLOSE.FILES:
            CLOSE 6
            IF HAVELOG$="YES" THEN GOTO CHAIN.TO.COMMUNICATIONS
            LET HAVEDIAL$="YES"
            GOTO TERMINAL.START
REM------------------------------------------------------------(UNATTENDED CALLING)
AUTO.INITIALIZE.MATRIX:
            FOR COUNT%=1 TO ENTRY_MT%
                    LET UDAY$(COUNT%)="000000"
                    LET UHOUR$(COUNT%)="000000"
                    LET UCALL%(COUNT%)=0
                    LET USTATUS$(COUNT%)="     "
            NEXT COUNT%
            GOTO SELECTION.START
REM------------------------------------------------------------(COMMUNICATIONS RETURN)
COMMO.RETURN:
            ON END (2) GOTO COMMO.DIAL.READ.ERROR
            READ #2;CALLNBR%,DESCRIP$,CDATE$,CTIME$,RTIME$,DS%%,DSKMETH$,_
                    ECRT$,EPTR$,DIAG$,SAVEPTR$,FOX$,EYDY$,HBKSP$,EOF$,LOGMSG$,_
                    ENDCHR$,PARITY%,STATUS%,RECNT%,STIME$,ETIYE$,LDATE$,RPGRM$,_
                    SPGRM$
            LET FUNCTION$=LEFT$(SPGRM$,1)
            LET SPGRM$=RIGHT$(SPGRM$,(LEN(SPGRM$)-1))
            IF FUNCTION$()"T" THEN GOTO COMMO.GET.DATES
```

```
          LET DESCRIP$=DESCRIP$+SPGRM$
          LET SPGRM$=" "
          GOTO COMMO.GET.DATES
COMMO.DIAL.READ.ERROR:
          DELETE 2
          GOTO CALLFILE.CREATE.WORK
COMMO.GET.DATES:
          GOSUB SCREEN.HEADINGS
          PRINT "Call has been completed. Updating the proper files."
          IF FUNCTION$()"U" THEN GOTO COMMO.CHECK.CLOCK
          PRINT
          PRINT "***********************************************************"
          PRINT "*                                                         *"
          PRINT "*  TO INTERRUPT UNATTENDED CALLING PRESS 'RETURN' BETWEEN *"
          PRINT "*  NOW AND THE TIME DISPLAY ON THE 'UNATTENDED AUTOMATIC  *"
          PRINT "*  CALLING' SCREEN.                                       *"
          PRINT "*                                                         *"
          PRINT "*  PLEASE WAIT - RESPONSE MAY TAKE A FEW SECONDS.         *"
          PRINT "*                                                         *"
          PRINT "***********************************************************"
COMMO.CHECK.CLOCK:
          GOSUB GO.GET.TIME
          LET HAVEERRORS$="NO"
          ON END (7) GOTO COMMO.NO.ERROR.CODE
          OPEN "I",7,CFILE7$
          LET HAVEERRORS$="YES"
COMMO.READ.ERROR.FILE:
          ON END (7) GOTO COMMO.NO.ERROR.CODE
          READ #7;ERRORCD%,EFLAG$,EMSG1$,EMSG2$
          IF ERRORCD%=STATUS% THEN GOTO COMMO.FOUND.ERROR.CODE
          GOTO COMMO.READ.ERROR.FILE
COMMO.NO.ERROR.CODE:
          LET ERRORCD%=STATUS%
          LET EFLAG$="R"
          LET EMSG1$="Unknown Error Condition: "+TRIM$(STR$(STATUS%))
          LET EMSG2$=" "
COMMO.FOUND.ERROR.CODE:
          IF HAVEERRORS$="YES" THEN CLOSE 7
          LET COMMOERRORS$="YES"
          IF EFLAG$="N" THEN COMMOERRORS$="NO"
REY-----------------------------------------------------------(RENAME/DELETE COMDSKW.$$$)
          LET DISKFILES$="N"
          LET DISKNAME$=" "
          ON END (3) GOTO COMMO.FILE.FINISH
          OPEN "I",3,CFILE3$
          CLOSE 3
          LET WORKNBR$=TRIM$(STR$(CALLNBR%))
          IF LEN(WORKNBR$)=1 THEN WORKNBR$="0"+WORKNBR$
          IF DIAG$="N" THEN GOTO COMMO.FILE.NO.DIAG
          LET NEWNAME$="C"+WORKNBR$+"DIAG.DAT"
          ON END (4) GOTO COMMO.DELETE.RENAME
          OPEN "I",4,NEWNAME$
          DELETE 4
COMMO.DELETE.RENAME:
          RTN%=RENAME(NEWNAME$,CFILE3$)
          IF RTN%=-1 THEN GOTO COMMO.FILE.HAVE.DIAG
               PRINT "CANNOT RENAME TO DIAGNOSTICS FILE"
```

```
                PRINT
                PRINT "Press RETURN when you have read this message. ";
                WORK%=CONCHAR
                GOTO COMMO.FILE.FINISH
COMMO.FILE.HAVE.DIAG:
        LET DISKNAME$=NEWNAME$
        LET DISKFILE$="D"
        GOTO COMMO.FILE.FINISH
COMMO.FILE.NO.DIAG:
        IF COMMOERRORS()"YES" THEN GOTO COMMO.FILE.NO.ERROR
                LET NEWNAME$="C"+WORKNBR$+"EROR.DAT"
                ON END (4) GOTO COMMO.ERROR.RENAME
                OPEN "I",4,NEWNAME$
                DELETE 4
COMMO.ERROR.RENAME:
        RTN%=RENAME(NEWNAME$,CFILE3$)
        IF RTN%=-1 THEN GOTO COMMO.FILE.HAVE.ERROR
                PRINT "CANNOT RENAME TO ERROR RETENTION FILE"
                PRINT
                PRINT "Press RETURN when you have read this message. ";
                WORK%=CONCHAR
                GOTO COMMO.FILE.FINISH
COMMO.FILE.HAVE.ERROR:
        LET DISKNAME$=NEWNAME$
        LET DISKFILE$="E"
        GOTO COMMO.FILE.FINISH
COMMO.FILE.NO.ERROR:
        IF DSK%()0 THEN GOTO COMMO.FILE.HAVE.DISKRPT
        GOTO COMMO.FILE.DELETE
COMMO.FILE.HAVE.DISKRPT:
        LET DSK%=DSK%+1
        IF DSK%)99 THEN DSK%=1
        LET WORKNBR2$=TRIM$(STR$(DSK%))
        IF LEN(WORKNBR2$)=1 THEN WORKNBR2$="0"+WORKNBR2$
        LET NEWNAME$="C"+WORKNBR$+WORKNBR2$
        LET NEWNAME2$=NEWNAME$+"DSK.DAT"
        IF SAVEPTR$="Y" THEN LET NEWNAME2$=NEWNAME$+"RPT.DAT"
        ON END (4) GOTO COMMO.FILE.RENAME
        OPEN "I",4,NEWNAME2$
        DELETE 4
COMMO.FILE.RENAME:
        RTN%=RENAME(NEWNAME2$,CFILE3$)
        IF RTN%=-1 THEN GOTO COMMO.FILE.HAVE.DSK.RPT
                LET MSG$="CANNOT RENAME TO DISK DATASET FILE"
                IF SAVEPTR$="Y" THEN LET MSG$="CANNOT RENAME TO PRINTER FILE"
                PRINT MSG$
                PRINT
                PRINT "Press RETURN when you have read this message. ";
                WORK%=CONCHAR
                GOTO COMMO.FILE.FINISH
COMMO.FILE.HAVE.DSK.RPT:
        LET DISKNAME$=NEWNAME2$
        LET DISKFILE$="F"
        IF SAVEPTR$="Y" THEN LET DISKFILE$="R"
        GOTO COMMO.FILE.FINISH
COMMO.FILE.DELETE:
        ON END (3) GOTO COMMO.FILE.FINISH
```

```
            OPEN "I",3,CFILE3$
            DELETE 3
COMMO.FILE.FINISH:
            LET HAVECOMFILE$="NO"
            IF DISKFILE$="N" THEN GOTO COMMO.CHECK.NORMAL
COMMO.COMFILE.WORK:
            ON END (3) GOTO COMMO.COMFILE.CREATE.WORK
            OPEN "I",3,CFILE12$
            DELETE 3
COMMO.COMFILE.CREATE.WORK:
            OPEN "O",3,CFILE12$
            ON END (4) GOTO COMMO.COMFILE.ADD
            OPEN "I",4,CFILE11$
            HAVECOMFILE$="YES"
COMMO.COMFILE.READ:
            READ #4;CFYMD$,CFHMS$,CFNAME$
            IF CFNAME$=DISKNAME$ THEN GOTO COMMO.COMFILE.READ
            WRITE #3;CFYMD$,CFHMS$,CFNAME$
            GOTO COMMO.COMFILE.READ
COMMO.COMFILE.ADD:
            LET CFYMD$=RIGHT$(CURRDATE$,2)+LEFT$(CURRDATE$,4)
            LET CFHMS$=CURRTIME$
            ON END (3) GOTO COMMO.COMFILE.RENAME
            WRITE #3;CFYMD$,CFHMS$,DISKNAME$
COMMO.COMFILE.RENAME:
            IF HAVECOMFILE$="YES" THEN DELETE 4
            CLOSE 3
            RECX=RENAME(CFILE11$,CFILE12$)
            IF RECX=-1 THEN GOTO COMMO.CHECK.NORMAL
            PRINT "CANNOT RENAME COMFILE WORK TO CURRENT"
            PRINT
            PRINT "Press RETURN when you have read this message. ";
            WORKX=CONCHAR
COMMO.CHECK.NORMAL:
            IF TEST$()"YES" THEN GOTO COMMO.CHECK.NORMAL.CONTINUE
                   LPRINTER
                   PRINT "------COMMO.CHECK.NORMAL------"
                   PRINT "DISKFILE$=";DISKFILE$
                   PRINT "DISKNAME$=";DISKNAME$
                   PRINT "   EFLAG$=";EFLAG$
                   PRINT "------------------------------"
                   CONSOLE
            IF EFLAG$="N" THEN GOTO COMMO.NORMAL.COMPLETION
REM-----------------------------------------------------------(UPDATE TROUBLE FILE)
        PRINT
        PRINT "Have an error. Updating trouble log."
        LET ETIME$=CURRTIME$
        LET LDATE$=CURRDATE$
        LET RPGRM$=RETURNPGM$
        ON END (4) GOTO COMMO.NO.TRBL.FILE
        OPEN "I",4,CFILE4$
        GOTO COMMO.COPY.TRBL
COMMO.NO.TRBL.FILE:
        ON END (4) GOTO COMMO.BYPASS.TRBL.UPDATE
        OPEN "O",4,CFILE4$
        WRITE #4;CALLNBRX,DESCRIP$,CDATE$,CTIME$,RTIME$,DSKX,DSKMETH$,_
                ECRT$,EPTR$,DIAG$,SAVEPTR$,FDX$,EMDY$,HBKSP$,EOF$,LCEMSG$,_
```

```
                COMMO.CHECK.NORMAL.CONTINUE:
                ENDCHR$,PARITY%,STATUS%,RECNT%,STIME$,ETIME$,LDATE$,RPGRM$,_
                SPGRM$
        CLOSE 4
        GOTO COMMO.BYPASS.TRBL.UPDATE
COMMO.COPY.TRBL:
        OPEN "O",13,CFILE13$
COMMO.TRBL.READ.LOOP:
        ON END (4) GOTO COMMO.ADD.TRBL.RECORD
        READ #4;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEMDM$,OHBKSP$,OECF$,OLOGMSG$,_
                OENDCHR$,OPARITY%,OSTATUS%,ORECNT%,OSTIME$,OETIME$,OLDATE$,ORPGRM$,_
                OSPGRM$
        WRITE #13;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEMDM$,OHBKSP$,OECF$,OLOGMSG$,_
                OENDCHR$,OPARITY%,OSTATUS%,ORECNT%,OSTIME$,OETIME$,OLDATE$,ORPGRM$,_
                OSPGRM$
        GOTO COMMO.TRBL.READ.LOOP
COMMO.ADD.TRBL.RECORD:
        WRITE #13;CALLNBR%,DESCRIP$,CDATE$,CTIME$,RTIME$,DSK%,DSKMETH$,_
                ECRT$,EPTR$,DIAG$,SAVEPTR$,FDX$,EMDM$,HBKSP$,ECF$,LOGMSG$,_
                ENDCHR$,PARITY%,STATUS%,RECNT%,STIME$,ETIME$,LDATE$,RPGRM$,_
                SPGRM$
        CLOSE 13
        DELETE 4
        RENFLAG%=RENAME(CFILE4$,CFILE13$)
        IF RENFLAG%()-1 THEN GOTO COMMO.COMBINE.TRBL.ERROR
        GOTO COMMO.BYPASS.TRBL.UPDATE
COMMO.COMBINE.TRBL.ERROR:
        PRINT "****** BIG PROBLEM - CANNOT RENAME WORK TO TROUBLE ******"
        PRINT : PRINT "Press RETURN when you have read this message. ";
        WORK%=CONCHAR
REM--------------------------------------------------------------(RESCHEDULE THE CALL)
COMMO.BYPASS.TRBL.UPDATE:
        IF FUNCTION$()"U" THEN GOTO COMMO.BYPASS.RESCHEDULING
        IF EFLAG$="T" THEN RTIME$="999999":LET NEWMIN$="5":GOTO COMMO.RESCHEDULE.CALL
        LET RTIME$=CURRTIME$
        PRINT
        PRINT "Have an error. Rescheduling the call."
        LET WORKMIN$=MID$(RTIME$,3,1)
        IF WORKMIN$="5" THEN _
            LET NEWMIN$="1" :_
            GOTO COMMO.RESCHEDULE.OVER.HOUR
        IF WORKMIN$="4" THEN :_
            LET NEWMIN$="0" :_
            GOTO COMMO.RESCHEDULE.OVER.HOUR
        IF WORKMIN$="3" THEN NEWMIN$="5"
        IF WORKMIN$="2" THEN NEWMIN$="4"
        IF WORKMIN$="1" THEN NEWMIN$="3"
        IF WORKMIN$="0" THEN NEWMIN$="2"
        GOTO COMMO.RESCHEDULE.CALL
COMMO.RESCHEDULE.OVER.HOUR:
        LET WORKHR$=LEFT$(RTIME$,2)
        IF WORKHR$="24" THEN GOTO COMMO.RESCHEDULE.OVER.DAY
        IF WORKHR$="23" THEN GOTO COMMO.RESCHEDULE.OVER.DAY
        IF WORKHR$="22" THEN NEWHR$="23"
        IF WORKHR$="21" THEN NEWHR$="22"
```

```
        IF WORKHR$="20" THEN NEWHR$="21"
        IF WORKHR$="19" THEN NEWHR$="20"
        IF WORKHR$="18" THEN NEWHR$="19"
        IF WORKHR$="17" THEN NEWHR$="18"
        IF WORKHR$="16" THEN NEWHR$="17"
        IF WORKHR$="15" THEN NEWHR$="16"
        IF WORKHR$="14" THEN NEWHR$="15"
        IF WORKHR$="13" THEN NEWHR$="14"
        IF WORKHR$="12" THEN NEWHR$="13"
        IF WORKHR$="11" THEN NEWHR$="12"
        IF WORKHR$="10" THEN NEWHR$="11"
        IF WORKHR$="09" THEN NEWHR$="10"
        IF WORKHR$="08" THEN NEWHR$="09"
        IF WORKHR$="07" THEN NEWHR$="08"
        IF WORKHR$="06" THEN NEWHR$="07"
        IF WORKHR$="05" THEN NEWHR$="06"
        IF WORKHR$="04" THEN NEWHR$="05"
        IF WORKHR$="03" THEN NEWHR$="04"
        IF WORKHR$="02" THEN NEWHR$="03"
        IF WORKHR$="01" THEN NEWHR$="02"
        IF WORKHR$="00" THEN NEWHR$="01"
        LET RTIME$=NEWHR$+RIGHT$(RTIME$,4)
        GOTO COMMO.RESCHEDULE.CALL
COMMO.RESCHEDULE.OVER.DAY:
        LET NEWHR$="00"
        LET RTIME$=NEWHR$+RIGHT$(RTIME$,4)
COMMO.RESCHEDULE.CALL:
        LET RTIME$=LEFT$(RTIME$,2)+NEWMIN$+RIGHT$(RTIME$,2)
        GET #1,CALLNBR%
        INPUT #1,OCALLNBR%,ODESCRIP$,OCDATE$,OCTIME$,ORTIME$,ODSK%,ODSKMETH$
        INPUT #1,OECRT$,OEPTR$,ODIAG$,OSAVEPTR$,OFDX$,OEXDY$,OHBKEP$,OECF$,OLOGMSG$
        INPUT #1,OENDCHR$,OPARITY%,OSTATUS%,ORECNT%,OSTIME$,OETIME$,OLDATE$,ORPGRM$
        INPUT #1,OSPGRM$
        LET ORTIME$=RTIME$
        LET OCDATE$=CURRDATE$
        WRITE #1,CALLNBR%;OCALLNBR%,ODESCRIP$,OCDATE$,OCTIME$,ORTIME$,ODSK%,ODSKMETH$,_
              OECRT$,OEPTR$,ODIAG$,OSAVEPTR$,OFDX$,OEXDY$,OHBKEP$,OECF$,OLOGMSG$,_
              OENDCHR$,OPARITY%,OSTATUS%,ORECNT%,OSTIME$,OETIME$,OLDATE$,ORPGRM$,_
              OSPGRM$
REM-----------------------------------------------------------(DISPLAY ERROR MESSAGE)
COMMO.BYPASS.RESCHEDULING:
        IF FUNCTION$="U" THEN GOTO COMMO.CHECK.RETURN
        GOSUB SCREEN.HEADING
        PRINT "****************************************************"
        PRINT "*                                                  *"
        PRINT "*  THERE HAS BEEN AN ERROR DURING COMMUNICATIONS PROCESSING  *"
        PRINT "*                                                  *"
        PRINT "****************************************************"
        PRINT
        PRINT
        PRINT TAB(15);EMSG1$
        PRINT
        PRINT
        PRINT "Press RETURN when you have reviewed the error message.";
        WORK%=CONCHAR
        GOTO COMMO.CHECK.RETURN
REM-----------------------------------------------------------(NORMAL COMPLETION)
```

```
COMMO.NORMAL.COMPLETION:
        LET ETIME$=CURRTIME$
        LET LDATE$=CURRDATE$
        LET RPGRM$=RETURNPGM$
        PRINT
        PRINT "Normal completion. Updating the daily history file."
        ON END (5) GOTO COMMO.NO.HIST.FILE
        OPEN "I",5,CFILE5$
        GOTO COMMO.COPY.HIST
COMMO.NO.HIST.FILE:
        ON END (5) GOTO COMMO.BYPASS.HIST.UPDATE
        OPEN "O",5,CFILE5$
        WRITE  #5;CALLNBR%,DESCRIP$,CDATE$,CTIME$,RTIME$,DSK%,DSKMETH$,_
                ECRT$,EPTR$,DIAG$,SAVEPTR$,FDX$,EMDM$,HBKSP$,EOF$,LOGMSG$,_
                ENDCHR$,PARITY%,STATUS%,RECNT%,STIME$,ETIME$,LDATE$,RPGRM$,_
                SPGRM$
        CLOSE 5
        GOTO COMMO.BYPASS.HIST.UPDATE
COMMO.COPY.HIST:
        OPEN "O",14,CFILE14$
COMMO.HIST.READ.LOOP:
        ON END (5) GOTO COMMO.ADD.HIST.RECORD
        READ #5;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEMDM$,OHBKSP$,OEOF$,OLOGMSG$,_
                OENDCHR$,OPARITY%,OSTATUS%,ORECNT%,OSTIME$,OETIME$,OLDATE$,ORPGRM$,_
                OSPGRM$
        WRITE #14;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEMDM$,OHBKSP$,OEOF$,OLOGMSG$,_
                OENDCHR$,OPARITY%,OSTATUS%,ORECNT%,OSTIME$,OETIME$,OLDATE$,ORPGRM$,_
                OSPGRM$
        GOTO COMMO.HIST.READ.LOOP
COMMO.ADD.HIST.RECORD:
        WRITE  #14;CALLNBR%,DESCRIP$,CDATE$,CTIME$,RTIME$,DSK%,DSKMETH$,_
                ECRT$,EPTR$,DIAG$,SAVEPTR$,FDX$,EMDM$,HBKSP$,EOF$,LOGMSG$,_
                ENDCHR$,PARITY%,STATUS%,RECNT%,STIME$,ETIME$,LDATE$,RPGRM$,_
                SPGRM$
        CLOSE 14
        DELETE 5
        RENFLAG%=RENAME(CFILE5$,CFILE14$)
        IF RENFLAG%()-1 THEN GOTO COMMO.COMBINE.HIST.ERROR
        GOTO COMMO.BYPASS.HIST.UPDATE
COMMO.COMBINE.HIST.ERROR:
        PRINT "****** BIG PROBLEM - CANNOT RENAME WORK TO HISTORY ******"
        PRINT : PRINT "Press RETURN when you have read this message. ";
        WORK%=CONCHAR
REM-------------------------------------------------------------(UPDATE DIAL LIST)
COMMO.BYPASS.HIST.UPDATE:
        IF CALLNBR%=0 THEN GOTO COMMO.CHECK.RETURN
        GET #1,CALLNBR%
        INPUT #1,OCALLNBR%,ODESCRIP$,OCDATE$,OCTIME$,ORTIME$,ODSK%,ODSKMETH$
        INPUT #1,OECRT$,OEPTR$,ODIAG$,OSAVEPTR$,OFDX$,OEMDM$,OHBKSP$,OEOF$,OLOGMSG$
        INPUT #1,OENDCHR$,OPARITY%,OSTATUS%,ORECNT%,OSTIME$,OETIME$,OLDATE$,ORPGRM$
        INPUT #1,OSPGRM$
        IF FUNCTION$()"A" THEN GOTO COMMO.SETUP.DIAL.ONE
COMMO.CHECK.CDATE.RESET:
        PRINT
        INPUT "Does this call satisfy today's call requirement (Y,N)? ",WORK$
```

```
            ANSWER2$=LEFT$(WORK$,1)
            ANSWER$=UCASE$(ANSWER2$)
            IF ANSWER$="Y" THEN GOTO COMMO.SETUP.DIAL.ONE
            IF ANSWER$="N" THEN GOTO COMMO.SETUP.DIAL.TWO
            PRINT "RESPONSE MUST BE (Y)ES OR (N)O. RE-ENTER."
            GOTO COMMO.CHECK.CDATE.RESET
COMMO.SETUP.DIAL.ONE:
            LET OCDATE$=NEXTDATE$
COMMO.SETUP.DIAL.TWO:
            LET ORTIME$="000000"
            LET ODSK%=DSK%
            LET OSTATUS%=STATUS%
            LET ORECNT%=RECNT%
            LET OSTIME$=STIME$
            LET OETIME$=CURRTIME$
            LET OLDATE$=CURRDATE$
            LET ORPGRM$=RETURNPGM$
            WRITE #1, CALLNBR%;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OENDY$,OHBKSP$,OEOF$,OLOGMSG$,_
                OENDCHR$,OPARITY%,OSTATUS%,ORECNT%,OSTIME$,OETIME$,OLDATE$,ORPGRM$,_
                OSPGRM$
REM-----------------------------------------------------------------(DATA TRANSLATION)
TRANSLATE.START:
            IF DISKFILE$()"F"    THEN GOTO COMMO.CHECK.RETURN
            IF SPGRM$()"BAMTRAC" THEN GOTO COMMO.CHECK.RETURN
            PRINT
            PRINT "Transferring to BAMTRAC translation module."
            PRINT
            CLOSE 1
            DELETE 2
            FILESIZE=SIZE(CTLFILE1$)
            IF FILESIZE=0 THEN GOTO CONTROLFILE.NO.FILE
            OPEN "R",4,CTLFILE1$,CTLLENGTH%
            LET WORK%=1
TRANSLATE.DATERTRN.READ:
            GOSUB READ.CONTROLFILE.RECORD
            IF STAT$="END"       THEN GOTO TRANSLATE.DATERTRN.ERROR
            IF NAME$="ENDALL"    THEN GOTO TRANSLATE.DATERTRN.ERROR
            IF NAME$="DATERTRN"  THEN GOTO TRANSLATE.DATERTRN.UPDATE
            LET WORK%=WORK%+1
            IF WORK%)CTLMAX%     THEN GOTO TRANSLATE.DATERTRN.ERROR
            GOTO TRANSLATE.DATERTRN.READ
TRANSLATE.DATERTRN.UPDATE:
            LET VALUEONE$="COMMCALL"
            LET VALUETWO$=FUNCTION$+DISKNAME$
            GOSUB WRITE.CONTROLFILE.RECORD
            IF STAT$="END" THEN GOTO TRANSLATE.DATERTRN.ERROR
            CLOSE 4
            CHAIN "COMTBAMR.EXE"
TRANSLATE.DATERTRN.ERROR:
            CLOSE 4
            PRINT "NO DATERTRN ENTRY IN THE CONTROL FILE."
            PRINT
            PRINT "Press RETURN to return to Communications Menu."
            WORK%=CONCHAR
            GOTO RETURN.TO.MENU
REM-----------------------------------------------------------------(COMMO RETURN CHECK)
```

```
COMMO.CHECK.RETURN:
        DELETE 2
        OPEN "O",2,CFILE2$
        IF FUNCTION$="U" THEN GOTO AUTO.INITIALIZE.MATRIX
        IF FUNCTION$="X" THEN GOTO SELECTION.START
        IF FUNCTION$="A" THEN GOTO SELECTION.START
        GOTO DISPLAY.FUNCTIONS
REM---------------------------------------------------(RETURN)
RETURN.TO.MENU:
        GOSUB SCREEN.HEADING
        PRINT "Returning to Communications Menu."
        END C)type D:COMULOG.BAS
REM ***** COMULOG.BAS (Business BASIC (.99))
REM     04/26/83
REM     1558
REM
REM THIS PROGRAM PROVIDES THE FACILITY TO UPDATE THE LOG
REM FILE. IT THEN SAVES THE MODIFIED VALUES FOR USE BY THE
REM OTHER COMMUNICATIONS PROGRAMS.
REM
REM ORIGINALLY PROGRAMMED BY TOM TRELFORD 08/28/82
REM TRANSLATED FROM CB80 BY TERESA JANE LORD
REM----------------------------------------------------(CHANGE LOG)
REM VERSION   DATE      CHANGE
REM   1.0    08/28/82   INITIAL VERSION
REM   1.1    09/01/82   Changed wording on prompt in WHICH.CALL
REM   1.2    09/07/82   Added delete confirmation request
REM   1.3    09/10/82   Changed (L)ist to (D)isplay
REM   1.4    09/25/82   Changed INTX to INT in RESET.UPDATE.OR.LOOP
REM   1.5    10/04/82   Added ANSWER6$ and ANSWER7$ to MSG.CO
REM   1.6    10/19/82   Current date on BAYTRAC file
REM   1.7    10/28/82   Added (E) and (F) on date format
REM   1.8    02/04/83   Return to COMUMENU added
REM                     Eliminated use of CLOCK
REM                     Added use of TECH from control file
REM                     Changed wording
REM                     Bypassed update if LG & RF functions cancelled
REM                     Eliminated non-validated update function
REM   2.0    02/17/83   Translated from C380
REM   2.1    03/03/83   Removed chain-back to COMUMENU; by Steve Hemphill
REM   2.2    03/04/83   Check password moved from COMUMENU to COMULOG.
REM                     CINT(INT changed to FIX.
REM   2.3    03/15/83   Added ENDCHAR to PH record; by Teresa Jane Lord.
REM   2.4    03/16/83   Removed references to RETRY WAIT SECONDS.
REM   2.5    03/29/83   Password for restricted functions made case insen-
REM                     sitive; by Steve Hemphill
REM   2.6    04/25/83   Display of Version number added; by Steve Hemphill
REM   2.6    07/29/83   chg "log file values" -> "Log File Report" b.wong
REM----------------------------------------------------(START OF PROGRAM)
START:
        CONSOLE
        LET VERSION$="Log File Processor - Version 2.6"
        LET CARRIAGE%=13
        LET CFILE1$="COMLOGY.DAT"
```

```
            LET CFILE2$="CCM_LGM.$$$"
            LET CFILE3$="COMLOGM.BAK"
            LET CFILE4$="COMLOG.DAT"
            LET CFILE5$="COMLOG.$$$"
            LET CFILE6$="COMLOG.BAK"
            LET CFILELENX=125
            LET CTLFILE1$="CONTROL.DAT"
            LET CTLLENGTHX=100
            LET CTLMAXX=100
            LET CURRDAY$="000000"
            LET CALLMAXX=50
            LET DPREFIXMAXX=15
            LET HAVECALLNBR$="NO"
            LET MSGMAXX=30
            LET NBRENTRYX=40
            LET SCRN01$="LOG FILE"
            LET TECH$="NO"
            LET TEXTMAXX=50
SETUP.WORK.AREAS:
            REDIM WTYPE$(NBRENTRYX)
            REDIM WANDX(NBRENTRYX)
            REDIM WACNT(NBRENTRYX)
            REDIM WMSG$(NBRENTRYX)
            REDIM WMODE$(NBRENTRYX)
            REDIM WENDCHAR$(NBRENTRYX)
            REDIM WTEXT$(NBRENTRYX)
            GOTO CONTROLFILE.OPEN
REM-----------------------------------------------------------(SUBROUTINES)
SCREEN.HEADING:
            IF HEADING$="BLANK" THEN GOTO SCREEN.BLANK
                PRINT SHOME$; SCLEAR$
                GOTO SCREEN.TITLE
SCREEN.BLANK:
            PRINT BLANK$
SCREEN.TITLE:
            PRINT TAB((80-LEN(TITLE$))\2);TITLE$
            PRINT TAB((80-LEN(CTITLE$))\2);CTITLE$
            PRINT TAB((80-LEN(VERSION$))\2);VERSION$
            PRINT
            RETURN
REM-------------------------------------------------------
READ.CONTROLFILE.RECORD:
            ON END (1) GOTO READ.CONTROLFILE.ERROR
            READ #1,WORKX;NAME$,VALUEONE$,VALUETWO$
            LET STAT$="OK"
            RETURN
READ.CONTROLFILE.ERROR:
            LET STAT$="END"
            RETURN
REM-----------------------------------------------------------(GET KEY INPUT)
GET.KEY.INPUT:
            LET WORK$=""
            PRINT " ";
GET.KEY.FIRST:
            LET EWORK$=INKEY$
            IF LEN(EWORK$)=0 THEN GOTO GET.KEY.FIRST
            IF ASC(EWORK$)=CARRIAGEX THEN GOTO GET.KEY.RETURN
```

```
            LET KWORK$=EWORK$
GET.KEY.RESPONSE:
            LET EWORK$=INKEY$
            IF LEN(EWORK$)=0 THEN GOTO GET.KEY.RESPONSE
            IF ASC(EWORK$)=CARRIAGE% THEN GOTO GET.KEY.RETURN
            LET KWORK$=KWORK$+EWORK$
            GOTO GET.KEY.RESPONSE
GET.KEY.RETURN:
            LET WORK$=KWORK$
            RETURN
REM------------------------------------------------------
READ.LOGFILE.RECORD:
            ON END (2) GOTO READ.LOGFILE.ERROR
            READ #2;CALLNBR%,ETYPE$,ANO%,ACNT,MSG$,MODE$,ENDCHAR$,TEXT$
            LET STAT$="OK"
            RETURN
READ.LOGFILE.ERROR:
            LET STAT$="END"
            RETURN
REM------------------------------------------------------
WRITE.LOGFILE.RECORD:
            ON END (2) GOTO WRITE.LOGFILE.ERROR
            WRITE  #2;CALLNBR%,ETYPE$,ANO%,ACNT,MSG$,MODE$,ENDCHAR$,TEXT$
            LET STAT$="OK"
            RETURN
WRITE.LOGFILE.ERROR:
            LET STAT$="END"
            RETURN
REM------------------------------------------------------
SETUP.INITIAL.LOG.RECORD:
            LET ETYPE$="EM"
            LET ANO%=0
            LET ACNT=0
            LET MSG$=" "
            LET MODE$=" "
            LET ENDCHAR$=" "
            LET TEXT$=" "
            RETURN
REM------------------------------------------------------
MOVE.FROM.ANOTHER:
            ON END (2) GOTO MOVE.OPEN.ERROR
            OPEN "I",2,CFILE2$
            GOTO MOVE.SETUP.MOVE
MOVE.OPEN.ERROR:
            PRINT
            PRINT "****** BIG PROBLEM - LOG FILE NOT THERE FOR MOVE *****"
            LET WORK%=CONCHAR
            GOTO RETURN.TO.MENU
MOVE.SETUP.MOVE:
            PRINT
            PRINT "Copying information from selected call."
            LET MOVENBR%=WANO%(WORKNBR%)
            LET INSERTFIRST$="NO"
MOVE.READ.LOGFILE:
            GOSUB READ.LOGFILE.RECORD
            IF STAT$="END" THEN GOTO MOVE.CLOSE.FILE
            IF CALLNBR%>MOVENBR% THEN GOTO MOVE.CLOSE.FILE
```

```
        IF CALLNBR%(MOVENBR% THEN GOTO MOVE.READ.LOGFILE
        IF GETTYPE$="RESPONSE" THEN GOTO MOVE.CHECK.RESPONSE
        IF GETTYPE$()"LOG" THEN GOTO MOVE.CLOSE.FILE
        IF ETYPE$="PH" THEN GOTO MOVE.RECORD.MOVE
        IF ETYPE$="CR" THEN GOTO MOVE.RECORD.MOVE
        IF ETYPE$="RD" THEN GOTO MOVE.RECORD.MOVE
        IF ETYPE$="SL" THEN GOTO MOVE.RECORD.MOVE
        IF ETYPE$="SN" THEN GOTO MOVE.RECORD.MOVE
        IF ETYPE$="**" THEN GOTO MOVE.RECORD.MOVE
        GOTO MOVE.READ.LOGFILE
MOVE.CHECK.RESPONSE:
        IF ETYPE$="CD" THEN GOTO MOVE.RECORD.MOVE
        IF ETYPE$="CN" THEN GOTO MOVE.RECORD.MOVE
        IF ETYPE$="CM" THEN GOTO MOVE.RECORD.MOVE
        IF ETYPE$="CW" THEN GOTO MOVE.RECORD.MOVE
        GOTO MOVE.READ.LOGFILE
MOVE.RECORD.MOVE:
        LET WETYPE$(WORKNBR%)=ETYPE$
        LET WANO%(WORKNBR%)=ANO%
        LET WACNT(WORKNBR%)=ACNT
        LET WMSG$(WORKNBR%)=MSG$
        LET WMODE$(WORKNBR%)=MODE$
        LET WENDCHAR$(WORKNBR%)=ENDCHAR$
        LET WTEXT$(WORKNBR%)=TEXT$
        LET WORKNBR%=WORKNBR%+1
        IF WORKNBR%)NBRENTRY% THEN GOTO MOVE.CLOSE.FILE
        GOTO MOVE.READ.LOGFILE
MOVE.CLOSE.FILE:
        CLOSE 2
        RETURN
REM--------------------------------------------------------
SETUP.DISPLAY.WORK:
        LET WORK$=WETYPE$(WORKNBR%)
        IF WETYPE$(WORKNBR%)="PH" THEN GOTO SETUP.PHONE
        IF WETYPE$(WORKNBR%)="CR" THEN GOTO SETUP.SEND
        IF WETYPE$(WORKNBR%)="RD" THEN GOTO SETUP.READ
        IF WETYPE$(WORKNBR%)="SL" THEN GOTO SETUP.SEND
        IF WETYPE$(WORKNBR%)="SN" THEN GOTO SETUP.SEND
        IF WETYPE$(WORKNBR%)="**" THEN GOTO SETUP.LOG.END
        IF WETYPE$(WORKNBR%)="CD" THEN GOTO SETUP.MATCH
        IF WETYPE$(WORKNBR%)="CN" THEN GOTO SETUP.NO.MATCH
        IF WETYPE$(WORKNBR%)="CM" THEN GOTO SETUP.MATCH
        IF WETYPE$(WORKNBR%)="CW" THEN GOTO SETUP.MATCH
        LET WORK$=WORK$+"=(UNKNOWN VALUE)"
        GOTO SETUP.END
SETUP.PHONE:
        LET WORK$=WORK$+", "+WMSG$(WORKNBR%)
        GOTO SETUP.END
SETUP.SEND:
        LET WORK$=WORK$+", "+TRIM$(STR$(WANO%(WORKNBR%)))
        LET WORK$=WORK$+", "+TRIM$(STR$(FIX(WACNT(WORKNBR%))))
        LET WORK$=WORK$+", "+WMSG$(WORKNBR%)+", "+WENDCHAR$(WORKNBR%)
        GOTO SETUP.END
SETUP.READ:
        LET WORK$=WORK$+", "+TRIM$(STR$(FIX(WACNT(WORKNBR%))))
        LET WORK$=WORK$+", "+WENDCHAR$(WORKNBR%)
        GOTO SETUP.END
```

```
SETUP.LOS.END:
        LET WORK$=WORK$+","+WMSG$(WORKNBR%)
        GOTO SETUP.END
SETUP.NO.MATCH:
        LET WORK$=WORK$+","+WMSG$(WORKNBR%)+","+WMODE$(WORKNBR%)
        LET WORK$=WORK$+","+WENDCHAR$(WORKNBR%)
        GOTO SETUP.END
SETUP.MATCH:
        LET WORK$=WORK$+","+WMSG$(WORKNBR%)+","+WMODE$(WORKNBR%)
        LET WORK$=WORK$+","+WENDCHAR$(WORKNBR%)+","+WTEXT$(WORKNBR%)
        GOTO SETUP.END
SETUP.END:
        LET WORK2$=LEFT$(WORK$,38)
        LET WORK$=WORK2$
        RETURN
REM-----------------------------------------------------------
ENTRY.BLOCK.SETUP:
        LET HAVECALLNBR$="YES"
        IF CALLNBR%=LASTCALL% THEN LET WORKNBR%=WORKNBR%+1
        IF CALLNBR%()LASTCALL% THEN LET WORKNBR%=1
        IF CALLNBR%()LASTCALL% THEN LET LASTCALL%=CALLNBR%
        LET WETYPE$(WORKNBR%)=ETYPE$
        LET WANO%(WORKNBR%)=ANO%
        LET WACNT(WORKNBR%)=ACNT
        LET WMSG$(WORKNBR%)=YSG$
        LET WMODE$(WORKNBR%)=MODE$
        LET WENDCHAR$(WORKNBR%)=ENDCHAR$
        LET WTEXT$(WORKNBR%)=TEXT$
        GOSUB ENTRY.BLOCK
        LET HAVECALLNBR$="NO"
        RETURN
REM-----------------------------------------------------------
ENTRY.BLOCK:
        PRINT "============================================================"
        PRINT "I *** CURRENT VALUE (ENTRY:";WORKNBR%;") ***"
        IF WETYPE$(WORKNBR%)()"EM" THEN GOTO ENTRY.BLOCK.ETYPE.OUT
                PRINT "I";TAB(6);"EMPTY ENTRY"
                GOTO ENTRY.BLOCK.BOTTOM
ENTRY.BLOCK.ETYPE.OUT:
        PRINT "I ";TAB(6);"    CALL NUMBER: ";
        IF HAVECALLNBR$="YES" THEN PRINT USING "##";CALLNBR%;
        IF HAVECALLNBR$="NO" THEN PRINT USING "##";CALLSELECT%;
        PRINT TAB(40);"     ENTRY TYPE: ";WETYPE$(WORKNBR%)
        IF WETYPE$(WORKNBR%)="PH" THEN GOTO ENTRY.BLOCK.MSG.OUT
        IF WETYPE$(WORKNBR%)="**" THEN GOTO ENTRY.BLOCK.MSG.OUT
        IF WETYPE$(WORKNBR%)="CD" THEN GOTO ENTRY.BLOCK.MSG.OUT
        IF WETYPE$(WORKNBR%)="CN" THEN GOTO ENTRY.BLOCK.MSG.OUT
        IF WETYPE$(WORKNBR%)="CM" THEN GOTO ENTRY.BLOCK.MSG.OUT
        IF WETYPE$(WORKNBR%)="CW" THEN GOTO ENTRY.BLOCK.MSG.OUT
        PRINT "I ";TAB(6);" CALL/RETRY COUNT: ";
        IF WANO%(WORKNBR%)=0 THEN PRINT "None Specified";
        IF WANO%(WORKNBR%)()0 THEN PRINT USING "###";WANO%(WORKNBR%);
REM     PRINT TAB(40);"RETRY WAIT SECONDS: ";
REM     IF WACNT(WORKNBR%)=0 THEN PRINT "None Specified"
REM     IF WACNT(WORKNBR%)=0 THEN GOTO ENTRY.BLOCK.MSG.OUT
REM     LET SECONDS%=FIX(WACNT(WORKNBR%))
REM     LET SECONDS2%=SECONDS%\1000
```

```
REM     PRINT USING "##";SECONDS2%
ENTRY.BLOCK.MSG.OUT:
        IF WETYPE$(WORKNBR%)="RD" THEN GOTO ENTRY.BLOCK.MODE.ENDCHAR.OUT
        PRINT "I ";TAB(6);"  MESSAGE TO SEND: ";
        IF WMSG$(WORKNBR%)=" " OR WMSG$(WORKNBR%)="" THEN GOTO ENTRY.BLOCK.NO.MSG
        PRINT WMSG$(WORKNBR%)
        GOTO ENTRY.BLOCK.CHECK.MODE.ENDCHAR
ENTRY.BLOCK.NO.MSG:
        PRINT "None Specified"
ENTRY.BLOCK.CHECK.MODE.ENDCHAR:
REM     IF WETYPE$(WORKNBR%)="PH" THEN GOTO ENTRY.BLOCK.BOTTOM
        IF WETYPE$(WORKNBR%)="**" THEN GOTO ENTRY.BLOCK.BOTTOM
ENTRY.BLOCK.MODE.ENDCHAR.OUT:
        PRINT "I ";TAB(6);"    RESPONSE MODE: ";
        IF WMODE$(WORKNBR%)=" " THEN PRINT "None Specified";
        IF WMODE$(WORKNBR%)()" " THEN PRINT WMODE$(WORKNBR%);
        PRINT TAB(40);"   END CHAR/PROMPT: ";
        IF WENDCHAR$(WORKNBR%)=" " THEN PRINT "None Specified"
        IF WENDCHAR$(WORKNBR%)()" " THEN PRINT WENDCHAR$(WORKNBR%)
        IF WETYPE$(WORKNBR%)="P-" THEN GOTO ENTRY.BLOCK.BOTTOM
        IF WETYPE$(WORKNBR%)="CR" THEN GOTO ENTRY.BLOCK.BOTTOM
        IF WETYPE$(WORKNBR%)="RD" THEN GOTO ENTRY.BLOCK.BOTTOM
        IF WETYPE$(WORKNBR%)="SL" THEN GOTO ENTRY.BLOCK.BOTTOM
        IF WETYPE$(WORKNBR%)="SN" THEN GOTO ENTRY.BLOCK.BOTTOM
        IF WETYPE$(WORKNBR%)="CN" THEN GOTO ENTRY.BLOCK.BOTTOM
        PRINT "I ";TAB(6);"    TEXT TO MATCH: ";
        IF WTEXT$(WORKNBR%)=" " OR WTEXT$(WORKNBR%)="" THEN GOTO ENTRY.BLOCK.NO.TEXT
        PRINT WTEXT$(WORKNBR%)
        GOTO ENTRY.BLOCK.BOTTOM
ENTRY.BLOCK.NO.TEXT:
        PRINT "None Specified"
ENTRY.BLOCK.BOTTOM:
        PRINT "============================================================"
        RETURN
REM------------------------------------------------------------(CONTROLFILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",1,CTLFILE1$,CTLLENGTH%
        LET WORK%=1
        GOTO CONTROLFILE.GET.RECORD
CONTROLFILE.NO.FILE:
        FOR LLINE%=1 TO 25
                PRINT
        NEXT LLINE%
        PRINT "NO CONTROL FILE. RETURNING TO MENU"
        GOTO RETURN.TO.MENU
CONTROLFILE.GET.RECORD:
        GOSUB READ.CONTROLFILE.RECORD
        IF STAT$="END"     THEN GOTO CONTROLFILE.CLOSE
        IF NAME$="ENDALL"  THEN GOTO CONTROLFILE.CLOSE
        LET IWORK%=FIX(VAL(LEFT$(VALUEONE$,4)))
        IF NAME$="BLANK"   THEN BLANK$=CHR$(IWORK%)
        IF NAME$="CTITLE"  THEN CTITLE$=VALUEONE$
        IF NAME$="CURRDAY" THEN CURRDAY$=VALUEONE$
```

```
        IF NAME$="HEADING"  THEN HEADING$=VALUEONE$
        IF NAME$="PASSWORD" THEN PASSWORD$=VALUEONE$
        IF NAME$="PNEWPAGE" THEN PNEWPAGE$=CHR$(IWORK%)
        IF NAME$="PRINTER"  THEN PRINTER$=VALUEONE$
        IF NAME$="SHOME"    THEN SHOME$=CHR$(IWORK%)
        IF NAME$="SCLEAR"   THEN SCLEAR$=CHR$(IWORK%)
        IF NAME$="TECH"     THEN TECH$=VALUEONE$
        IF NAME$="TITLE"    THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.CLOSE:
        CLOSE 1
REM----------------------------------------------------(CHECK PASSWORD)
CHECK.PASSWORD:
        GOSUB SCREEN.HEADING
        PRINT "What is the password to perform restricted functions?"
        GOSUB GET.KEY.INPUT
        LET UCASEPASS$=UCASE$(WORK$)
        LET WORK$=UCASEPASS$
        IF WORK$=PASSWORD$ THEN GOTO LOGFILE.OPEN
            PRINT
            PRINT
            PRINT "**************** INCORRECT PASSWORD ***********************"
            PRINT "*                                                          *"
            PRINT "*  You shouldn't be trying this function.                  *"
            PRINT "*  Press RETURN to go back to the menu.                    *"
            PRINT "*                                                          *"
            PRINT "************************************************************"
            WORK%=CONCHAR
            GOTO RETURN.TO.MENU
REM----------------------------------------------------(LOGFILE SETUP)
LOGFILE.OPEN:
        GOSUB SCREEN.HEADING
        PRINT "Opening the Log files."
        ON END (1) GOTO LOGFILE.INITIALIZE
        OPEN "I",1,CFILE1$
LOGFILE.DELETE.WORK:
        ON END (2) GOTO LOGFILE.CREATE.WORK
        OPEN "I",2,CFILE2$
        DELETE 2
LOGFILE.CREATE.WORK:
        OPEN "O",2,CFILE2$
        PRINT
        PRINT "Saving a backup version for these calls, before changes."
        PRINT
        ON END (1) GOTO LOGFILE.READ.END
        LET INDEX%=2
        LET LASTCALL%=0
LOGFILE.READ.LOOP:
        READ #1;CALLNBR%,ETYPE$,ANO%,ACNT,MSG$,MODE$,ENDCHAR$,TEXT$
        WRITE #2;CALLNBR%,ETYPE$,ANO%,ACNT,MSG$,MODE$,ENDCHAR$,TEXT$
        IF LASTCALL%=CALLNBR% THEN GOTO LOGFILE.READ.LOOP
        IF INDEX%>70 THEN GOTO LOGFILE.READ.CHK.NEXT
LOGFILE.READ.SETUP.NEXT:
        IF TECH$="YES" THEN PRINT TAB(INDEX%);CALLNBR%;
```

```
            LET LASTCALL%=CALLNBR%
            LET INDEX%=INDEX%+5
            GOTO LOGFILE.READ.LOOP
LOGFILE.READ.CHK.NEXT:
            LET INDEX%=2
            IF TECH$="YES" THEN PRINT
            GOTO LOGFILE.READ.SETUP.NEXT
LOGFILE.READ.END:
            PRINT
            CLOSE 1
            CLOSE 2
            GOTO DISPLAY.FUNCTIONS
LOGFILE.INITIALIZE:
            PRINT
            OPEN "O",1,CFILE1$
            PRINT "Created a new ";CFILE1$;" file."
            CLOSE 1
            OPEN "I",1,CFILE1$
            GOTO LOGFILE.DELETE.WORK
REM--------------------------------------------------------(DISPLAY FUNCTIONS)
DISPLAY.FUNCTIONS:
            GOSUB SCREEN.HEADINGS
            PRINT "Available functions are:"
            PRINT
            PRINT TAB(15);"(U)pdate log file values"
            PRINT TAB(15);"(D)isplay Log File Report"
            PRINT TAB(15);"(P)rint Log File Report"
            PRINT TAB(15);"(Q)uit"
DISPLAY.RESPONSE:
            PRINT
            INPUT "What function do you want to perform?",WORK$
            ANSWER2$=LEFT$(WORK$,1)
            FUNCTION$=UCASE$(ANSWER2$)
            IF FUNCTION$="U" THEN GOTO WHICH.CALL
            IF FUNCTION$="D" THEN GOTO DISPLAY.SELECTION
            IF FUNCTION$="P" THEN GOTO DISPLAY.SELECTION
            IF FUNCTION$="Q" THEN GOTO RESET.FILES
            PRINT "RESPONSE MUST BE U, D, P, OR Q.  RE-ENTER."
            GOTO DISPLAY.RESPONSE
DISPLAY.SELECTION:
            PRINT
            INPUT "What do you want listed ((A)ll, (S)ingle, (Q)uit)? ",WORK$
            ANSWER2$=LEFT$(WORK$,1)
            SELECTION$=UCASE$(ANSWER2$)
            LET CALLSELECT%=2
            IF SELECTION$="A" AND FUNCTION$="P" THEN GOTO PRNT.LOG.FILE
            IF SELECTION$="A" AND FUNCTION$="D" THEN GOTO LIST.LOG.FILE
            IF SELECTION$="S" THEN GOTO WHICH.CALL
            IF SELECTION$="Q" THEN GOTO DISPLAY.FUNCTIONS
            PRINT "RESPONSE MUST BE (A)LL, (S)INGLE, OR (Q)UIT. RE-ENTER."
            GOTO DISPLAY.SELECTION
REM--------------------------------------------------------(SELECT CALL)
WHICH.CALL:
            PRINT
            INPUT "Do you want a display of the defined calls? ",WORK$
            ANSWER2$=LEFT$(WORK$,1)
            ANSWER$=UCASE$(ANSWER2$)
```

```
        IF ANSWER$="N" THEN GOTO SPECIFIC.CALL
        IF ANSWER$="Y" THEN GOTO DISPLAY.CALLS
        PRINT "RESPONSE MUST BE Y OR N. RE-ENTER."
        GOTO WHICH.CALL
SPECIFIC.CALL:
        PRINT
        INPUT "What call do you want to work with ((Q) to quit)? ",WORK$
        ANSWER2$=LEFT$(WORK$,1)
        ANSWER$=UCASE$(ANSWER2$)
        IF ANSWER$="Q" THEN GOTO DISPLAY.FUNCTIONS
        LET CALLSELECT%=FIX(VAL(LEFT$(WORK$,4)))
        IF CALLSELECT%>0 AND CALLSELECT%<CALLMAX%+1 THEN GOTO SPECIFIC.BRANCH
        PRINT "SELECTED CALL MUST BE 1 THRU";CALLMAX%;". RE-ENTER."
        GOTO SPECIFIC.CALL
SPECIFIC.BRANCH:
        IF FUNCTION$="U" THEN GOTO UPDATE.VALUES
        IF FUNCTION$="D" THEN GOTO LIST.LOG.FILE
        IF FUNCTION$="P" THEN GOTO PRNT.LOG.FILE
        PRINT "INVALID FUNCTION. SHOULD NOT GET HERE."
        PRINT "Press RETURN to go back to the function selection.";
        WORK%=CONCHAR
        GOTO DISPLAY.FUNCTIONS
DISPLAY.CALLS:
        GOSUB SCREEN.HEADING
        PRINT "Calls with currently defined responses:"
        PRINT
        REC%=0
        ON END (2) GOTO DISPLAY.OPEN.ERROR
        OPEN "I",2,CFILE2$
        LET INDEX%=2
        LET LASTCALL%=0
        GOTO DISPLAY.ENTRY
DISPLAY.OPEN.ERROR:
        PRINT "****** BIG PROBLEM - WORK FILE NOT THERE FOR SELECTION *****"
        LET WORK%=CONCHAR
        GOTO RETURN.TO.MENU
DISPLAY.ENTRY:
        GOSUB READ.LOGFILE.RECORD
        IF STAT$="END" THEN GOTO DISPLAY.END
        IF ETYPE$="EM" THEN GOTO DISPLAY.ENTRY
        IF CALLNBR%=LASTCALL% THEN GOTO DISPLAY.ENTRY
        IF INDEX%>70 THEN PRINT: LET INDEX%=2
        PRINT TAB(INDEX%);CALLNBR%;
        LET LASTCALL%=CALLNBR%
        LET INDEX%=INDEX%+5
        GOTO DISPLAY.ENTRY
DISPLAY.END:
        CLOSE 2
        PRINT
        GOTO SPECIFIC.CALL
REM---------------------------------------------------------(UPDATE CALL VALUES)
UPDATE.VALUES:
        GOSUB SETUP.INITIAL.LOG.RECORD
        FOR WORKNBR%=1 TO NBRENTRY%
                LET WETYPE$(WORKNBR%)=ETYPE$
                LET WANO%(WORKNBR%)=ANO%
                LET WACNT(WORKNBR%)=ACNT
```

```
                LET WYSS$(WORKNBR%)=YSS$
                LET WMODE$(WORKNBR%)=MODE$
                LET WENDCHAR$(WORKNBR%)=ENDCHAR$
                LET WTEXT$(WORKNBR%)=TEXT$
        NEXT WORKNBR%
        ON END (2) GOTO UPDATE.OPEN.ERROR
        OPEN "I",2,CFILE2$
        LET INDEX%=2
        LET WORKNBR%=0
        LET LASTCALL%=0
        GOTO UPDATE.READ.CURRENT
UPDATE.OPEN.ERROR:
        PRINT
        PRINT "****** BIG PROBLEM - WORK FILE NOT THERE FOR UPDATE *****"
        LET WORK%=CONCHAR
        GOTO RETURN.TO.MENU
UPDATE.READ.CURRENT:
        GOSUB READ.LOGFILE.RECORD
        IF STAT$="END" THEN GOTO UPDATE.HOUSEKEEPING
        IF CALLNBR%>CALLSELECT% THEN GOTO UPDATE.HOUSEKEEPING
        IF CALLNBR%<CALLSELECT% THEN GOTO UPDATE.READ.CURRENT
        LET WORKNBR%=WORKNBR%+1
        IF WORKNBR%>NBRENTRY% THEN GOTO UPDATE.HOUSEKEEPING
        LET WETYPE$(WORKNBR%)=ETYPE$
        LET WANO%(WORKNBR%)=ANO%
        LET WACNT(WORKNBR%)=ACNT
        LET WMSS$(WORKNBR%)=MSS$
        LET WMODE$(WORKNBR%)=MODE$
        LET WENDCHAR$(WORKNBR%)=ENDCHAR$
        LET WTEXT$(WORKNBR%)=TEXT$
        IF LASTCALL%=CALLNBR% THEN GOTO UPDATE.READ.CURRENT
        IF INDEX%>70 THEN PRINT: LET INDEX%=2
        PRINT TAB(INDEX%);CALLNBR%;
        LET INDEX%=INDEX%+5
        LET LASTCALL%=CALLNBR%
        GOTO UPDATE.READ.CURRENT
UPDATE.HOUSEKEEPING:
        CLOSE 2
REM----------------------------------------------------------(DISPLAY ENTRIES)
UPDATE.DISPLAY.WORK:
        GOSUB SCREEN.HEADING
        PRINT "Current instructions for call";CALLSELECT%;":"
        PRINT
        WORKNBR%=0
        WORKMAXNBR%=0
UPDATE.DISPLAY.WORK.LEFT:
        LET WORKNBR%=WORKNBR%+1
        IF WORKNBR%>NBRENTRY% THEN GOTO UPDATE.SELECT.WORK
        IF WETYPE$(WORKNBR%)="EM" THEN GOTO UPDATE.DISPLAY.WORK.LEFT
        GOSUB SETUP.DISPLAY.WORK
        PRINT USING "##";WORKNBR%;
        PRINT TAB(4);".. ";WORK$;
        IF WORKNBR%>WORKMAXNBR% THEN WORKMAXNBR%=WORKNBR%
UPDATE.DISPLAY.WORK.RIGHT:
        LET WORKNBR%=WORKNBR%+1
        IF WORKNBR%>NBRENTRY% THEN PRINT: GOTO UPDATE.SELECT.WORK
        IF WETYPE$(WORKNBR%)="EM" THEN GOTO UPDATE.DISPLAY.WORK.RIGHT
```

```
        GOSUB SETUP.DISPLAY.WORK
        PRINT TAB(38);" ";
        PRINT USING "##";WORKNBR%;
        PRINT TAB(42);".. ";WORK$
        IF WORKNBR%>WORKMAXNBR% THEN WORKMAXNBR%=WORKNBR%
        GOTO UPDATE.DISPLAY.WORK.LEFT
UPDATE.SELECT.WORK:
        PRINT
        INPUT "What entry do you want to change ((Q) to quit)? ",WORK$
        ANSWER2$=LEFT$(WORK$,1)
        ANSWER$=UCASE$(ANSWER2$)
        IF ANSWER$="Q" THEN GOTO UPDATE.YES.OR.NO
        LET WORKNBR%=FIX(VAL(LEFT$(WORK$,4)))
        IF WORKNBR%>0 AND WORKNBR%<NBRENTRY%+1 THEN GOTO UPDATE.SELECTED.ENTRY
        PRINT "MUST BE 1 THRU";NBRENTRY%;". RE-ENTER."
        GOTO UPDATE.SELECT.WORK
REM----------------------------------------------------------------(UPDATE THE WORK FILE)
UPDATE.YES.OR.NO:
        PRINT
        INPUT "Do you want update the log file with these values (Y,N,D,Q)? ",WORK$
        ANSWER2$=LEFT$(WORK$,1)
        ANSWER$=UCASE$(ANSWER2$)
        IF ANSWER$="Y" THEN GOTO UPDATE.CHECK.LOGIC
        IF ANSWER$="N" THEN GOTO DISPLAY.CALLS
        IF ANSWER$="D" THEN GOTO UPDATE.DELETE.CONFIRMATION
        IF ANSWER$="Q" THEN GOTO DISPLAY.CALLS
        PRINT "RESPONSE MUST BE (Y)ES, (N)O, (D)ELETE, OR (Q)UIT. RE-ENTER."
        GOTO UPDATE.YES.OR.NO
UPDATE.DELETE.CONFIRMATION:
        PRINT
        PRINT "THIS ACTION DELETES THE CALL INSTRUCTIONS FOR THE SELECTED CALL."
UPDATE.DELETE.RESPONSE:
        INPUT "Do you really want to delete these instuctions? ",WORK$
        ANSWER2$=LEFT$(WORK$,1)
        ANSWER$=UCASE$(ANSWER2$)
        IF ANSWER$="Y" THEN GOTO UPDATE.DELETE.INITIALIZE
        IF ANSWER$="N" THEN GOTO UPDATE.DISPLAY.WORK
        PRINT "RESPONSE MUST BE (Y)ES OR (N)O. RE-ENTER."
        PRINT
        GOTO UPDATE.DELETE.RESPONSE
UPDATE.CHECK.LOGIC:
        GOSUB SCREEN.HEADING
        PRINT "Checking the consistency of the call definition:"
        PRINT
        LET MSG$=")))ERROR(((  "
        LET WORKNBR%=1
        LET HAVELOG%=0
        LET HAVEEND%=0
        LET LOGICERROR$="NO"
        LET INLOGVALUES$="YES"
        IF WETYPE$(WORKNBR%)="PH" THEN HAVELG$="NO": GOTO UPDATE.CHECK.01
        PRINT MSG$+"First entry must be 'PH'."
        LET LOGICERROR$="YES"
UPDATE.CHECK.01:
        IF WETYPE$(WORKMAXNBR%)="**" THEN GOTO UPDATE.CHECK.02
        IF WETYPE$(WORKMAXNBR%)="CD" AND WMODE$(WORKMAXNBR%)="*" THEN GOTO UPDATE.CHECK.02
        IF WETYPE$(WORKMAXNBR%)="CN" AND WMODE$(WORKMAXNBR%)="*" THEN GOTO UPDATE.CHECK.02
```

```
        IF WETYPE$(WORKMAXNBR%)="CM" AND WMODE$(WORKMAXNBR%)="*" THEN GOTO UPDATE.CHECK.02
        IF WETYPE$(WORKMAXNBR%)="CW" AND WMODE$(WORKMAXNBR%)="*" THEN GOTO UPDATE.CHECK.02
        PRINT MSG$+"Last entry (";TRIM$(STR$(WORKMAXNBR%));") must be '**', 'RP', or have mode '*'."
        LET LOGICERROR$="YES"
UPDATE.CHECK.02:
        LET WORKNBR%=WORKNBR%+1
        IF WORKNBR%)WORKMAXNBR% THEN GOTO UPDATE.CHECK.DONE
        IF WETYPE$(WORKNBR%)="PH" THEN GOTO UPDATE.CHECK.03
        IF WETYPE$(WORKNBR%)="**" THEN GOTO UPDATE.CHECK.04
        IF WETYPE$(WORKNBR%)="CR" AND INLOGVALUES$="YES" THEN GOTO UPDATE.CHECK.02
        IF WETYPE$(WORKNBR%)="CR" THEN GOTO UPDATE.CHECK.03
        IF WETYPE$(WORKNBR%)="RD" AND INLOGVALUES$="YES" THEN GOTO UPDATE.CHECK.02
        IF WETYPE$(WORKNBR%)="RD" THEN GOTO UPDATE.CHECK.03
        IF WETYPE$(WORKNBR%)="SL" AND INLOGVALUES$="YES" THEN GOTO UPDATE.CHECK.02
        IF WETYPE$(WORKNBR%)="SL" THEN GOTO UPDATE.CHECK.03
        IF WETYPE$(WORKNBR%)="SN" AND INLOGVALUES$="YES" THEN GOTO UPDATE.CHECK.02
        IF WETYPE$(WORKNBR%)="SN" THEN GOTO UPDATE.CHECK.03
        IF WETYPE$(WORKNBR%)="CD" AND INLOGVALUES$="NO" THEN GOTO UPDATE.CHECK.06
        IF WETYPE$(WORKNBR%)="CD" THEN GOTO UPDATE.CHECK.03
        IF WETYPE$(WORKNBR%)="CN" AND INLOGVALUES$="NO" THEN GOTO UPDATE.CHECK.06
        IF WETYPE$(WORKNBR%)="CN" THEN GOTO UPDATE.CHECK.03
        IF WETYPE$(WORKNBR%)="CM" AND INLOGVALUES$="NO" THEN GOTO UPDATE.CHECK.06
        IF WETYPE$(WORKNBR%)="CM" THEN GOTO UPDATE.CHECK.03
        IF WETYPE$(WORKNBR%)="CW" AND INLOGVALUES$="NO" THEN GOTO UPDATE.CHECK.06
        IF WETYPE$(WORKNBR%)="CW" THEN GOTO UPDATE.CHECK.03
        PRINT MSG$+"Entry "+TRIM$(STR$(WORKNBR%))+" has an invalid entry type."
        LET LOGICERROR$="YES"
        GOTO UPDATE.CHECK.02
UPDATE.CHECK.03:
        PRINT MSG$+"Entry "+TRIM$(STR$(WORKNBR%))+", with an entry type of "+WETYPE$(WORKNBR%)+" is misplaced."
        LET LOGICERROR$="YES"
        GOTO UPDATE.CHECK.02
UPDATE.CHECK.04:
        IF INLOGVALUES$="YES" THEN INLOGVALUES$="NO": GOTO UPDATE.CHECK.05
        PRINT MSG$+"Entry "+TRIM$(STR$(WORKNBR%))+" with a '**' entry type is misplaced."
        LET LOGICERROR$="YES"
        GOTO UPDATE.CHECK.02
UPDATE.CHECK.05:
        LET HAVELOG%=HAVELOG%+1
        IF HAVELOG%=1 THEN GOTO UPDATE.CHECK.02
        PRINT MSG$+"Entry "+TRIM$(STR$(WORKNBR%))+" is a multiple '**' entry, can only have one."
        LET LOGICERROR$="YES"
        GOTO UPDATE.CHECK.02
UPDATE.CHECK.06:
        IF WMODE$(WORKNBR%)()"*" THEN GOTO UPDATE.CHECK.02
        LET HAVEEND%=HAVEEND%+1
        IF HAVEEND%=1 THEN GOTO UPDATE.CHECK.02
        PRINT MSG$+"Entry "+TRIM$(STR$(WORKNBR%))+" is a multiple last mode entry, can only have one."
        LET LOGICERROR$="YES"
        GOTO UPDATE.CHECK.02
UPDATE.CHECK.DONE:
        IF LOGICERROR$="NO" THEN GOTO UPDATE.MASTER.FILE
        PRINT
        PRINT "PLEASE NOTE THESE ERRORS SO YOU CAN CORRECT THEM."
        PRINT "Press RETURN to current instructions display.";
        WORK%=CONCHAR
        GOTO UPDATE.DISPLAY.WORK
```

```
UPDATE.DELETE.INITIALIZE:
        GOSUB SETUP.INITIAL.LOG.RECORD
        FOR WORKNBR%=1 TO NBRENTRY%
                LET WETYPE$(WORKNBR%)=ETYPE$
                LET WANO%(WORKNBR%)=ANO%
                LET WACNT(WORKNBR%)=ACNT
                LET WMSG$(WORKNBR%)=MSG$
                LET WMODE$(WORKNBR%)=MODE$
                LET WENDCHAR$(WORKNBR%)=ENDCHAR$
                LET WTEXT$(WORKNBR%)=TEXT$
        NEXT WORKNBR%
        GOSUB SCREEN.HEADING
        PRINT "Deleting all entries for call specified."
        GOTO UPDATE.MASTER.DELETE
UPDATE.MASTER.FILE:
        GOSUB SCREEN.HEADING
        PRINT "Updating Working Log file with entered values."
UPDATE.MASTER.DELETE:
        ON END (2) GOTO UPDATE.MASTER.ERROR
        OPEN "I",2,CFILE2$
        ON END (5) GOTO UPDATE.CREATE.SECOND.WORK
        OPEN "I",5,CFILE5$
        DELETE 5
        GOTO UPDATE.CREATE.SECOND.WORK
UPDATE.MASTER.ERROR:
        PRINT "****** BIG PROBLEM - WORK FILE NOT THERE FOR MERGE UPDATE *****"
        LET WORK%=CONCHAR
        GOTO RETURN.TO.MENU
UPDATE.CREATE.SECOND.WORK:
        OPEN "O",5,CFILE5$
        LET OLDEND$="NO"
        ON END(2) GOTO UPDATE.OLD.END
                READ #2;CALLNBR%,ETYPE$,ANO%,ACNT,MSG$,MODE$,ENDCHAR$,TEXT$
        CLOSE 2
        OPEN "I",2,CFILE2$
        LET SAVERECORD$="NO"
        IF CALLSELECT%<CALLNBR% THEN GOTO UPDATE.MATRIX.SETUP
        IF CALLSELECT%=CALLNBR% THEN GOTO UPDATE.MATRIX.SETUP
UPDATE.MERGE.LOWER.VALUES:
        ON END (2) GOTO UPDATE.OLD.END
                READ #2;CALLNBR%,ETYPE$,ANO%,ACNT,MSG$,MODE$,ENDCHAR$,TEXT$
        IF CALLNBR%=CALLSELECT% THEN GOTO UPDATE.MATRIX.SETUP
        IF CALLNBR%>CALLSELECT% THEN GOTO UPDATE.SAVE.RECORD.VALUES
                WRITE #5;CALLNBR%,ETYPE$,ANO%,ACNT,MSG$,MODE$,ENDCHAR$,TEXT$
        GOTO UPDATE.MERGE.LOWER.VALUES
UPDATE.SAVE.RECORD.VALUES:
        LET SCALLNBR%=CALLNBR%
        LET SETYPE$=ETYPE$
        LET SANO%=ANO%
        LET SACNT=ACNT
        LET SMSG$=MSG$
        LET SMODE$=MODE$
        LET SENDCHAR$=ENDCHAR$
        LET STEXT$=TEXT$
        LET SAVERECORD$="YES"
        GOTO UPDATE.MATRIX.SETUP
UPDATE.OLD.END:
        LET OLDEND$="YES"
```

```
UPDATE.MATRIX.SETUP:
        LET WORKNBR%=0
        LET CALLNBR%=CALLSELECT%
UPDATE.MATRIX.LOOP:
        LET WORKNBR%=WORKNBR%+1
        IF WORKNBR%>WORKMAXNBR% THEN GOTO UPDATE.SKIP.PAST.OLD.VALUES
        IF WETYPE$(WORKNBR%)="EM" THEN GOTO UPDATE.MATRIX.LOOP
        LET ETYPE$=WETYPE$(WORKNBR%)
        LET ANO%=WANO%(WORKNBR%)
        LET ACNT=WACNT(WORKNBR%)
        LET MSG$=WMSG$(WORKNBR%)
        LET MODE$=WMODE$(WORKNBR%)
        LET ENDCHAR$=WENDCHAR$(WORKNBR%)
        LET TEXT$=WTEXT$(WORKNBR%)
        WRITE #5;CALLNBR%,ETYPE$,ANO%,ACNT,MSG$,MODE$,ENDCHAR$,TEXT$
        GOTO UPDATE.MATRIX.LOOP
UPDATE.SKIP.PAST.OLD.VALUES:
        IF SAVERECORD$="YES" THEN GOTO UPDATE.SAVE.NO.OLD.VALUES
        ON END (2) GOTO UPDATE.OLD.END.TWO
                READ #2;CALLNBR%,ETYPE$,ANO%,ACNT,MSG$,MODE$,ENDCHAR$,TEXT$
        IF CALLNBR%=CALLSELECT% THEN GOTO UPDATE.SKIP.PAST.OLD.VALUES
        GOTO UPDATE.MERGE.HIGHER.FIRST.RECORD
UPDATE.OLD.END.TWO:
        LET OLDEND$="YES"
        GOTO UPDATE.MERGE.HIGHER.VALUES
UPDATE.SAVE.NO.OLD.VALUES:
        LET CALLNBR%=SCALLNBR%
        LET ETYPE$=SETYPE$
        LET ANO%=SANO%
        LET ACNT=SACNT
        LET MSG$=SMSG$
        LET MODE$=SMODE$
        LET ENDCHAR$=SENDCHAR$
        LET TEXT$=STEXT$
        GOTO UPDATE.MERGE.HIGHER.FIRST.RECORD
UPDATE.MERGE.HIGHER.VALUES:
        ON END (2) GOTO UPDATE.CLOSE.AND.RENAME
        IF OLDEND$="YES" THEN GOTO UPDATE.CLOSE.AND.RENAME
                READ #2;CALLNBR%,ETYPE$,ANO%,ACNT,MSG$,MODE$,ENDCHAR$,TEXT$
UPDATE.MERGE.HIGHER.FIRST.RECORD:
                WRITE #5;CALLNBR%,ETYPE$,ANO%,ACNT,MSG$,MODE$,ENDCHAR$,TEXT$
        GOTO UPDATE.MERGE.HIGHER.VALUES
UPDATE.CLOSE.AND.RENAME:
        DELETE 2
        CLOSE 5
        REC%=RENAME(CFILE2$,CFILE5$)
        IF REC%=-1 THEN GOTO DISPLAY.CALLS
        PRINT "****** BIG PROBLEM - CANNOT RENAME SECOND WORK TO PRIMARY *****"
        WORK%=CONCHAR
        GOTO RETURN.TO.MENU
REM--------------------------------------------------------(SELECTED ENTRY UPDATE)
UPDATE.SELECTED.ENTRY:
        GOSUB SCREEN.HEADING
        GOSUB ENTRY.BLOCK
        PRINT
        PRINT "Available entry update functions are:"
        PRINT
```

```
            PRINT TAB(15);"(C)hange the entry values"
            PRINT TAB(15);"(D)elete the entry"
            PRINT TAB(15);"(I)nsert an entry prior to this one"
            PRINT TAB(15);"(Q)uit"
UPDATE.SELECTED.RESPONSE:
            PRINT
            INPUT "What function do you want to perform?",WORK$
            ANSWER2$=LEFT$(WORK$,1)
            ANSWER$=UCASE$(ANSWER2$)
            IF ANSWER$="C" THEN GOTO UPDATE.CHANGE.ENTRY
            IF ANSWER$="D" THEN GOTO UPDATE.DELETE.ENTRY
            IF ANSWER$="I" THEN GOTO UPDATE.INSERT.ENTRY
            IF ANSWER$="Q" THEN GOTO UPDATE.QUIT.ENTRY
            PRINT "RESPONSE MUST BE C, D, I, OR Q.  RE-ENTER."
            GOTO UPDATE.SELECTED.RESPONSE
REM----------------------------------------------------------(CHANGE ENTRY)
UPDATE.CHANGE.ENTRY:
            GOSUB SCREEN.HEADING
            GOSUB ENTRY.BLOCK
            PRINT TAB(15);"(LG) Copy Log Information from another call."
            PRINT TAB(15);"(PH) Specify Phone Number."
            PRINT TAB(15);"(CR) Character Response with non-keyable value."
            PRINT TAB(15);"(RD) Read for a specific value before processing next."
            PRINT TAB(15);"(SL) Read and Send Message with carriage return/line feed."
            PRINT TAB(15);"(SN) Read and Send Message with out carriage return/line feed."
            PRINT TAB(15);"(**) End of Logon, Indicate presence of responses."
            PRINT TAB(15);"(CD) Check for character/text, send response with date."
            PRINT TAB(15);"(CN) Check for single character, send response."
            PRINT TAB(15);"(CM) Check for text message, send response. Prompt on same line."
            PRINT TAB(15);"(CW) Check for text message, send response. Prompt on next line."
            PRINT TAB(15);"(RP) Copy Response Information from another call."
UPDATE.ENTRY.RESPONSE:
            PRINT
            INPUT "What is the Entry Type value? ",WORK$
            IF LEN(WORK$)()2 THEN GOTO UPDATE.ENTRY.ERROR.ONE
            LET ANSWER2$=UCASE$(WORK$)
            LET WORK$=ANSWER2$
            IF WORK$="LG" THEN GOTO UPDATE.LOG
            IF WORK$="PH" THEN GOTO UPDATE.PHONE
            IF WORK$="CR" THEN GOTO UPDATE.CHARACTER.SEND
            IF WORK$="RD" THEN GOTO UPDATE.READ
            IF WORK$="SL" THEN GOTO UPDATE.CHARACTER.SEND
            IF WORK$="SN" THEN GOTO UPDATE.CHARACTER.SEND
            IF WORK$="**" THEN GOTO UPDATE.LOG.END
            IF WORK$="CD" THEN GOTO UPDATE.COMPARE
            IF WORK$="CN" THEN GOTO UPDATE.NO.COMPARE
            IF WORK$="CM" THEN GOTO UPDATE.COMPARE
            IF WORK$="CW" THEN GOTO UPDATE.COMPARE
            IF WORK$="RP" THEN GOTO UPDATE.RESPONSE
            PRINT "NOT A VALID 2 CHARACTER CODE. RE-ENTER."
            GOTO UPDATE.ENTRY.RESPONSE
UPDATE.ENTRY.ERROR.ONE:
            PRINT "MUST BE A 2 CHARACTER CODE. RE-ENTER."
            GOTO UPDATE.ENTRY.RESPONSE
REM----------------------------------------------------------(PERFORM UPDATES)
UPDATE.LOG:
            LET SAVWORK$=WORK$
```

```
            GOSUB UPDATE.AND
            IF UPDATE$="NO" THEN GOTO UPDATE.DISPLAY.WORK
            LET GETTYPE$="LOG"
            GOSUB MOVE.FROM.ANOTHER
            GOTO UPDATE.DISPLAY.WORK
UPDATE.PHONE:
            LET WETYPE$(WORKNBR%)=WORK$
            LET WANO%(WORKNBR%)=0
            LET WACNT(WORKNBR%)=0
            GOSUB UPDATE.MSG
            LET WMODE$(WORKNBR%)=" "
REM         LET WENDCHAR$(WORKNBR%)=" "
            GOSUB UPDATE.ENDCHAR
            LET WTEXT$(WORKNBR%)=" "
            GOTO UPDATE.DISPLAY.WORK
UPDATE.CHARACTER.SEND:
            LET WETYPE$(WORKNBR%)=WORK$
            GOSUB UPDATE.AND
REM         GOSUB UPDATE.ACNT
            GOSUB UPDATE.MSG
            LET WMODE$(WORKNBR%)=" "
            GOSUB UPDATE.ENDCHAR
            LET WTEXT$(WORKNBR%)=" "
            GOTO UPDATE.DISPLAY.WORK
UPDATE.READ:
            LET WETYPE$(WORKNBR%)=WORK$
            LET WANO%(WORKNBR%)=0
REM         GOSUB UPDATE.ACNT
            LET WMSG$(WORKNBR%)=" "
            LET WMODE$(WORKNBR%)=" "
            GOSUB UPDATE.ENDCHAR
            LET WTEXT$(WORKNBR%)=" "
            GOTO UPDATE.DISPLAY.WORK
UPDATE.LOG.END:
            LET WETYPE$(WORKNBR%)=WORK$
            LET WANO%(WORKNBR%)=0
            LET WACNT(WORKNBR%)=0
            GOSUB UPDATE.MSG
            LET WMODE$(WORKNBR%)=" "
            LET WENDCHAR$(WORKNBR%)=" "
            LET WTEXT$(WORKNBR%)=" "
            GOTO UPDATE.DISPLAY.WORK
UPDATE.COMPARE:
            LET WETYPE$(WORKNBR%)=WORK$
            LET WANO%(WORKNBR%)=0
            LET WACNT(WORKNBR%)=0
            GOSUB UPDATE.MSG
            GOSUB UPDATE.MODE
            GOSUB UPDATE.ENDCHAR
            GOSUB UPDATE.TEXT
            GOTO UPDATE.DISPLAY.WORK
UPDATE.NO.COMPARE:
            LET WETYPE$(WORKNBR%)=WORK$
            LET WANO%(WORKNBR%)=0
            LET WACNT(WORKNBR%)=0
            GOSUB UPDATE.MSG
            GOSUB UPDATE.MODE
```

```
        GOSUB UPDATE.ENDCHAR
        LET WTEXT$(WORKNBR%)=" "
        GOTO UPDATE.DISPLAY.WORK
UPDATE.RESPONSE:
        LET SAVWORK$=WORK$
        GOSUB UPDATE.AND
        IF UPDATE$="NO" THEN GOTO UPDATE.DISPLAY.WORK
        LET GETTYPE$="RESPONSE"
        GOSUB MOVE.FROM.ANOTHER
        GOTO UPDATE.DISPLAY.WORK
REM----------------------------------------------------------------(UPDATE SUBROUTINE = AND)
UPDATE.AND:
        GOSUB SCREEN.HEADING
        IF SAVWORK$="LG" THEN GOTO UPDATE.AND.LG.RP
        IF SAVWORK$="RP" THEN GOTO UPDATE.AND.LG.RP
        GOSUB ENTRY.BLOCK
UPDATE.AND.RESPONSE:
        PRINT
        INPUT "How many times do you want to retry responding before stopping? ",WORK$
        LET WORK%=FIX(VAL(WORK$))
        IF WORK%>0 AND WORK%<501 THEN GOTO UPDATE.AND.RETURN
        PRINT "VALUE MUST BE BETWEEN 1 AND 500. RE-ENTER."
        GOTO UPDATE.AND.RESPONSE
UPDATE.AND.LG.RP:
        PRINT "***********************************************************"
        PRINT "*                                                         *"
        PRINT "*   This process transfers the information from another   *"
        PRINT "*   call to this call starting at the current position.   *"
        PRINT "*   The copied information REPLACES the current entry     *"
        PRINT "*   values.                                               *"
        PRINT "*                                                         *"
        PRINT "***********************************************************"
        LET UPDATE$="NO"
UPDATE.AND.LG.RP.RESPONSE:
        PRINT
        INPUT "Do you want to perform this information transfer (Y,N)? ",WORK$
        LET ANSWER$=LEFT$(WORK$,1)
        LET ANSWERW$=UCASE$(ANSWER$)
        IF ANSWERW$="Y" THEN GOTO UPDATE.AND.LG.RP.WHICH.ONE
        IF ANSWERW$="N" THEN RETURN
        PRINT "RESPONSE MUST BE (Y)ES OR (N)O. RE-ENTER."
        PRINT
        GOTO UPDATE.AND.LG.RP.RESPONSE
UPDATE.AND.LG.RP.WHICH.ONE:
        PRINT
        PRINT "Which call's ";
        IF SAVWORK$="LG" THEN PRINT "logon ";
        IF SAVWORK$="RP" THEN PRINT "response ";
        INPUT "information do you want to copy? ",WORK$
        LET WORK%=FIX(VAL(WORK$))
        IF WORK%>0 AND WORK%<CALLMAXX+1 THEN GOTO UPDATE.AND.LG.RP.UPDATE
                PRINT "VALUE MUST BE BETWEEN 1 AND";CALLMAXX;". RE-ENTER."
                GOTO UPDATE.AND.LG.RP.WHICH.ONE
UPDATE.AND.LG.RP.UPDATE:
        LET WETYPE$(WORKNBR%)=SAVWORK$
        LET SAVWORK$=" "
        LET UPDATE$="YES"
```

```
UPDATE.AND.RETURN:
        LET WANDX(WORKNBR%)=WORK%
        RETURN
REM----------------------------------------------------------------(UPDATE SUBROUTINE = ACNT)
UPDATE.ACNT:
        GOSUB SCREEN.HEADING
        GOSUB ENTRY.BLOCK
UPDATE.ACNT.RESPONSE:
        PRINT
        INPUT "How many seconds do you want to wait before retrying? ",WORK$
        LET WORK%=FIX(VAL(WORK$))
        IF WORK%>0 AND WORK%<31 THEN GOTO UPDATE.ACNT.RETURN
        PRINT "VALUE MUST BE BETWEEN 1 AND 30. RE-ENTER."
        GOTO UPDATE.ACNT.RESPONSE
UPDATE.ACNT.RETURN:
        LET WACNT(WORKNBR%)=WORK%*1000
        RETURN
REM----------------------------------------------------------------(UPDATE SUBROUTINE = MSG)
UPDATE.MSG:
        GOSUB SCREEN.HEADING
        GOSUB ENTRY.BLOCK
        PRINT
        LET WORK2$="/"
        IF WETYPE$(WORKNBR%)="CR" THEN GOTO UPDATE.MSG.CR
        IF WETYPE$(WORKNBR%)="CD" THEN GOTO UPDATE.MSG.CD
UPDATE.MSG.RESPONSE:
        IF WETYPE$(WORKNBR%)="PH" THEN GOTO UPDATE.MSG.PH
        IF WETYPE$(WORKNBR%)="**" THEN GOTO UPDATE.MSG.END
        PRINT "What response message do you want to send to the other computer:"
        GOTO UPDATE.MSG.GET.INPUT
UPDATE.MSG.PH:
        PRINT "What is the telephone number to be called";
        GOTO UPDATE.MSG.GET.INPUT
UPDATE.MSG.END:
        PRINT "Are there response definitions to be processed";
UPDATE.MSG.GET.INPUT:
        LINE INPUT "? ", WORK$
        IF LEN(WORK$)<MSGMAX%+1 THEN GOTO UPDATE.CHECK.MSG
        PRINT "MESSAGE IS TOO LONG. MUST BE";MSGMAX%;"CHARACTERS OR LESS."
        PRINT "SHORTENED TO:"
        LET WORK$=LEFT$(WORK$,MSGMAX%)
        PRINT TAB(13);WORK$
        PRINT
        GOTO UPDATE.MSG.RESPONSE
UPDATE.CHECK.MSG:
        IF WETYPE$(WORKNBR%)="PH" THEN GOTO UPDATE.CHECK.PHONE.NBR
        IF WETYPE$(WORKNBR%)<>"**" THEN GOTO UPDATE.MSG.RETURN
        LET ANSWER2$=LEFT$(WORK$,1)
        LET WORK$=UCASE$(ANSWER2$)
        IF WORK$="Y" THEN GOTO UPDATE.MSG.RETURN
        IF WORK$="N" THEN GOTO UPDATE.MSG.RETURN
        PRINT "RESPONSE MUST BE (Y)ES OR (N)O. RE-ENTER."
        PRINT
        GOTO UPDATE.MSG.RESPONSE
UPDATE.CHECK.PHONE.NBR:
        IF LEN(WORK$)>4 THEN GOTO UPDATE.CHECK.PHONE.NBR.TWO
        PRINT "NUMBER MUST BE MORE THAN FOUR DIGITS. RE-ENTER."
```

```
        PRINT
        GOTO UPDATE.MSG.RESPONSE
UPDATE.CHECK.PHONE.NBR.TWO:
        LET PHONENBR$=RIGHT$(WORK$,4)
        IF PHONENBR$)="0000" AND PHONENBR$(="9999" THEN GOTO UPDATE.MSG.RETURN
        PRINT "I CAN'T CHECK IT ALL, BUT THE LAST FOUR MUST BE NUMERIC. RE-ENTER."
        PRINT
        GOTO UPDATE.MSG.RESPONSE
UPDATE.MSG.CD:
        INPUT "Is the date used to retrieve a (D)isk file or a (R)eport? ",WORK$
        LET ANSWER$=LEFT$(WORK$,1)
        LET ANSWER1$=UCASE$(ANSWER$)
        IF ANSWER1$="D" THEN GOTO UPDATE.MSG.CD.FILE
        IF ANSWER1$="R" THEN GOTO UPDATE.MSG.CD.NORMAL
        PRINT "RESPONSE MUST BE (D)ISK FILE OR (R)EPORT. RE-ENTER."
        PRINT
        GOTO UPDATE.MSG.CD
UPDATE.MSG.CD.FILE:
        LET ANSWER3$=" "
        LET ANSWER4$=" "
        LET ANSWER5$=" "
        LET ANSWER6%=0
        LET ANSWER7$=" "
        LET ANSWER1$="B"
        GOTO UPDATE.MSG.CD.WHICH.DATE
REM*********************************************** LEFT IN FOR FUTURE EXPANSION
REM     INPUT "What type of data is to be received ((B)alance, (D)etail, (G)lobal)? ";WORK$
REM     LET ANSWER$=LEFT$(WORK$,1)
REM     LET ANSWER1$=UCASE$(ANSWER$)
REM     IF ANSWER1$="B" THEN GOTO UPDATE.MSG.CD.WHICH.DATE
REM     IF ANSWER1$="D" THEN GOTO UPDATE.MSG.CD.WHICH.DATE
REM     IF ANSWER1$="G" THEN GOTO UPDATE.MSG.CD.WHICH.DATE
REM     PRINT "RESPONSE MUST BE (B)ALANCE, (D)ETAIL, OR (G)LOBAL. RE-ENTER."
REM     PRINT
REM     GOTO UPDATE.MSG.CD.FILE
REM****************************************************************************
UPDATE.MSG.CD.NORMAL:
        LET ANSWER1$="N"
        LET ANSWER3$=" "
        LET ANSWER4$=" "
        LET ANSWER5$=" "
        LET ANSWER6%=0
        LET ANSWER7$=" "
        PRINT "Enter length of prefix to send with the date (between 0 and ";DPREFIXMAX%;")";
        INPUT "? ",WORK%
        IF WORK%(0 THEN _
           PRINT "DATE PREFIX LENGTH MUST BE GREATER THAN ZERO." :_
           GOTO UPDATE.MSG.CD.NORMAL
        IF WORK%)DPREFIXMAX% THEN _
           PRINT "DATE PREFIX LENGTH IS TOO LONG. MUST BE ";DPREFIXMAX%;" CHARACTERS OR LESS." :_
           GOTO UPDATE.MSG.CD.NORMAL
        IF WORK%=0 THEN GOTO UPDATE.MSG.CD.DATE
        ANSWER6%=WORK%
        PRINT "What is the date prefix (";ANSWER6%;" characters)";
        INPUT "? ",WORK$
        IF LEN(WORK$)()ANSWER6% THEN _
           PRINT "MUST BE EXACTLY ";ANSWER6%;" CHARACTERS IN LENGTH. RE-ENTER." :_
```

```
            IF LEN(WORK$)>ANSWER6% THEN _
                LET WORK$=LEFT$(WORK$,ANSWER6%) :_
                PRINT "SHORTENED TO: ";WORK$ :_
                GOTO UPDATE.MSG.CD.NORMAL :_
            ELSE _
                GOTO UPDATE.MSG.CD.NORMAL
        ANSWER7$=WORK$
UPDATE.MSG.CD.DATE:
        PRINT TAB(15);"(A)=MMDDYY  (B)=MM/DD/YY  (C)=YYMMDD  (D)=YY/MM/DD"
        PRINT TAB(15);"(E)=MMDD    (F)=MM/DD"
        INPUT "What date format is used in the response? ",WORK$
        LET ANSWER$=LEFT$(WORK$,1)
        LET ANSWER4$=UCASE$(ANSWER$)
        IF ANSWER4$="A" THEN GOTO UPDATE.MSG.CD.WHICH.DATE
        IF ANSWER4$="B" THEN GOTO UPDATE.MSG.CD.WHICH.DATE
        IF ANSWER4$="C" THEN GOTO UPDATE.MSG.CD.WHICH.DATE
        IF ANSWER4$="D" THEN GOTO UPDATE.MSG.CD.WHICH.DATE
        IF ANSWER4$="E" THEN GOTO UPDATE.MSG.CD.WHICH.DATE
        IF ANSWER4$="F" THEN GOTO UPDATE.MSG.CD.WHICH.DATE
        PRINT "RESPONSE MUST BE (A), (B), (C), (D), (E), OR (F). RE-ENTER."
        PRINT
        GOTO UPDATE.MSG.CD.DATE
UPDATE.MSG.CD.WHICH.DATE:
        INPUT "Which date is used ((P)rior work day, (C)urrent, (N)ext)? ",WORK$
        LET ANSWER$=LEFT$(WORK$,1)
        LET ANSWER5$=UCASE$(ANSWER$)
        IF ANSWER5$="P" THEN GOTO UPDATE.MSG.CD.CR
        IF ANSWER5$="C" THEN GOTO UPDATE.MSG.CD.CR
        IF ANSWER5$="N" THEN GOTO UPDATE.MSG.CD.CR
        PRINT "RESPONSE MUST BE (P)RIOR, (C)URRENT, OR (N)EXT. RE-ENTER."
        PRINT
        GOTO UPDATE.MSG.CD.WHICH.DATE
UPDATE.MSG.CD.CR:
        INPUT "Does the response require a carriage return and line feed? ",WORK$
        LET ANSWER$=LEFT$(WORK$,1)
        LET ANSWER2$=UCASE$(ANSWER$)
        IF ANSWER2$="Y" THEN GOTO UPDATE.MSG.CD.SPLIT
        IF ANSWER2$="N" THEN GOTO UPDATE.MSG.CD.FORMAT
        PRINT "RESPONSE MUST BE (Y)ES OR (N)O. RE-ENTER."
        PRINT
        GOTO UPDATE.MSG.CD.CR
UPDATE.MSG.CD.SPLIT:
        INPUT "Is the end character (prompt) on the same line as the text? ",WORK$
        LET ANSWER$=LEFT$(WORK$,1)
        LET ANSWERW$=UCASE$(ANSWER$)
        IF ANSWERW$="Y" THEN GOTO UPDATE.MSG.CD.FORMAT
        IF ANSWERW$="N" THEN LET ANSWER2$="S": GOTO UPDATE.MSG.CD.FORMAT
        PRINT "RESPONSE MUST BE (Y)ES OR (N)O. RE-ENTER."
        PRINT
        GOTO UPDATE.MSG.CD.SPLIT
UPDATE.MSG.CD.FORMAT:
        ANSWER6$=TRIM$(STR$(ANSWER6%))
        IF LEN(ANSWER6$)=1 THEN ANSWER6$="0"+ANSWER6$
        LET WORK$=ANSWER1$+ANSWER2$+ANSWER3$+ANSWER4$+ANSWER5$+ANSWER6$+ANSWER7$
        GOTO UPDATE.MSG.RETURN
UPDATE.MSG.CR:
        INPUT "What character value do you want to send ((END) to end)? ",WORK$
```

```
        IF WORK$="END" OR WORK$="end" THEN GOTO UPDATE.MSG.CR.END
        IF LEN(WORK$)=3 THEN GOTO UPDATE.MSG.CR.CHECK.NUMERICS
        PRINT "MUST BE 3 DIGITS (001 TO 255), RE-ENTER."
        PRINT
        GOTO UPDATE.MSG.CR
UPDATE.MSG.CR.CHECK.NUMERICS:
        IF WORK$>"000" AND WORK$<"256" THEN GOTO UPDATE.MSG.CR.UPDATE
        PRINT "MUST HAVE VALUE OF 001 THRU 255, RE-ENTER."
        PRINT
        GOTO UPDATE.MSG.CR
UPDATE.MSG.CR.UPDATE:
        LET WORK2$=WORK2$+WORK$+"/"
        GOTO UPDATE.MSG.CR
UPDATE.MSG.CR.END:
        IF LEN(WORK2$)<MSGMAX% THEN WORK$=WORK2$: GOTO UPDATE.MSG.RETURN
        PRINT "MUST BE 2 TO";MSGMAX%;"DIGITS, RE-ENTER."
        PRINT
        LET WORK2$="/"
        GOTO UPDATE.MSG.CR
UPDATE.MSG.RETURN:
        LET WMSG$(WORKNBR%)=WORK$
        RETURN
REM-------------------------------------------------(UPDATE SUBROUTINE = MODE)
UPDATE.MODE:
        GOSUB SCREEN.HEADING
        GOSUB ENTRY.BLOCK
        PRINT TAB(15);"(E) End of response group, report from host follows."
        PRINT TAB(15);"(N) Normal command, another response command follows."
        PRINT TAB(15);"(L) End of all responses, must have this at end."
UPDATE.MODE.RESPONSE:
        PRINT
        INPUT "What is the mode value (E,L,N)? ",WORK$
        IF LEN(WORK$)=1 THEN GOTO UPDATE.MODE.CHECK.ANSWER
        PRINT "MUST BE A SINGLE CHARACTER ENTRY, RE-ENTER."
        GOTO UPDATE.MODE.RESPONSE
UPDATE.MODE.CHECK.ANSWER:
        LET ANSWER$=UCASE$(WORK$)
        IF ANSWER$="E" THEN GOTO UPDATE.MODE.RETURN
        IF ANSWER$="L" THEN GOTO UPDATE.MODE.RETURN
        IF ANSWER$="N" THEN GOTO UPDATE.MODE.RETURN
        PRINT "MUST BE (N)ORMAL ENTRY, (E)ND OF SET, OR (L)AST ENTRY, RE-ENTER."
        PRINT
        GOTO UPDATE.MODE.RESPONSE
UPDATE.MODE.RETURN:
        IF ANSWER$="L" THEN ANSWER$="X"
        LET WMODE$(WORKNBR%)=ANSWER$
        RETURN
REM----------------------------------------------(UPDATE SUBROUTINE = ENDCHAR)
UPDATE.ENDCHAR:
        GOSUB SCREEN.HEADING
        GOSUB ENTRY.BLOCK
UPDATE.ENDCHAR.RESPONSE:
        IF WETYPE$(WORKNBR%)="PH" THEN GOTO UPDATE.ENDCHAR.LOG
        IF WETYPE$(WORKNBR%)="CR" THEN GOTO UPDATE.ENDCHAR.LOG
        IF WETYPE$(WORKNBR%)="SL" THEN GOTO UPDATE.ENDCHAR.LOG
        IF WETYPE$(WORKNBR%)="SV" THEN GOTO UPDATE.ENDCHAR.LOG
        IF WETYPE$(WORKNBR%)<>"RD" THEN GOTO UPDATE.ENDCHAR.RESP
        PRINT
```

```
        PRINT "What is the last unique character to be received before responding?";
        GOTO UPDATE.ENDCHAR.ENTRY
UPDATE.ENDCHAR.LOG:
        PRINT
        PRINT "What is the last unique character received after the response is sent?";
        GOTO UPDATE.ENDCHAR.ENTRY
UPDATE.ENDCHAR.RESP:
        PRINT
        PRINT "What single character (prompt) must be matched before sending response?";
UPDATE.ENDCHAR.ENTRY:
        LINE INPUT " ", WORK$
        IF LEN(WORK$)=1 THEN GOTO UPDATE.ENDCHAR.RETURN
        PRINT "MUST BE A SINGLE CHARACTER. RE-ENTER."
        GOTO UPDATE.ENDCHAR.RESPONSE
UPDATE.ENDCHAR.RETURN:
        LET WENDCHAR$(WORKNBR%)=WORK$
        RETURN
REM----------------------------------------------------------(UPDATE SUBROUTINE = TEXT)
UPDATE.TEXT:
        GOSUB SCREEN.HEADING
        GOSUB ENTRY.BLOCK
UPDATE.TEXT.RESPONSE:
        PRINT
        PRINT "What message must be matched before sending response:"
        LINE INPUT "? ", WORK$
        IF LEN(WORK$)<TEXTMAX%+1 THEN GOTO UPDATE.TEXT.RETURN
        PRINT "MESSAGE IS TOO LONG. MUST BE";TEXTMAX%;"CHARACTERS OR LESS."
        PRINT "SHORTENED TO:"
        LET WORK$=LEFT$(WORK$,TEXTMAX%)
        PRINT TAB(13);WORK$
        GOTO UPDATE.TEXT.RESPONSE
UPDATE.TEXT.RETURN:
        LET WTEXT$(WORKNBR%)=WORK$
        RETURN
REM----------------------------------------------------------(UPDATE DELETE)
UPDATE.DELETE.ENTRY:
        LET WETYPE$(WORKNBR%)=WETYPE$(WORKNBR%+1)
        LET WANO%(WORKNBR%)=WANO%(WORKNBR%+1)
        LET WACNT(WORKNBR%)=WACNT(WORKNBR%+1)
        LET WMSG$(WORKNBR%)=WMSG$(WORKNBR%+1)
        LET WMODE$(WORKNBR%)=WMODE$(WORKNBR%+1)
        LET WENDCHAR$(WORKNBR%)=WENDCHAR$(WORKNBR%+1)
        LET WTEXT$(WORKNBR%)=WTEXT$(WORKNBR%+1)
        LET WORKNBR%=WORKNBR%+1
        IF WORKNBR%<=WORKMAXNBR% THEN GOTO UPDATE.DELETE.ENTRY
        LET WORKMAXNBR%=WORKMAXNBR%-1
        GOTO UPDATE.QUIT.ENTRY
REM----------------------------------------------------------(UPDATE INSERT)
UPDATE.INSERT.ENTRY:
        LET SAVWORKNBR%=WORKNBR%
        IF WORKMAXNBR%<NBRENTRY% THEN GOTO UPDATE.INSERT.SET.END
        PRINT
        PRINT "NO ROOM TO MOVE LAST ENTRY. MUST ELIMINATE END BEFORE"
        PRINT "INSERTING NEW ENTRY."
        PRINT "Press RETURN when you have read this message.";
        WORK%=CONCHAR
        GOTO UPDATE.QUIT.ENTRY
```

```
UPDATE.INSERT.SET.END:
    LET WORKMAXNBR%=WORKMAXNBR%+1
    LET WORKNBR%=WORKMAXNBR%
UPDATE.INSERT.MOVE.LOOP:
    LET WETYPE$(WORKNBR%)=WETYPE$(WORKNBR%-1)
    LET WANO%(WORKNBR%)=WANO%(WORKNBR%-1)
    LET WACNT(WORKNBR%)=WACNT(WORKNBR%-1)
    LET WMSG$(WORKNBR%)=WMSG$(WORKNBR%-1)
    LET WMODE$(WORKNBR%)=WMODE$(WORKNBR%-1)
    LET WENDCHAR$(WORKNBR%)=WENDCHAR$(WORKNBR%-1)
    LET WTEXT$(WORKNBR%)=WTEXT$(WORKNBR%-1)
    LET WORKNBR%=WORKNBR%-1
    IF WORKNBR%>SAVWORKNBR% THEN GOTO UPDATE.INSERT.MOVE.LOOP
    GOSUB SETUP.INITIAL.LOG.RECORD
    LET WETYPE$(WORKNBR%)=ETYPE$
    LET WANO%(WORKNBR%)=ANO%
    LET WACNT(WORKNBR%)=ACNT
    LET WMSG$(WORKNBR%)=MSG$
    LET WMODE$(WORKNBR%)=MODE$
    LET WENDCHAR$(WORKNBR%)=ENDCHAR$
    LET WTEXT$(WORKNBR%)=TEXT$
    GOTO UPDATE.CHANGE.ENTRY
REM--------------------------------------------------------(UPDATE QUIT)
UPDATE.QUIT.ENTRY:
    GOTO UPDATE.DISPLAY.WORK
REM--------------------------------------------------------(LIST LOG FILE)
LIST.LOG.FILE:
    GOSUB SCREEN.HEADING
    ON END (2) GOTO LIST.LOG.OPEN.ERROR
    OPEN "I",2,CFILE2$
    LET LASTCALL%=2
    GOTO LIST.TOP.SCREEN
LIST.LOG.OPEN.ERROR:
    GOSUB SCREEN.HEADING
    PRINT "****** BIG PROBLEM - WORK FILE NOT THERE FOR LIST ******"
    LET WORK%=CONCHAR
    GOTO RETURN.TO.MENU
LIST.TOP.SCREEN:
    GOSUB SCREEN.HEADING
    LET TITLE2$="LOG FILE REPORT"
    LET CALLSELECT$=TRIM$(STR$(CALLSELECT%))
    IF CALLSELECT%<>0 THEN TITLE2$=TITLE2$+" - CALL NUMBER "+CALLSELECT$
    IF CALLSELECT%=0 THEN TITLE2$=TITLE2$+" - ALL CALLS"
    PRINT TAB((80-LEN(TITLE2$))\2);TITLE2$
    PRINT
LIST.TOP.READ:
    GOSUB READ.LOGFILE.RECORD
    IF STAT$="END" THEN GOTO LIST.LAST.DISPLAYED
    IF CALLSELECT%=0 THEN GOTO LIST.TOP.ALL
    IF CALLNBR%<CALLSELECT% THEN GOTO LIST.TOP.READ
    IF CALLNBR%>CALLSELECT% THEN GOTO LIST.LAST.DISPLAYED
LIST.TOP.ALL:
    GOSUB ENTRY.BLOCK.SETUP
LIST.BOTTOM.READ:
    GOSUB READ.LOGFILE.RECORD
    IF STAT$="END" THEN GOTO LIST.LAST.DISPLAYED
    IF CALLSELECT%=0 THEN GOTO LIST.BOTTOM.ALL
```

```
            IF CALLNBR%(CALLSELECT% THEN GOTO LIST.BOTTOM.READ
            IF CALLNBR%)CALLSELECT% THEN GOTO LIST.LAST.DISPLAYED
LIST.BOTTOM.ALL:
            GOSUB ENTRY.BLOCK.SETUP
LIST.BOTTOM.RESPONSE:
            INPUT "Enter (N) for next screen, (Q) to quit. ",WORK$
            LET ANSWER2$=LEFT$(WORK$,1)
            LET ANSWER$=UCASE$(ANSWER2$)
            IF ANSWER$="N" THEN GOTO LIST.TOP.SCREEN
            IF ANSWER$="Q" THEN GOTO LIST.CLOSE.FILE
            PRINT "RESPONSE MUST BE (N)EXT OR (Q)UIT. RE-ENTER."
            GOTO LIST.BOTTOM.RESPONSE
LIST.LAST.DISPLAYED:
            PRINT "The last entry has been displayed.";
            PRINT "Press RETURN to continue.";
            WORK%=CONCHAR
LIST.CLOSE.FILE:
            CLOSE 2
            GOTO DISPLAY.FUNCTIONS
REM------------------------------------------------------(PRINT LOG FILE)
PRNT.LOG.FILE:
            GOSUB SCREEN.HEADING
            IF PRINTER$="YES" THEN GOTO PRNT.OPEN.LOG.FILE
            PRINT "YOU DON'T HAVE A PRINTER AVAILABLE."
            PRINT "Press RETURN to return to selection menu.";
            WORK%=CONCHAR
            GOTO DISPLAY.FUNCTIONS
PRNT.OPEN.LOG.FILE:
            ON END (2) GOTO PRNT.LOG.OPEN.ERROR
            OPEN "I",2,CFILE2$
            LET LASTCALL%=0
            GOTO PRNT.SETUP.PRINTER
PRNT.LOG.OPEN.ERROR:
            GOSUB SCREEN.HEADING
            PRINT "****** BIG PROBLEM - WORK FILE NOT THERE FOR PRINT ******"
            LET WORK%=CONCHAR
            GOTO RETURN.TO.MENU
PRNT.SETUP.PRINTER:
            GOSUB SCREEN.HEADING
            PRINT "When the printer is ready press RETURN.";
            WORK%=CONCHAR
            PRINT
            PRINT "Printing the Log File Report."
            LPRINTER
            LET PAGENO%=0
            LET COUNT%=0
            LET HAVEDATA$="NO"
            PRNTDATE$=MID$(CURRDAY$,3,2)+"/"+RIGHT$(CURRDAY$,2)+"/"+LEFT$(CURRDAY$,2)
PRNT.READ.RECORD:
            GOSUB READ.LOGFILE.RECORD
            IF STAT$="END" THEN GOTO PRNT.LAST.PRINTED
            IF CALLSELECT%=2 THEN GOTO PRNT.PRINT.ALL
            IF CALLNBR%(CALLSELECT% THEN GOTO PRNT.READ.RECORD
            IF CALLNBR%)CALLSELECT% THEN GOTO PRNT.LAST.PRINTED
PRNT.PRINT.ALL:
            IF CALLNBR%()LASTCALL% THEN GOSUB PRNT.NEW.PAGE.HEADING
            LET COUNT%=COUNT%+1
```

```
        IF COUNT%)7 THEN GOSUB PRNT.NEW.PAGE.HEADING: LET COUNT%=COUNT%+1
        GOSUB ENTRY.BLOCK.SETUP
        LET HAVEDATA$="YES"
        GOTO PRNT.READ.RECORD
PRNT.LAST.PRINTED:
        CONSOLE
        CLOSE 2
        GOTO DISPLAY.FUNCTIONS
PRNT.NEW.PAGE.HEADING:
        PRINT PNEWPAGE$
        LET PAGENO%=PAGENO%+1
        PRINT TAB((80-LEN(TITLE$))\2);TITLE$
        PRINT TAB((80-LEN(CTITLE$))\2);CTITLE$
        LET CALLSELECT$=TRIM$(STR$(CALLSELECT%))
        LET TITLE2$="LOG FILE REPORT"
        IF CALLSELECT%()0 THEN TITLE2$=TITLE2$+" - CALL NUMBER "+CALLSELECT$
        IF CALLSELECT%=0 THEN TITLE2$=TITLE2$+" - ALL CALLS"
        PRINT "DATE: ";PRNTDATE$;
        PRINT TAB((80-LEN(TITLE2$))\2);TITLE2$;
        PRINT TAB(70);"PAGE: ";
        PRINT USING "###";PAGENO%
        PRINT
        LET COUNT%=0
        RETURN
REM--------------------------------------------------------------(RESET FILES)
RESET.FILES:
        GOSUB SCREEN.HEADING
        PRINT "Resetting the file names."
        ON END (3) GOTO RESET.RENAME.BAK
        OPEN "I",3,CFILE3$
        DELETE 3
RESET.RENAME.BAK:
        REC%=RENAME(CFILE3$,CFILE1$)
        IF REC%=-1 THEN GOTO RESET.RENAME.DAT
            PRINT "CANNOT RENAME CURRENT LOG FILE TO BACKUP VERSION."
            PRINT "When ready to continue press RETURN."
            WORK%=CONCHAR
RESET.RENAME.DAT:
        REC%=RENAME(CFILE1$,CFILE2$)
        IF REC%=-1 THEN GOTO RESET.WORKING.COMLOG
            PRINT "CANNOT RENAME WORKING LOG FILE TO CURRENT VERSION."
            PRINT "When ready to continue press RETURN."
            WORK%=CONCHAR
RESET.WORKING.COMLOG:
        GOSUB SCREEN.HEADING
        PRINT "Changing the log file with updates for these calls."
        PRINT
        ON END (1) GOTO RESET.COMLOGM.ERROR
        OPEN "I",1,CFILE1$
        GOTO RESET.COMLOG.OPEN
RESET.COMLOGM.ERROR:
        PRINT "CANNOT OPEN THE NEW COMLOGM FILE."
        PRINT "When ready to continue press RETURN."
        WORK%=CONCHAR
        GOTO RETURN.TO.MENU
RESET.COMLOG.OPEN:
        CLOSE 4
```

```
            ON END (4) GOTO RESET.NO.COMLOG
            OPEN "I",4,CFILE4$
            LET FILESTAT$="HAVE"
            GOTO RESET.COMLOGW.DELETE
RESET.NO.COMLOG:
            LET FILESTAT$="NONE"
RESET.COMLOGW.DELETE:
            ON END (5) GOTO RESET.COMLOGW.CREATE
            OPEN "I",5,CFILE5$
            DELETE 5
RESET.COMLOGW.CREATE:
            OPEN "O",5,CFILE5$
RESET.UPDATE.WORK:
            ON END (1) GOTO RESET.CLOSE.FILES
            LET INDEX%=2
            LET LASTCALL%=0
RESET.UPDATE.LOOP:
            READ #1;CALLNBR%,ETYPE$,ANO%,ACNT,MSG$,MODE$,ENDCHAR$,TEXT$
            IF ETYPE$()"CR" THEN GOTO RESET.UPDATE.PRINT.NEW
            LET WORK$=""
            LET WKMSG$=MSG$
            IF LEN(WKMSG$)(5 THEN GOTO RESET.UPDATE.PRINT.NEW
            LET WVAL$=MID$(WKMSG$,2,3)
            LET NCHR$=CHR$(FIX(VAL(LEFT$(WVAL$,4))))
            LET WORK$=WORK$+NCHR$
            IF LEN(WKMSG$)(9 THEN GOTO RESET.CR.VALUE
            LET WVAL$=MID$(WKMSG$,6,3)
            LET NCHR$=CHR$(FIX(VAL(LEFT$(WVAL$,4))))
            LET WORK$=WORK$+NCHR$
            IF LEN(WKMSG$)(13 THEN GOTO RESET.CR.VALUE
            LET WVAL$=MID$(WKMSG$,10,3)
            LET NCHR$=CHR$(FIX(VAL(LEFT$(WVAL$,4))))
            LET WORK$=WORK$+NCHR$
            IF LEN(WKMSG$)(17 THEN GOTO RESET.CR.VALUE
            LET WVAL$=MID$(WKMSG$,14,3)
            LET NCHR$=CHR$(FIX(VAL(LEFT$(WVAL$,4))))
            LET WORK$=WORK$+NCHR$
            IF LEN(WKMSG$)(21 THEN GOTO RESET.CR.VALUE
            LET WVAL$=MID$(WKMSG$,18,3)
            LET NCHR$=CHR$(FIX(VAL(LEFT$(WVAL$,4))))
            LET WORK$=WORK$+NCHR$
            IF LEN(WKMSG$)(25 THEN GOTO RESET.CR.VALUE
            LET WVAL$=MID$(WKMSG$,22,3)
            LET NCHR$=CHR$(FIX(VAL(LEFT$(WVAL$,4))))
            LET WORK$=WORK$+NCHR$
            IF LEN(WKMSG$)(29 THEN GOTO RESET.CR.VALUE
            LET WVAL$=MID$(WKMSG$,26,3)
            LET NCHR$=CHR$(FIX(VAL(LEFT$(WVAL$,4))))
            LET WORK$=WORK$+NCHR$
RESET.CR.VALUE:
            LET MSG$=WORK$
            LET ETYPE$="SN"
RESET.UPDATE.PRINT.NEW:
            WRITE #5;CALLNBR%,ETYPE$,ANO%,ACNT,MSG$,MODE$,ENDCHAR$,TEXT$
            IF LASTCALL%=CALLNBR% THEN GOTO RESET.UPDATE.LOOP
            IF INDEX%)70 THEN GOTO RESET.UPDATE.CHK.PRINT
RESET.UPDATE.SETUP.NEXT:
            IF TECH$="YES" THEN PRINT TAB(INDEX%);CALLNBR%;
```

```
        LET LASTCALL%=CALLNBR%
        LET INDEX%=INDEX%+5
        GO TO RESET.UPDATE.LOOP
RESET.UPDATE.CHK.PRINT:
        LET INDEX%=2
        IF TECH$="YES" THEN PRINT
        GOTO RESET.UPDATE.SETUP.NEXT
RESET.CLOSE.FILES:
        PRINT
        PRINT
        PRINT "Resetting the work file names."
        CLOSE 1
        CLOSE 5
        ON END (6) GOTO RESET.NO.BACKUP
        OPEN "I",6,CFILE6$
        DELETE 6
RESET.NO.BACKUP:
        LET REC%=-1
        IF FILESTAT$="SAVE" THEN REC%=RENAME(CFILE5$,CFILE4$)
        IF REC%=-1 THEN GOTO RESET.RENAME.WORK.TO.CURRENT
                PRINT "CANNOT RENAME CURRENT TO COMLOG BACKUP."
                PRINT "When ready to continue press RETURN."
                WORK%=CONCHAR
RESET.RENAME.WORK.TO.CURRENT:
        REC%=RENAME(CFILE4$,CFILE5$)
        IF REC%=-1 THEN GOTO RETURN.TO.MENU
                PRINT "CANNOT RENAME WORKING TO CURRENT COMLOG FILE."
                PRINT "When ready to continue press RETURN."
                WORK%=CONCHAR
REM------------------------------------------------------------(RETURN)
RETURN.TO.MENU:
        GOSUB SCREEN.HEADING
        PRINT "Returning to Communications Menu."
        END C)type D:COMUDIAL.BAS
REM ***** COMUDIAL.BAS (Business BASIC (.99))
REM     06/08/83
REM     1630
REM
REM THIS PROGRAM PROVIDES THE FACILITY TO UPDATE THE DIAL
REM LIST. IT THEN SAVES THE MODIFIED VALUES FOR USE BY THE
REM OTHER COMMUNICATIONS PROGRAMS.
REM
REM ORIGINALLY PROGRAMMED BY TOM TRELFORD 08/28/82
REM TRANSLATED FROM CB80 BY TERESA JANE LORD
REM------------------------------------------------------------(CHANGE LOG)
REM VERSION  DATE      CHANGE
REM    1.0   08/28/82  INITIAL VERSION
REM    1.1   09/01/82  Deleted carry forward of RTIME from COMDIAL.DAT
REM    1.2   09/03/82  Added 'G' function to update detail selection
REM                    Turned off the file update record number display
REM    1.3   09/07/82  Added call date changed flag
REM                    Changed to carry forward next call date
REM    1.4   09/10/82  Changed (L)ist function to (D)isplay
REM    1.5   02/03/83  Return to COMUMENU added
```

```
REM                     Eliminated use of CLOCK
REM                     Added bypass due to TECH=YES
REM                     Added Dial Entry copy
REM                     Limited disk access to BAMTRAC
REM                     Eliminated status updating
REM                     Changed prompt wording
REM     2.0   02/16/83  Translated from CB80
REM     2.1   03/03/83  Chain to COMUMENU taken out; by Steve Hemphill
REM     2.2   03/04/83  Check password moved from COMUMENU to COMUDIAL; by
REM                     Terry Lord
REM     2.3   03/09/83  Prompts changed to show a space before response; by
REM                     Steve Hemphill
REM     2.4   03/16/83  Changed UPDATE PARITY for 1200 bps. Refer to
REM                     SMARTMODEM 1200 OWNER'S MANUAL - Format & Speed of
REM                     Commands & Result Codes (S-5); by Teresa Jane Lord
REM     2.5   03/29/83  Password for restricted functions made case insen-
REM                     sitive; by Steve Hemphill
REM     2.6   04/26/83  Display of Version number added; by Steve Hemphill
REM     2.7   05/18/83  Disallow BOFA File Xfer=YES and Save Rpt on Disk
REM                     = YES; by Judy Ku
REM     2.8   06/08/83  When checking for the illegal combination of
REM                     BOFA File Xfer=YES and Save Rpt on Disk=YES,
REM                     the program was changing DSK% from 0 to 1.
REM                     Commented that out; by Judy Ku
REM     2.9   07/11/83  Only check for illegal combination of BOFA File
REM                     Xfer=Yes and Save Rpt on Disk=Yes; by Judy Ku
REM     2.10  07/27/83  correct invalid response msg;replace "entry" w/
REM                     "call";date & time formatting by Ben Wong
REM     2.11  09/01/83  Modified display of CALL DATE while updating
REM                     or displaying a dial list entry. The asterisk
REM                     is now displayed before the MM of MM/DD/YY.
REM                     Statement added to UPDATE.CHECK.DSK: The change
REM                     assigns a 1 to DSK% when a dial entry is initially
REM                     entered if the report will be saved on disk.
REM                     by John Kirch.
REM-----------------------------------------------------------(PROGRAM START)
START:
        CONSOLE
        LET VERSION$="Dial List Processor - Version 2.11"
        CARRIAGE%=13
        LET CTLFILE1$="CONTROL.DAT"
        LET CTLLENGTH%=100
        LET CTLMAX%=100
        LET ENTRYLMT%=50
        LET CFILE1$="COMDIALM.DAT"
        LET CFILE2$="COMDIALM.$$$"
        LET CFILE3$="COMDIALM.BAK"
        LET CFILE4$="COMDIAL.DAT"
        LET CFILE5$="COMDIAL.$$$"
        LET CFILELEN%=220
        LET CURRDAY$="200000"
        LET ENTRYMAX=35
        LET SHOWDIAL$="NO"
        LET TECH$="NO"
        GOTO CONTROLFILE.OPEN
REM------------------------------------------------------------(SUBROUTINES)
REM------------------------------------------------------------(SCREEN HEADING)
```

```
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        RETURN
REM----------------------------------------------------------(READ CONTROL FILE)
READ.CONTROLFILE.RECORD:
        ON END (1) GOTO READ.CONTROLFILE.ERROR
        READ #1,WORK%;NAME$,VALUEONE$,VALUETWO$
        LET STAT$="OK"
        RETURN
READ.CONTROLFILE.ERROR:
        LET STAT$="END"
        RETURN
REM----------------------------------------------------------(GET KEY INPUT)
GET.KEY.INPUT:
        LET WORK$=""
        PRINT " ";
GET.KEY.FIRST:
        LET EWORK$=INKEY$
        IF LEN(EWORK$)=0 THEN GOTO GET.KEY.FIRST
        IF ASC(EWORK$)=CARRIAGE% THEN GOTO GET.KEY.RETURN
        LET KWORK$=EWORK$
GET.KEY.RESPONSE:
        LET EWORK$=INKEY$
        IF LEN(EWORK$)=0 THEN GOTO GET.KEY.RESPONSE
        IF ASC(EWORK$)=CARRIAGE% THEN GOTO GET.KEY.RETURN
        LET KWORK$=KWORK$+EWORK$
        GOTO GET.KEY.RESPONSE
GET.KEY.RETURN:
        LET WORK$=KWORK$
        RETURN
REM----------------------------------------------------------(READ DIAL LIST)
READ.CALLFILE.RECORD:
        ON END (2) GOTO READ.CALLFILE.ERROR
        GET #2,REC%
        INPUT #2,CALLNBR%,DESCRIP$,CDATE$,CTIME$,RTIME$,DSK%,DSKMETH$
        INPUT #2,ECRT$,EPTR$,DIAG$,SAVEPTR$,FDX$,EMDY$,HBKSP$,EOF$,LOGMSG$
        INPUT #2,ENDCHR$,PARITY%,STATUS%,RECNT%,STIME$,ETIME$,LDATE$,RPGRM$
        INPUT #2,SPGRM$
        LET STAT$="OK"
        RETURN
READ.CALLFILE.ERROR:
        LET STAT$="END"
        RETURN
REM----------------------------------------------------------(WRITE DIAL LIST)
WRITE.CALLFILE.RECORD:
        ON END (2) GOTO WRITE.CALLFILE.ERROR
        WRITE #2,REC%;CALLNBR%,DESCRIP$,CDATE$,CTIME$,RTIME$,DSK%,DSKMETH$,_
               ECRT$,EPTR$,DIAG$,SAVEPTR$,FDX$,EMDM$,HBKSP$,EOF$,LOGMSG$,_
```

```
                ENDCHR$, PARITY%, STATUS%, RECNT%, STIME$, ETIME$, LDATE$, RPGRM$,_
                SPGRM$
        LET STAT$="OK"
        RETURN
WRITE.CALLFILE.ERROR:
        LET STAT$="END"
        RETURN
REM--------------------------------------------------------------(WRITE COMDIAL.W)
SETUP.INITIALIZED.RECORD:
        LET DESCRIP$="*"
        LET CDATE$="000000"
        LET CTIME$="000000"
        LET RTIME$="000000"
        LET DSK%=0
        LET DSKMETH$="N"
        LET ECRT$="Y"
        LET EPTR$="N"
        LET DIAG$="N"
        LET SAVEPTR$="N"
        LET FDX$="Y"
        LET EMD%$="N"
        LET HBKSP$="0"
        LET EOF$="EOF"
        LET LOGMSG$="LOG"
        LET ENDCHR$=")"
        LET PARITY%=0
        LET STATUS%=0
        LET RECNT%=0
        LET STIME$="000000"
        LET ETIME$="000000"
        LET LDATE$="000000"
        LET RPGRM$=" "
        LET SPGRM$=" "
        RETURN
REM-------------------------------------------------------------(VALIDATE DATE)
VALIDATE.DATE:
        LET STAT$="OK"
        LET MSG$=" "
        IF LEN(WORK$)=6 THEN GOTO VALIDATE.DATE.MONTH
            LET MSG$="MUST HAVE 6 DIGITS. RE-ENTER."
            GOTO VALIDATE.DATE.ERROR
VALIDATE.DATE.MONTH:
        LET ANSWER$=LEFT$(WORK$,2)
        LET ANSWER2$=MID$(WORK$,3,2)
        LET ANSWER3$=RIGHT$(WORK$,2)
        IF ANSWER$>"00" AND ANSWER$<"13" THEN GOTO VALIDATE.DATE.DAY
            LET MSG$="MONTH MUST BE 01 THRU 12"
            GOTO VALIDATE.DATE.ERROR
VALIDATE.DATE.DAY:
        IF ANSWER2$>"00" AND ANSWER2$<"29" THEN GOTO VALIDATE.DATE.YEAR
        IF ANSWER2$="29" AND ANSWER$<>"02" THEN GOTO VALIDATE.DATE.YEAR
        IF ANSWER2$<"32" AND ANSWER$="01" THEN GOTO VALIDATE.DATE.YEAR
        IF ANSWER2$<"32" AND ANSWER$="03" THEN GOTO VALIDATE.DATE.YEAR
        IF ANSWER2$<"31" AND ANSWER$="04" THEN GOTO VALIDATE.DATE.YEAR
        IF ANSWER2$<"32" AND ANSWER$="05" THEN GOTO VALIDATE.DATE.YEAR
        IF ANSWER2$<"31" AND ANSWER$="06" THEN GOTO VALIDATE.DATE.YEAR
        IF ANSWER2$<"32" AND ANSWER$="07" THEN GOTO VALIDATE.DATE.YEAR
```

```
        IF ANSWER2$("32" AND ANSWER$="08" THEN GOTO VALIDATE.DATE.YEAR
        IF ANSWER2$("31" AND ANSWER$="09" THEN GOTO VALIDATE.DATE.YEAR
        IF ANSWER2$("32" AND ANSWER$="10" THEN GOTO VALIDATE.DATE.YEAR
        IF ANSWER2$("31" AND ANSWER$="11" THEN GOTO VALIDATE.DATE.YEAR
        IF ANSWER2$("32" AND ANSWER$="12" THEN GOTO VALIDATE.DATE.YEAR
                LET MSG$="DAY VALUE MUST BE VALID FOR MONTH. RE-ENTER."
                GOTO VALIDATE.DATE.ERROR
VALIDATE.DATE.YEAR:
        IF ANSWER3$)"81" AND ANSWER3$(="99" THEN RETURN
                LET MSG$="INVALID YEAR, MUST BE 82 THRU 99. RE-ENTER."
VALIDATE.DATE.ERROR:
        LET STAT$="BAD"
        RETURN
REM----------------------------------------------------------(VALIDATE TIME)
VALIDATE.TIME:
        LET STAT$="OK"
        LET MSG$=" "
        IF LEN(WORK$)=4 THEN WORK$=WORK$+"00"
        IF LEN(WORK$)=6 THEN GOTO VALIDATE.TIME.HOUR
                LET MSG$="MUST HAVE 4 DIGITS. RE-ENTER."
                GOTO VALIDATE.TIME.ERROR
VALIDATE.TIME.HOUR:
        IF WORK$="000000" THEN RETURN
        LET ANSWER$=LEFT$(WORK$,2)
        LET ANSWER2$=MID$(WORK$,3,2)
        LET ANSWER3$=RIGHT$(WORK$,2)
        IF ANSWER$="00" AND ANSWER2$()"00" THEN GOTO VALIDATE.TIME.MIN
        IF ANSWER$="24" AND ANSWER2$="00" AND ANSWER3$="00" THEN RETURN
        IF ANSWER$)"00" AND ANSWER$("24" THEN GOTO VALIDATE.TIME.MIN
                LET MSG$="HOUR MUST BE 00 THRU 24. RE-ENTER."
                GOTO VALIDATE.TIME.ERROR
VALIDATE.TIME.MIN:
        IF ANSWER2$="00" THEN GOTO VALIDATE.TIME.SEC
        IF ANSWER2$)"00" AND ANSWER2$("60" THEN GOTO VALIDATE.TIME.SEC
                LET MSG$="MINUTES MUST BE 00 THRU 59. RE-ENTER."
                GOTO VALIDATE.TIME.ERROR
VALIDATE.TIME.SEC:
        IF ANSWER3$="00" THEN RETURN
        IF ANSWER3$)"00" AND ANSWER3$("60" THEN RETURN
                LET MSG$="SECONDS MUST BE 00 THRU 59. RE-ENTER."
VALIDATE.TIME.ERROR:
        LET STAT$="BAD"
        RETURN
REM----------------------------------------------------(DESCRIBE ENTRY ON SCREEN)
ENTRY.BLOCK:
        GOSUB ENTRY.BLOCK.TOP
        GOSUB ENTRY.BLOCK.DESCRIP
        IF STAT$="NONE" THEN RETURN
        GOSUB ENTRY.BLOCK.CALLTIME
        GOSUB ENTRY.BLOCK.DSKMETH
        GOSUB ENTRY.BLOCK.ECRT
        GOSUB ENTRY.BLOCK.TECHNICAL
        RETURN
ENTRY.BLOCK.TOP:
        PRINT "================================================================"
        PRINT "I *** DIAL LIST MASTER FILE --- CALL ";CALLNBR%;" ";MESSAGE$;" ***"
        RETURN
```

```
ENTRY.BLOCK.DESCRIP:
    IF DESCRIP$()"*" THEN GOTO ENTRY.BLOCK.DESCRIP.OUT
        PRINT "I";TAB(6);"NULL ENTRY"
        LET STAT$="NONE"
        RETURN
ENTRY.BLOCK.DESCRIP.OUT:
    PRINT "I    CALL DESCRIPTION: ";DESCRIP$
    LET STAT$="OK"
    RETURN
ENTRY.BLOCK.CALLTIME.LINE:
    PRINT "I=====================(CALL TIME)====================================="
    RETURN
ENTRY.BLOCK.CALLTIME:
    PRINT "I ";TAB(6);"  NEXT CALL DATE: ";
    IF CDATE$="000000" THEN PRINT "None Specified";
    IF CDATE$()"000000" AND MID$(CDATE$,1,1) () "*" THEN _
        PRINT MID$(CDATE$,1,2);"/";MID$(CDATE$,3,2);"/";MID$(CDATE$,5,2);
    IF CDATE$()"000000" AND MID$(CDATE$,1,1) = "*" THEN _
        PRINT MID$(CDATE$,1,3);"/";MID$(CDATE$,4,2);"/";MID$(CDATE$,6,2);
    PRINT TAB(42);"    CALL TIME: ";
    IF CTIME$="000000" THEN PRINT "None Assigned": GOTO ENTRY.BLOCK.RTIME
    PRINT MID$(CTIME$,1,2);":";MID$(CTIME$,3,2);":";MID$(CTIME$,5,2)
ENTRY.BLOCK.RTIME:
    PRINT "I ";TAB(6);" RESCHEDULE TIME: ";
    IF RTIME$="000000" THEN PRINT "Not Rescheduled": GOTO ENTRY.BLOCK.CALLTIME.RTN
    PRINT MID$(RTIME$,1,2);":";MID$(RTIME$,3,2);":";MID$(RTIME$,5,2)
ENTRY.BLOCK.CALLTIME.RTN:
    RETURN
ENTRY.BLOCK.DSK.LINE:
    PRINT "I=====================(DISK FILE)====================================="
    RETURN
ENTRY.BLOCK.DSKMETH:
    PRINT "I ";TAB(6);"  BofA FILE TXFR: ";
        IF DSKMETH$="N" THEN PRINT "No";
        IF DSKMETH$="Y" THEN PRINT "Yes";
    IF TECH$()"YES" THEN PRINT " ": RETURN
    PRINT TAB(42);" NEXT FILE NUMBER: ";
        IF DSK%=0 THEN PRINT "None Designated": RETURN
        LET NFILE$=TRIM$(STR$(DSK%))
        PRINT NFILE$
    RETURN
ENTRY.BLOCK.ECRT.LINE:
    PRINT "I=====================(DISPOSITION)====================================="
    RETURN
ENTRY.BLOCK.ECRT:
    PRINT "I ";TAB(6);"DISPLAY ON SCREEN: ";
        IF ECRT$="N" THEN PRINT "No";
        IF ECRT$="Y" THEN PRINT "Yes";
    PRINT TAB(42);" PRINT ON PRINTER: ";
        IF EPTR$="N" THEN PRINT "No"
        IF EPTR$="Y" THEN PRINT "Yes"
    PRINT "I ";TAB(6);" SAVE RPT ON DISK: ";
        IF SAVEPTR$="N" THEN PRINT "No";
        IF SAVEPTR$="Y" THEN PRINT "Yes";
    IF TECH$()"YES" THEN PRINT " ": RETURN
    PRINT TAB(42);" HAVE DIAGNOSTICS: ";
        IF DIAG$="N" THEN PRINT "No"
```

```
                    IF DIAG$="Y" THEN PRINT "Yes"
            PRINT "I ";TAB(6);"ECHO MODEM OUTPUT: ";
                    IF EMDM$="N" THEN PRINT "No"
                    IF EMDM$="Y" THEN PRINT "Yes"
            RETURN
ENTRY.BLOCK.TECHNICAL.LINE:
            PRINT "I=====================(TECHNICAL)====================================="
            RETURN
ENTRY.BLOCK.TECHNICAL:
            PRINT "I ";TAB(6);"    FULL DUPLEX: ";
                    IF FDX$="N" THEN PRINT "No";
                    IF FDX$="Y" THEN PRINT "Yes";
            PRINT TAB(42);"   MODEM SETTING: ";
                    LET NPARITY$=TRIM$(STR$(PARITY%))
                    PRINT NPARITY$
            PRINT "I";TAB(6);"LOGOFF/QUIT VALUE: ";LOGYES$
            IF TECH$()"YES" THEN RETURN
ENTRY.BLOCK.EOF:
            PRINT "I ";TAB(6);"    EDITOR EOF: ";
            IF EOF$=" " THEN PRINT "None Specified";: GOTO ENTRY.BLOCK.ENDCHR
            PRINT EOF$;
ENTRY.BLOCK.ENDCHR:
            PRINT "I ";TAB(6);"   NORMAL PROMPT: ";
                    IF ENDCHR$=" " THEN PRINT "None Specified";: GOTO ENTRY.BLOCK.BACKSPACE
                    PRINT ENDCHR$;
ENTRY.BLOCK.BACKSPACE:
            PRINT TAB(42);"  HOST BACKSPACE: ";
                    IF HBKSP$=" " THEN PRINT "None Specified": GOTO ENTRY.BLOCK.EOF
                    PRINT HBKSP$
            RETURN
ENTRY.BLOCK.BOTTOM:
            PRINT "=================================================================="
            RETURN
REM------------------------------------------------------(PROCESS CONTROL FILE)
CONTROLFILE.OPEN:
            PRINT
            PRINT "Obtaining system control values."
            PRINT
            FILESIZE=SIZE(CTLFILE1$)
            IF FILESIZE=0 THEN GOTO CONTROLFILE.NO.FILE
            OPEN "R",1,CTLFILE1$,CTLLENGTH%
            LET WORK%=1
            GOTO CONTROLFILE.GET.RECORD
CONTROLFILE.NO.FILE:
            FOR LLINE%=1 TO 25
                    PRINT
            NEXT LLINE%
            PRINT "NO CONTROL FILE. RETURNING TO MENU"
            GOTO RETURN.TO.MENU
CONTROLFILE.GET.RECORD:
            GOSUB READ.CONTROLFILE.RECORD
                    IF STAT$="END"    THEN GOTO CONTROLFILE.CLOSE
                    IF NAME$="ENDALL" THEN GOTO CONTROLFILE.CLOSE
                    LET IWORK%=FIX(VAL(LEFT$(VALUEONE$,4)))
                    IF NAME$="BLANK"  THEN BLANK$=CHR$(IWORK%)
                    IF NAME$="CLOCK"  THEN CLOCK$=VALUEONE$
                    IF NAME$="CTITLE" THEN CTITLE$=VALUEONE$
```

```
            IF NAME$="CURRDAY"  THEN CURRDAY$=VALUEONE$
            IF NAME$="HEADING"  THEN HEADING$=VALUEONE$
            IF NAME$="PASSWORD" THEN PASSWORD$=VALUEONE$
            IF NAME$="PNEWPAGE" THEN PNEWPAGE$=CHR$(IWORK%)
            IF NAME$="PRINTER"  THEN PRINTER$=VALUEONE$
            IF NAME$="SHOME"    THEN SHOME$=CHR$(IWORK%)
            IF NAME$="SHOWDIAL" THEN SHOWDIAL$=VALUEONE$
            IF NAME$="SCLEAR"   THEN SCLEAR$=CHR$(IWORK%)
            IF NAME$="TECH"     THEN TECH$=VALUEONE$
            IF NAME$="TITLE"    THEN TITLE$=VALUEONE$
CONTROLFILE.SETUP.NEXT:
            LET WORK%=WORK%+1
            IF WORK%>CTLMAX% THEN GOTO CONTROLFILE.CLOSE
            GOTO CONTROLFILE.GET.RECORD
CONTROLFILE.CLOSE:
            CLOSE 1
REM---------------------------------------------------------(CHECK PASSWORD)
CHECK.PASSWORD:
            GOSUB SCREEN.HEADING
            PRINT "What is the password to perform restricted functions?";
            GOSUB GET.KEY.INPUT
            LET UCASEPASS$=UCASE$(WORK$)
            LET WORK$=UCASEPASS$
            IF WORK$=PASSWORD$ THEN GOTO CALLFILE.OPEN
                PRINT
                PRINT
                PRINT "****************  INCORRECT PASSWORD  ********************"
                PRINT "*                                                         *"
                PRINT "*  You shouldn't be trying this function.                 *"
                PRINT "*  Press RETURN to go back to the menu.                   *"
                PRINT "*                                                         *"
                PRINT "***********************************************************"
                WORK%=CONCHAR
                GOTO RETURN.TO.MENU
REM---------------------------------------------------------(PROCESS CALL FILE)
CALLFILE.OPEN:
            GOSUB SCREEN.HEADING
            PRINT "Opening the Dial List files."
            PRINT
            FILESIZE=SIZE(CFILE1$)
            IF FILESIZE=0 THEN GOTO CALLFILE.INITIALIZE
            OPEN "R",1,CFILE1$,CFILELEN%
CALLFILE.DELETE.WORK:
            FILESIZE=SIZE(CFILE2$)
            IF FILESIZE=0 THEN GOTO CALLFILE.CREATE.WORK
            OPEN "R",2,CFILE2$,CFILELEN%
            DELETE 2
CALLFILE.CREATE.WORK:
            OPEN "R",2,CFILE2$,CFILELEN%
            PRINT "Saving a backup version for defined calls before changes."
            PRINT
            ON END (1) GOTO DISPLAY.FUNCTIONS
            LET I%=2
            FOR REC%=1 TO ENTRYLMT%
                GET #1,REC%
                INPUT #1,CALLNBR%,DESCRIP$,CDATE$,CTIME$,RTIME$,DSK%,DSKMETH$
                INPUT #1,ECRT$,EPTR$,DIAG$,SAVEPTR$,FDX$,EMDM$,HBKSP$,EOF$,LOGMSG$
```

```
        INPUT #1,ENDCHR$,PARITY%,STATUS%,RECNT%,STIME$,ETIME$,LDATE$,RPGRM$
        INPUT #1,SPGRM$
        LET WORK$=LEFT$(CDATE$,1)
        IF WORK$="*" THEN WORK2$=RIGHT$(CDATE$,6): CDATE$=WORK2$
        WRITE #2,REC%;CALLNBR%,DESCRIP$,CDATE$,CTIME$,RTIME$,DSK%,DSKMETH$,_
              ECRT$,EPTR$,DIAG$,SAVEPTR$,FDX$,EMDY$,HBKSP$,ECF$,LOGYSB$,_
              ENDCHR$,PARITY%,STATUS%,RECNT%,STIME$,ETIME$,LDATE$,RPGRM$,_
              SPGRM$
        IF TECH$="YES" THEN GOTO CALLFILE.SHOW.RECS
        IF SHOWDIAL$="NO" THEN GOTO CALLFILE.NEXT.REC
CALLFILE.SHOW.RECS:
        IF I%>70 THEN PRINT: LET I%=2
                PRINT TAB(I%);REC%;
                LET I%=I%+5
CALLFILE.NEXT.REC:
        NEXT REC%
        PRINT
        GOTO DISPLAY.FUNCTIONS
CALLFILE.INITIALIZE:
        PRINT
        OPEN "R",1,CFILE1$,CFILELEN%
        GOSUB SETUP.INITIALIZED.RECORD
        LET I%=2
        PRINT "Initializing a new dial list file."
        PRINT
        FOR REC%=1 TO ENTRYLMT%
                LET CALLNBR%=REC%
                IF TECH$="YES" THEN GOTO CALLFILE.WRITE.SHOW.RECS
                IF SHOWDIAL$="NO" THEN GOTO CALLFILE.WRITE.INITIAL.REC
CALLFILE.WRITE.SHOW.RECS:
        IF I%>70 THEN PRINT: LET I%=2
                PRINT TAB(I%);CALLNBR%;
                LET I%=I%+5
CALLFILE.WRITE.INITIAL.REC:
        WRITE #1,REC%;CALLNBR%,DESCRIP$,CDATE$,CTIME$,RTIME$,DSK%,DSKMETH$,_
              ECRT$,EPTR$,DIAG$,SAVEPTR$,FDX$,EMDY$,HBKSP$,ECF$,LOGYSB$,_
              ENDCHR$,PARITY%,STATUS%,RECNT%,STIME$,ETIME$,LDATE$,RPGRM$,_
              SPGRM$
        NEXT REC%
        PRINT
        GOTO CALLFILE.DELETE.WORK
REM------------------------------------------------(SHOW AVAILABLE FUNCTIONS)
DISPLAY.FUNCTIONS:
        GOSUB SCREEN.HEADING
        PRINT "Available functions are:"
        PRINT
        PRINT TAB(15);"(U)pdate dial list values"
        PRINT TAB(15);"(D)isplay Master Dial List Report"
        PRINT TAB(15);"(P)rint Master Dial List Report"
        PRINT TAB(15);"(C)opy from another call"
        PRINT TAB(15);"(Q)uit"
DISPLAY.RESPONSE:
        PRINT
        INPUT "What function do you want to perform? ",WORK$
        ANSWER2$=LEFT$(WORK$,1)
        ANSWER$=LCASE$(ANSWER2$)
        FUNCTION$=ANSWER$
```

```
        IF ANSWER$="U" THEN GOSUB UPDATE.VALUES: GOTO DISPLAY.FUNCTIONS
        IF ANSWER$="D" THEN GOSUB LIST.VALUES: GOTO DISPLAY.FUNCTIONS
        IF ANSWER$="P" THEN GOSUB PRNT.VALUES: GOTO DISPLAY.FUNCTIONS
        IF ANSWER$="C" THEN GOSUB UPDATE.VALUES: GOTO DISPLAY.FUNCTIONS
        IF ANSWER$="Q" THEN GOTO RESET.FILES
        PRINT "RESPONSE MUST BE U, D, P, C, OR Q.  RE-ENTER."
        GOTO DISPLAY.RESPONSE
REM------------------------------------------------------------------(UPDATE)
UPDATE.VALUES:
        LET REC%=0
        LET MSG$=" "
UPDATE.NEW.SCREEN:
        GOSUB SCREEN.HEADING
        PRINT "Current dial list values (null entries not listed):"
        PRINT
        LET SSAVE%=REC%
        LET LLINE%=5
UPDATE.LEFT.DISPLAY:
        LET REC%=REC%+1
        IF REC%>ENTRYLMT% THEN GOTO UPDATE.RESPONSE
        GOSUB READ.CALLFILE.RECORD
        IF STAT$="END" THEN GOTO UPDATE.LEFT.DISPLAY
        IF DESCRIP$="*" THEN GOTO UPDATE.LEFT.DISPLAY
        PRINT USING "##";CALLNBR%;
        PRINT TAB(4);"... ";LEFT$(DESCRIP$,32);
UPDATE.RIGHT.DISPLAY:
        LET REC%=REC%+1
        IF REC%>ENTRYLMT% THEN PRINT " ": GOTO UPDATE.RESPONSE
        GOSUB READ.CALLFILE.RECORD
        IF STAT$="END" THEN GOTO UPDATE.RIGHT.DISPLAY
        IF DESCRIP$="*" THEN GOTO UPDATE.RIGHT.DISPLAY
        PRINT TAB(38);" ";
        PRINT USING "##";CALLNBR%;
        PRINT TAB(42);"... ";LEFT$(DESCRIP$,32)
        LET LLINE%=LLINE%+1
        LET HAVENEXT$="NO"
        IF LLINE%<18 THEN GOTO UPDATE.LEFT.DISPLAY
        PRINT " (N)";TAB(8);"NEXT SCREEN"
        LET HAVENEXT$="YES"
UPDATE.RESPONSE:
        PRINT " (Q)";TAB(8);"QUIT"
        PRINT
        PRINT MSG$
UPDATE.RESPONSE.QUESTION:
        PRINT "What call do you want to ";
        IF FUNCTION$="U" THEN PRINT "update ((Q)uit";
        IF FUNCTION$="C" THEN PRINT "copy into ((Q)uit";
        IF FUNCTION$="P" THEN PRINT "print ((Q)uit";
        IF FUNCTION$="D" THEN PRINT "display ((Q)uit";
        IF HAVENEXT$="YES" THEN PRINT ", (N)ext,";
        INPUT " or number)? ",WORK$
        LET ANSWER2$=LEFT$(WORK$,1)
        LET ANSWER$=UCASE$(ANSWER2$)
        IF ANSWER$="N" THEN GOTO UPDATE.NEW.SCREEN
        IF ANSWER$="Q" THEN GOTO DISPLAY.FUNCTIONS
        LET REC%=FIX(VAL(LEFT$(WORK$,4)))
        IF REC%>0 AND REC%<=ENTRY_MT% THEN GOTO UPDATE.READ.CURRENT
```

```
        LET ENTRYLMT$=TRIM$(STR$(ENTRYLMT%))
        LET MSG$="ENTRY NUMBER MUST BE 1 THRU "+ENTRYLMT$+". RE-ENTER."
        LET REC%=SSAVE%
        GOTO UPDATE.NEW.SCREEN
UPDATE.READ.CURRENT:
        GOSUB READ.CALLFILE.RECORD
        IF STAT$="END" THEN GOTO UPDATE.HOUSEKEEPING
        IF FUNCTION$="C" THEN GOTO UPDATE.COPY.REC
        GOSUB SCREEN.HEADING
        LET MESSAGE$="CURRENT VALUE"
        GOSUB ENTRY.BLOCK
        GOSUB ENTRY.BLOCK.BOTTOM
        PRINT "These are the current values. Press RETURN to continue.";
        WORK2%=CONCHAR
UPDATE.HOUSEKEEPING:
        LET HAVE$="YES"
        IF DESCRIP$="*" THEN LET HAVE$="NO"
        GOTO UPDATE.DESCRIP
REM----------------------------------------------------------------(COPY FROM ANOTHER)
UPDATE.COPY.REC:
        LET SAVREC%=REC%
UPDATE.COPY.BAD.RESPONSE:
        PRINT
        INPUT "What call do you want to copy from ((Q)uit or number)? ",WORK$
        LET ANSWER2$=LEFT$(WORK$,1)
        LET ANSWER$=UCASE$(ANSWER2$)
        IF ANSWER$="Q" THEN GOTO DISPLAY.FUNCTIONS
        LET WREC%=FIX(VAL(LEFT$(WORK$,4)))
        IF WREC%>0 AND WREC%<=ENTRYLMT% THEN GOTO UPDATE.COPY.READ.CURRENT
                LET ENTRYLMT$=TRIM$(STR$(ENTRYLMT%))
                PRINT "ENTRY NUMBER MUST BE 1 THRU "+ENTRYLMT$+". RE-ENTER."
                GOTO UPDATE.COPY.BAD.RESPONSE
UPDATE.COPY.READ.CURRENT:
        LET REC%=WREC%
        GOSUB READ.CALLFILE.RECORD
        IF STAT$()"END" THEN GOTO UPDATE.COPY.OK
                PRINT "BAD READ WHEN OBTAINING DISK FILE ENTRY. RE-TRY."
                GOTO UPDATE.COPY.REC
UPDATE.COPY.OK:
        LET REC%=SAVREC%
        LET CALLNBR%=SAVREC%
        GOSUB WRITE.CALLFILE.RECORD
        GOTO DISPLAY.FUNCTIONS
REM----------------------------------------------------------------(DESCRIP)
UPDATE.DESCRIP:
        GOSUB SCREEN.HEADING
        GOSUB ENTRY.BLOCK.TOP
        GOSUB ENTRY.BLOCK.DESCRIP
        GOSUB ENTRY.BLOCK.BOTTOM
        PRINT
UPDATE.DESCRIP.RESPONSE.ONE:
        PRINT
        INPUT "Do you want to update the description (Y,N,R,Q)? ",WORK$
        ANSWER2$=LEFT$(WORK$,1)
        ANSWER$=UCASE$(ANSWER2$)
        IF ANSWER$="Y" THEN GOTO UPDATE.DESCRIP.RESPONSE.TWO
        IF ANSWER$="N" THEN GOTO UPDATE.CALL.TIME
```

```
        IF ANSWER$="R" THEN GOTO UPDATE.DESCRIP.RESET
        IF ANSWER$="Q" THEN GOTO UPDATE.CONTINUE.REASK
        PRINT "MUST RESPOND (Y)ES, (N)O, (R)ESET OR (Q)UIT. RE-ENTER."
        GOTO UPDATE.DESCRIP.RESPONSE.ONE
UPDATE.DESCRIP.RESPONSE.TWO:
        PRINT
        PRINT "What is the call description..."
        INPUT "? ",WORK$
        IF LEN(WORK$)()0 THEN GOTO UPDATE.DESCRIP.MAXIMUM
UPDATE.DESCRIP.MUST.HAVE:
        PRINT "MUST HAVE A DESCRIPTION ENTRY. RE-ENTER."
        PRINT
        GOTO UPDATE.DESCRIP.RESPONSE.TWO
UPDATE.DESCRIP.MAXIMUM:
        IF LEN(WORK$))ENTRYMAX THEN GOTO UPDATE.DESCRIP.MAXERROR
        IF WORK$()"*" THEN GOTO UPDATE.DESCRIP.VALUE
                PRINT "CANNOT BE A SINGLE ASTERISK. RE-ENTER."
                PRINT
                GOTO UPDATE.DESCRIP.RESPONSE.TWO
UPDATE.DESCRIP.VALUE:
        LET DESCRIP$=WORK$
        GOTO UPDATE.CALL.TIME
UPDATE.DESCRIP.RESET:
        GOSUB SETUP.INITIALIZED.RECORD
        GOSUB WRITE.CALLFILE.RECORD
        GOTO UPDATE.CONTINUE
UPDATE.DESCRIP.MAXERROR:
        PRINT "MUST BE";ENTRYMAX;"CHARACTERS OR LESS."
        PRINT "ENTRY SHORTENED TO: ";
        LET WORK$=LEFT$(WORK$,ENTRYMAX)
        PRINT WORK$
        PRINT
        GOTO UPDATE.DESCRIP.RESPONSE.TWO
REM--------------------------------------------------------(CDATE,CTIME,RTIME)
UPDATE.CALL.TIME:
        IF LEN(DESCRIP$)=0 THEN GOTO UPDATE.DESCRIP.MUST.HAVE
        GOSUB SCREEN.HEADING
        GOSUB ENTRY.BLOCK.TOP
        GOSUB ENTRY.BLOCK.CALLTIME.LINE
        GOSUB ENTRY.BLOCK.CALLTIME
        GOSUB ENTRY.BLOCK.BOTTOM
UPDATE.CALL.TIME.REASK:
        PRINT
        IF HAVE$="NO" THEN GOTO UPDATE.CALL.TIME.NEW
        INPUT "Do you want to change/cancel the call time (Y,N,C,Q)? ",WORK$
        GOTO UPDATE.CALL.TIME.RESPONSE
UPDATE.CALL.TIME.NEW:
        INPUT "Do you want to establish a call time (Y,N,Q)? ",WORK$
UPDATE.CALL.TIME.RESPONSE:
        LET ANSWER2$=LEFT$(WORK$,1)
        LET ANSWER$=UCASE$(ANSWER2$)
        IF ANSWER$="Y" THEN GOTO UPDATE.CDATE
        IF ANSWER$="N" THEN GOTO UPDATE.DISK.FILE
        IF ANSWER$="Q" THEN GOTO UPDATE.CONTINUE
        IF HAVE$="YES" THEN GOTO UPDATE.CALL.TIME.YES
        PRINT "MUST RESPOND (Y)ES, (N)O, OR (Q)UIT. RE-ENTER."
        GOTO UPDATE.CALL.TIME.REASK
```

```
UPDATE.CALL.TIME.YES:
     IF ANSWER$="C" THEN GOTO UPDATE.CALL.TIME.CANCEL
     PRINT "MUST RESPOND (Y)ES, (N)O, (C)ANCEL, OR (Q)UIT. RE-ENTER."
     GOTO UPDATE.CALL.TIME.REASK
UPDATE.CALL.TIME.CANCEL:
     LET CDATE$="000000"
     LET CTIME$="000000"
     LET RTIME$="000000"
     GOTO UPDATE.DISK.FILE
UPDATE.CDATE:
     INPUT "What day is the call to be started (mmdcyy)? ",WORK$
     IF WORK$="0" THEN CDATE$="000000": GOTO UPDATE.CTIME
     GOSUB VALIDATE.DATE
     IF STAT$="OK" THEN CDATE$="*"+WORK$: GOTO UPDATE.CTIME
     PRINT MSG$
     PRINT
     GOTO UPDATE.CDATE
UPDATE.CTIME:
     INPUT "What time is the call placed (nhmm, 24 hour clock)? ",WORK$
     IF WORK$="0" THEN CTIME$="000000": GOTO UPDATE.RTIME
     GOSUB VALIDATE.TIME
     IF STAT$="OK" THEN CTIME$=WORK$: GOTO UPDATE.RTIME
     PRINT MSG$
     PRINT
     GOTO UPDATE.CTIME
UPDATE.RTIME:
     LET RTIME$="000000"
REM----------------------------------------------------------------(DSK,DSKMETH)
UPDATE.DISK.FILE:
     GOSUB SCREEN.HEADING
     GOSUB ENTRY.BLOCK.TOP
     GOSUB ENTRY.BLOCK.DSK.LINE
     GOSUB ENTRY.BLOCK.DSKMETH
     GOSUB ENTRY.BLOCK.BOTTOM
UPDATE.DISK.FILE.REASK:
     PRINT
     INPUT "Do you want to update the disk file definition (Y,N,Q)? ",WORK$
     LET ANSWER2$=LEFT$(WORK$,1)
     ANSWER$=UCASE$(ANSWER2$)
     IF ANSWER$="Y" THEN GOTO UPDATE.DSK
     IF ANSWER$="N" THEN GOTO UPDATE.DISPOSITION
     IF ANSWER$="Q" THEN GOTO UPDATE.CONTINUE
     PRINT "MUST RESPOND (Y)ES, (N)O OR (Q)UIT. RE-ENTER."
     GOTO UPDATE.DISK.FILE.REASK
UPDATE.DSK:
     IF HAVE$="NO" THEN GOTO UPDATE.DSK.NEW
     IF DSK%=0 THEN GOTO UPDATE.DSK.NEW
     INPUT "Do you want to continue keeping a disk data file? ",WORK$
     GOTO UPDATE.DSK.RESPONSE
UPDATE.DSK.NEW:
     INPUT "Do you want a data file to result from this call? ",WORK$
UPDATE.DSK.RESPONSE:
     LET ANSWER2$=LEFT$(WORK$,1)
     ANSWER$=UCASE$(ANSWER2$)
     IF ANSWER$="Y" THEN GOTO UPDATE.DSK.DATA
     IF ANSWER$="N" THEN GOTO UPDATE.DSK.RESET
     PRINT "MUST RESPOND (Y)ES OR (N)O. RE-ENTER."
```

```
        PRINT
        GOTO UPDATE.DSK
UPDATE.DSK.DATA:
        LET DSK%=1
        LET DSKMETH$="Y"
        LET SPGRM$="BAMTRAC"
        GOTO UPDATE.DISPOSITION
REM ******************************** LEFT IN FOR FUTURE EXPANSION
REM UPDATE.DSKMETH:
REM     INPUT "Is the Bank of America data transfer protocol used? ";WORK$
REM     LET ANSWER2$=LEFT$(WORK$,1)
REM     ANSWER$=UCASE$(ANSWER2$)
REM     IF ANSWER$="Y" THEN DSKMETH$="Y": GOTO UPDATE.DSK.FORMAT
REM     IF ANSWER$="N" THEN DSKMETH$="N": GOTO UPDATE.DSK.FORMAT
REM     PRINT "MUST RESPOND (Y)ES OR (N)O. RE-ENTER."
REM     PRINT
REM     GOTO UPDATE.DSKMETH
REM UPDATE.DSK.FORMAT:
REM     INPUT "What is the format of the disk file received? ";WORK$
REM     LET ANSWER$=UCASE$(WORK$)
REM     LET SPGRM$=ANSWER$
REM     IF ANSWER$="BAMTRAC" THEN GOTO UPDATE.DISPOSITION
REM     IF ANSWER$="BAI" THEN GOTO UPDATE.DISPOSITION
REM     IF ANSWER$="NONE" THEN GOTO UPDATE.DISPOSITION
REM     PRINT "RESPONSE MUST BE (BAMTRAC), (BAI), OR (NONE). RE-ENTER."
REM     PRINT
REM     GOTO UPDATE.DSK.FORMAT
REM***************************************************************
UPDATE.DSK.RESET:
        LET DSK%=0
        LET DSKMETH$="N"
        LET SPGRM$="NONE"
REM-------------------------------------------------(ECRT,EPTR,DIAG,SAVEPTR,EXDM)
UPDATE.DISPOSITION:
        GOSUB SCREEN.HEADING
        GOSUB ENTRY.BLOCK.TOP
        GOSUB ENTRY.BLOCK.ECRT.LINE
        GOSUB ENTRY.BLOCK.ECRT
        GOSUB ENTRY.BLOCK.BOTTOM
UPDATE.DISPOSITION.REASK:
        PRINT
        INPUT "Do you want to change the data disposition (Y,N,Q)? ",WORK$
        LET ANSWER2$=LEFT$(WORK$,1)
        ANSWER$=UCASE$(ANSWER2$)
        IF ANSWER$="Y" THEN GOTO UPDATE.ECRT
        IF ANSWER$="N" THEN GOTO UPDATE.CHECK.DSK
        IF ANSWER$="Q" THEN GOTO UPDATE.CONTINUE
        PRINT "MUST RESPOND (Y)ES, (N)O, OR (Q)UIT. RE-ENTER."
        GOTO UPDATE.DISPOSITION.REASK
UPDATE.ECRT:
        INPUT "Do you want to display the received data on the screen? ",WORK$
        LET ANSWER2$=LEFT$(WORK$,1)
        ANSWER$=UCASE$(ANSWER2$)
        IF ANSWER$="Y" THEN ECRT$="Y": GOTO UPDATE.EPTR
        IF ANSWER$="N" THEN ECRT$="N": GOTO UPDATE.EPTR
        PRINT "MUST RESPOND (Y)ES OR (N)O. RE-ENTER."
        PRINT
        GOTO UPDATE.ECRT
```

```
UPDATE.EPTR:
        INPUT "Do you want to print the received data on the printer? ",WORK$
        LET ANSWER2$=LEFT$(WORK$,1)
        ANSWER$=UCASE$(ANSWER2$)
        IF ANSWER$="Y" THEN EPTR$="Y": GOTO UPDATE.DIAG
        IF ANSWER$="N" THEN EPTR$="N": GOTO UPDATE.DIAG
        PRINT "MUST RESPOND (Y)ES OR (N)O. RE-ENTER."
        PRINT
        GOTO UPDATE.EPTR
UPDATE.DIAG:
        IF TECH$()"YES" THEN DIAG$="N": GOTO UPDATE.SAVEPTR
        INPUT "Do you want to update the diagnostics file? ",WORK$
        LET ANSWER2$=LEFT$(WORK$,1)
        ANSWER$=UCASE$(ANSWER2$)
        IF ANSWER$="Y" THEN DIAG$="Y": GOTO UPDATE.SAVEPTR
        IF ANSWER$="N" THEN DIAG$="N": GOTO UPDATE.SAVEPTR
        PRINT "MUST RESPOND (Y)ES OR (N)O. RE-ENTER."
        PRINT
        GOTO UPDATE.DIAG
UPDATE.SAVEPTR:
        INPUT "Do you want to save the received data in a disk file? ",WORK$
        LET ANSWER2$=LEFT$(WORK$,1)
        ANSWER$=UCASE$(ANSWER2$)
        IF ANSWER$="Y" THEN SAVEPTR$="Y": GOTO UPDATE.CHECK.DSK
        IF ANSWER$="N" THEN SAVEPTR$="N": GOTO UPDATE.EMDM
        PRINT "MUST RESPOND (Y)ES OR (N)O. RE-ENTER."
        PRINT
        GOTO UPDATE.SAVEPTR
UPDATE.CHECK.DSK:

REM ---------------------------------------9/01/83: SEE V2.11 ABOVE.
        IF ANSWER$="Y" AND DSK%=2 THEN DSK%=1: GOTO UPDATE.EMDM

IF NOT((DSKMETH$="Y") AND (SAVEPTR$="Y")) THEN GOTO UPDATE.EMDM
PRINT "YOU INDICATED THAT THERE WAS ALSO A DISK DATA FILE RESULTING FROM THIS CALL."
        PRINT "YOU CANNOT HAVE BOTH. IF YOU HAVE A PRINTER FILE, YOU CANNOT HAVE A"
        PRINT "DISK DATA FILE."
        PRINT
UPDATE.CHECK.DSK.RESPONSE:
        INPUT "Which do you have for this call ((D)isk Data or (R)eport)? ",WORK$
        LET ANSWER2$=LEFT$(WORK$,1)
        ANSWER$=UCASE$(ANSWER2$)
        IF ANSWER$="D" THEN SAVEPTR$="N": GOTO UPDATE.EMDM
        IF ANSWER$="R" THEN SPGRM$="NONE": DSKMETH$="N": GOTO UPDATE.EMDM
        PRINT "MUST RESPOND (D)ISK OR (R)EPORT. RE-ENTER."
        PRINT
        GOTO UPDATE.CHECK.DSK.RESPONSE
UPDATE.EMDM:
        IF TECH$()"YES" THEN EMDM$="N": GOTO UPDATE.TECHNICAL
        INPUT "Do you want to display modem output on the screen? ",WORK$
        LET ANSWER2$=LEFT$(WORK$,1)
        ANSWER$=UCASE$(ANSWER2$)
        IF ANSWER$="Y" THEN EMDM$="Y": GOTO UPDATE.TECHNICAL
        IF ANSWER$="N" THEN EMDM$="N": GOTO UPDATE.TECHNICAL
        PRINT "MUST RESPOND (Y)ES OR (N)O. RE-ENTER."
        PRINT
        GOTO UPDATE.EMDM
```

```
REM----------------------------------------(FDX,HBKSP,EOF,LOGMSG,ENDCHR,PARITY)
UPDATE.TECHNICAL:
        GOSUB SCREEN.HEADING
        GOSUB ENTRY.BLOCK.TOP
        GOSUB ENTRY.BLOCK.TECHNICAL.LINE
        GOSUB ENTRY.BLOCK.TECHNICAL
        GOSUB ENTRY.BLOCK.BOTTOM
UPDATE.TECHNICAL.REASK:
        PRINT
        INPUT "Do you want update the technical data (Y,N,Q)? ",WORK$
        LET ANSWER2$=LEFT$(WORK$,1)
        ANSWER$=UCASE$(ANSWER2$)
        IF ANSWER$="Y" THEN GOTO UPDATE.FDX
        IF ANSWER$="N" THEN GOTO UPDATE.CONTINUE
        IF ANSWER$="Q" THEN GOTO UPDATE.CONTINUE
        PRINT "MUST RESPOND (Y)ES, (N)O, OR (Q)UIT. RE-ENTER."
        GOTO UPDATE.TECHNICAL.REASK
UPDATE.FDX:
        INPUT "Is the call placed under full duplex mode? ",WORK$
        LET ANSWER2$=LEFT$(WORK$,1)
        ANSWER$=UCASE$(ANSWER2$)
        IF ANSWER$="Y" THEN FDX$="Y": GOTO UPDATE.PARITY
        IF ANSWER$="N" THEN FDX$="N": GOTO UPDATE.PARITY
        PRINT "MUST RESPOND (Y)ES OR (N)O. RE-ENTER."
        PRINT
        GOTO UPDATE.FDX
UPDATE.PARITY:
        INPUT "What is the modem setting for the host system? ",WORK$
        IF LEN(WORK$)=1 THEN WORK$="0"+WORK$
        IF WORK$="00" THEN GOTO UPDATE.PARITY.OK
        IF WORK$="10" THEN GOTO UPDATE.PARITY.OK
        IF WORK$)"00" AND WORK$("09" THEN GOTO UPDATE.PARITY.OK
        IF WORK$)"10" AND WORK$("17" THEN GOTO UPDATE.PARITY.OK
                PRINT "PARITY VALUE MUST BE 00, 01-08, 10, 11-16. RE-ENTER."
                PRINT
                GOTO UPDATE.PARITY
UPDATE.PARITY.OK:
        LET WORK%=FIX(VAL(LEFT$(WORK$,4)))
        LET PARITY%=WORK%
        INPUT "What is the host system logoff (quit) message? ",LOGMSG$
        IF LEN(LOGMSG$)=0 THEN LOGMSG$="LOG"
UPDATE.HBKSP:
        IF TECH$()"YES" THEN GOTO UPDATE.CONTINUE
        INPUT "What is the host system backspace character? ",HBKSP$
        IF LEN(HBKSP$)=1 THEN GOTO UPDATE.EOF
        PRINT "MUST HAVE A SINGLE CHARACTER VALUE. RE-ENTER."
        PRINT
        GOTO UPDATE.HBKSP
UPDATE.EOF:
        INPUT "How does the host system editor indicate end-of-file? ",EOF$
UPDATE.ENDCHR:
        INPUT "What is the normal prompt for the host system? ",ENDCHR$
        IF LEN(ENDCHR$)=1 THEN GOTO UPDATE.CONTINUE
                PRINT "MUST HAVE A SINGLE CHARACTER VALUE. RE-ENTER."
                PRINT
                GOTO UPDATE.ENDCHR
REM----------------------------------------------------------------(CONTINUE)
```

```
UPDATE.CONTINUE:
        GOSUB SCREEN.HEADING
        GOSUB ENTRY.BLOCK.TOP
        GOSUB ENTRY.BLOCK.BOTTOM
        PRINT
        PRINT "Replacing the updated record on file."
        GOSUB WRITE.CALLFILE.RECORD
UPDATE.CONTINUE.REASK:
        PRINT
        INPUT "Do you want a display of the defined calls (Y,N,Q)? ",WORK$
        ANSWER2$=LEFT$(WORK$,1)
        ANSWER$=UCASE$(ANSWER2$)
        IF ANSWER$="N" THEN GOTO UPDATE.SETUP.NEXT
        IF ANSWER$="Y" THEN GOTO UPDATE.VALUES
        IF ANSWER$="Q" THEN GOTO DISPLAY.FUNCTIONS
        PRINT "MUST RESPOND (Y)ES, (N)O, OR (Q)UIT. RE-ENTER."
        GOTO UPDATE.CONTINUE.REASK
UPDATE.SETUP.NEXT:
        GOSUB SCREEN.HEADING
        LET MESSAGE$="PRIOR UPDATE"
        GOSUB ENTRY.BLOCK.TOP
        GOSUB ENTRY.BLOCK.BOTTOM
        PRINT
        GOTO UPDATE.RESPONSE.QUESTION
REM----------------------------------------------------------------(LIST VALUES)
LIST.VALUES:
        GOSUB SCREEN.HEADING
LIST.RESPONSE:
        INPUT "What do you want listed ((A)ll, (S)ingle)? ",WORK$
        ANSWER2$=LEFT$(WORK$,1)
        ANSWER$=UCASE$(ANSWER2$)
        IF ANSWER$="A" THEN GOTO LIST.ALL
        IF ANSWER$="S" THEN PRINT: GOTO LIST.SINGLE
        PRINT "RESPONSE MUST BE (A)LL OR (S)INGLE. RE-ENTER."
        PRINT
        GOTO LIST.RESPONSE
LIST.ALL:
        REC%=0
LIST.ALL.LOOP:
        LET REC%=REC%+1
        IF REC%>ENTRYLMT% THEN RETURN
        GOSUB READ.CALLFILE.RECORD
        IF STAT$="END" THEN RETURN
        IF DESCRIP$="*" THEN GOTO LIST.ALL.LOOP
        GOSUB SCREEN.HEADING
        LET MESSAGE$="CURRENT VALUE"
        GOSUB ENTRY.BLOCK
        GOSUB ENTRY.BLOCK.BOTTOM
        PRINT "When ready to view next call press RETURN";
        WORK%=CONCHAR
        GOTO LIST.ALL.LOOP
LIST.SINGLE:
        INPUT "What call do you want to view ((Q) to quit)? ",WORK$
        ANSWER2$=LEFT$(WORK$,1)
        ANSWER$=UCASE$(ANSWER2$)
        IF ANSWER$="Q" THEN RETURN
        LET REC%=FIX(VAL(LEFT$(WORK$,4)))
```

```
        IF REC%>0 AND REC%(=ENTRYLMT% THEN GOTO LIST.SINGLE.DISPLAY
        PRINT "ENTRY NUMBER MUST BE 1 THRU";ENTRYLMT%;". RE-ENTER."
        PRINT
        GOTO LIST.SINGLE
LIST.SINGLE.DISPLAY:
        GOSUB SCREEN.HEADING
        GOSUB READ.CALLFILE.RECORD
        IF STAT$="END" THEN GOTO LIST.SINGLE.ERROR
        LET MESSAGE$="CURRENT VALUE"
        GOSUB ENTRY.BLOCK
        GOSUB ENTRY.BLOCK.BOTTOM
        GOTO LIST.SINGLE
LIST.SINGLE.ERROR:
        PRINT "ERROR WHEN READING THE ENTRY SPECIFIED. RE-ENTER."
        PRINT
        GOTO LIST.SINGLE
REM--------------------------------------------------------------(PRINT VALUES)
PRNT.VALUES:
        GOSUB SCREEN.HEADING
        IF PRINTER$="YES" THEN GOTO PRNT.RESPONSE
        PRINT "YOU DON'T HAVE A PRINTER AVAILABLE."
        PRINT "Press RETURN to return to selection menu.";
        WORK%=CONCHAR
        RETURN
PRNT.RESPONSE:
        INPUT "What do you want listed ((A)ll, (S)ingle)? ",WORK$
        ANSWER2$=LEFT$(WORK$,1)
        ANSWER$=LCASE$(ANSWER2$)
        IF ANSWER$="A" THEN GOTO PRNT.ALL
        IF ANSWER$="S" THEN GOTO PRNT.SINGLE
        PRINT "RESPONSE MUST BE (A)LL OR (S)INGLE. RE-ENTER."
        PRINT
        GOTO PRNT.RESPONSE
PRNT.ALL:
        PRINT
        PRINT "When the printer is ready press RETURN."
        WORK%=CONCHAR
        GOSUB SCREEN.HEADING
        PRINT "Printing all dial list values."
        LPRINTER
        PRNTDATE$=MID$(CURRDAY$,3,2)+"/"+RIGHT$(CURRDAY$,2)+"/"+LEFT$(CURRDAY$,2)
        REC%=0
        PAGENO%=0
        SETCNT%=0
        GOSUB PRNT.NEW.PAGE.HEADING
PRNT.ALL.LOOP:
        LET REC%=REC%+1
        IF REC%>ENTRYLMT% THEN GOTO PRNT.ALL.THRU
        GOSUB READ.CALLFILE.RECORD
        IF STAT$="END" THEN GOTO PRNT.ALL.THRU
        IF DESCRIP$="*" THEN GOTO PRNT.ALL.LOOP
        IF SETCNT%>1 THEN GOSUB PRNT.NEW.PAGE
        LET MESSAGE$="CURRENT VALUE"
        GOSUB ENTRY.BLOCK.TOP
        GOSUB ENTRY.BLOCK.DESCRIP
        IF STAT$="NONE" THEN GOTO PRNT.BLOCK.BOTTOM
        GOSUB ENTRY.BLOCK.CALLTIME.LINE
```

```
            GOSUB ENTRY.BLOCK.CALLTIME
            GOSUB ENTRY.BLOCK.DSK.LINE
            GOSUB ENTRY.BLOCK.DSKYETH
            GOSUB ENTRY.BLOCK.ECRT.LINE
            GOSUB ENTRY.BLOCK.ECRT
            GOSUB ENTRY.BLOCK.TECHNICAL.LINE
            GOSUB ENTRY.BLOCK.TECHNICAL
PRNT.BLOCK.BOTTOM:
            GOSUB ENTRY.BLOCK.BOTTOM
            LET SETCNT%=SETCNT%+1
            PRINT
            PRINT
            PRINT
            GOTO PRNT.ALL.LOOP
PRNT.NEW.PAGE:
            LET SETCNT%=2
            GOSUB PRNT.NEW.PAGE.HEADING
            RETURN
PRNT.ALL.THRU:
            CONSOLE
            RETURN
PRNT.NEW.PAGE.HEADING:
            PRINT PNEWPAGE$
            LET PAGENO%=PAGENO%+1
            PRINT TAB((80-LEN(TITLE$))\2);TITLE$
            PRINT TAB((80-LEN(CTITLE$))\2);CTITLE$
            LET TITLE2$="MASTER DIAL LIST ENTRY REPORT"
            PRINT "DATE: ";PRNTDATE$;
            PRINT TAB((80-LEN(TITLE2$))\2);TITLE2$;
            PRINT TAB(72);"PAGE: ";
            PRINT USING "###";PAGENO%
            PRINT: PRINT: PRINT
            RETURN
PRNT.SINGLE:
            PRINT
            INPUT "What call do you want to view ((Q) to quit)? ",WORK$
            ANSWER2$=LEFT$(WORK$,1)
            ANSWER$=UCASE$(ANSWER2$)
            IF ANSWER$="Q" THEN RETURN
            LET RECX=FIX(VAL(LEFT$(WORK$,4)))
            IF RECX>0 AND RECX<=ENTRYLMT% THEN GOTO PRNT.SINGLE.DISPLAY
            PRINT "ENTRY NUMBER MUST BE 1 THRU";ENTRYLMT%;". RE-ENTER."
            GOTO PRNT.SINGLE
PRNT.SINGLE.DISPLAY:
            GOSUB READ.CALLFILE.RECORD
            IF STAT$="END" THEN GOTO PRNT.SINGLE.ERROR
            PRINT
            PRINT "When the printer is ready press RETURN."
            WORK%=CONCHAR
            GOSUB SCREEN.HEADING
            PRINT "Printing specified dial list values."
            LPRINTER
            PAGENO%=0
            PRNTDATE$=MID$(CURRDAY$,3,2)+"/"+RIGHT$(CURRDAY$,2)+"/"+LEFT$(CURRDAY$,2)
PRNT.SINGLE.HEADING:
            GOSUB PRNT.NEW.PAGE.HEADING
            LET MESSAGE$="CURRENT VALUE"
```

```
        GOSUB ENTRY.BLOCK.TOP
        GOSUB ENTRY.BLOCK.DESCRIP
        IF STAT$="NONE" THEN GOTO PRNT.SINGLE.BLOCK.BOTTOM
        GOSUB ENTRY.BLOCK.CALLTIME.LINE
        GOSUB ENTRY.BLOCK.CALLTIME
        GOSUB ENTRY.BLOCK.DSK.LINE
        GOSUB ENTRY.BLOCK.DSKMETH
        GOSUB ENTRY.BLOCK.ECRT.LINE
        GOSUB ENTRY.BLOCK.ECRT
        GOSUB ENTRY.BLOCK.TECHNICAL.LINE
        GOSUB ENTRY.BLOCK.TECHNICAL
PRNT.SINGLE.BLOCK.BOTTOM:
        GOSUB ENTRY.BLOCK.BOTTOM
        CONSOLE
        GOTO PRNT.SINGLE
PRNT.SINGLE.ERROR:
        PRINT "ERROR WHEN READING THE ENTRY SPECIFIED. RE-ENTER."
        GOTO PRNT.SINGLE
REY-----------------------------------------------------------------(RESET)
RESET.FILES:
        GOSUB SCREEN.HEADING
        PRINT "Resetting the dial list file names."
        PRINT
        CLOSE 1
        CLOSE 2
        FILESIZE=SIZE(CFILE3$)
        IF FILESIZE=0 THEN GOTO RESET.RENAME.BAK
        OPEN "R",3,CFILE3$,CFILELEN%
        DELETE 3
RESET.RENAME.BAK:
        RECX=RENAME(CFILE3$,CFILE1$)
        IF RECX=-1 THEN GOTO RESET.RENAME.DAT
        PRINT "CANNOT RENAME CURRENT TO BACKUP VERSION."
        PRINT "When ready to continue press RETURN."
        WORKX=CONCHAR
        PRINT
RESET.RENAME.DAT:
        RECX=RENAME(CFILE1$,CFILE2$)
        IF RECX=-1 THEN GOTO RESET.WORKING.COMDIAL
        PRINT "CANNOT RENAME WORKING TO CURRENT VERSION."
        PRINT "When ready to continue press RETURN."
        WORKX=CONCHAR
        PRINT
RESET.WORKING.COMDIAL:
        GOSUB SCREEN.HEADING
        PRINT "Changing the dial list with updates for the defined calls."
        PRINT
        FILESIZE=SIZE(CFILE1$)
        IF FILESIZE=0 THEN GOTO RESET.COMDIALM.ERROR
        OPEN "R",1,CFILE1$,CFILELEN%
        GOTO RESET.COMDIAL.OPEN
RESET.COMDIALM.ERROR:
        PRINT "CANNOT OPEN THE COMDIALM FILE."
        PRINT "When ready to continue press RETURN."
        WORKX=CONCHAR
        GOTO RETURN.TO.MENU
RESET.COMDIAL.OPEN:
        FILESIZE=SIZE(CFILE4$)
```

```
        IF FILESIZE=2 THEN GOTO RESET.NO.COMDIAL
        OPEN "R",4,CFILE4$,CFILELEN%
        LET FILESTAT$="HAVE"
        GOTO RESET.COMDIALW.DELETE
RESET.NO.COMDIAL:
        LET FILESTAT$="NONE"
RESET.COMDIALW.DELETE:
        FILESIZE=SIZE(CFILES$)
        IF FILESIZE=0 THEN GOTO RESET.COMDIALW.CREATE
        OPEN "R",5,CFILES$,CFILELEN%
        DELETE 5
RESET.COMDIALW.CREATE:
        OPEN "R",5,CFILES$,CFILELEN%
RESET.UPDATE.WORK:
        ON END (1) GOTO RESET.CLOSE.FILES
        ON END (4) GOTO RESET.CLOSE.FILES
        LET I%=2
        FOR REC%=1 TO ENTRYLMT%
                GET #1,REC%
                INPUT #1,CALLNBR%,DESCRIP$,CDATE$,CTIME$,RTIME$,DSK%,DSKMETH$
                INPUT #1,ECRT$,EPTR$,DIAG$,SAVEPTR$,FDX$,EMDM$,HBKSP$,EOF$,LOGMSG$
                INPUT #1,ENDCHR$,PARITY%,STATUS%,RECNT%,STIME$,ETIME$,LDATE$,RPGRM$
                INPUT #1,SPGRM$
                IF FILESTAT$="NONE" THEN GOTO RESET.SETUP.NONE.VALUES
                GET #4,REC%
                INPUT #4,OCALLNBR%,ODESCRIP$,OCDATE$,OCTIME$,ORTIME$,ODSK%,ODSKMETH$
                INPUT #4,OECRT$,OEPTR$,ODIAG$,OSAVEPTR$,OFDX$,OEMDM$,OHBKSP$,OEOF$,OLOGMSG$
                INPUT #4,OENDCHR$,OPARITY%,OSTATUS%,ORECNT%,OSTIME$,OETIME$,OLDATE$,ORPGRM$
                INPUT #4,OSPGRM$
                GOTO RESET.WRITE.WORK.FILE
RESET.SETUP.NONE.VALUES:
                LET OCDATE$=CDATE$
                LET OSTATUS%=STATUS%
                LET ORECNT%=RECNT%
                LET OSTIME$=STIME$
                LET OETIME$=ETIME$
                LET OLDATE$=LDATE$
                LET ORPGRM$=RPGRM$
RESET.WRITE.WORK.FILE:
                LET WORK$=LEFT$(CDATE$,1)
                IF WORK$="*" THEN OCDATE$=RIGHT$(CDATE$,6)
                WRITE #5,REC%;CALLNBR%,DESCRIP$,OCDATE$,CTIME$,RTIME$,DSK%,DSKMETH$,_
                        ECRT$,EPTR$,DIAG$,SAVEPTR$,FDX$,EMDM$,HBKSP$,EOF$,LOGMSG$,_
                        ENDCHR$,PARITY%,OSTATUS%,ORECNT%,OSTIME$,OETIME$,OLDATE$,ORPGRM$,_
                        SPGRM$
                IF TECH$="YES" THEN GOTO RESET.SHOW.RECS
                IF SHOWDIAL$="NO" THEN GOTO RESET.NEXT.REC
RESET.SHOW.RECS:
                IF I%>70 THEN PRINT: LET I%=2
                        PRINT TAB(I%);REC%;
                        LET I%=I%+5
RESET.NEXT.REC:
        NEXT REC%
        PRINT
RESET.CLOSE.FILES:
        CLOSE 1
        IF FILESTAT$="HAVE" THEN DELETE 4
```

```
        CLOSE 5
        REDX=RENAME(CFILE4$,CFILE5$)
        IF REDX=-1 THEN GOTO RETURN.TO.MENU
        PRINT "CANNOT RENAME WORK TO COMDIAL VERSION."
        PRINT "When ready to continue press RETURN."
        WORKX=CONCHAR
REM----------------------------------------------------------------(RETURN)
RETURN.TO.MENU:
        GOSUB SCREEN.HEADING
        PRINT "Returning to Communications Menu."
        END D)type D:COMPTRBL.BAS REM ***** COMPTRBL.BAS (Business BASIC 0.99)
REM        05/02/83
REM        1420
REM
REM DISPLAYS DAILY COMMUNICATIONS TROUBLE LOG ON CONSOLE
REM OR LISTS IT ON LINE PRINTER.
REM
REM ORIGINALLY PROGRAMMED BY MONTE MONTEAU AND TOM TRELFORD 08/28/82
REM----------------------------------------------------------------(CHANGE LOG)
REM VERSION   DATE    CHANGE
REM    1.0   08/28/82 INITIAL VERSION
REM    1.1   09/10/82 Changed (L)ist and (S)how to (D)isplay (T)echnical
REM    1.2   02/02/83 Return to COMMENU added
REM                   Eliminated use of CLOCK
REM                   Eliminated (T)echnical selection
REM                   Added use of control file TECH value
REM    2.0   02/16/83 Translated to Business BASIC 0.99; by Steve Hemphill
REM    2.1   03/03/83 Remove chain-back to COMMENU; by Steve Hemphill
REM    2.2   03/10/83 Prompts changed to show space before response; by
REM                   Steve Hemphill
REM    2.3   04/25/83 Display of Version number added; by Steve Hemphill
REM    2.4   05/02/83 Get report date from the control file; by Judy Ku
REM    2.5   07/29/83 various report format changes; by b.wong
REM----------------------------------------------------------------(PROGRAM START)
STARTUP:
  CONSOLE
  VERSION$="Trouble Log Processor - Version 2.5"
  CONTROL$="CONTROL.DAT"
  CTLLENX=120
  CTLMAXX=102
  CURRDAY$="000000"
  EFILE2$="COMERROR.DAT"
  LOGLINE2$="1"
  PASSWORD$="FRED"
  SCRNMAXX=15
  SHOWTECH$="NO"
  LET TECH$="NO"
  TFILE2$="COMTRBL.DAT"
  TITLE2$="DAILY TROUBLE LOG"
REM----------------------------------------------------------------(SET CONTROLS)
  PRINT
  PRINT "Obtaining system control values."
```

```
    ON END (1) GOTO CONTROL.MISSING
    OPEN "R",1,CONTROL$,CTLLEN%
    STAT.CTL$="RDY"
    WORK%=1
    GOTO CONTROLFILE.GET.RECORD
CONTROL.MISSING:
    FOR CNT%=1 TO 25
        PRINT
    NEXT CNT%
    PRINT "NO CONTROL FILE. CANNOT PROCEED WITH PROCESSING."
    PRINT "Press RETURN to return to menu. ";
    WORK%=CONCHAR
    GOTO RETURN.TO.MENU
CONTROLFILE.GET.RECORD:
    GOSUB READ.CONTROL
    IF STAT$="END"      THEN GOTO CONTROLFILE.CLOSE
    IF NAME$="ENDALL"   THEN GOTO CONTROLFILE.CLOSE
    LET IWORK%=INT(VAL(LEFT$(VALUEONE$,4)))
    IF NAME$="BLANK"    THEN BLANK$=CHR$(IWORK%)
    IF NAME$="CLOCK"    THEN CLOCK$=VALUEONE$
    IF NAME$="CARRIAGE" THEN CARRIAGE%=IWORK%
    IF NAME$="CURRDAY"  THEN CURRDAY$=VALUEONE$
    IF NAME$="CTITLE"   THEN CTITLE$=VALUEONE$
    IF NAME$="HEADING"  THEN HEADING$=VALUEONE$
    IF NAME$="PASSWORD" THEN PASSWORD$=VALUEONE$
    IF NAME$="PMAXLINE" THEN PMAXLINE%=IWORK%
    IF NAME$="PNEXPAGE" THEN PNEXPAGE$=CHR$(IWORK%)
    IF NAME$="PRINTER"  THEN PRINTER$=VALUEONE$
    IF NAME$="SHOME"    THEN SHOME$=CHR$(IWORK%)
    IF NAME$="SCLEAR"   THEN SCLEAR$=CHR$(IWORK%)
    IF NAME$="TEST"     THEN TEST$=VALUEONE$
    IF NAME$="TITLE"    THEN TITLE$=VALUEONE$
CONTROLFILE.SETUP.NEXT:
    LET WORK%=WORK%+1
    IF WORK%>CTLMAX% THEN GOTO CONTROLFILE.CLOSE
    GOTO CONTROLFILE.GET.RECORD
CONTROLFILE.CLOSE:
    CLOSE 1
REM----------------------------------------------------------------(READY CONTRBL)
CONTRBL.OPEN:
    ON END (2) GOTO CONTRBL.MISSING
    OPEN "I",2,TFILE2$ : CLOSE 2
    GOTO CONERROR.TEST
CONTRBL.MISSING:
    GOSUB SCREEN.HEADING
    PRINT "NO TROUBLE LOG FILE FOR TODAY."
    PRINT "Press RETURN to return to the menu. ";
    WORK%=CONCHAR
    GOTO RETURN.TO.MENU
REM----------------------------------------------------------------(READY CONERROR)
CONERROR.TEST:
    ON END (3) GOTO CONERROR.MISSING
    OPEN "I",3,EFILE3$ : CLOSE 3
    GOTO OFFER.FUNCTION
CONERROR.MISSING:
    GOSUB SCREEN.HEADING
    PRINT "NO ERROR CODE FILE, CANNOT CONTINUE PROCESSING."
```

```
        STAT.ERR$="MSG"
        PRINT "Press RETURN to return to menu. ";
        WORK%=CONCHAR
        GOTO RETURN.TO.MENU
REM------------------------------------------(SUBROUTINE = SCREEN OR PAGE FULL)
PAGE.BREAK:
    IF MEDIA$="P" THEN GOTO PUT.NEW.PAGE
    INPUT "(N)ext page or (R)eturn to selection menu ", W$
    ANSWER$=UCASE$(LEFT$(W$,1))
    IF ANSWER$()"N" AND ANSWER$()"R" _
        THEN PRINT "RESPONSE MUST BE N OR R. RE-ENTER." : PRINT: _
        GOTO PAGE.BREAK
    IF ANSWER$="R" THEN GOTO END.PAGE.BREAK
PUT.NEW.SCREEN:
    GOSUB SCREEN.HEADING
REM   PRINT TAB((80-LEN(TITLE2$))\2);TITLE2$ : PRINT
    MAXLINE%=SCRNMAX%
    LLINE%=3
    GOTO PUT.COL.TITLES
PUT.NEW.PAGE:
    PRINT PNEWPAGE$
    PGNO%=PGNO%+1
    PRINT TAB((80-LEN(TITLE$))\2);TITLE$
    PRINT TAB((80-LEN(CTITLE$))\2);CTITLE$
    PRINT "DATE: ";PRNTDATE$;
    PRINT TAB((60-LEN(TITLE2$))\2);TITLE2$;
    PRINT TAB(70);"Page: ";
    PRINT USING "###";PGNO%
    PRINT: PRINT
    LLINE%=6
PUT.COL.TITLES:
    PRINT TAB(2);"CALL";TAB(45);"CALL       CALL    LINES"
    PRINT TAB(2);"NBR   DESCRIPTION";TAB(45);"TIME       DATE    REC'D"
    PRINT : LLINE%=LLINE% + 3
END.PAGE.BREAK:
    RETURN
REM------------------------------------------(SUBROUTINE = SCREEN HEADING)
SCREEN.HEADING:
    IF HEADING$="BLANK" THEN GOTO SCREEN.BLANK
        PRINT SHOME$;SCLEAR$
        GOTO SCREEN.TITLE
SCREEN.BLANK:
    PRINT BLANK$
SCREEN.TITLE:
    PRINT TAB((80-LEN(TITLE$))\2);TITLE$
    PRINT TAB((80-LEN(CTITLE$))\2);CTITLE$
    PRINT TAB((80-LEN(VERSION$))\2);VERSION$
    PRINT
    RETURN
REM------------------------------------------(SUBROUTINE = READ CONTROL FILE)
READ.CONTROL:
    ON ERROR GOTO READ.CONTROL.END1
    READ #1,WORK%;NAMES,VALUEONE$,VALUETWO$
    RETURN
READ.CONTROL.END1:
    RESUME READ.CONTROL.END
READ.CONTROL.END:
    STAT.CTL$="END"
```

```
     RETURN
REM----------------------------------------------(SUBROUTINE = READ TROUBLE FILE)
READ.CONTRBL.RECORD:
   ON END (2) GOTO READ.CONTRBL.ERROR
   ON ERROR GOTO READ.CONTRBL.ERROR1
   READ #2; CALLNBR%,DESCRIP$,CDATE$,CTIME$,RTIME$,DSK%,DSKMETH$,ECRT$,_
           EPTR$,DIAG$,SAVEPTR$,FDX$,EMDX$,HBKSP$,EDF$
   READ #2; LOGMSG$,ENDCHR$,PARITY%,STATUS%,RECNT%,STIME$,ETIME$,LDATE$,_
           RPGRM$,SPGRM$
   IF LEFT$(DESCRIP$,1)="*" THEN DESCRIP$="NO DESCRIPTION ON FILE"
   IF ETIME$="" THEN ETIME$=" LOST "
   IF LDATE$=""_
      THEN LDATE$="  LOST  "_
      ELSE LDATE$=LEFT$(LDATE$,2)+"/"+MID$(LDATE$,3,2)+"/"+RIGHT$(LDATE$,2)
   RETURN
READ.CONTRBL.ERROR1:
   RESUME READ.CONTRBL.ERROR
READ.CONTRBL.ERROR:
   STAT.TRBL$="END"
   CLOSE 2
   RETURN
REM----------------------------------------------(SUBROUTINE = READ COMERROR FILE)
READ.COMERROR.POSIT:
   OPEN "I",3,EFILE3$
   STAT.ERR$="RDY"
READ.COMERROR.RECORD:
   ON END (3) GOTO READ.ERROR.CONTINUE
   ON ERROR GOTO READ.COMERROR.ERROR
   READ #3; ERRORCD%,ERRORTYP$,EMSG1$,EMSG2$
   IF ERRORCD%()STATUS% THEN GOTO READ.COMERROR.RECORD
   TRBLDESC$=EMSG1$
   TRBLTECH$=EMSG2$
   CLOSE 3
   RETURN
READ.COMERROR.ERROR:
   RESUME READ.ERROR.CONTINUE
READ.ERROR.CONTINUE:
   TRBLDESC$="NO DESCRIPTION FOR CODE " + TRIM$(STR$(STATUS%))
   TRBLTECH$="CONTRBL.DAT.STATUS% NOT DEFINED IN COMERROR.DAT"
   STAT.ERR$="END"
   CLOSE 3
   RETURN
REM----------------------------------------------(MAIN PROGRAM CONTROL)
OFFER.FUNCTION:
   GOSUB SCREEN.HEADING
   PRINT "Functions available are:"
   PRINT TAB(15);"(D)isplay Trouble Log"
   PRINT TAB(15);"(P)rint Trouble Log"
   PRINT TAB(15);"(Q)uit"
   ANSWER$=" "
   MEDIA$=" "
   TIPTRY% = 0
   TIP$=" "
   SHOWTECH$="NO"
CHOOSE.FUNCTION:
        PRINT
        INPUT "What function do you want to perform? ",W$
```

```
        ANSWER$=UCASE$(LEFT$(K$,1))
        MEDIA$=ANSWER$
        IF ANSWER$="D" THEN GOTO CHECK.TECHNICAL
        IF ANSWER$="P" THEN GOTO CHECK.TECHNICAL
        IF ANSWER$="Q" THEN GOTO RETURN.TO.MENU
BAD.FUNCTION.RESPONSE:
        PRINT "RESPONSE MUST BE (D)ISPLAY, (P)PRINT, OR (Q)UIT. RE-ENTER."
        GOTO CHOOSE.FUNCTION
CHECK.TECHNICAL:
        IF TECH$="YES" THEN SHOWTECH$="YES"
        IF MEDIA$="P" THEN GOTO READY.PRINTER
        PRINT
        MAXLINE%=SCRNMAX%
        GOTO START.REPORT
READY.PRINTER:
        IF PRINTER$()"YES" THEN PRINT : PRINT"YOU DON'T HAVE A PRINTER AVAILABLE" :_
                PRINT "Press RETURN to return to selection menu. "; :_
                WORK%=CONCHAR :_
                GOTO OFFER.FUNCTION
        PRINT : PRINT "When you have the printer ready press RETURN ";
        WORK%=CONCHAR
        GOSUB SCREEN.HEADING
        PRINT "Printing Trouble Log"
        MAXLINE%=PMAXLINE%
        LPRINTER
        PRNTDATE$=MID$(CURRDAY$,3,2)+"/"+RIGHT$(CURRDAY$,2)+"/"+LEFT$(CURRDAY$,2)
START.REPORT:
   IF STAT.TBL$="RDY" THEN CLOSE 2
   OPEN "I",2,TFILE2$
   STAT.TBL$="RDY"
   PGNO%=0
   IF MEDIA$="P" THEN GOSUB PUT.NEW.PAGE ELSE GOSUB PUT.NEW.SCREEN
REM--------------------------------------------------------(READ-WRITE LOOP)
PUT.REPORT.DETAIL:
   GOSUB READ.CONTROL.RECORD
   IF STAT.TBL$="END" THEN GOTO FINISH.REPORT
   IF LLINE%>MAXLINE% THEN GOSUB PAGE.BREAK
   IF ANSWER$="R" THEN GOTO OFFER.FUNCTION
   GOSUB READ.COMERROR.POSIT
   PRINT CALLNBR%;TAB(8);DESCRIP;TAB(45);LEFT$(ETIME$,2);":";MID$(ETIME$,3,2);TAB(55);LDATE$;TAB(68);RECNT%
   PRINT USING LOGLINE2$; TRBLDESC$
   IF SHOWTECH$="YES" THEN PRINT USING LOGLINE2$; TRBLTECH$ : LLINE%=LLINE% + 1
   PRINT
   LLINE%=LLINE% + 3
   GOTO PUT.REPORT.DETAIL
REM--------------------------------------------------------(NORMAL REPORT END)
FINISH.REPORT:
   IF MEDIA$="P" THEN CONSOLE : GOTO OFFER.FUNCTION
   PRINT
   PRINT "Last entry has been displayed."
   PRINT "Press RETURN to return to Function List ";
   WORK%=CONCHAR
   GOTO OFFER.FUNCTION
REM--------------------------------------------------------(RETURN TO MENU)
RETURN.TO.MENU:
        GOSUB SCREEN.HEADING
        IF STAT.TBL$="RDY" THEN CLOSE 2
```

```
    PRINT "Returning to Communications Menu."
    END

C)type D:COMPDIAL.BAS
REM ***** COMPDIAL.BAS (Business BASIC 0.99)
REM      04/26/83
REM      1248
REM
REM THIS PROGRAM PROVIDES THE FACILITY TO DISPLAY AND PRINT THE
REM DIAL LIST ON THE SCREEN OR HARD-COPY.
REM
REM ORIGINALLY PROGRAMMED BY TOM TRELFORD 08/28/82
REM------------------------------------------------------------(CHANGE LOG)
REM VERSION   DATE       CHANGE
REM    1.0    08/28/82   INITIAL VERSION
REM    1.1    02/02/83   Return to COMUMENU added
REM                      Eliminated use of CLOCK
REM    2.0    02/17/83   Translated to MicroSoft Business BASIC 0.99
REM                      by Steve Hemphill
REM    2.1    03/03/83   Remove chain-back to COMUMENU; by Steve Hemphill
REM    2.2    03/09/83   Prompts changed to show space before response; by
REM                      Steve Hemphill
REM    2.3    04/26/83   Display of Version number added; by Steve Hemphill
REM    2.4    07/27/83   Various cosmetic changes to improve readability
REM------------------------------------------------------------(PROGRAM START)
START:
        CONSOLE
        LET VERSION$="Current Dial List - Version 2.4"
        LET CFILE2$="COMDIAL.DAT"
        LET CFILELEN%=200
        LET CTLFILE1$="CONTROL.DAT"
        LET CTLLENGTH%=100
        LET CTLMAX%=100
        LET CURRDAY$="000000"
        LET ENTRYLMT%=50
        LET SCRMAX%=14
        LET TITLE$="DIAL LIST REPORT"
        GOTO CONTROLFILE.OPEN
REM------------------------------------------------------------(SUBROUTINES)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        RETURN
REM------------------------------------------------------------
READ.CONTROLFILE.RECORD:
        ON END (1) GOTO READ.CONTROLFILE.ERROR
        READ #1,WORK%;NAMES,VALUEONE$,VALUETWO$
        LET STAT$="OK"
        RETURN
```

```
READ.CONTROLFILE.ERROR:
        LET STAT$="END"
        RETURN
REM------------------------------------------------------------
READ.CALLFILE.RECORD:
        ON END (2) GOTO READ.CALLFILE.ERROR
        GET #2,REC%
        INPUT #2,CALLNBR%,DESCRIP$,CDATE$,CTIME$,RTIME$,DSK%,DSKMETH$
        INPUT #2,EDRT$,EPTR$,DIAG$,SAVEPTR$,FDX$,EXDX$,HBKSP$,EOF$,LOGYS3$
        INPUT #2,ENDCHR$,PARITY%,STATUS%,RECNT%,STIME$,ETIME$,LDATE$,PRGRM$
        INPUT #2,SPBRY$
        LET STAT$="OK"
        RETURN
READ.CALLFILE.ERROR:
        LET STAT$="END"
        RETURN
REM---------------------------------------------------(CONTROLFILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",1,CTLFILE1$,CTLLENGTH%
        LET WORK%=1
        GOTO CONTROLFILE.GET.RECORD
CONTROLFILE.NO.FILE:
        FOR LLINE%=1 TO 25
             PRINT
        NEXT LLINE%
        PRINT "NO CONTROL FILE. RETURNING TO MENU"
        GOTO RETURN.TO.MENU
CONTROLFILE.GET.RECORD:
        GOSUB READ.CONTROLFILE.RECORD
        IF STAT$="END"     THEN GOTO CONTROLFILE.CLOSE
        IF NAME$="ENDALL"  THEN GOTO CONTROLFILE.CLOSE
        LET IWORK%=FIX(VAL(LEFT$(VALUEONE$,4)))
        IF NAME$="BLANK"   THEN BLANK$=CHR$(IWORK%)
        IF NAME$="CLOCK"   THEN CLOCK$=VALUEONE$
        IF NAME$="CTITLE"  THEN CTITLE$=VALUEONE$
        IF NAME$="CURRDAY" THEN CURRDAY$=VALUEONE$
        IF NAME$="HEADING" THEN HEADING$=VALUEONE$
        IF NAME$="PMAXLINE" THEN PMAXLINE%=IWORK%
        IF NAME$="PNEWPAGE" THEN PNEWPAGE$=CHR$(IWORK%)
        IF NAME$="PRINTER" THEN PRINTER$=VALUEONE$
        IF NAME$="SHOME"   THEN SHOME$=CHR$(IWORK%)
        IF NAME$="SCLEAR"  THEN SCLEAR$=CHR$(IWORK%)
        IF NAME$="TITLE"   THEN TITLE$=VALUEONE$
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.CLOSE:
        CLOSE 1
REM------------------------------------------------------(CALLFILE)
CALLFILE.OPEN:
        GOSUB SCREEN.HEADING
        PRINT "Opening the Dial List files."
```

```
        FILESIZE=SIZE(CFILE2$)
        IF FILESIZE=0 THEN GOTO CALLFILE.ERROR
        OPEN "R",2,CFILE2$,CFILELEN%
        GOTO DISPLAY.FUNCTIONS
CALLFILE.ERROR:
        PRINT
        PRINT "You don't have a Dial List."
        PRINT
        PRINT "Press RETURN to return to menu."
        WRITER%=CONCHAR
        GOTO RETURN.TO.MENU
REM-----------------------------------------------------------------(DISPLAY)
DISPLAY.FUNCTIONS:
        GOSUB SCREEN.HEADING
        PRINT "Available functions are:"
        PRINT
        PRINT TAB(15);"(D)isplay Dial List Report"
        PRINT TAB(15);"(P)rint Dial List Report"
        PRINT TAB(15);"(Q)uit"
DISPLAY.RESPONSE:
        PRINT
        INPUT "What function do you want to perform? ",WORK$
        ANSWER2$=LEFT$(WORK$,1)
        ANSWER$=UCASE$(ANSWER2$)
        IF ANSWER$="D" THEN MEDIA$="D": GOTO DISPLAY.DIAL.LIST
        IF ANSWER$="P" THEN MEDIA$="P": GOTO DISPLAY.DIAL.LIST
        IF ANSWER$="Q" THEN CLOSE 2: GOTO RETURN.TO.MENU
        PRINT "RESPONSE MUST BE D, P, OR Q.  RE-ENTER."
        GOTO DISPLAY.RESPONSE
REM-------------------------------------------------------------------------
DISPLAY.DIAL.LIST:
        LET REC%=1
        LET PGNO%=0
        IF MEDIA$="D" THEN GOTO DISPLAY.NEW.SCREEN
        GOSUB SCREEN.HEADING
        IF PRINTER$="YES" THEN GOTO DISPLAY.GET.PRINT.INPUT
        PRINT "YOU DON'T HAVE A PRINTER AVAILABLE."
        PRINT "Press RETURN to return to selection menu. ";
        WORK%=CONCHAR
        GOTO DISPLAY.FUNCTIONS
DISPLAY.GET.PRINT.INPUT:
        PRINT "Do you have the printer ready (press RETURN) ";
        WORK%=CONCHAR
        GOSUB SCREEN.HEADING
        PRINT "Printing Dial List Report."
        LPRINTER
        LET MAXLINE%=PMAXLINE%
        PRNTDATE$=MID$(CURRDAY$,3,2)+"/"+RIGHT$(CURRDAY$,2)+"/"+LEFT$(CURRDAY$,2)
DISPLAY.NEW.PAGE:
        PRINT PNEWPAGE$
        LET PGNO%=PGNO%+1
        PRINT TAB((80-LEN(TITLE$))\2);TITLE$
        PRINT TAB((80-LEN(CTITLE$))\2);CTITLE$
        PRINT "DATE: ";PRNTDATE$;
        PRINT TAB((80-LEN(TITLE2$))\2);TITLE2$;
        PRINT TAB(70);"Page: ";
        PRINT USING "###";PGNO%
```

```
            PRINT
            LET LLINE%=9
            GOTO DISPLAY.TITLES
DISPLAY.NEW.SCREEN:
            GOSUB SCREEN.HEADING
     REM    PRINT TAB((80-LEN(TITLE$))\2);TITLE$
            PRINT
            LET MAXLINE%=SCRNMAX%
            LET LLINE%=6
DISPLAY.TITLES:
            PRINT TAB(42);"NEXT";TAB(50);" FILE";TAB(58);" DATA";TAB(68);" DATA"
            PRINT TAB(1);"CALL";TAB(42);"CALL";
            PRINT TAB(50);"SEQUENCE";TAB(60);" TO";TAB(68);" TO"
            PRINT TAB(1);"NBR";TAB(6);"DESCRIPTION";TAB(42);"TIME";
            PRINT TAB(52);" NUMBER";TAB(60);"SCREEN";TAB(68);"PRINTER"
            PRINT
DISPLAY.DETAIL:
            GOSUB READ.CALLFILE.RECORD
            IF STAT$="END" THEN LET REC%=ENTRYLMT%+1: GOTO DISPLAY.LOOP
            IF DESCRIP$="*" THEN GOTO DISPLAY.LOOP
            PRINT TAB(1);" ";
               PRINT USING "##";CALLNBR%;
            PRINT TAB(5);" ";
               PRINT DESCRIP$;
            PRINT TAB(41);" ";
               IF CTIME$="000000" THEN GOTO DISPLAY.NO.TIME
               PRINT MID$(CTIME$,1,2)+":"+MID$(CTIME$,3,2);
DISPLAY.NO.TIME:
            PRINT TAB(51);" ";
               IF DSK%=0 THEN PRINT "None";
               IF DSK%()0 THEN PRINT USING "####";DSK%;
            PRINT TAB(60);" ";
               IF ECRT$="N" THEN PRINT " No";
               IF ECRT$="Y" THEN PRINT "Yes";
            PRINT TAB(68);" ";
               IF EPTR$="N" THEN PRINT " No"
               IF EPTR$="Y" THEN PRINT "Yes"
            LET LLINE%=LLINE%+1
            IF LLINE%>MAXLINE% AND MEDIA$="P" THEN GOTO DISPLAY.TOP.PAGE
            IF LLINE%>MAXLINE% AND MEDIA$="D" THEN GOTO DISPLAY.SCREEN.END
DISPLAY.LOOP:
            LET REC%=REC%+1
            IF REC%(=ENTRYLMT% THEN GOTO DISPLAY.DETAIL
            IF MEDIA$="P" THEN GOTO DISPLAY.CLOSE.PRINTER
            GOTO DISPLAY.LAST.ENTRY
DISPLAY.TOP.PAGE:
            LET REC%=REC%+1
            IF REC%(=ENTRYLMT% THEN GOTO DISPLAY.NEW.PAGE
DISPLAY.CLOSE.PRINTER:
            CONSOLE
            GOTO DISPLAY.FUNCTIONS
DISPLAY.LAST.ENTRY:
            PRINT
            PRINT "THE LAST ENTRY HAS BEEN DISPLAYED."
            PRINT "Are you ready to continue (press RETURN). ";
            WORK%=CONCHAR
            GOTO DISPLAY.FUNCTIONS
```

```
DISPLAY.SCREEN.END:
        PRINT
        PRINT "What function do you want to perform"
        INPUT "     ((Q)uit,(N)ext page)? ",W$
        ANSWER2$=LEFT$(W$,1)
        ANSWER$=UCASE$(ANSWER2$)
        IF ANSWER$="Q" THEN GOTO DISPLAY.FUNCTIONS
        IF ANSWER$="N" THEN GOTO DISPLAY.NEXT
        PRINT "MUST RESPOND Q OR N.  RE-ENTER."
        GOTO DISPLAY.SCREEN.END
DISPLAY.NEXT:
        LET RECX=RECX+1
        IF RECX<=ENTRYLMT% THEN GOTO DISPLAY.NEW.SCREEN
        GOTO DISPLAY.LAST.ENTRY
REM-------------------------------------------------------------(RETURN)
RETURN.TO.MENU:
        GOSUB SCREEN.HEADING
        PRINT "Returning to Communications Menu."
        END D)type D:COMPHIST.BAS REM ***** COMPHIST.BAS (Business BASIC 0.99)
REM       04/26/83
REM       1853
REM
REM  DISPLAY COMMUNICATIONS CALL HISTORY ON CONSOLE OR LIST IT
REM  ON LINE PRINTER.
REM
REM  ORIGINALLY PROGRAMMED BY MONTE MONTEAU AND TOM TRELFORD 08/28/82
REM-------------------------------------------------------------(CHANGE LOG)
REM  VERSION   DATE      CHANGE
REM     1.0    08/28/82  INITIAL VERSION
REM     1.1    09/07/82  Allowed lower case 'Q' on change values
REM     1.2    02/02/83  Return to COMMENU added
REM                      Eliminated use of CLOCK
REM     2.0    02/17/83  Translated to MicroSoft Business BASIC 0.99
REM                      by Steve Hemphill
REM     2.1    03/04/83  Remove chain-back to COMMENU; by Steve Hemphill
REM     2.2    03/18/83  Prompts changed to show space before response; by
REM                      Steve Hemphill
REM     2.3    04/25/83  Display of Version number added; by Steve Hemphill
REM     2.4    06/25/83  Addition of "Console" to Return.To.Menu by J.Kirch
REM     2.5    07/21/83  Wording changes to report and display by Judy Ku
REM     2.6    08/02/83  more wording changes to display by ben wong
REM-------------------------------------------------------------(PROGRAM START)
ENTRY.COMPHIST:
        CONSOLE
        VERSION$="Call history Processor - Version 2.6"
        BEGCALLX=0
        BEGCONN$="000001"
        BEGDATE$="820101"
        BEGRECSX=0
        BEGTIME$="000001"
        CONTROL$="CONTROL.DAT"
        CTLLENX=100
        CTLMAXX=100
```

```
        CURRDAY$="202020"
        ENDCALL%=50
        ENDDATE$="991231"
        ENDRECS%=32767
        ENDTIME$="240002"
        ENDCONN$="240000"
        HISTYEST$="COMHIST.DAT"
        HISTTODY$="COMHISTD.DAT"
        PRINTER$="NO"
        RANGEWARN$="*WARNING Beginning Range value exceeds Ending Range value WARNING*"
        RNGDTMLINE$= _
                "  \                 \   \\!\\!\\  (##)       \\!\\!\\  (##)"
        RNGNUMLINE$= _
                "  \                 \       ##,###  (##)         ##,###  (##)"
        SCRNMAX%=17
        TITLE2$="CALL HISTORY REPORT"
        GOTO CONTROLFILE.OPEN
REM-----------------------------------------------------------(SETUP FOR PRINTING)
READY.PRINTER:
        PRINT
        PRINT "When you have the printer ready press RETURN ";
        W%=CONCHAR
        PRINT
        PRINT "Printing ";TITLE2$
        LPRINTER
        RETURN
REM-----------------------------------------------------------(SCREEN OR PAGE HEADING)
PAGE.BREAK:
        IF MEDIA$="P" THEN GOTO PUT.NEW.PAGE
        PRINT
        INPUT "(N)ext page or (Q)uit ",W$
        ANSWER$=UCASE$(LEFT$(W$,1))
        IF ANSWER$()"N" AND ANSWER$()"Q" _
                THEN PRINT : PRINT "RESPONSE MUST BE N OR Q. RE-ENTER." : _
                GOTO PAGE.BREAK
        IF ANSWER$="Q" THEN GOTO END.PAGE.BREAK
PUT.NEW.SCREEN:
        PGNO%=PGNO%+1
        GOSUB SCREEN.HEADING
        GOTO PUT.COL.TITLES
PUT.NEW.PAGE:
        PGNO%=PGNO% + 1
        PRINT PNEWPAGE$
        PRINT TAB((80-LEN(TITLE$))\2);TITLE$
        PRINT TAB((80-LEN(CTITLE$))\2);CTITLE$
        LLINE%=2
PUT.COL.TITLES:
        IF MEDIA$="P" THEN PRINT TAB(2),"Date: ";RUNDATE$;
        IF MEDIA$="P" THEN PRINT TAB((80-LEN(TITLE2$))\2);TITLE2$;
        IF MEDIA$="P" THEN PRINT TAB(70);"Page: ";; _
                        PRINT USING "###"; PGNO%
        IF MEDIA$()"P" THEN PRINT
        LLINE%=LLINE%+1
        PRINT
        LLINE%=LLINE%+1
        IF MEDIA$="P" AND PRNTVAL$="YES" THEN GOSUB SHOW.REPORT.RANGE: LET LLINE%=LLINE%+10
        PRINT TAB(2);"CALL";
```

```
            PRINT TAB(45);"CALL      CALL    LINES    CONNECT"
            PRINT TAB(2);"NBR DESCRIPTION";
            PRINT TAB(45);"TIME      DATE    REC'D    TIME"
            PRINT
            LLINE%=LLINE%+3
END.PAGE.BREAK:
        RETURN
REM-----------------------------------------------------------(SCREEN HEADING)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        LLINE%=3
        RETURN
REM-----------------------------------------------------------(VALIDATE DATE)
VALIDATE.DATE:
        DATEBAD$="NO"
        DATEWARN$=""
        RIGHTMOST$=RIGHT$(IN$,2)
        IF RIGHTMOST$<"82" OR RIGHTMOST$>"99" _
                THEN DATEBAD$="YES" : DATEWARN$="YEAR MUST BE 82 THRU 99." : _
                GOTO VALIDATE.DATE.END
        MM$=LEFT$(IN$,2)
        DD$=MID$(IN$,3,2)
        IF MM$<"01" OR MM$>"12" _
                THEN DATEBAD$="YES" : DATEWARN$="MONTH MUST BE 01 THRU 12." : _
                GOTO VALIDATE.DATE.END
        IF DD$<"01" OR DD$>"31" _
                OR (DD$="31" AND (MM$="02" OR MM$="04" OR MM$="06" _
                                OR MM$="09" OR MM$="11")) _
                OR (DD$="32" AND MM$="02") _
                THEN DATEBAD$="YES" : DATEWARN$="DAY OUT OF RANGE FOR MONTH."
VALIDATE.DATE.END:
        RETURN
REM-----------------------------------------------------------(VALIDATE TIME)
VALIDATE.TIME:
        TIMEBAD$="NO"
        TIMEWARN$=""
        HRS$=LEFT$(IN$,2)
        MIN$=MID$(IN$,3,2)
        SEC$=RIGHT$(IN$,2)
        IF HRS$<"00" OR HRS$>"24" _
                THEN TIMEBAD$="YES" : TIMEWARN$="HOUR MUST BE 00 THRU 24." : _
                GOTO VALIDATE.TIME.END
        IF MIN$<"00" OR MIN$>"59" OR (HRS$="24" AND MIN$>"00") _
                THEN TIMEBAD$="YES" : TIMEWARN$="MINUTES MUST BE 00 THRU 59." : _
                GOTO VALIDATE.TIME.END
        IF SEC$<"00" OR SEC$>"59" OR (HRS$="24" AND SEC$>"00") _
                THEN TIMEBAD$="YES" : TIMEWARN$="SECONDS MUST BE 00 THRU 59." : _
                GOTO VALIDATE.TIME.END
```

```
VALIDATE.TIME.END:
        RETURN
REM----------------------------------------------------(DISPLAY SELECTION RANGE)
SHOW.REPORT.RANGE:
        PRINT _
        "=====================(REPORT SELECTION VALUES)======================";_
        PRINT TAB(28);"START (NBR)      END (NBR)"
        PRINT
        PRINT USING RNEDTMLINE$; "Call Date", _
                MID$(BEGDATE$,3,2),"/",RIGHT$(BEGDATE$,2),"/",LEFT$(BEGDATE$,2),1, _
                MID$(ENDDATE$,3,2),"/",RIGHT$(ENDDATE$,2),"/",LEFT$(ENDDATE$,2),2
        PRINT USING RNGNUMLINE$; "Call Number", BEGCALL%,3,ENDCALL%,4
        PRINT USING RNEDTMLINE$; "Call Time", _
                LEFT$(BEGTIME$,2),":",MID$(BEGTIME$,3,2),":",RIGHT$(BEGTIME$,2),5, _
                LEFT$(ENDTIME$,2),":",MID$(ENDTIME$,3,2),":",RIGHT$(ENDTIME$,2),6
        PRINT USING RNGNUMLINE$; "Number of Lines  ", BEGRECS%,7,ENDRECS%,8
        PRINT USING RNEDTMLINE$; "Connect Time", _
                LEFT$(BEGCONN$,2),":",MID$(BEGCONN$,3,2),":",RIGHT$(BEGCONN$,2),9, _
                LEFT$(ENDCONN$,2),":",MID$(ENDCONN$,3,2),":",RIGHT$(ENDCONN$,2),10
        PRINT _
        "================================================================";_
        PRINT
        RETURN
REM----------------------------------------------------(CHANGE SELECTION VALUES)
SET.REPORT.RANGE:
        GOSUB SCREEN.HEADING
        GOSUB SHOW.REPORT.RANGE
        PRINT CHGMSG$
        LET CHGMSG$=" "
CHOOSE.RESPONSE:
        PRINT
        INPUT "Enter number of value to change ((Q) to quit). ",C$
        LET ANSWER$=UCASE$(LEFT$(C$,1))
        IF ANSWER$="Q" THEN RETURN
        LET CX=FIX(VAL(LEFT$(C$,4)))
        IF CX<1 OR CX>10 THEN PRINT : _
                PRINT "VALUE TO CHANGE MUST BE (Q), OR 1 THRU 10. RE-ENTER." : _
                GOTO CHOOSE.RESPONSE
        ON CX GOTO SET.DATE,SET.DATE,SET.CALL,SET.CALL,SET.TIME,SET.TIME, _
                SET.RECS,SET.RECS,SET.CONN,SET.CONN
SET.DATE:
        PRINT
        IF CX=1 _
                THEN INPUT "What is the earliest date to select (mmddyy)? ",IN$ _
                ELSE INPUT "What is the latest date to select (mmddyy)? ",IN$
        THISLEN%=LEN(IN$)
        IF THISLEN%<>6 THEN PRINT "DATE MUST HAVE 6 DIGITS. RE-ENTER.": _
                GOTO SET.DATE
        GOSUB VALIDATE.DATE
        IF DATEBAD$="YES" THEN PRINT DATEWARN$;" RE-ENTER.": GOTO SET.DATE
        LET WORKDATE$=RIGHT$(IN$,2)+LEFT$(IN$,4)
        IF CX<>1 AND WORKDATE$>TODY$ THEN _
                PRINT "LATEST CANNOT EXCEED TODAY. RE-ENTER.": GOTO SET.DATE
        IF CX=1 THEN BEGDATE$=RIGHT$(IN$,2)+LEFT$(IN$,4) _
                ELSE ENDDATE$=RIGHT$(IN$,2)+LEFT$(IN$,4)
        IF BEGDATE$>ENDDATE$ THEN CHGMSG$=RANGEWARN$
        GOTO SET.REPORT.RANGE
```

```
SET.CALL:
    PRINT
    IF CX=3 _
        THEN INPUT "What is the starting call number (01 to 50)? ",IN$ _
        ELSE INPUT "What is the ending call number (01 to 50)? ",IN$
    THISLEN%=LEN(IN$)
    IF THISLEN%<>2 OR IN$<"00" OR IN$>"50" _
        THEN PRINT "CALL NUMBER OUT OF RANGE. RE-ENTER.": GOTO SET.CALL
    IN%=FIX(VAL(LEFT$(IN$,4)))
    IF CX=3 THEN BEGCALL%=IN% ELSE ENDCALL%=IN%
    IF BEGCALL%>ENDCALL% THEN CHGMSG$=RANGEWARN$
    GOTO SET.REPORT.RANGE
SET.TIME:
    PRINT
    IF CX=5 _
        THEN INPUT "What is the earliest call time (hhmmss)? ",IN$ _
        ELSE INPUT "What is the latest call time (hhmmss)? ",IN$
    THISLEN%=LEN(IN$)
    IF THISLEN%=4 THEN IN$=IN$+"00"
    IF THISLEN%<>6 _
        THEN PRINT "TIME MUST HAVE 6 DIGITS. RE-ENTER.": GOTO SET.TIME
    GOSUB VALIDATE.TIME
    IF TIMEBAD$="YES" THEN PRINT TIMEWARN$;" RE-ENTER.": GOTO SET.TIME
    IF CX=5 THEN BEGTIME$=IN$ ELSE ENDTIME$=IN$
    IF BEGTIME$>ENDTIME$ THEN CHGMSG$=RANGEWARN$
    GOTO SET.REPORT.RANGE
SET.RECS:
    PRINT
    PRINT"Enter record count as a number from 1 through 32767." : PRINT
    IF CX=7 _
        THEN INPUT "What is the minimum record count (1 to 32767)? ",IN% _
        ELSE INPUT "What is the maximum record count (1 to 32767)? ",IN%
    IF IN%<1 OR IN%>32767 _
        THEN PRINT "NUMBER MUST BE 1 THRU 32767. RE-ENTER": GOTO SET.RECS
    IF CX=7 THEN BEGRECS%=IN% ELSE ENDRECS%=IN%
    IF BEGRECS$>ENDRECS$ THEN CHGMSG$=RANGEWARN$
    GOTO SET.REPORT.RANGE
SET.CONN:
    PRINT
    IF CX=9 _
        THEN INPUT "What is the minimum connect time (hhmmss)? ",IN$ _
        ELSE INPUT "What is the maximum connect time (hhmmss)? ",IN$
    THISLEN%=LEN(IN$)
    IF THISLEN%=4 THEN IN$=IN$+"00"
    IF THISLEN%<>6 _
        THEN PRINT "CONNECT TIME MUST HAVE 6 DIGITS. RE-ENTER.": _
        GOTO SET.CONN
    GOSUB VALIDATE.TIME
    IF TIMEBAD$="YES" THEN PRINT TIMEWARN$;" RE-ENTER.": GOTO SET.CONN
    IF CX=9 THEN BEGCONN$=IN$ ELSE ENDCONN$=IN$
    IF BEGCONN$>ENDCONN$ THEN CHGMSG$=RANGEWARN$
    GOTO SET.REPORT.RANGE
SET.REPORT.RANGE.END:
    RETURN
REM--------------------------------------------------(READ CONTROL RECORDS)
READ.CONTROL:
    ON END (1) GOTO READ.CONTROL.END
```

```
            READ #1,CHECK;NAME$,VALUEONE$,VALUETWO$
            RETURN
READ.CONTROL.END:
        STAT.CTL$="END"
        RETURN
REM----------------------------------------------------------(READ HISTORY FILE)
READ.HISTORY:
        ON END (1) GOTO READ.HISTORY.END
        READ #1;CALLNBR%,DESCRIP$,CDATE$,CTIME$,RTIME$,DSK%,DSKMETH$,EDRT$
        READ #1;EPTR$,DIAG$,SAVEPTR$,FDX$,EMDM$,HPKSP$,EOF$,LOGMSG$,ENDCHR$
        READ #1;PARITY%,STATUS%,RECNT%,STIME$,ETIME$,LDATE$,RPGRM$,SPSRM$
        HISTIN%=HISTIN%+1
REM-----------CHECK CALL NBR
        IF CALLNBR%(BEGCALL% OR CALLNBR%)ENDCALL% THEN GOTO READ.HISTORY
REM-----------CHECK CALL DATE
        IF LDATE$="" THEN LDATE$="000000"
        TESTDATE$=RIGHT$(LDATE$,2)+LEFT$(LDATE$,4)
        IF TESTDATE$(BEGDATE$ THEN GOTO READ.HISTORY
        IF TESTDATE$)ENDDATE$ THEN GOTO READ.HISTORY.END
REM-----------CHECK CALL END TIME
        IF ETIME$="" THEN ETIME$="000000"
        IF ETIME$(BEGTIME$ OR ETIME$)ENDTIME$ THEN GOTO READ.HISTORY
REM-----------CHECK RECORD COUNT
        IF RECNT%(BEGRECS% OR RECNT%)ENDRECS% THEN GOTO READ.HISTORY
REM-----------CHECK CONNECT TIME
        IF STIME$="" THEN STIME$="000000"
        WBHR%=FIX(VAL(LEFT$(STIME$,2)))
        WEHR%=FIX(VAL(LEFT$(ETIME$,2)))
        WBMN%=FIX(VAL(MID$(STIME$,3,2)))
        WEMN%=FIX(VAL(MID$(ETIME$,3,2)))
        WBSC%=FIX(VAL(RIGHT$(STIME$,2)))
        WESC%=FIX(VAL(RIGHT$(ETIME$,2)))
        IF WBHR%)WEHR% THEN WEHR%=WEHR%+24
        CONNHR%=WEHR%-WBHR%
        IF WBMN%)WEMN% THEN WEMN%=WEMN%+60: CONNHR%=CONNHR%-1
        CONNMN%=WEMN%-WBMN%
        IF WBSC%)WESC% THEN WESC%=WESC%+60 : CONNMN%=CONNMN%-1
        CONNSC%=WESC%-WBSC%
        CONNHR$=TRIM$(STR$(CONNHR%))
        IF CONNHR%(10 THEN CONNHR$="0"+CONNHR$
        CONNMN$=TRIM$(STR$(CONNMN%))
        IF CONNMN%(10 THEN CONNMN$="0"+CONNMN$
        CONNSC$=TRIM$(STR$(CONNSC%))
        IF CONNSC%(10 THEN CONNSC$="0"+CONNSC$
        TESTCONN$=CONNHR$+CONNMN$+CONNSC$
        IF TESTCONN$(BEGCONN$ OR TESTCONN$)ENDCONN$ THEN GOTO READ.HISTORY
REM-----------SETUP REPORTED RECORD FIELDS
        IF CONNHR$()"00" THEN RPTCONN$=CONNHR$+":": GOTO FORMAT.CONN.01
        RPTCONN$="   "
FORMAT.CONN.01:
        IF RPTCONN$()"   " THEN RPTCONN$=RPTCONN$+CONNMN$+":": GOTO FORMAT.CONN.02
        IF CONNMN$()"00"THEN RPTCONN$=RPTCONN$+CONNMN$+":": GOTO FORMAT.CONN.02
        RPTCONN$=RPTCONN$+"   "
FORMAT.CONN.02:
        IF RPTCONN$()"      " THEN RPTCONN$=RPTCONN$+CONNSC$: GOTO FORMAT.CONN.03
        RPTCONN$=RPTCONN$+":"+CONNSC$
FORMAT.CONN.03:
        LDATE$=LEFT$(LDATE$,2)+"/"+MID$(LDATE$,3,2)+"/"+RIGHT$(LDATE$,2)
```

```
        LEFTMOST$=LEFT$(DESCRIP$,1)
        IF LEFTMOST$="*" THEN DESCRIP$="NO DESCRIPTION ON FILE"
        HISTADX=HISTADX+1
        RETURN
READ.HISTORY.END:
        STAT1$="END"
        RETURN
REM----------------------------------------------------------(READ CONTROL FILE)
CONTROL.FILE.OPEN:
        PRINT
        PRINT "Obtaining system control values."
        FILESIZE=SIZE(CONTROL$)
        IF FILESIZE=0 GOTO CONTROL.MISSING
        OPEN "R",1,CONTROL$,CTLLENX
        STAT1$="RDY"
        STAT.CTL$="RDY"
        CREDX=0
        GOTO LOAD.CONTROL.VALUE
CONTROL.MISSING:
        FOR CNTX=1 TO 25
                PRINT
        NEXT CNTX
        PRINT "Control File missing. Returning to menu"
        GOTO RETURN.TO.MENU
LOAD.CONTROL.VALUE:
        CREDX=CREDX+1
        IF CREDX>CTLMAXX        THEN GOTO CONTROL.CLOSE
        GOSUB READ.CONTROL
        IF STAT.CTL$="END"      THEN GOTO CONTROL.CLOSE
        IF NAME$="ENDALL"       THEN GOTO CONTROL.CLOSE
        WORKX=FIX(VAL(LEFT$(VALUEONE$,4)))
        IF NAME$="BLANK"        THEN BLANK$=CHR$(WORKX)
        IF NAME$="CTITLE"       THEN CTITLE$=VALUEONE$
        IF NAME$="CURRDAY"      THEN CURRDAY$=VALUEONE$
        IF NAME$="HEADING"      THEN HEADING$=VALUEONE$
        IF NAME$="PASSWORD"     THEN PASSWORD$=VALUEONE$
        IF NAME$="PMAXLINE"     THEN PMAXLINEX=WORKX
        IF NAME$="PNEWPAGE"     THEN PNEWPAGE$=CHR$(WORKX)
        IF NAME$="PRINTER"      THEN PRINTER$=VALUEONE$
        IF NAME$="SCLEAR"       THEN SCLEAR$=CHR$(WORKX)
        IF NAME$="SHOME"        THEN SHOME$=CHR$(WORKX)
        IF NAME$="TITLE"        THEN TITLE$=VALUEONE$
        GOTO LOAD.CONTROL.VALUE
CONTROL.CLOSE:
        CLOSE 1
        STAT1$="CLS"
REM----------------------------------------------------------(OBTAIN DATE)
REM     GOSUB SCREEN.HEADING
        IF CURRDAY$="000000" THEN GOTO ENTER.RUN.DATE
        TODY$=CURRDAY$
        ENDDATE$=TODY$
        RUNDATE$=MID$(TODY$,3,2)+"/"+RIGHT$(TODY$,2)+"/"+LEFT$(TODY$,2)
        GOTO HISTYEST.TEST
ENTER.RUN.DATE:
        GOSUB SCREEN.HEADING
        PRINT
        INPUT "What is today's date (mmddyy)? ",IN$
```

```
          THISLENX=LEN(IN$)
          IF THISLENX()6 THEN PRINT "DATE MUST HAVE 6 DIGITS RE-ENTER."; GOTO ENTER.RUN.DATE
          GOSUB VALIDATE.DATE
          IF DATEBAD$="YES" THEN PRINT DATEWARN$;" RE-ENTER."; GOTO ENTER.RUN.DATE
          TODY$=RIGHT$(IN$,2)+LEFT$(IN$,4)
          ENDDATE$=TODY$
          RUNDATE$=MID$(TODY$,3,2)+"/"+RIGHT$(TODY$,2)+"/"+LEFT$(TODY$,2)
REM----------------------------------------------------------(CHECK HISTORY FILES)
HISTYEST.TEST:
REM       GOSUB SCREEN.HEADING
          LET STAT.HISTYEST$=" "
          LET STAT.HISTTODY$=" "
          ON END (1) GOTO HISTYEST.MISSING
          OPEN "I",1,HISTYEST$
          CLOSE 1
          STAT1$="CLS"
          GOTO HISTTODY.TEST
HISTYEST.MISSING:
          STAT.HISTYEST$="YES"
HISTTODY.TEST:
          ON END (1) GOTO HISTTODY.MISSING
          OPEN "I",1,HISTTODY$
          CLOSE 1
          STAT1$="CLS"
          GOTO OFFER.FUNCTION
HISTTODY.MISSING:
          STAT.HISTTODY$="YES"
OFFER.FUNCTION:
          GOSUB SCREEN.HEADING
          GOSUB SHOW.REPORT.RANGE
          PRINT "Functions available are:"
          PRINT TAB(15);"(C)hange Report Selection Values"
          PRINT TAB(15);"(D)isplay Call History Report"
          PRINT TAB(15);"(P)rint Call History Report"
          PRINT TAB(15);"(Q)uit"
CHOOSE.FUNCTION:
          PRINT
          INPUT "What function do you want to perform? ",W$
          ANSWER$=UCASE$(LEFT$(W$,1))
          IF  ANSWER$()"C" AND ANSWER$()"D" _
              AND ANSWER$()"P" AND ANSWER$()"Q" _
              THEN PRINT "RESPONSE MUST BE C, D, P OR Q. RE-ENTER." : _
              GOTO CHOOSE.FUNCTION
          IF ANSWER$="Q" THEN GOTO RETURN.TO.MENU
          IF ANSWER$="C" THEN CHGMSG$=" "; GOSUB SET.REPORT.RANGE: GOTO OFFER.FUNCTION
          IF ANSWER$="D" THEN MEDIA$="D" ELSE MEDIA$="P"
REM----------------------------------------------------------(SETUP REPORT)
START.REPORT:
       PGNOX=0
       LET PRNTVAL$="NO"
       IF MEDIA$="D" _
              THEN MAXLINEX=SCRNMAXX: _
                 GOSUB PUT.NEW.SCREEN: _
              ELSE IF PRINTER$="YES" _
                 THEN MAXLINEX=PMAXLINEX: _
                     GOSUB SCREEN.HEADING: _
                     GOSUB READY.PRINTER: _
```

```
                    LET PRNTVAL$="YES": _
                    GOSUB PUT.NEW.PAGE: _
                    LET PRNTVAL$="NO": _
                ELSE PRINT: _
                    PRINT "YOU DON'T HAVE A PRINTER AVAILABLE": _
                    PRINT "Press RETURN to return to function menu ";: _
                    W%=CONCHAR: _
                    GOTO OFFER.FUNCTION
REM----------------------------------------------------(CHECK FILE AVAILABILITY)
        HISTIN%=0
        HISTACC%=0
        HISTYEST%=0
        HISTODY%=0
        IF STAT1$()"CLS" THEN CLOSE 1: STAT1$="CLS"
        IF BEGDATE$(TODY$ _
                THEN IF STAT.HISTYEST$()"YES" _
                        THEN OPEN "I",1,HISTYEST$: _
                            STAT1$="RDY": _
                            GOSUB PUT.REPORT.DETAIL: _
                            CLOSE 1: _
                            STAT1$="CLS": _
                    ELSE PRINT "History available from current file only.": _
                        PRINT: _
                        LET LLINE%=LLINE%+2
        IF ANSWER$="Q" THEN GOTO OFFER.FUNCTION
        HISTYEST%=HISTACC%
        HISTACC%=0
        HISTTODY%=0
        IF STAT1$()"CLS" THEN CLOSE 1: STAT1$="CLS"
        IF STAT.HISTTODY$()"YES" _
                THEN OPEN "I",1,HISTTODY$: _
                    STAT1$="RDY": _
                    GOSUB PUT.REPORT.DETAIL: _
                    CLOSE 1: _
                    STAT1$="CLS": _
            ELSE PRINT "History available only from consolidated history file.": _
                PRINT: _
                LET LLINE%=LLINE%+2
        IF ANSWER$="Q" THEN GOTO OFFER.FUNCTION
        IF MEDIA$="P" THEN CONSOLE
        HISTODY%=HISTACC%
        IF (HISTIN%=0 OR (HISTYEST%=0 AND HISTODY%=0)) _
                THEN PRINT: _
                    PRINT "No entries in History File within selection criteria": _
                ELSE PRINT: _
                    PRINT "Last History File entry has been displayed."
        PRINT
        PRINT "Press RETURN to return to function menu ";
        W%=CONCHAR
        GOTO OFFER.FUNCTION
REM-------------------------------------------------(READ SELECTED HISTORY FILE)
PUT.REPORT.DETAIL:
        GOSUB READ.HISTORY
        IF STAT1$="END" THEN GOTO PUT.REPORT.EXIT
        IF LLINE%)MAXLINE% THEN GOSUB PAGE.BREAK
        IF ANSWER$="Q" THEN GOTO PUT.REPORT.EXIT
        PRINT CALLNBR%;TAB(7);DESCRIP$;TAB(45);LEFT$(ETIME$,2);":";MID$(ETIME$,3,2);TAB(52);LDATE$;TAB(65);
            REENT%;TAB(71);RPTCON%$
```

```
        LLINE%=LLINE% + 1
        GOTO PUT.REPORT.DETAIL
PUT.REPORT.EXIT:
        RETURN
REM----------------------------------------------------------------(RETURN TO MENU)
RETURN.TO.MENU:
        GOSUB SCREEN.HEADING
        IF STAT1$()"CLS" THEN CLOSE 1
        CONSOLE
        PRINT "Returning to Communications Menu."
        END C)type D:COMPFILE.BAS
REM ***** COMPFILE.BAS (Business BASIC 0.99)
REM        05/13/83
REM        1200
REM
REM  THIS PROGRAM DISPLAYS/PRINTS THE USER SELECTED DISK DATA OR
REM  COMMUNICATIONS REPORT FILE(S) FROM THE LIST OF FILES IN THE
REM  "COMFILES.DAT" FILE.
REM
REM  ORIGINALLY PROGRAMMED BY TERRY LORD 08/31/82
REM----------------------------------------------------------------(CHANGE LOG)
REM  VERSION    DATE      CHANGE
REM    1.0      06/31/82  INITIAL VERSION
REM    1.1      09/07/82  Changed Report output to bypass headings
REM                       Added clock access for date and time
REM                       Increased screen lines from 14 to 20
REM                       Changed error messages to CONCHAR responses
REM    1.2      09/15/82  Re-arranged version to reduce 'DEF' usage
REM                       Added line separators on screen
REM                       Increased screen lines from 20 to 21
REM                       Added ability to print "ALL"
REM                       Made internal workfile a matrix
REM    1.3      10/11/82  Added ability to print "GROUP" based on time
REM    1.4      10/27/82  Added 'HEADRPAGE' logic for communications
REM                       header page printing.
REM    1.5      02/22/83  Return to COMUMENU added
REM                       Eliminated use of CLOCK
REM                       Limited to DSK and RPT files only
REM    2.0      02/16/83  Translated to MicroSoft Business BASIC 2.99
REM                       by Steve Hemphill
REM    2.1      03/04/83  Remove chair-back to COMUMENU; by Steve Hemphill
REM    2.2      03/12/83  Prompts changed to show space before response; by
REM                       Steve Hemphill
REM    2.3      04/26/83  Display of Version number added; by Steve Hemphill
REM             05/02/83  1) CR in addition to 'N' to go to next screen
REM                          on display
REM                       2) Bug fix - CR in select causes BAD FILE NUMBER ERR
REM                       3) Centering of file description on printer report
REM                          by Andrew Schwartz
REM             05/13/83  Scan report line for linefeeds, formfeeds, and
REM                       length greater than 79.  These items require the
REM                       line count to be changed so that the report will be
REM                       displayed properly.
REM                       by Judy Ku
REM    2.4      08/02/83  chg printing ...on printer-)printing ...;by b.wong
```

```
REM------------------------------------------------------------(PROGRAM START)
START:
        CONSOLE
        LET VERSION$="Communications Files Listing - Version 2.4"
        LET CFILE2$="COMFILES.DAT"
        LET CFILE3$="COMFILEW.$$$"
        LET CFILE3.LENX=100
        LET COMTYPEMAXX=100
        LET CURRDAY$="000000"
        LET CTLFILE1$="CONTROL.DAT"
        LET CTLLENGTHX=100
        LET CTLMAXX=100
        LET ENTRYLMTX=50
        LET HEADRPAGE$="NORMAL"
        LET LINE$=" ----------------------------------------------------------------------"
        REM-----------------------------------------
        REM Create a line of linefeeds so that BRMTRAC report lines can be
        REM  compared against this.
        LF$=CHR$(10)
        FOR IX=1 TO 59
            LF$=LF$+CHR$(10)
            NEXT IX
        LF$=LF$+CHR$(32)

LET SCRNMAXX=21
        LET TITLE2$="COMMUNICATIONS FILES LISTING"
        LET WORKFILEX=0
        DIM RECORD$(COMTYPEMAXX)
        GOTO CONTROLFILE.OPEN
REM==========================================================(SCREEN.HEADING)
SCREEN.HEADING:
        IF HEADING$ = "BLANK" THEN  PRINT BLANK$ _
                ELSE _
                    PRINT SHOME$; SCLEAR$
        PRINT TAB((80-LEN(TITLE$))\2); TITLE$
        PRINT TAB((80-LEN(CTITLE$))\2); CTITLE$
        PRINT TAB((80-LEN(VERSION$))\2); VERSION$
        LLINEX=4
        RETURN
REM==========================================================(READ.CONTROLFILE.RECORD)
READ.CONTROLFILE.RECORD:
        ON END (1) GOTO READ.CONTROLFILE.ERROR
        READ #1,WORKX;NAME$,VALUEONE$,VALUETWO$
        LET STAT$="OK"
        RETURN
READ.CONTROLFILE.ERROR:
        LET STAT$="END"
        RETURN
REM==========================================================(OPEN SELECTED FILE)
SELECT.FILE.OPEN:
        ON END (3) GOTO SELECT.FILE.OPEN.ERROR
        OPEN "I",3,FILENAME$
        FSTAT$="OPN"
        RETURN
SELECT.FILE.OPEN.ERROR:
        FSTAT$="CLS"
        RETURN
```

```
REM=============================================================(INITIALIZE MATRIX)
INITIALIZE.MATRIX:
        FOR WORK%=1 TO COMTYPEYAX%
                LET RECORDS$(WORK%)="END"
        NEXT WORK%
        RETURN
REM-------------------------------------------------------------(CONTROLFILE)
CONTROLFILE.OPEN:
        PRINT
        PRINT "Obtaining system control values."
        FILESIZE=SIZE(CTLFILE:$)
        IF FILESIZE=0 THEN GOTO CONTROLFILE.NO.FILE
        OPEN "R",1,CTLFILE:$,CTLLENGTH%
        LET WORK%=1
        GOTO CONTROLFILE.GET.RECORD
CONTROLFILE.NO.FILE:
        FOR LLINE%=1 TO 25
                PRINT
        NEXT LLINE%
        PRINT "NO CONTROL FILE. RETURNING TO MENU"
        PRINT
        PRINT "Press RETURN when you have reviewed this message. ";
        WORK%=CONCHAR
        GOTO RETURN.TO.MENU
CONTROLFILE.GET.RECORD:
        GOSUB READ.CONTROLFILE.RECORD
        IF STAT$="END"       THEN GOTO CONTROLFILE.CLOSE
        IF NAME$="ENDALL"    THEN GOTO CONTROLFILE.CLOSE
        LET IWORK%=FIX(VAL(LEFT$(VALUEONE$,4)))
        IF NAME$="BLANK"     THEN BLANK$=CHR$(IWORK%)
        IF NAME$="CURRDAY"   THEN CURRDAY$=VALUEONE$
        IF NAME$="HEADRPAGE" THEN HEADRPAGE$=VALUEONE$
        IF NAME$="CTITLE"    THEN CTITLE$=VALUEONE$
        IF NAME$="HEADING"   THEN HEADING$=VALUEONE$
        IF NAME$="PMAXLINE"  THEN PMAXLINE%=IWORK%
        IF NAME$="PNEWPAGE"  THEN PNEWPAGE$=CHR$(IWORK%)
        IF NAME$="PRINTER"   THEN PRINTER$=VALUEONE$
        IF NAME$="SHOME"     THEN SHOME$=CHR$(IWORK%)
        IF NAME$="SCLEAR"    THEN SCLEAR$=CHR$(IWORK%)
        IF NAME$="TITLE"     THEN TITLE$=VALUEONE$
REM*----------------------------------------------------------(CSI VT52 PATCH)
        IF IWORK%<>27 THEN GOTO CONTROLFILE.SETUP.NEXT
        IF NAME$="SCLEAR"                            REM ADD PARSING FOR ADD'TL
            THEN SCLEAR$=CHR$(IWORK%)+VALUETWO$      REM VT52 DISPLAY DRIVER
        IF NAME$="SHOME"                             REM MNEMONICS AT END OF THIS
            THEN SHOME$=CHR$(IWORK%)+VALUETWO$       REM PATCH AREA
REM*----------------------------------------------------------(CSI VT52 PATCH)
CONTROLFILE.SETUP.NEXT:
        LET WORK%=WORK%+1
        IF WORK%>CTLMAX% THEN GOTO CONTROLFILE.CLOSE
        GOTO CONTROLFILE.GET.RECORD
CONTROLFILE.CLOSE:
        CLOSE 1
        GOSUB INITIALIZE.MATRIX
REM-------------------------------------------------------------(OPEN COMFILES)
COMFILESFILE.CHECK.SIZE:
        FILESIZE=SIZE(CFILE:$)
```

```
        IF FILESIZE=0 THEN GOTO COMFILESFILE.ERROR
        GOTO CHOOSE.FUNCTION
COMFILESFILE.ERROR:
        GOSUB SCREEN.HEADING
        PRINT
        PRINT "NO COMMUNICATIONS FILES AVAILABLE FOR DISPLAY."
        PRINT
        PRINT "Press RETURN when you have reviewed this message. ";
        WORK%=CONCHAR
        GOTO RETURN.TO.MENU
REM-----------------------------------------------------------(CHOOSE.FUNCTION)
CHOOSE.FUNCTION:
        GOSUB SCREEN.HEADING
        PRINT
        PRINT "Available functions are:"
        PRINT
        PRINT TAB(15);"(D)isplay file values"
        PRINT TAB(15);"(P)rint file values"
        PRINT TAB(15);"(Q)uit"
DISPLAY.RESPONSE:
        PRINT
        INPUT "What function do you want to perform? ",WORK$
        ANSWER2$=LEFT$(WORK$,1)
        MEDIA$=UCASE$(ANSWER2$)
        IF MEDIA$="Q" THEN GOTO RETURN.TO.MENU
        IF MEDIA$="D" THEN GOTO CHOOSE.FILETYPE
        IF MEDIA$="P" THEN GOTO CHOOSE.FILETYPE
        PRINT "RESPONSE MUST BE (D)ISPLAY, (P)RINT, OR (Q)UIT. RE-ENTER."
        GOTO DISPLAY.RESPONSE
REM-----------------------------------------------------------(CHOOSE FILETYPE)
CHOOSE.FILETYPE:
        GOSUB SCREEN.HEADING
        PRINT
        PRINT "Available file types are:"
        PRINT
        PRINT TAB(15);"(D) Communications DISK files"
        PRINT TAB(15);"(R) Communications REPORT files"
        PRINT TAB(15);"(Q)uit"
DISPLAY.FTYPE.RESPONSE:
        PRINT
        INPUT "What file type do you want to select? ",WORK$
        ANSWER2$=LEFT$(WORK$,1)
        ANSWER$=UCASE$(ANSWER2$)
        IF ANSWER$="Q" THEN GOTO CHOOSE.FUNCTION
        IF ANSWER$="D" THEN FTYPE$="DSK": GOTO CHOOSE.CALLFILE
        IF ANSWER$="R" THEN FTYPE$="RPT": GOTO CHOOSE.CALLFILE
        PRINT "RESPONSE MUST BE (D)ISK, (R)EPORT, OR (Q)UIT. RE-ENTER."
        GOTO DISPLAY.FTYPE.RESPONSE
REM-----------------------------------------------------(BUILD WORK FILE OF SELECTED)
CHOOSE.CALLFILE:
        ON END (2) GOTO COMFILESFILE.ERROR
        OPEN "I",2,CFILE2$
        GOSUB INITIALIZE.MATRIX
        LET MAXCALLNBR%=0
        LET REC%=0
        IF FTYPE$="DSK" THEN DESC$="Disk"
        IF FTYPE$="RPT" THEN DESC$="Report"
```

```
CALLFILE.LOOP.START:
        ON END (2) GOTO CALLFILE.END.LOOP
        READ #2;FDATE$,FTIME$,FILENAME$
        LET MATCH1$=MID$(FILENAME$,6,3)
        IF FTYPE$=MATCH1$ THEN GOTO CALLFILE.UPDATE.MATRIX
        GOTO CALLFILE.LOOP.START
CALLFILE.UPDATE.MATRIX:
        YDATE$=MID$(FDATE$,3,4)+LEFT$(FDATE$,2)
        YTIME$=LEFT$(FTIME$,4)
        CALLNO$=MID$(FILENAME$,2,2)
        REC%=REC%+1
        REC$=TRIM$(STR$(REC%))
        FDATE$=MID$(FDATE$,3,2)+"/"+MID$(FDATE$,5,2)+"/"+MID$(FDATE$,1,2)
        FTIME$=MID$(FTIME$,1,2)+":"+MID$(FTIME$,3,2)+":"+MID$(FTIME$,5,2)
        LET WORK$=FILENAME$+YDATE$+YTIME$+" ("+REC$+") "+DESC$+" file for call "
        LET WORK$=WORK$+CALLNO$+" on "+FDATE$+" at "+FTIME$
        LET RECORD$(REC%)=WORK$
        LET MAXRECVER%=REC%
        IF REC%(CONTY:EMAX% THEN GOTO CALLFILE.LOOP.START
CALLFILE.END.LOOP:
        CLOSE 2
        IF RECORD$(1)="END" THEN _
                PRINT: _
                PRINT "UNABLE TO FIND ANY FILES OF SELECTED TYPE." :_
                PRINT:_
                GOTO RETURN.TO.CHOOSE.FILETYPE
        MAX.LINE%=SCRNMAX%
REM-----------------------------------------------(DISPLAY FILE SELECTION)
GET.RESPONSE:
        LET REC%=1
        LET MENU.PROMPT$="Select file"
        IF MEDIA$="P" THEN MENU.PROMPT$=MENU.PROMPT$+" or (G)roup or (A)ll"
        LET PMSG$=MENU.PROMPT$+" or (N)ext or (Q)uit"
        LET EOF$="NO"
        GOSUB SCREEN.HEADING
        PRINT
        PRINT "Available files are:"
        PRINT LINE$
        LLINE%=5
GET.RESPONSE.LOOP:
        IF RECORD$(REC%)="END" THEN GOTO GET.RESPONSE.MENU.END
        MENU.REC$=MID$(RECORD$(REC%),23,80)
        GOTO GET.RESPONSE.GOOD.READ
GET.RESPONSE.MENU.END:
        LET PMSG$=MENU.PROMPT$+" or (Q)uit"
        LET EOF$="YES"
GET.RESPONSE.GOOD.READ:
        IF EOF$="YES" THEN GOTO GET.RESPONSE.MESSAGE
        PRINT MENU.REC$
        LLINE%=LLINE%+1
        REC%=REC%+1
        IF LLINE%(MAX.LINE% THEN GOTO GET.RESPONSE.LOOP
        WORK%=CONCHAR
GET.RESPONSE.MESSAGE:
        PRINT LINE$
GET.RESPONSE.MSG.RESPONSE:
        LET PRNTALL$="NO"
```

```
        LET PRNTTIME1$="0000"
        LET PRNTTIME2$="2400"
        LET PRNTCNT%=0
        PRINT PMSG$;
        INPUT RESP$
        ANSWER$=UCASE$(LEFT$(RESP$,1))
        IF ANSWER$="A" THEN _
            SELECT$="ALL" _
        ELSE _
            SELECT$=" "
        IF ANSWER$="Q" THEN GOTO GET.RESPONSE.SETUP.SELECTED
        IF ANSWER$="A" AND MEDIA$="P" THEN GOTO GET.RESPONSE.SETUP.ALL
        IF ANSWER$="S" AND MEDIA$="P" THEN GOTO GET.RESPONSE.SETUP.ALL
        IF ANSWER$()"N" THEN GOTO GET.RESPONSE.CHECK.NUMERICS
            GOSUB SCREEN.HEADING
            PRINT
            PRINT MENU.HEADING$
            PRINT LINE$
            LLINE%=5
            GOTO GET.RESPONSE.LOOP
GET.RESPONSE.CHECK.NUMERICS:
        IF RESP$="" THEN GOTO GET.RESPONSE.MSG.RESPONSE
        LEAVELOOP%=1
        FOR I%=1 TO LEN(RESP$) AND LEAVELOOP%=1
            II%=MATCH("#",RESP$,I%)
            IF II%()I% THEN _
                PRINT "NON-NUMERIC RESPONSE. RE-ENTER.": _
                LEAVELOOP%=0
        NEXT I%
        IF LEAVELOOP%=0 THEN GOTO GET.RESPONSE.MSG.RESPONSE
        GOTO GET.RESPONSE.SETUP.SELECTED
GET.RESPONSE.SETUP.ALL:
        LET PRNTALL$="YES"
        LET RESP$="1"
        PRINT
        INPUT "What day's reports do you want (mmddyy,999999=all dates)? ",PRNTDATE$
        IF PRNTDATE$="999999" THEN GOTO GET.RESPONSE.SETUP.SELECTED
        IF SELECT$="ALL" THEN GOTO GET.RESPONSE.SETUP.SELECTED
GET.RESPONSE.SETUP.TIME:
        PRINT
        INPUT "Do you want to select by time (Y/N/Q)? ",RESP$
        ANSWER$=UCASE$(LEFT$(RESP$,1))
        IF ANSWER$="Q" THEN GOTO RETURN.TO.CHOOSE.FILETYPE
        IF ANSWER$="N" THEN GOTO GET.RESPONSE.SETUP.SELECTED
        IF ANSWER$="Y" THEN GOTO GET.RESPONSE.TIME.RANGE
        PRINT "RESPONSE MUST BE Y, N, OR Q. RE-ENTER."
        GOTO GET.RESPONSE.SETUP.TIME
GET.RESPONSE.TIME.RANGE:
        INPUT "What is the earliest time (HHMM)? ",PRNTTIME1$
        INPUT "What is the latest time (HHMM)? ",PRNTTIME2$
GET.RESPONSE.SETUP.SELECTED:
        IF ANSWER$="Q" THEN GOTO RETURN.TO.CHOOSE.FILETYPE
        REC%=FIX(VAL(LEFT$(RESP$,4)))
GET.RESPONSE.READ.FOR.NEXT:
        LET BUFF$=RECORD$(REC%)
        IF BUFF$="END" THEN GOTO GET.RESPONSE.NO.SELECT.FILE
```

```
        IF PRNTALL$="YES" AND PRNTDATE$()"999999" THEN GOTO SET.RESPONSE.CHECK.DATE
        GOTO START.REPORT
SET.RESPONSE.CHECK.DATE:
        XDATE$=MID$(BUFF$,13,6)
        MTIME$=MID$(BUFF$,19,4)
        IF XDATE$=PRNTDATE$ THEN _
            IF MTIME$ )= PRNTTIME1$ THEN _
                IF MTIME$ (= PRNTTIME2$ THEN GOTO START.REPORT
        LET RECX=RECX+1
        IF RECX(=MAXRECNBRX THEN GOTO SET.RESPONSE.READ.FOR.NEXT
SET.RESPONSE.NO.SELECT.FILE:
        IF PRNTCNTX=0 THEN _
            PRINT :_
            PRINT "NO FILES MEET SELECTION CRITERIA" :_
            PRINT :_
            PRINT "Press RETURN when you have reviewed this message. "; :_
            WORKX=CONCHAR :_
            GOTO CHOOSE.CALLFILE
        IF ANSWER$()"2" THEN _
            PRINT "Press RETURN to return to last menu. " :_
            WX=CONCHAR :_
            GOTO CHOOSE.CALLFILE
RETURN.TO.CHOOSE.FILETYPE:
        IF ANSWER$()"2" THEN _
            PRINT "Press RETURN to return to last menu. "; _
            WX=CONCHAR
        GOTO CHOOSE.FILETYPE
REM----------------------------------------------------(PRINT/DISPLAY SELECTED FILE)
START.REPORT:
        FILENAME$=MID$(BUFF$,1,12)
        PGNOX=2
        IF MEDIA$="D" THEN GOTO PROCESS.SCREEN
        IF PRINTER$="NO" THEN GOTO REPORT.NO.PRINTER
        MAXLINEX=PMAXLINEX
        IF PRNTALL$="YES" AND PRNTCNTX()0 THEN GOTO REPORT.CONTINUATION
        GOSUB SCREEN.HEADING
        PRINT
        PRINT "When you have the printer ready, press RETURN ";
        WX=CONCHAR
        IF HEADRPAGE$()"SUMMARY" THEN GOTO REPORT.CONTINUATION
        GOSUB SCREEN.HEADING
        PRINT
        PRINT "Printing ";TITLE2$
        LPRINTER
        PGNOX=PGNOX+1
        RUNDATE$=" "
        RUNTIME$=" "
        RUNDATE$=MID$(CURRDAY$,3,2)+"/"+RIGHT$(CURRDAY$,2)+"/"+LEFT$(CURRDAY$,2)
REPORT.SUMMARY.PAGE:
        PRINT PNEWPAGE$
        PRINT TAB((80-LEN(TITLE$))\2); TITLE$
        PRINT TAB((80-LEN(CTITLE$))\2); CTITLE$
        PRINT TAB(2); "Date: "; RUNDATE$;
        PRINT TAB((60-LEN(TITLE2$))\2); TITLE2$;
        PRINT TAB(72); "Page: "; : PRINT USING "###"; PGNOX
        PRINT
```

```
            PRINT TAB(2); "SELECTION CRITERIA:"
            PRINT TAB(2); "Date: ";PRNTDATE$;" Earliest time: ";PRNTTIME1$;" Latest time: ";PRNTTIME2$
            PRINT
            SUMREC%=1
SUMMARY.HEADER.LOOP:
            LET BUFF$=RECORD$(SUMREC%)
            IF BUFF$="END" THEN GOTO END.SUMMARY.LOOP
            IF PRNTALL$="YES" THEN _
                    IF PRNTDATE$="999999" THEN GOTO PRINT.HEADER.RECORD _
                    ELSE _
                            XDATE$=MID$(BUFF$,13,6) :_
                            XTIME$=MID$(BUFF$,19,4) :_
                            IF XDATE$=PRNTDATE$ THEN _
                                    IF XTIME$)=PRNTTIME1$ THEN _
                                            IF XTIME$(=PRNTTIME2$ THEN GOTO PRINT.HEADER.RECORD _
                                            ELSE _
                                    ELSE _
                            ELSE _
            ELSE IF SUMREC%=REC% THEN GOTO PRINT.HEADER.RECORD
            GOTO NXT.SUMMARY.HEADER
PRINT.HEADER.RECORD:
            TEMP$=MID$(BUFF$,23)
            PRINT TAB((80-LEN(TEMP$))\2); TEMP$
NXT.SUMMARY.HEADER:
            SUMREC%=SUMREC%+1
            IF SUMREC%(=MAXREC\BR% THEN GOTO SUMMARY.HEADER.LOOP
END.SUMMARY.LOOP:
            PRINT
            PRINT TAB(2); "COMMUNICATIONS FILE PRINT STARTS ON NEXT PAGE."
            PRINT TAB(2); "IT IS UNCHANGED AND IS PRINTED 'AS IS'."
            PRINT PNEWPAGE$
            GOTO ACCESS.CURRENT.FILE
REPORT.CONTINUATION:
            LPRINTER
            PGNO%=PGNO%+1
            RLNDATE$=" "
            RLNTIME$=" "
            RUNDATE$=MID$(CURRDAY$,3,2)+"/"+RIGHT$(CURRDAY$,2)+"/"+LEFT$(CURRDAY$,2)
REPORT.TITLE.PAGE:
            PRINT PNEWPAGE$
            IF HEADRPAGE$()"NORMAL" THEN GOTO ACCESS.CURRENT.FILE
            PRINT TAB((82-LEN(TITLE$))\2); TITLE$
            PRINT TAB((82-LEN(DTITLE$))\2); DTITLE$
            PRINT TAB(2); "Date: "; RUNDATE$;
            PRINT TAB((80-LEN(TITLE2$))\2); TITLE2$;
            PRINT TAB(70); "Page: "; : PRINT USING "###"; PGNO%
            PRINT
            TEMP$=MID$(BUFF$,23,80)
            PRINT TAB((60-LEN(TEMP$))\2); TEMP$
            PRINT
            PRINT TAB(2); "SELECTION CRITERIA:"
            PRINT TAB(2); "Date: ";PRNTDATE$;" Earliest time: ";PRNTTIME1$;" Latest time: ";PRNTTIME2$
            PRINT
            PRINT TAB(2); "COMMUNICATIONS FILE PRINT STARTS ON NEXT PAGE."
            PRINT TAB(2); "IT IS UNCHANGED AND IS PRINTED 'AS IS'."
            PRINT PNEWPAGE$
            GOTO ACCESS.CURRENT.FILE
```

```
REPORT.NO.PRINTER:
        PRINT
        PRINT "YOU DON'T HAVE A PRINTER AVAILABLE"
        PRINT
        PRINT "Press RETURN to return to Function List ";
        WX=CONCHAR
        GOTO CHOOSE.FUNCTION
PROCESS.SCREEN:
        MAXLINE%=SCRNMAX%
        PGNO%=PGNO%+1
        GOSUB SCREEN.HEADING
        PRINT LINE$
ACCESS.CURRENT.FILE:
        GOSUB SELECT.FILE.OPEN
        IF FSTAT$()="OK" THEN GOTO PRNT.FILE.LOOP
        CONSOLE
        PRINT
        PRINT "UNABLE TO OPEN SELECTED FILE."
        PRINT
        PRINT "Press RETURN to return to last menu. ";
        WX=CONCHAR
        LET ANSWER$="Q"
        GOTO RETURN.TO.CHOOSE.FILETYPE
PRNT.FILE.LOOP:
        FSTAT$=" "
        ON END (3) GOTO PRNT.FILE.END
        LINE READ #3; CALLFILE.REC$
        FSTAT$="OK"
        GOTO PRNT.FILE.GOOD.READ
PRNT.FILE.END:
        FSTAT$="END"
PRNT.FILE.GOOD.READ:
        IF MEDIA$="D" AND FSTAT$="END" THEN GOTO PRNT.LAST.SHOWN
        IF MEDIA$()"D" AND FSTAT$="END" THEN GOTO PRNT.CLOSE.FILE REM------------------------------------------------------------
        REM Look at the input record. Linefeeds, formfeeds, and records
        REM with 80 characters or more will affect the line count.
        IF RIGHT$(CALLFILE.REC$,1)=CHR$(10) OR_
            LEFT$(CALLFILE.REC$,1)=CHR$(10) THEN LLINE%=LLINE%+1
        IF RIGHT$(CALLFILE.REC$,1)=CHR$(12) OR_
            LEFT$(CALLFILE.REC$,1)=CHR$(12) THEN LLINE%=MAXLINE%
        IF INSTR(LF$,CALLFILE.REC$))0 THEN CALLFILE.REC$=" "
        IF LEN(CALLFILE.REC$))79 THEN LLINE%=LLINE%+1

IF LLINE%(MAXLINE% THEN GOTO PRNT.SAME.PAGE
        IF MEDIA$()"D" THEN GOTO PRNT.SAME.PAGE
        PRINT LINE$
PRNT.RESPONSE:
        REM------------------------------------------------------------
        REM We drop down here if we have filled up one page.
        INPUT "Press RETURN to go to the next screen or (Q)uit:",RESP$
        ANSWER$=UCASE$(LEFT$(RESP$,1))
        IF ANSWER$="Q" THEN GOTO PRNT.CLOSE.FILE
        IF ANSWER$="" THEN GOTO PRNT.SETUP.NEXT.SCREEN
        IF ANSWER$="N" THEN GOTO PRNT.SETUP.NEXT.SCREEN
        PRINT "INVALID RESPONSE. RE-ENTER."
```

```
            GOTO PRNT.RESPONSE
PRNT.SETUP.NEXT.SCREEN:
        REM----------------------------------------------------------------
        REM  Write the headings for the next page.  Check if we must write
        REM  a record for the new page.
        PLINE%=LLINE%
        PGNO%=PGNO%+1
        GOSUB SCREEN.HEADING
        PRINT LINE$
        IF PLINE%)MAXLINE%-1 THEN GOTO PRNT.SAME.PAGE
        GOTO PRNT.FILE.LOOP
PRNT.SAME.PAGE:
        IF FSTAT$="END" THEN GOTO PRNT.CLOSE.FILE
        PRINT CALLFILE.REC$
        LLINE%=LLINE%+1
        GOTO PRNT.FILE.LOOP
PRNT.LAST.SHOWN:
        PRINT LINE$
        PRINT "Last record processed for this file. To continue press RETURN. ";
        WORK%=CONCHAR
PRNT.CLOSE.FILE:
        CLOSE 3
        IF MEDIA$="D" THEN GOTO CHOOSE.CALLFILE
        CONSOLE
        IF PRNTALL$()"YES" THEN GOTO CHOOSE.CALLFILE
        LET REC%=REC%+1
        LET PRNTCNT%=PRNTCNT%+1
        IF REC%)MAXRECNBR% THEN GOTO CHOOSE.CALLFILE
        LET RESP$=TRIM$(STR$(REC%))
        LET ANSWER$="R"
        GOTO GET.RESPONSE.SETUP.SELECTED
REM---------------------------------------------------------------(RETURN TO MENU)
RETURN.TO.MENU:
        CONSOLE
        GOSUB SCREEN.HEADING
        PRINT
        PRINT "Returning to Communications Menu."
REM     CHAIN "COMUMENU.EXE"
        END C)type D:COMPCALL.BAS REM ***** COMPCALL.BAS (Business Basic 2.59)
REM     04/26/83
REM     1:09
REM
REM THIS PROGRAM PROVIDES THE FACILITY TO DISPLAY AND PRINT THE
REM CALL AUDIT LIST ON THE SCREEN OR HARD-COPY.
REM
REM ORIGINALLY PROGRAMMED BY TOM TRELFORD 08/23/82
REM----------------------------------------------------------------(CHANGE LOG)
REM VERSION   DATE     CHANGE
REM    1.0   08/26/82  INITIAL VERSION
REM    1.1   02/02/83  Return to COMUMENU added
REM                    Eliminated use of CLOCK
```

```
REM     2.0     02/17/83  Translated to MicroSoft Business BASIC 0.99;
REM                       by Steve Hemphill
REM     2.1     03/03/83  Remove chain-back-to COMMENU; by Steve Hemphill
REM     2.2     03/09/83  Prompts changed to show space before response; by
REM                       Steve Hemphill
REM     2.3     04/26/83  Display of Version number added; by Steve Hemphill
REM     2.4     07/22/83  Changes in wording of report and display; by Judy Ku
REM     2.5     07/29/83  chg printing on printer to printing....  by ben wong
REM-----------------------------------------------------------(PROGRAM START)
START:
        CONSOLE
        LET VERSION$="Call Audit Processor - Version 2.5"
        LET CTLFILE1$="CONTROL.DAT"
        LET CTLLENGTH%=120
        LET CTLMAX%=100
        LET ENTRYLYT%=50
        LET TITLE2$="CALL AUDIT REPORT"
        LET CFILE2$="COMDIAL.DAT"
        LET CFILELEN%=200
        LET CURRDAY$="002020"
        LET SCRNMAX%=15
        LET CLOCK$="NO"
        GOTO CONTROLFILE.OPEN
REM-----------------------------------------------------------(SUBROUTINES)
SCREEN.HEADING:
        IF HEADING$="BLANK" THEN GOTO SCREEN.BLANK
                PRINT SHOME$; SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        RETURN
REM-------------------------------------------------------------------
READ.CONTROLFILE.RECORD:
        ON END (1) GOTO READ.CONTROLFILE.ERROR
        READ #1,WORK%;NAME$,VALUEONE$,VALUETWO$
        LET STAT$="OK"
        RETURN
READ.CONTROLFILE.ERROR:
        LET STAT$="END"
        RETURN
REM-------------------------------------------------------------------
READ.CALLFILE.RECORD:
        ON END (2) GOTO READ.CALLFILE.ERROR
        SET #2,REC%
        INPUT #2,CALLNGR%,DESCRIP$,CDATE$,CTIME$,RTIME$,DSK%,DSKMETH$
        INPUT #2,EDRT$,EPTR$,DIAG$,SAVEPTR$,FDX$,EYDY$,HBKSP$,EOF$,LOGYSG$
        INPUT #2,ENDCHR$,PARITY%,STATUS%,RECNT%,STIME$,ETIME$,LDATE$,RPGRM$
        INPUT #2,SPGRY$
        LET STAT$="OK"
        RETURN
READ.CALLFILE.ERROR:
        LET STAT$="END"
        RETURN
```

```
REM----------------------------------------------------------------
CALCULATE.CONNECT.TIME:
        LET WSHR%=FIX(VAL(LEFT$(WSTART$,2)))
        LET WSMN%=FIX(VAL(MID$(WSTART$,3,2)))
        LET WSSC%=FIX(VAL(RIGHT$(WSTART$,2)))
        LET WEHR%=FIX(VAL(LEFT$(WEND$,2)))
        LET WEMN%=FIX(VAL(MID$(WEND$,3,2)))
        LET WESC%=FIX(VAL(RIGHT$(WEND$,2)))
CALCULATE.HOURS:
        IF WEHR%=WSHR% THEN WCHR%=0: GOTO CALCULATE.MINUTES
        IF WEHR%>WSHR% THEN WCHR%=WEHR%-WSHR%: GOTO CALCULATE.MINUTES
        LET WEHR%=WEHR%+24
        GOTO CALCULATE.HOURS
CALCULATE.MINUTES:
        IF WEMN%=WSMN% THEN WCMN%=0: GOTO CALCULATE.SECONDS
        IF WEMN%>WSMN% THEN WCMN%=WEMN%-WSMN%: GOTO CALCULATE.SECONDS
        LET WCHR%=WCHR%-1
        LET WEMN%=WEMN%+60
        GOTO CALCULATE.MINUTES
CALCULATE.SECONDS:
        IF WESC%=WSSC% THEN WCSC%=0: GOTO FORMAT.TIMES
        IF WESC%>WSSC% THEN WCSC%=WESC%-WSSC%: GOTO FORMAT.TIMES
        LET WCMN%=WCMN%-1
        LET WESC%=WESC%+60
        GOTO CALCULATE.SECONDS
FORMAT.TIMES:
        IF WCHR%>9 THEN WCHR$=TRIM$(STR$(WCHR%)) ELSE WCHR$="0"+TRIM$(STR$(WCHR%))
        IF WCMN%>9 THEN WCMN$=TRIM$(STR$(WCMN%)) ELSE WCMN$="0"+TRIM$(STR$(WCMN%))
        IF WCSC%>9 THEN WCSC$=TRIM$(STR$(WCSC%)) ELSE WCSC$="0"+TRIM$(STR$(WCSC%))
        CTIME$=WCHR$+":"+WCMN$+":"+WCSC$
        RETURN
REM CALCULATE.FORMAT.HOURS:
REM     LET CTIME$=" "
REM     IF WCHR%=0 THEN GOTO CALCULATE.FORMAT.MINUTES
REM     LET CTIME$=TRIM$(STR$(WCHR%))+":"+TRIM$(STR$(WCMN%))+":"+TRIM$(STR$(WCSC%))
REM     RETURN
REM CALCULATE.FORMAT.MINUTES:
REM     IF WCMN%=0 THEN GOTO CALCULATE.FORMAT.SECONDS
REM     LET CTIME$=TRIM$(STR$(WCMN%))+":"+TRIM$(STR$(WCSC%))
REM     RETURN
REM CALCULATE.FORMAT.SECONDS:
REM     IF WCSC%=0 THEN RETURN
REM     LET CTIME$=":"+TRIM$(STR$(WCSC%))
REM     RETURN
REM---------------------------------------------------------(CONTROLFILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",1,CTLFILE1$,CTLLENGTH%
        LET WORK%=1
        GOTO CONTROLFILE.GET.RECORD
CONTROLFILE.NO.FILE:
        FOR LLINE%=1 TO 25
            PRINT
        NEXT LLINE%
```

```
            PRINT "NO CONTROL FILE. RETURNING TO MENU"
            GOTO RETURN.TO.MENU
CONTROLFILE.GET.RECORD:
            GOSUB READ.CONTROLFILE.RECORD
            IF STAT$="END"      THEN GOTO CONTROLFILE.CLOSE
            IF NAME$="ENDALL"   THEN GOTO CONTROLFILE.CLOSE
            LET IWORK%=FIX(VAL(LEFT$(VALUEONE$,4)))
            IF NAME$="BLANK"    THEN BLANK$=CHR$(IWORK%)
            IF NAME$="CTITLE"   THEN CTITLE$=VALUEONE$
            IF NAME$="CURRDAY"  THEN CURRDAY$=VALUEONE$
            IF NAME$="HEADING"  THEN HEADING$=VALUEONE$
            IF NAME$="PMAXLINE" THEN PMAXLINE%=IWORK%
            IF NAME$="PNEWPAGE" THEN PNEWPAGE$=CHR$(IWORK%)
            IF NAME$="PRINTER"  THEN PRINTER$=VALUEONE$
            IF NAME$="SHOME"    THEN SHOME$=CHR$(IWORK%)
            IF NAME$="SCLEAR"   THEN SCLEAR$=CHR$(IWORK%)
            IF NAME$="TITLE"    THEN TITLE$=VALUEONE$
CONTROLFILE.SETUP.NEXT:
            LET WORK%=WORK%+1
            IF WORK%>CTLMAX% THEN GOTO CONTROLFILE.CLOSE
            GOTO CONTROLFILE.GET.RECORD
CONTROLFILE.CLOSE:
            CLOSE 1
REM--------------------------------------------------------------(CALLFILE)
CALLFILE.OPEN:
            GOSUB SCREEN.HEADING
            PRINT "Opening the Dial List files."
            FILESIZE=SIZE(CFILE2$)
            IF FILESIZE=0 THEN GOTO CALLFILE.ERROR
            OPEN "R",2,CFILE2$,CFILELEN%
            GOTO DISPLAY.FUNCTIONS
CALLFILE.ERROR:
            PRINT
            PRINT "You don't have a Dial List."
            PRINT
            PRINT "Press RETURN to return to menu. "
            WRITER%=CONCHAR
            GOTO RETURN.TO.MENU
REM--------------------------------------------------------------(DISPLAY)
DISPLAY.FUNCTIONS:
            GOSUB SCREEN.HEADING
            PRINT "Available functions are:"
            PRINT
            PRINT TAB(15);"(D)isplay Call Audit Report"
            PRINT TAB(15);"(P)rint Call Audit Report"
            PRINT TAB(15);"(Q)uit"
DISPLAY.RESPONSE:
            PRINT
            INPUT "What function do you want to perform? ",WORK$
            ANSWER2$=LEFT$(WORK$,1)
            ANSWER$=UCASE$(ANSWER2$)
            IF ANSWER$="D" THEN MEDIA$="D": GOTO DISPLAY.CALL.LIST
            IF ANSWER$="P" THEN MEDIA$="P": GOTO DISPLAY.CALL.LIST
            IF ANSWER$="Q" THEN CLOSE 2: GOTO RETURN.TO.MENU
            PRINT "RESPONSE MUST BE D, P, OR Q.   RE-ENTER."
            GOTO DISPLAY.RESPONSE
```

```
REM-----------------------------------------------------------------
DISPLAY.CALL.LIST:
        LET RECX=1
        LET PGNDX=0
        IF MEDIA$="D" THEN GOTO DISPLAY.NEW.SCREEN
        GOSUB SCREEN.HEADING
        IF PRINTER$="YES" THEN GOTO DISPLAY.GET.PRINT.INPUT
        PRINT "YOU DON'T HAVE A PRINTER AVAILABLE."
        PRINT "Press RETURN to return to selection menu. ";
        WORK%=CONCHAR
        GOTO DISPLAY.FUNCTIONS
DISPLAY.GET.PRINT.INPUT:
        PRINT "Do you have the printer ready (press RETURN) ";
        WORK%=CONCHAR
        GOSUB SCREEN.HEADING
        PRINT "Printing Call Audit Report."
        LPRINTER
        LET MAXLINE%=PMAXLINE%
        PRNTDATE$=MID$(CURRDAY$,3,2)+"/"+RIGHT$(CURRDAY$,2)+"/"+LEFT$(CURRDAY$,2)
DISPLAY.NEW.PAGE:
        PRINT PNEWPAGE$
        LET PGNDX=PGNDX+1
        PRINT TAB((63-LEN(TITLE$))\2);TITLE$
        PRINT TAB((80-LEN(CTITLE$))\2);CTITLE$
        PRINT "DATE: ";PRNTDATE$;
        PRINT TAB((60-LEN(TITLE2$))\2);TITLE2$;
        PRINT TAB(72);"Page: ";
        PRINT USING "##";PGNDX
        PRINT
        LET LLINE%=9
        GOTO DISPLAY.TITLES
DISPLAY.NEW.SCREEN:
        GOSUB SCREEN.HEADING
        PRINT TAB((80-LEN(TITLE2$))\2);TITLE2$
        PRINT
        LET MAXLINE%=SCRNMAX%
        LET LLINE%=6
DISPLAY.TITLES:
        PRINT TAB(1);"CALL";TAB(43);"CALL";TAB(54);"CALL";
        PRINT TAB(63);"LINES";TAB(71);"CONNECT"
        PRINT TAB(1);"NBR";TAB(6);"DESCRIPTION";TAB(43);"TIME";
        PRINT TAB(54);"DATE";TAB(63);"REC'D";TAB(72);"TIME"
        PRINT
DISPLAY.DETAIL:
        GOSUB READ.CALLFILE.RECORD
        IF STAT$="END" THEN LET RECX=ENTRYLMT%: GOTO DISPLAY.LOOP
        IF DESCRIP$="*" THEN GOTO DISPLAY.LOOP
REM     PRINT TAB(1);" ";
        PRINT USING "##";CALLNBR%;
        PRINT TAB(5);" ";
            PRINT DESCRIP$;
        PRINT TAB(42);" ";
            IF ETIME$="000000" THEN GOTO DISPLAY.LAST.DATE
            PRINT LEFT$(ETIME$,2);":";MID$(ETIME$,3,2);
```

```
DISPLAY.LAST.DATE:
        PRINT TAB(51);" ";
           IF LDATE$="000000" THEN GOTO DISPLAY.REC.CNT
                PRINT LEFT$(LDATE$,2)+"/"+MID$(LDATE$,3,2)+"/"+RIGHT$(LDATE$,2);
DISPLAY.REC.CNT:
        PRINT TAB(60);" ";
           IF RECNT%=0 THEN GOTO DISPLAY.CONNECT.TIME
                PRINT USING "###,###";RECNT%;
DISPLAY.CONNECT.TIME:
        PRINT TAB(72);" ";
           IF STIME$="000000" OR ETIME$="000000" THEN PRINT: GOTO DISPLAY.UP.LINE
           LET WSTART$=STIME$
           LET WEND$=ETIME$
           LET CTIME$="000000"
           GOSUB CALCULATE.CONNECT.TIME
           PRINT CTIME$
DISPLAY.UP.LINE:
        LET LLINE%=LLINE%+1
        IF LLINE%>MAXLINE% AND MEDIA$="P" THEN GOTO DISPLAY.TOP.PAGE
        IF LLINE%>MAXLINE% AND MEDIA$="D" THEN GOTO DISPLAY.SCREEN.END
DISPLAY.LOOP:
        LET REC%=REC%+1
        IF REC%<=ENTRY.NT% THEN GOTO DISPLAY.DETAIL
        IF MEDIA$="P" THEN GOTO DISPLAY.CLOSE.PRINTER
        GOTO DISPLAY.LAST.ENTRY
DISPLAY.TOP.PAGE:
        LET REC%=REC%-1
        IF REC%<=ENTRY.NT% THEN GOTO DISPLAY.NEW.PAGE
DISPLAY.CLOSE.PRINTER:
        CONSOLE
        GOTO DISPLAY.FUNCTIONS
DISPLAY.LAST.ENTRY:
        PRINT
        PRINT "THE LAST ENTRY HAS BEEN DISPLAYED."
        PRINT "Are you ready to continue (press RETURN). ";
        WORK%=CONCHAR
        GOTO DISPLAY.FUNCTIONS
DISPLAY.SCREEN.END:
        PRINT
        PRINT "What do you want to do now..."
        INPUT "    ((Q)uit, (N)ext task)? ",W$
        ANSWER2$=LEFT$(W$,1)
        ANSWER$=UCASE$(ANSWER2$)
        IF ANSWER$="Q" THEN GOTO DISPLAY.FUNCTIONS
        IF ANSWER$="N" THEN GOTO DISPLAY.NEXT
        PRINT "MUST RESPOND Q OR N. RE-ENTER."
        GOTO DISPLAY.SCREEN.END
DISPLAY.NEXT:
        LET REC%=REC%+1
        IF REC%<=ENTRY.NT% THEN GOTO DISPLAY.NEW.SCREEN
        GOTO DISPLAY.LAST.ENTRY
REM------------------------------------------------------------------(RETURN)
RETURN.TO.MENU:
        GOSUB SCREEN.HEADING
        PRINT "Returning to Communications Menu."
        END
```

```
D>type D:COMUPLAC.BAS
REM ***** COMUPLAC.BAS (Business BASIC 2.99)
REM     08/22/83
REM     0855
REM
REM PROVIDES THE ABILITY TO PERFORM ANY PREDEFINED
REM CALL DIRECTLY FROM THE MAIN MENU.  IF THE CALL REQUESTED DOES
REM NOT EXIST, EXITS TO TERMINAL EMULATION MODE.
REM
REM  ORIGINALLY PROGRAMMED AS COMUCALL.BAS BY TOM TRELFORD 08/28/82
REM  ORIGINALLY PROGRAMMED AS COMUPLAC BY STEVE HEMPHILL 02/04/83
REM-----------------------------------------------------------(CHANGE LOG)
REM  VERSION    DATE      CHANGE
REM    1.0    02/04/83  INITIAL VERSION
REM    1.1    02/11/83  Added CnnERCR file update when error occurs
REM                     Added use of DATERTRN for translation return
REM    2.0    02/18/83  Translated to MicroSoft Business BASIC 2.99
REM                     by Steve Hemphill
REM    2.1    02/22/83  New file CONTRBL.$$$ added to update trouble log
REM    2.2    03/31/83  DIALRECX changed to VAL of Command string.
REM    2.3    03/23/83  Substituted hardware clock for chronograph.
REM                     COMMO.FILE.FINISH mods.
REM                     Added COMHISTD.$$$ for updating history log.
REM                     Restructured initialization checks.
REM    2.4    05/18/83  Changed to delete COMDIALW.$$$ at end of program and
REM                     open the COMDIAL.DAT file when returning from the
REM                     communications routines.
REM                     by Judy Ku
REM    2.5    06/22/83  COMIO is now "RUN" instead of "CHAIN"ed to.
REM                     by Judy Ku
REM    2.6    06/16/83  ENDCHAR$=")" replaced with ENDCHAR$=" ".
REM                     FIX FOR WIRE TRANSFER & DTC/ACH  John Kirch.
REM----------------------------------------------------------------------

REM-----------------------------------------------------(START OF PROGRAM)
START:
        CONSOLE
        DIALREC$ = LEFT$(COMMAND$,2)
        DIALRECX = VAL(DIALREC$)
        LET VERSION$="Direct Call Processor - Version 2.6"
        IF DIALRECX<2 OR DIALRECX>99 THEN GOTO BADPARM
        GOTO START.CONTINUE
BADPARM:
        PRINT
        PRINT DIALREC$;" IS NOT A VALID CALL NUMBER"
        PRINT "CALL NUMBER MUST BE FROM 1 TO 99"
        PRINT
        PRINT "When ready to continue press RETURN."
        WAITERX=CONCHAR
        GOTO RETURN.TO.MENU
START.CONTINUE:
        IF TEST$()"YES" THEN GOTO START.KEEP.GOING
        PRINT "DIALREC$ = "+DIALREC$
        PRINT "DIALRECX = "+TRIM$(STR$(DIALRECX))
        WAITERX=CONCHAR
```

```
START.KEEP.GOING:
        LET CTLFILE1$="CONTROL.DAT"
        LET CTLLENGTH%=100
        LET CTLMAX%=100
        LET ENTRYLMT%=50
        LET SCRN01$="DIAL LIST"
        LET CLOCK$="NO"
        LET TEST$="NO"
        LET CFILE1$="COMDIAL.DAT"
        LET CFILE2$="COMDIALW.$$$"
        LET CFILE3$="COMDSKW.$$$"
        LET CFILE4$="COMTBL.DAT"
        LET CFILE5$="COMHISTD.DAT"
        LET CFILE6$="COMLOG.DAT"
        LET CFILE7$="COMERROR.DAT"
        LET CFILE10$="UTLDATES.DAT"
        LET CFILE11$="COMFILES.DAT"
        LET CFILE12$="COMFILES.$$$"
        LET CFILE13$="COMTBL.$$$"
        LET CFILE14$="COMHISTD.$$$"
        LET CFILELEN%=200
        LET ENTRYMAX=35
        LET RETURNPGM$="COMUPLAC.EXE"
        GOTO CONTROLFILE.OPEN
REM---------------------------------------------(SUBROUTINE = GET TIME OF DAY)
GO.GET.TIME:
REM USE HARDWARE CLOCK
REM TIME$ FUNCTION RETURNS HH:MM:SS:SS
        CURRTIME$=TIME$
REM CONVERT TO HHMMSS
        CURRTIME$=LEFT$(CURRTIME$,2)+MID$(CURRTIME$,4,2)+MID$(CURRTIME$,7,2)
        RETURN
REM---------------------------------------------(SUBROUTINE = SCREEN HEADING)
SCREEN.HEADING:
        IF HEADING$="BLANK" THEN GOTO SCREEN.BLANK
                PRINT SHOME$;SCLEAR$
                GOTO SCREEN.TITLE
SCREEN.BLANK:
        PRINT BLANK$
SCREEN.TITLE:
        PRINT TAB((80-LEN(TITLE$))\2);TITLE$
        PRINT TAB((80-LEN(CTITLE$))\2);CTITLE$
        PRINT TAB((80-LEN(VERSION$))\2);VERSION$
        PRINT
        RETURN
REM---------------------------------------------(SUBROUTINE = READ CONTROL FILE)
READ.CONTROLFILE.RECORD:
        ON END (4) GOTO READ.CONTROLFILE.ERROR
        READ #4,WORK%;NAME$,VALUEONE$,VALUETWO$
        LET STAT$="OK"
        RETURN
READ.CONTROLFILE.ERROR:
        LET STAT$="END"
        RETURN
REM---------------------------------------------(SUBROUTINE = WRITE CONTROL FILE)
WRITE.CONTROLFILE.RECORD:
```

```
            ON END (4) GOTO WRITE.CONTROLFILE.ERROR
            WRITE #4,WORK%;NAME$,VALUEONE$,VALUETWO$
            LET STAT$="OK"
            RETURN
WRITE.CONTROLFILE.ERROR:
            LET STAT$="END"
            RETURN
REM------------------------------------------------(SUBROUTINE = READ DIAL LIST)
READ.CALLFILE.RECORD:
            ON END (1) GOTO READ.CALLFILE.ERROR
            GET #1,REC%
            INPUT #1,CALLNBR%,DESCRIP$,CDATE$,CTIME$,RTIME$,DSK%,DSKMETH$
            INPUT #1,ECRT$,EPTR$,DIAG$,SAVEPTR$,FDX$,EMDM$,HBKSP$,EOF$,LOGMSG$
            INPUT #1,ENDCHR$,PARITY%,STATUS%,RECNT%,STIME$,ETIME$,LDATE$,RPGRM$
            INPUT #1,SPGRM$
            LET STAT$="OK"
            RETURN
READ.CALLFILE.ERROR:
            LET STAT$="END"
            RETURN
REM---------------------------------(SUBROUTINE = CONVERT YYMMDD FORMAT TO MMDDYY)
CONVERT.YMD.MDY:
            LET INYR$=LEFT$(DATEIN$,2)
            LET INMO$=MID$(DATEIN$,3,2)
            LET INDA$=RIGHT$(DATEIN$,2)
            LET DATEOUT$=INMO$+INDA$+INYR$
            RETURN
REM---------------------------------(SUBROUTINE = CONVERT MMDDYY FORMAT TO YYMMDD)
CONVERT.MDY.YMD:
            LET INMO$=LEFT$(DATEIN$,2)
            LET INDA$=MID$(DATEIN$,3,2)
            LET INYR$=RIGHT$(DATEIN$,2)
            LET DATEOUT$=INYR$+INMO$+INDA$
            RETURN
REM------------------------------------------------(SUBROUTINE = VALIDATE TIME)
VALIDATE.TIME:
            LET STAT$="OK"
            LET MSG$=" "
            THISLEN=LEN(WORK$)
            IF THISLEN=4 THEN WORK$=WORK$+"00"
            IF THISLEN=6 THEN GOTO VALIDATE.TIME.HOUR
                        LET MSG$="MUST HAVE 6 DIGITS. RE-ENTER."
                        GOTO VALIDATE.TIME.ERROR
VALIDATE.TIME.HOUR:
            IF WORK$="002000" THEN RETURN
            LET ANSWER$=LEFT$(WORK$,2)
            LET ANSWER2$=MID$(WORK$,3,2)
            LET ANSWER3$=RIGHT$(WORK$,2)
            IF ANSWER$="00" AND ANSWER2$()"00" THEN GOTO VALIDATE.TIME.MIN
            IF ANSWER$="24" AND ANSWER2$="00" AND ANSWER3$="00" THEN RETURN
            IF ANSWER$)"00" AND ANSWER$("24" THEN GOTO VALIDATE.TIME.MIN
                        LET MSG$="HOUR MUST BE 00 THRU 24. RE-ENTER."
                        GOTO VALIDATE.TIME.ERROR
VALIDATE.TIME.MIN:
            IF ANSWER2$="00" THEN GOTO VALIDATE.TIME.SEC
            IF ANSWER$)"00" AND ANSWER2$("60" THEN GOTO VALIDATE.TIME.SEC
                        LET MSG$="MINUTES MUST BE 00 THRU 59. RE-ENTER."
```

```
                    GOTO VALIDATE.TIME.ERROR
VALIDATE.TIME.SEC:
        IF ANSWER3$="00" THEN RETURN
        IF ANSWER3$)"22" AND ANSWER3$("60" THEN RETURN
                LET.MSE$="SECONDS MUST BE 00 THRU 59. RE-ENTER."
VALIDATE.TIME.ERROR:
        LET STAT$="BAD"
        RETURN
REM---------------------------------------------------------------(PROCESS CONTROL FILE)
CONTROLFILE.OPEN:
        PRINT
        PRINT "Obtaining system control values."
        FILESIZE=SIZE(CTLFILE1$)
        IF FILESIZE=0 THEN GOTO CONTROLFILE.NO.FILE
        OPEN "R",4,CTLFILE1$,CTLLENGTH%
        LET DATERTRN$="NO"
        LET WORK%=1
        GOTO CONTROLFILE.GET.RECORD
CONTROLFILE.NO.FILE:
        FOR LLINE%=1 TO 25
                PRINT
        NEXT LLINE%
        PRINT "NO CONTROL FILE. RETURNING TO MENU"
        GOTO RETURN.TO.MENU
CONTROLFILE.GET.RECORD:
        GOSUB READ.CONTROLFILE.RECORD
        IF STAT$="END" THEN GOTO CONTROLFILE.CLOSE
        IF NAME$="ENDALL" THEN GOTO CONTROLFILE.CLOSE
        LET IWORK%=FIX(VAL(LEFT$(VALUEONE$,4)))
        IF NAME$="BLANK" THEN BLANK$=CHR$(IWORK%)
        IF NAME$="CLOCK" THEN CLOCK$=VALUEONE$
        IF NAME$="CTITLE" THEN CTITLE$=VALUEONE$
        IF NAME$="CURRDAY" THEN CURRYMD$=VALUEONE$ : CURRDAY$=VALUETWO$
        IF NAME$="DATERTRN" THEN GOTO CONTROLFILE.DATERTRN
        IF NAME$="HEADING" THEN HEADING$=VALUEONE$
        IF NAME$="NEXTDAY" THEN NEXTYMD$=VALUEONE$ : NEXTDAY$=VALUETWO$
        IF NAME$="PNEWPAGE" THEN PNEWPAGE$=CHR$(IWORK%)
        IF NAME$="PREVDAY" THEN LASTYMD$=VALUEONE$ : LASTDAY$=VALUETWO$
        IF NAME$="PRINTER" THEN PRINTER$=VALUEONE$
        IF NAME$="SHOME" THEN SHOME$=CHR$(IWORK%)
        IF NAME$="SCLEAR" THEN SCLEAR$=CHR$(IWORK%)
        IF NAME$="TEST" THEN TEST$=VALUEONE$
        IF NAME$="TITLE" THEN TITLE$=VALUEONE$
CONTROLFILE.SETUP.NEXT:
        LET WORK%=WORK%+1
        IF WORK%)CTLMAX% THEN GOTO CONTROLFILE.CLOSE
        GOTO CONTROLFILE.GET.RECORD
CONTROLFILE.DATERTRN:
        LET DATERTRN$=VALUEONE$
        LET VALUEONE$="NO"
        LET VALUETWO$=""
        GOSUB WRITE.CONTROLFILE.RECORD
        IF STAT$="END" THEN GOTO CONTROLFILE.CLOSE
        GOTO CONTROLFILE.SETUP.NEXT
CONTROLFILE.CLOSE:
        CLOSE 4
        IF DATERTRN$="TRAN" THEN GOTO RETURN.TO.MENU
```

```
REM-----------------------------------------------------(OBTAIN DATES)
SETUP.DATES:
        LET DATEIN$=CURRYMD$
        GOSUB CONVERT.YMD.MDY
        LET CURRDATE$=DATEOUT$
        LET DATEIN$=NEXTYMD$
        GOSUB CONVERT.YMD.MDY
        LET NEXTDATE$=DATEOUT$
        LET DATEIN$=LASTYMD$
        GOSUB CONVERT.YMD.MDY
        LET LASTDATE$=DATEOUT$
REM------------------------------------------(OPEN DIAL LIST AND WORK FILES)
CALLFILE.OPEN:
        GOSUB SCREEN.HEADING
        IF TEST$()"YES" THEN GOTO CALLFILE.OPEN.WORK.FILE
        PRINT "This processing is being run in TEST mode. Turn on printer."
        PRINT "When the printer is ready press RETURN.";
        WAITER%=CONCHAR
        PRINT
        LPRINTER
        PRINT "COMMUNICATIONS CALLING TEST REPORT"
        PRINT
        CONSOLE
CALLFILE.OPEN.WORK.FILE:
        ON END (2) GOTO CALLFILE.MESSAGE
        OPEN "I",2,CFILE2$
        LET RETURNCODE$="CCMMD"
        GOTO COMMD.RETURN
CALLFILE.MESSAGE:
REM-----------------------------------------------------------------
REM IF THE CALL NUMBER WAS NOT ENTERED, AND COMUPLAC IS NOT RETURNING FROM
REM A COMPLETED CALL, THEN AN ERROR HAS OCCURRED - USE BADPARM TO SAY SO
REM-----------------------------------------------------------------
        IF DIALREC%=0 THEN GOTO BADPARM
        PRINT "Opening the Dial List and communications processing files."
        FILESIZE=SIZE(CFILE1$)
        IF FILESIZE=0 THEN GOTO CALLFILE.NO.DIAL.LIST
        OPEN "R",1,CFILE1$,CFILELEN%
        GOTO CALLFILE.CREATE.WORK
CALLFILE.NO.DIAL.LIST:
        PRINT "NO DIAL LIST HAS BEEN ESTABLISHED."
        PRINT "THIS FUNCTION WILL GO INTO TERMINAL EMULATION MODE."
        PRINT
        PRINT "When you have read this message press RETURN.";
        WAITER%=CONCHAR
        LET FUNCTION$ = "T"
        LET HAVEDIAL$ = "NO"
        OPEN "O",2,CFILE2$
        LET RETURNCODE$="NORMAL"
        GOTO TERMINAL.START
CALLFILE.CREATE.WORK:
        OPEN "O",2,CFILE2$
        LET RETURNCODE$="NORMAL"
        GOTO SELECTION.START
REM-----------------------------------------------------(TERMINAL EMULATION)
TERMINAL.START:
```

```
        GOSUB SCREEN.HEADING
TERMINAL.RESPONSE:
        LINE INPUT "What telephone number do you want to dial ('C' to cancel call)? ", WORK$
        IF WORK$="C" OR WORK$="c" THEN GOTO COMMO.CHECK.RETURN
        LET TELEPHONE$=WORK$
        THISLEN=LEN(WORK$)
        IF THISLEN<20 THEN GOTO TERMINAL.TELEPHONE.NBR
        PRINT "TELEPHONE NUMBER IS TOO LONG. MUST BE 1 TO 19 DIGITS."
        PRINT "SHORTENED TO: ";
        LET WORK$=LEFT$(WORK$,19)
        PRINT WORK$
        PRINT
        GOTO TERMINAL.RESPONSE
TERMINAL.TELEPHONE.NBR:
        THISLEN=LEN(WORK$)
        IF THISLEN>4 THEN GOTO TERMINAL.TELEPHONE.NBR.TWO
        PRINT "NUMBER MUST BE MORE THAN FOUR DIGITS. RE-ENTER."
        PRINT
        GOTO TERMINAL.RESPONSE
TERMINAL.TELEPHONE.NBR.TWO:
        LET PHONENBR$=RIGHT$(WORK$,4)
        IF PHONENBR$>="0000" AND PHONENBR$<="9999" THEN GOTO TERMINAL.ASK.FOR.DISPLAY
        PRINT "I CAN'T CHECK IT ALL, BUT THE LAST FOUR MUST BE NUMERIC. RE-ENTER."
        PRINT
        GOTO TERMINAL.RESPONSE
TERMINAL.ASK.FOR.DISPLAY:
        IF HAVEDIAL$="YES" THEN GOTO TERMINAL.SETUP.LOGMSG
        PRINT
        INPUT "Do you want the received information to show on the screen? ",WORK$
        LET ANSWER2$=LEFT$(WORK$,1)
        LET ASCRN$=UCASE$(ANSWER2$)
        IF ASCRN$="Y" THEN GOTO TERMINAL.ASK.FOR.PRINTER
        IF ASCRN$="N" THEN GOTO TERMINAL.ASK.FOR.PRINTER
        PRINT "RESPONSE MUST BE (Y)ES OR (N)O. RE-ENTER."
        GOTO TERMINAL.ASK.FOR.DISPLAY
TERMINAL.ASK.FOR.PRINTER:
        PRINT
        INPUT "Do you want the received information to show on the printer? ",WORK$
        LET ANSWER2$=LEFT$(WORK$,1)
        LET APTR$=UCASE$(ANSWER2$)
        IF APTR$="Y" THEN GOTO TERMINAL.ASK.DUPLEX
        IF APTR$="N" THEN GOTO TERMINAL.ASK.DUPLEX
        PRINT "RESPONSE MUST BE (Y)ES OR (N)O. RE-ENTER."
        GOTO TERMINAL.ASK.FOR.PRINTER
TERMINAL.ASK.DUPLEX:
        PRINT
        INPUT "Is this call to be placed in full duplex mode? ",WORK$
        LET ANSWER2$=LEFT$(WORK$,1)
        LET AFDX$=UCASE$(ANSWER2$)
        IF AFDX$="Y" THEN GOTO TERMINAL.GET.START
        IF AFDX$="N" THEN GOTO TERMINAL.GET.START
        PRINT "RESPONSE MUST BE (Y)ES OR (N)O. RE-ENTER."
        GOTO TERMINAL.ASK.DUPLEX
TERMINAL.GET.START:
        LET DATEIN$=CURRYMD$
        GOSUB CONVERT.YMD.MDY
        LET CURRDATE$=DATEOUT$
```

```
        GOSUB 60.GET.TIME
TERMINAL.FILE.SETUP:
        LET CALLNBR%=0
        LET DESCRIP$="DIRECT CALL TO: "
        LET CDATE$="000000"
        LET CTIME$="000000"
        LET RTIME$="000000"
        LET DSK%=0
        LET DSKMETH$="N"
        LET ECRT$=ASCRN$
        LET EPTR$=APTR$
        LET DIAG$="N"
        LET SAVEPTR$="N"
        LET FDX$=AFDX$
        LET EXDY$="N"
        LET HBKSP$="0"
        LET EOF$="EOF"
        LET LOGMSG$="*QUIT"
        LET ENDCHR$=")"
        LET PARITY%=2
        LET STATUS%=0
        LET RECNT%=0
        LET STIME$=CURRTIME$
        LET ETIME$="000000"
        LET LDATE$=CURRDATE$
        LET RPGRM$=RETURNPGM$
        LET SPGRM$=FUNCTION\$+TELEPHONE$
        ON END (2) GOTO TERMINAL.DIAL.ADD.ERROR
        WRITE #2;CALLNBR%,DESCRIP$,CDATE$,CTIME$,RTIME$,DSK%,DSKMETH$,_
              ECRT$,EPTR$,DIAG$,SAVEPTR$,FDX$,EXDY$,HBKSP$,EOF$,LOGMSG$,_
              ENDCHR$,PARITY%,STATUS%,RECNT%,STIME$,ETIME$,LDATE$,RPGRM$,_
              SPGRM$
        GOTO TERMINAL.SETUP.LOGMSG
TERMINAL.DIAL.ADD.ERROR:
        PRINT
        PRINT "***** BIG PROBLEM - CANNOT ADD FIRST RECORD TO CCXDIALW *****"
        LET WAITER%=CONCHAR
        GOTO CLOSE.FILES
TERMINAL.SETUP.LOGMSG:
        LET ETYPE$="PH"
        LET ANO%=0
        LET ACNT=0
        LET MSG$=TELEPHONE$
        LET MODE$=" "
        LET ENDCHAR$=" "
        LET TEXT$=" "
        ON END (2) GOTO TERMINAL.LOGMSG.ERROR
        WRITE #2;CALLNBR%,ETYPE$,ANO%,ACNT,MSG$,MODE$,ENDCHAR$,TEXT$
        LET ETYPE$="**"
        LET MSG$="N"
        WRITE #2;CALLNBR%,ETYPE$,ANO%,ACNT,MSG$,MODE$,ENDCHAR$,TEXT$
        GOTO CHAIN.TO.COMMUNICATIONS
TERMINAL.LOGMSG.ERROR:
        PRINT
        PRINT "***** BIG PROBLEM - CANNOT ADD LOG RECORD TO CCXDIALW *****"
        LET WAITER%=CONCHAR
        GOTO CLOSE.FILES
```

```
REM---------------------------------------------------(CHAIN TO COMMUNICATIONS)
CHAIN.TO.COMMUNICATIONS:
        CLOSE 1
        CLOSE 2
        GOSUB SCREEN.HEADING
        FILESIZE=SIZE("COMIO.EXE")
        IF FILESIZE=0 THEN GOTO CANT.CHAIN.ERROR2
        PRINT "Transferring to communications processor."
        RUN "COMIO.EXE"
        END
CANT.CHAIN.ERROR2:
        PRINT "Unable to chain to communications processor."
        PRINT
        PRINT "Press RETURN to return to main menu."
        WAITER%=CONCHAR
        GOTO RETURN.TO.MENU
REM---------------------------------------------------------------(CLOSE FILES)
CLOSE.FILES:
        CLOSE 1
        DELETE 2
        GOTO RETURN.TO.MENU
REM-----------------------------------------------------------(SELECTION START)
SELECTION.START:
        ON END (6) GOTO SELECTION.NO.LOGFILE
        OPEN "I",6,CFILE6$
        GOTO SELECTION.CLOSE.LOGFILE
SELECTION.NO.LOGFILE:
        PRINT "NO LOG FILE HAS BEEN ESTABLISHED."
        PRINT "THIS FUNCTION WILL GO INTO TERMINAL EMULATION."
        PRINT
        PRINT "When you have read this message press RETURN.";
        WAITER%=CONCHAR
        LET FUNCTION$ = "T"
        GOTO TERMINAL.START
SELECTION.CLOSE.LOGFILE:
        CLOSE 6
        LET REC%=DIR_REC%
        LET MSG$=" "
        LET HAVECALLS$="NO"
SELECTION.READ.RECORD:
        IF REC%>ENTRY.NT% THEN GOTO SELECTION.SELECTED.ERROR
        ON END (1) GOTO SELECTION.SELECTED.ERROR
        GOSUB READ.CALLFILE.RECORD
        IF STAT$="END" THEN GOTO SELECTION.SELECTED.ERROR
        IF DESCRIP$="*" THEN GOTO SELECTION.SELECTED.ERROR
REM     IF SPGRM$="BAXTRAC" THEN GOTO SELECTION.INVALID.CALL
        GOTO SETUP.CHAIN.VALUES
REM SELECTION.INVALID.CALL:
REM     GOSUB SCREEN.HEADING
REM     PRINT
REM     PRINT "*****************************************************"
REM     PRINT "*                                                   *"
REM     PRINT "*   THIS MODULE CANNOT BE USED TO LOAD A DATA FILE  *"
REM     PRINT "*                                                   *"
REM     PRINT "*****************************************************"
REM     PRINT
REM     PRINT
```

```
REM     PRINT "When you have read this message press RETURN"
REM     LET WAITERX=CONCHAR
REM     LET HAVEDIAL$="NO"
REM     GOTO CLOSE.FILES
SELECTION.SELECTED.ERROR:
        GOSUB SCREEN.HEADING
        PRINT
        PRINT "*************************************************"
        PRINT "*                                               *"
        PRINT "*       CALL ";
        PRINT USING "##";DIALRECX;
        PRINT " DOES NOT EXIST                                 *"
        PRINT "*       GOING TO TERMINAL EMULATION             *"
        PRINT "*                                               *"
        PRINT "*************************************************"
        PRINT
        PRINT
        PRINT "When you have read this message press RETURN"
        LET WAITERX=CONCHAR
        GOTO TERMINAL.START
REM-----------------------------------------------(SETUP CHAIN VALUES)
SETUP.CHAIN.VALUES:
        GOSUB SCREEN.HEADING
        PRINT "Setting up instructions for selected call."
        GOSUB GO.GET.TIME
SETUP.NO.CLOCK:
        LET FUNCTION$="A"
        IF CTIME$()="000000" THEN FUNCTION$="A"
        LET STATUSX=0
        LET RECNTX=0
        IF DIAG$="Y" THEN SAVEPTR$="N"
        LET STIME$=CURRTIME$
        LET ETIME$="000000"
        LET LDATE$=CURRDATE$
        LET RPGRM$=RETURNPGM$
        LET SPGRM$=FUNCTION$+SPGRM$
        ON END (2) GOTO SETUP.DIAL.ADD.ERROR
        WRITE  #2;CALLNBRX,DESCRIP$,CDATE$,CTIME$,RTIME$,DSKX,DSKMETH$,_
                ECRT$,EPTR$,DIAG$,SAVEPTR$,FDX$,EMDM$,HBKSP$,EOF$,LCBKSP$,_
                ENDCHR$,PARITYX,STATUSX,RECNTX,STIME$,ETIME$,LDATE$,RPGRM$,_
                SPGRM$
        GOTO SETUP.OPEN.LOG.FILE
SETUP.DIAL.ADD.ERROR:
        PRINT
        PRINT "***** BIG PROBLEM - CANNOT ADD FIRST SETUP RECORD TO CD/DIALW *****"
        LET WAITERX=CONCHAR
        GOTO CLOSE.FILES
SETUP.OPEN.LOG.FILE:
        ON END (6) GOTO SETUP.LOGFILE.OPEN.ERROR
        OPEN "I",6,DFILE6$
        LET HAVELOG$="NO"
        GOTO SETUP.LOGFILE.READ.LOOP
SETUP.LOGFILE.OPEN.ERROR:
        PRINT
        PRINT "NO LOGFILE HAS BEEN ESTABLISHED. CHANGING TO TERMINAL EMULATION."
        PRINT "Press RETURN when you have read this message.";
```

```
        LET WAITERX=CONCHAR
        GOTO CLOSE.FILES
SETUP.LOGFILE.READ.LOOP:
        ON END (6) GOTO SETUP.CLOSE.FILES
        READ #6;CALLNBR%,ETYPE$,ANO%,ADNT,XSG$,MODE$,ENDCHAR$,TEXT$
        IF CALLNBR%<REC% THEN GOTO SETUP.LOGFILE.READ.LOOP
        IF CALLNBR%>REC% THEN GOTO SETUP.CLOSE.FILES
        LET HAVELOG$="YES"
        IF ETYPE$()"CD" THEN GOTO SETUP.OUTPUT.LOG.VALUES
        LET DTYPE$=LEFT$(XSG$,1)
        LET RTYPE$=MID$(XSG$,2,1)
        IF RTYPE$="Y" THEN ETYPE$="CY"
        IF RTYPE$="N" THEN ETYPE$="CN"
        IF RTYPE$="S" THEN ETYPE$="CW"
        LET DATETYPE$=MID$(XSG$,7,1)
        LET WORKDATE$=CURRDATE$
        IF DATETYPE$="P" THEN WORKDATE$=LASTDATE$
        IF DATETYPE$="N" THEN WORKDATE$=NEXTDATE$
        IF DATETYPE$=" " THEN WORKDATE$=LASTDATE$
        IF DTYPE$="N" THEN GOTO SETUP.CD.NORMAL.RESPONSE
            LET LDMM$=LEFT$(WORKDATE$,2)
            LET LDDD$=MID$(WORKDATE$,3,2)
            LET LDYY$=RIGHT$(WORKDATE$,2)
            LET LTHH$=LEFT$(CURRTIME$,2)
            LET LTMM$=MID$(CURRTIME$,3,2)
            LET YSG$=DTYPE$+" "+LDYY$+LDMM$+LDDD$+" "+LTHH$+LTMM$
            GOTO SETUP.OUTPUT.LOG.VALUES
SETUP.CD.NORMAL.RESPONSE:
        LET DATEFMT$=MID$(XSG$,6,1)
        IF DATEFMT$="A" OR DATEFMT$="B" THEN GOTO SETUP.CD.NORMAL.FORMAT
        IF DATEFMT$="E" OR DATEFMT$="F" THEN GOTO SETUP.CD.NORMAL.FORMAT
        LET DATEIN$=WORKDATE$
        GOSUB CONVERT.MDY.YMD
        LET WORKDATE$=DATEOUT$
SETUP.CD.NORMAL.FORMAT:
        LET WMSG$=""
        LET DPREFIXLEN$=MID$(YSG$,8,2)
        IF DPREFIXLEN$="  " THEN _
            LET DPREFIX$=MID$(XSG$,3,3) :_
            IF DPREFIX$()"   " THEN _
                LET WMSG$=DPREFIX$ _
            ELSE _
        ELSE _
            LET DPREFIXLEN%=VAL(DPREFIXLEN$) :_
            IF DPREFIXLEN%()0 THEN _
                LET WMSG$=MID$(YSG$,10,DPREFIXLEN%)
        LET WMSG$=WMSG$+LEFT$(WORKDATE$,2)
        IF DATEFMT$="B" OR DATEFMT$="D" OR DATEFMT$="F" THEN WMSG$=WMSG$+"/"
        LET WYSG$=WMSG$+MID$(WORKDATE$,3,2)
        IF DATEFMT$="B" OR DATEFMT$="D" THEN _
            WYSG$=WYSG$+"/"
        IF DATEFMT$="A" OR DATEFMT$="B" OR DATEFMT$="C" OR DATEFMT$="D" THEN _
            LET WYSG$=WMSG$+RIGHT$(WORKDATE$,2)
        LET YSG$=WYSG$
SETUP.OUTPUT.LOG.VALUES:
        ON END (2) GOTO SETUP.OUTPUT.ADD.ERROR
```

```
        WRITE #2;CALLNBR%,ETYPE$,ANDX,ACNT,MSG$,MODE$,ENDCHAR$,TEXT$
        GOTO SETUP.LOGFILE.READ.LOOP
SETUP.OUTPUT.ADD.ERROR:
        PRINT
        PRINT "***** BIG PROBLEM - NO ROOM FOR NEW COMDIALW RECORDS *****"
        LET WRITER%=ENDCHAR
        CLOSE 6
        GOTO CLOSE.FILES
SETUP.CLOSE.FILES:
        CLOSE 6
        IF HAVELOG$="YES" THEN GOTO CHAIN.TO.COMMUNICATIONS
        LET HAVEDIAL$="YES"
        GOTO TERMINAL.START
REY-----------------------------------------------------(COMMUNICATIONS RETURN)
COMMO.RETURN:
        ON END (2) GOTO COMMO.DIAL.READ.ERROR
        READ #2;CALLNBR%,DESCRIP$,CDATE$,CTIME$,RTIME$,DSK%,DSKMETH$,_
               ECRT$,EPTR$,DIAG$,SAVEPTR$,FDX$,EMDM$,HSKSP$,EOF$,LOGYSG$,_
               ENDCHR$,PARITY%,STATUS%,RECNT%,STIME$,ETIME$,LDATE$,RPGRM$,_
               SPGRM$
        LET FUNCTION$=LEFT$(SPGRM$,1)
        LET SPGRM$=RIGHT$(SPGRM$,(LEN(SPGRM$)-1))
        IF FUNCTION$()"T" THEN GOTO COMMO.GET.DATES
        LET DESCRIP$=DESCRIP$+SPGRM$
        LET SPGRM$=" "
        GOTO COMMO.GET.DATES
COMMO.DIAL.READ.ERROR:
        DELETE 2
        GOTO CALLFILE.CREATE.WORK
COMMO.GET.DATES:
        GOSUB SCREEN.HEADING
        PRINT "Call has been completed. Updating the proper files."
COMMO.CHECK.CLOCK:
        GOSUB SO.GET.TIME
        LET HAVEERROR$="NO"
        ON END (7) GOTO COMMO.NO.ERROR.CODE
        OPEN "I",7,CFILE7$
        LET HAVEERROR$="YES"

COMMO.READ.ERROR.FILE:
        ON END (7) GOTO COMMO.NO.ERROR.CODE
        READ #7;ERRORCD%,EFLAG$,EMSG1$,EMSG2$
        IF ERRORCD%=STATUS% THEN GOTO COMMO.FOUND.ERROR.CODE
        GOTO COMMO.READ.ERROR.FILE
COMMO.NO.ERROR.CODE:
        LET ERRORCD%=STATUS%
        LET EFLAG$="R":                                          REY cng 09/01/82
        LET EMSG1$="Unknown Error Condition: "+TRIM$(STR$(STATUS%))
        LET EMSG2$=" "
COMMO.FOUND.ERROR.CODE:
        IF HAVEERROR$="YES" THEN CLOSE 7
        LET COMMOERROR$="YES"
        IF EFLAG$="N" THEN COMMOERROR$="NO"
REY-----------------------------------------------------(RENAME/DELETE COMDSKW.$$$)
        LET DISKFILE$="N"
        LET DISKNAME$=" "
        ON END (3) GOTO COMMO.FILE.FINISH
```

```
            OPEN "I",3,CFILE3$
            CLOSE 3
            LET WORKNBR$=TRIM$(STR$(CALL\BR%))
            THISLEN=LEN(WORKNBR$)
            IF THISLEN=1 THEN WORKNBR$="3"+WORKNBR$
            IF DIAG$="N" THEN GOTO COMMO.FILE.NO.DIAG
            LET NEWNAME$="C"+WORKNBR$+"DIAG.DAT"
            ON END (4) GOTO COMMO.DELETE.RENAME
            OPEN "I",4,NEWNAME$
            DELETE 4
COMMO.DELETE.RENAME:
            RTN%=RENAME(NEWNAME$,CFILE3$)
            IF RTN%=-1 THEN GOTO COMMO.FILE.HAVE.DIAG
                    PRINT "CANNOT RENAME TO DIAGNOSTICS FILE"
                    PRINT "When ready to continue press RETURN."
                    WAITER%=CONCHAR
                    GOTO COMMO.FILE.FINISH
COMMO.FILE.HAVE.DIAG:
            LET DISKNAME$=NEWNAME$
            LET DISKFILE$="D"
            GOTO COMMO.FILE.FINISH
COMMO.FILE.NO.DIAG:
            IF COMMOERROR$()"YES" THEN GOTO COMMO.FILE.NO.ERROR
                    LET NEWNAME$="C"+WORKNBR$+"EROR.DAT"
                    ON END (4) GOTO COMMO.ERROR.RENAME
                    OPEN "I",4,NEWNAME$
                    DELETE 4
COMMO.ERROR.RENAME:
            RTN%=RENAME(NEWNAME$,CFILE3$)
            IF RTN%=-1 THEN GOTO COMMO.FILE.HAVE.ERROR
                    PRINT "CANNOT RENAME TO ERROR RETENTION FILE"
                    PRINT "When ready to continue press RETURN."
                    WAITER%=CONCHAR
                    GOTO COMMO.FILE.FINISH
COMMO.FILE.HAVE.ERROR:
            LET DISKNAME$=NEWNAME$
            LET DISKFILE$="E"
            GOTO COMMO.FILE.FINISH
COMMO.FILE.NO.ERROR:
            IF DSK%()2 THEN GOTO COMMO.FILE.HAVE.DISKRPT
            GOTO COMMO.FILE.DELETE
COMMO.FILE.HAVE.DISKRPT:
            LET DSK%=DSK%+1
            IF DSK%)99 THEN DSK%=1
            LET WORKNBR2$=TRIM$(STR$(DSK%))
            THISLEN=LEN(WORKNBR2$)
            IF THISLEN=1 THEN WORKNBR2$="2"+WORKNBR2$
            LET NEWNAME$="C"+WORKNBR$+WORKNBR2$
            LET NEWNAME2$=NEWNAME$+"DSK.DAT"
            IF SAVEPTR$="Y" THEN LET NEWNAME2$=NEWNAME$+"RPT.DAT"
            ON END (4) GOTO COMMO.FILE.RENAME
            OPEN "I",4,NEWNAME2$
            DELETE 4
COMMO.FILE.RENAME:
            RTN%=RENAME(NEWNAME2$,CFILE3$)
            IF RTN%=-1 THEN GOTO COMMO.FILE.HAVE.DSK.RPT
```

```
            LET MSG$="CANNOT RENAME TO DISK DATASET FILE"
            IF SAVEPTR$="Y" THEN LET MSG$="CANNOT RENAME TO PRINTER FILE"
            PRINT MSG$
            PRINT "When ready to continue press RETURN."
            WAITER%=CONCHAR
            GOTO COMMO.FILE.FINISH
COMMO.FILE.HAVE.DSK.RFT:
        LET DISKNAME$=NEWNAME$
        LET DISKFILE$="F"
        IF SAVEPTR$="Y" THEN LET DISKFILE$="R"
        GOTO COMMO.FILE.FINISH
COMMO.FILE.DELETE:
        ON END (3) GOTO COMMO.FILE.FINISH
        OPEN "I",3,CFILE$
        DELETE 3
COMMO.FILE.FINISH:
        LET HAVECOMFILE$="NO"
        IF DISKFILE$="N" THEN GOTO COMMO.CHECK.NORMAL
COMMO.COMFILE.WORK:
        ON END (3) GOTO COMMO.COMFILE.CREATE.WORK
        OPEN "I",3,CFILE12$
        DELETE 3
COMMO.COMFILE.CREATE.WORK:
        OPEN "C",3,CFILE12$
        ON END (4) GOTO COMMO.COMFILE.ADD
        OPEN "I",4,CFILE11$
        HAVECOMFILE$="YES"
COMMO.COMFILE.READ:
        READ #4;CFYMD$,CFHMS$,CFNAME$
        IF CFNAME$=DISKNAME$ THEN GOTO COMMO.COMFILE.READ
        WRITE #3;CFYMD$,CFHMS$,CFNAME$
        GOTO COMMO.COMFILE.READ
COMMO.COMFILE.ADD:
        LET CFYMD$=RIGHT$(CURRDATE$,2)+LEFT$(CURRDATE$,4)
        LET CFHMS$=CURRTIME$
        ON END (3) GOTO COMMO.COMFILE.RENAME
        WRITE #3;CFYMD$,CFHMS$,DISKNAME$
COMMO.COMFILE.RENAME:
        IF HAVECOMFILE$="YES" THEN DELETE 4
        CLOSE 3
        REC%=RENAME(CFILE11$,CFILE12$)
        IF REC%=-1 THEN GOTO COMMO.CHECK.NORMAL
        PRINT "CANNOT RENAME COMFILE WORK TO CURRENT"
        PRINT "When ready to continue press RETURN."
        WAITER%=CONCHAR
COMMO.CHECK.NORMAL:
        IF TEST$()"YES" THEN GOTO COMMO.CHECK.NORMAL.CONTINUE
            LPRINTER
            PRINT "------COMMO.CHECK.NORMAL------"
            PRINT "DISKFILE$=";DISKFILE$
            PRINT "DISKNAME$=";DISKNAME$
            PRINT "  EFLAG$=";EFLAG$
            PRINT "------------------------------"
            CONSOLE
COMMO.CHECK.NORMAL.CONTINUE:
        IF EFLAG$="N" THEN GOTO COMMO.NORMAL.COMPLETION
REM--------------------------------------------------------(UPDATE TROUBLE FILE)
```

```
        PRINT
        PRINT "Have an error. Updating trouble log."
        LET ETIME$=CURRTIME$
        LET LDATE$=CURRDATE$
        LET RPGRM$=RETURNPGM$
        ON END (4) GOTO COMMO.NO.TRBL.FILE
        OPEN "I",4,CFILE4$
        GOTO COMMO.COPY.TRBL
COMMO.NO.TRBL.FILE:
REM------------------------------------------------------------------
REM Trouble Log could not be opened for reading, so open it for writing. This
REM causes a new file to be created, and the current values are written to the
REM new file; the file is closed, and control passes to the rescheduling part
REM of the routine.
REM------------------------------------------------------------------
        ON END (4) GOTO COMMO.BYPASS.TRBL.UPDATE
        OPEN "O",4,CFILE4$
        WRITE #4;CALLNBR%,DESCRIP$,CDATE$,CTIME$,RTIME$,DSK%,DSKMETH$,_
              ECRT$,EPTR$,DIAG$,SAVEPTR$,FDX$,EMDM$,HBKSP$,EOF$,LOGMSG$,_
              ENDCHR$,PARITY%,STATUS%,RECNT%,STIME$,ETIME$,LDATE$,RPGRM$,_
              SPGRM$
        CLOSE 4
        GOTO COMMO.BYPASS.TRBL.UPDATE
COMMO.COPY.TRBL:
REM------------------------------------------------------------------
REM Open temporary Trouble Log for writing.
REM------------------------------------------------------------------
        OPEN "O",13,CFILE13$
COMMO.TRBL.READ.LOOP:
REM------------------------------------------------------------------
REM Read each record of Trouble Log, and write it to temporary Trouble Log.
REM When end of Trouble Log reached, go to next step.
REM------------------------------------------------------------------
        ON END (4) GOTO COMMO.ADD.TRBL.RECORD
        READ #4;OCALLNBR%,ODESCRIP$,OCDATE$,OCTIME$,ORTIME$,ODSK%,ODSKMETH$,_
              OECRT$,OEPTR$,ODIAG$,OSAVEPTR$,OFDX$,OEMDM$,OHBKSP$,OEOF$,OLOGMSG$,_
              OENDCHR$,OPARITY%,OSTATUS%,ORECNT%,OSTIME$,OETIME$,OLDATE$,ORPGRM$,_
              OSPGRM$
        WRITE #13;OCALLNBR%,ODESCRIP$,OCDATE$,OCTIME$,ORTIME$,ODSK%,ODSKMETH$,_
              OECRT$,OEPTR$,ODIAG$,OSAVEPTR$,OFDX$,OEMDM$,OHBKSP$,OEOF$,OLOGMSG$,_
              OENDCHR$,OPARITY%,OSTATUS%,ORECNT%,OSTIME$,OETIME$,OLDATE$,ORPGRM$,_
              OSPGRM$
        GOTO COMMO.TRBL.READ.LOOP
COMMO.ADD.TRBL.RECORD:
REM------------------------------------------------------------------
REM Write current values to temporary Trouble Log as last record, close file,
REM and delete old Trouble Log.
REM------------------------------------------------------------------
        WRITE #13;CALLNBR%,DESCRIP$,CDATE$,CTIME$,RTIME$,DSK%,DSKMETH$,_
              ECRT$,EPTR$,DIAG$,SAVEPTR$,FDX$,EMDM$,HBKSP$,EOF$,LOGMSG$,_
              ENDCHR$,PARITY%,STATUS%,RECNT%,STIME$,ETIME$,LDATE$,RPGRM$,_
              SPGRM$
        CLOSE 13
        DELETE 4
REM------------------------------------------------------------------
REM Rename temporary Trouble Log to Trouble Log; if unable, goto error
```

```
REM  reporting.  Go to rescheduling algorithm.
REM--------------------------------------------------------------------
        RENFLAG%=RENAME(CFILE4$,CFILE13$)
        IF RENFLAG%()-1 THEN GOTO COMMO.COMBINE.TRBL.ERROR
        GOTO COMMO.BYPASS.TRBL.UPDATE
COMMO.COMBINE.TRBL.ERROR:
REM--------------------------------------------------------------------
REM Temporary Trouble Log could not be renamed.  Tell user, and leave the
REM temporary file available for support maintenance.
REM--------------------------------------------------------------------
        PRINT "****** BIG PROBLEM - CANNOT RENAME WORK TO TROUBLE ******"
        PRINT
        PRINT "Press RETURN to continue"
        WAITER%=CONCHAR
REM------------------------------------------------(DISPLAY ERROR MESSAGE)
COMMO.BYPASS.TRBL.UPDATE:
        IF FUNCTION$="U" THEN GOTO COMMO.CHECK.RETURN
        GOSUB SCREEN.HEADING
        PRINT "***********************************************************"
        PRINT "*                                                         *"
        PRINT "*   THERE HAS BEEN AN ERROR DURING COMMUNICATIONS PROCESSING *"
        PRINT "*                                                         *"
        PRINT "***********************************************************"
        PRINT
        PRINT
        PRINT TAB(15);EMSG1$
        PRINT
        PRINT
        PRINT "Press RETURN when you have reviewed the error message.";
        WAITER%=CONCHAR
        GOTO COMMO.CHECK.RETURN
REM------------------------------------------------(NORMAL COMPLETION)
COMMO.NORMAL.COMPLETION:
        LET ETIME$=CURRTIME$
        LET LDATE$=CURRDATE$
        LET RPGRM$=RETURNPGM$
        PRINT
        PRINT "Normal completion. Updating the daily history file."
        ON END (5) GOTO COMMO.NO.HIST.FILE
        OPEN "I",5,CFILE5$
        GOTO COMMO.COPY.HIST
COMMO.NO.HIST.FILE:
        ON END (5) GOTO COMMO.BYPASS.HIST.UPDATE
        OPEN "O",5,CFILE5$
        WRITE #5;CALLNBR%,DESCRIP$,CDATE$,CTIME$,RTIME$,DSK%,DSKMETH$,_
                ECRT$,EPTR$,DIAG$,SAVEPTR$,FDX$,EMDY$,HBKSP$,EOF$,LOGMSG$,_
                ENDCHR$,PARITY%,STATUS%,RECNT%,STIME$,ETIME$,LDATE$,RPGRM$,_
                SPGRM$
        CLOSE 5
        GOTO COMMO.BYPASS.HIST.UPDATE
COMMO.COPY.HIST:
        OPEN "O",14,CFILE14$
COMMO.HIST.READ.LOOP:
        ON END (5) GOTO COMMO.ADD.HIST.RECORD
        READ #5;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEMDY$,OHBKSP$,OEOF$,OLOGMSG$,_
```

```
                OENDCHR$,OPARITY%,OSTATUS%,ORECNT%,OSTIME$,OETIME$,OLDATE$,ORPGRM$,_
                OSPGRM$
        WRITE #14;OCALLNBR%,ODESCRIP$,OCDATE$,OCTIME$,ORTIME$,ODSK%,ODSKMETH$,_
                OECRT$,OEPTR$,ODIAG$,OSAVEPTR$,OFDX$,OEXDM$,OHBKSP$,OEOF$,OLOGMSG$,_
                OENDCHR$,OPARITY%,OSTATUS%,ORECNT%,OSTIME$,OETIME$,OLDATE$,ORPGRM$,_
                OSPGRM$
        GOTO COMMO.HIST.READ.LOOP
COMMO.ADD.HIST.RECORD:
        WRITE #14;CALLNBR%,DESCRIP$,CDATE$,CTIME$,RTIME$,DSK%,DSKMETH$,_
                ECRT$,EPTR$,DIAG$,SAVEPTR$,FDX$,EXDM$,HBKSP$,EOF$,LOGMSG$,_
                ENDCHR$,PARITY%,STATUS%,RECNT%,STIME$,ETIME$,LDATE$,RPGRM$,_
                SPGRM$
        CLOSE 14
        DELETE 5
        RENFLAG%=RENAME(CFILE5$,CFILE14$)
        IF RENFLAG%()-1 THEN GOTO COMMO.COMBINE.HIST.ERROR
        GOTO COMMO.BYPASS.HIST.UPDATE
COMMO.COMBINE.HIST.ERROR:
        PRINT "****** BIG PROBLEM - CANNOT RENAME WORK TO HISTORY ******"
        PRINT : PRINT "Press RETURN to continue"
        WORK%=CONCHAR
REM------------------------------------------------------------(UPDATE DIAL LIST)
COMMO.BYPASS.HIST.UPDATE:
        IF CALLNBR%=0 THEN GOTO COMMO.CHECK.RETURN REM  Open the dial file
        REM------------------------------------------------------------
        FILESIZE=SIZE(CFILE1$)
        IF FILESIZE=0 THEN GOTO COMMO.CHECK.RETURN   REM No dial file
        OPEN "R",1,CFILE1$,CFILELEN%                 REM Open the file GET #1,CALLNER%
        INPUT #1,OCALLNBR%,ODESCRIP$,OCDATE$,OCTIME$,ORTIME$,ODSK%,ODSKMETH$
        INPUT #1,OECRT$,OEPTR$,ODIAG$,OSAVEPTR$,OFDX$,OEXDM$,OHBKSP$,OEOF$,OLOGMSG$
        INPUT #1,OENDCHR$,OPARITY%,OSTATUS%,ORECNT%,OSTIME$,OETIME$,OLDATE$,ORPGRM$
        INPUT #1,OSPGRM$
        IF FUNCTION$()"A" THEN GOTO COMMO.SETUP.DIAL.ONE
COMMO.CHECK.CDATE.RESET:
        PRINT
        INPUT "Does this call satisfy today's call requirement (Y,N)? ",WORK$
        ANSWER2$=LEFT$(WORK$,1)
        ANSWER$=UCASE$(ANSWER2$)
        IF ANSWER$="Y" THEN GOTO COMMO.SETUP.DIAL.ONE
        IF ANSWER$="N" THEN GOTO COMMO.SETUP.DIAL.TWO
        PRINT "RESPONSE MUST BE (Y)ES OR (N)O. RE-ENTER."
        GOTO COMMO.CHECK.CDATE.RESET
COMMO.SETUP.DIAL.ONE:
        LET OCDATE$=NEXTDATE$
COMMO.SETUP.DIAL.TWO:
        LET ORTIME$="230000"
        LET ODSK%=DSK%
        LET OSTATUS%=STATUS%
        LET ORECNT%=RECNT%
        LET OSTIME$=STIME$
        LET OETIME$=CURRTIME$
        LET OLDATE$=CURRDATE$
```

```
            LET ERPGRM$=RETURN\PGM$
            WRITE #1,CALLNBR%;GCALLNBR%,ODESCRIP$,ODDATE$,ODTIME$,ORTIME$,ODSK%,ODSKMETH$,_
                  OECRT$,DEPTR$,ODIAG$,OSAVEPTR$,OFDX$,OEMDM$,O-BASP$,OECP$,OLOGMSG$,_
                  OENOCHR$,OPARITY%,OSTATUS%,OREDNT%,OSTIME$,OETIME$,OLDATE$,ORPGRM$,_
                  OSPGRM$
     REM------------------------------------------------------(DATA TRANSLATION)
     TRANSLATE.START:
            IF DISKFILE$()"F"    THEN GOTO COMMO.CHECK.RETURN
            IF SPGRM$()"BAMTRAC" THEN GOTO COMMO.CHECK.RETURN
            PRINT
            PRINT "Transfering to BAMTRAC translation module."
            PRINT
            CLOSE 1
            DELETE 2
            FILESIZE=SIZE(CTLFILE1$)
            IF FILESIZE=0 THEN GOTO CONTROLFILE.NO.FILE
            OPEN "R",4,CTLFILE1$,CTLLENGTH%
            LET WORK%=1
     TRANSLATE.DATERTRN.READ:
            GOSUB READ.CONTROLFILE.RECORD
            IF STAT$="END"      THEN GOTO TRANSLATE.DATERTRN.ERROR
            IF NAME$="ENDALL"   THEN GOTO TRANSLATE.DATERTRN.ERROR
            IF NAME$="DATERTRN" THEN GOTO TRANSLATE.DATERTRN.UPDATE
            LET WORK%=WORK%+1
            IF WORK%)CTLMAX%    THEN GOTO TRANSLATE.DATERTRN.ERROR
            GOTO TRANSLATE.DATERTRN.READ
     TRANSLATE.DATERTRN.UPDATE:
            LET VALUEONE$="COMUPLAC"
            LET VALUETWO$=FUNCTION$+DISKNAME$
            GOSUB WRITE.CONTROLFILE.RECORD
            IF STAT$="END" THEN GOTO TRANSLATE.DATERTRN.ERROR
            CLOSE 4
            FILESIZE=SIZE("CONTBAMR.EXE")
            IF FILESIZE=0 THEN GOTO CANT.CHAIN.ERROR1
            CHAIN "CONTBAMR.EXE"
     CANT.CHAIN.ERROR1:
            PRINT "Unable to chain to translation routine."
            PRINT
            PRINT "Press RETURN to return to main menu."
            WAITER%=CONCHAR
            GOTO RETURN.TO.MENU
     TRANSLATE.DATERTRN.ERROR:
            CLOSE 4
            PRINT "NO DATERTRN ENTRY IN THE CONTROL FILE."
            PRINT
            PRINT "Press RETURN to return to main menu."
            WAITER%=CONCHAR
            GOTO RETURN.TO.MENU
     REM------------------------------------------------------(COMMO RETURN CHECK)
     COMMO.CHECK.RETURN:
     REM    ON END(2) GOTO RETURN.TO.MENU
            DELETE 2
     REM------------------------------------------------------(RETURN)
```

```
RETURN.TO.MENU:
    GOSUB SCREEN.HEADING
    PRINT "Returning to menu."
    END
END

C)
D)
```

What is claimed is:

1. A communications system comprising
a user terminal including
a microcomputer,
a mainframe computer connected to said microcomputer, said user terminal further including communication software control means for controlling the transfer of data directly between said microcomputer and said mainframe computer, said software control means including means for controlling the transfer of said data in an unattended mode.

2. A system as in claim 1 wherein said software control means include means for controlling the transfer of said data in an automatic mode.

3. A system as in claim 1 wherein said software control means include means for controlling the transfer of said data in a manual mode.

4. A system as in claim 1 wherein said software control means include means for controlling the transfer of said data in a terminal emulation mode.

5. In a cash management system, communications control apparatus comprising
a user terminal including
a microcomputer,
a mainframe computer connected to said microcomputer, said user terminal further including communication software control means for controlling the transfer of data directly between said microcomputer and said mainframe computer, said software control means including means for controlling the transfer of said data in a terminal emulation mode, in a manual mode, in an automatic mode, and in an unattended mode.

6. In a cash management system, communications control apparatus comprising
a user terminal including
a microcomputer,
a mainframe computer connected to said microcomputer, said user terminal further including communication software control means for controlling the transfer of data directly between said microcomputer and said mainframe computer, said software control means including means for controlling the transfer of said data in an unattended mode.

7. A system as in claim 6 wherein said software control means include means for controlling the transfer of said data in an automatic mode.

8. A system as in claim 6 wherein said software control means include means for controlling the transfer of said data in a manual mode.

9. A system as in claim 6 wherein said software control means include means for controlling the transfer of said data in a terminal emulation mode.

* * * * *